US008316438B1

(12) United States Patent
Bush et al.

(10) Patent No.: US 8,316,438 B1
(45) Date of Patent: Nov. 20, 2012

(54) NETWORK MANAGEMENT PROVIDING NETWORK HEALTH INFORMATION AND LOCKDOWN SECURITY

(75) Inventors: Steve Bush, Redmond, WA (US); Steve Mooney, Seattle, WA (US); Xin Liu, Seattle, WA (US); John Mevissen, Edmonds, WA (US); Josh J Hinds, Duvall, WA (US); Ron Gery, Kirkland, WA (US); Brett Marl, Seattle, WA (US); Matthew Tebbs, Seattle, WA (US)

(73) Assignee: Pure Networks LLC, Wilmington, DE (US)

( * ) Notice: Subject to any disclaimer, the term of this patent is extended or adjusted under 35 U.S.C. 154(b) by 868 days.

(21) Appl. No.: 11/696,638

(22) Filed: Apr. 4, 2007

Related U.S. Application Data

(63) Continuation-in-part of application No. 11/467,534, filed on Aug. 25, 2006, which is a continuation-in-part of application No. 11/297,809, filed on Dec. 7, 2005, which is a continuation-in-part of application No. 10/916,642, filed on Aug. 10, 2004.

(60) Provisional application No. 60/789,522, filed on Apr. 4, 2006, provisional application No. 60/634,432, filed on Dec. 7, 2004.

(51) Int. Cl.
*H04L 29/06* (2006.01)

(52) U.S. Cl. ............................................ 726/22; 726/23

(58) Field of Classification Search ..................... 726/23
See application file for complete search history.

(56) References Cited

U.S. PATENT DOCUMENTS 5,383,178 A 1/1995 Unverrich (Continued)

FOREIGN PATENT DOCUMENTS

EP 1315334 5/2003

(Continued)

OTHER PUBLICATIONS

Byoung-Koo Kim/Jong-Su Jang/Tai M.Chung, Design of Network Security Control System for Cooperative Intrusion Detection, 2002, pp. 389-398.*

(Continued)

*Primary Examiner* — Brandon Hoffman
*Assistant Examiner* — Michael D Anderson
(74) *Attorney, Agent, or Firm* — Patent Capital Group

(57) ABSTRACT

Network management to establish and maintain the health and security of a computing network, such as a home network. A network management tool may identify the media access control (MAC) address for each device in the network, and allow a user to identify which devices are authorized to be a member of the network. If the network gateway device supports MAC address filtering, a user can then employ the network management tool to configure the router to exclude non-authorized devices from joining or remaining in the network based upon their MAC addresses. Further, the network management tool may allow a user to configure a wireless gateway device to stop broadcasting its service set identifier (SSID), change the SSID, or both, identify to the user when a wireless gateway device is using encryption, and, if so, what type of encryption. Still further, the tool may monitor the status of various software applications on devices in the network, and then alert a user if the status of any of the devices in the network requires attention. Further, the network management tool may provide recommendations to a user for correcting or changing the status of the monitored software applications.

19 Claims, 102 Drawing Sheets

U.S. PATENT DOCUMENTS

| | | | | |
|---|---|---|---|---|
| 5,396,485 | A | 3/1995 | Ohno et al. | |
| 5,758,083 | A | 5/1998 | Singh et al. | |
| 5,768,483 | A | 6/1998 | Maniwa et al. | |
| 5,774,667 | A | 6/1998 | Garvey et al. | |
| 5,838,907 | A | 11/1998 | Hansen | |
| 5,974,237 | A | 10/1999 | Shurmer et al. | |
| 5,978,568 | A | 11/1999 | Abraham et al. | |
| 6,006,272 | A | 12/1999 | Aravamudan et al. | |
| 6,023,723 | A | 2/2000 | McCormick et al. | |
| 6,157,950 | A | 12/2000 | Krishnan | |
| 6,456,306 | B1 | 9/2002 | Chin et al. | |
| 6,530,018 | B2 | 3/2003 | Fleming | |
| 6,584,074 | B1 | 6/2003 | Vasamsetti et al. | |
| 6,631,118 | B1 | 10/2003 | Jones | |
| 6,678,250 | B1 | 1/2004 | Grabelsky et al. | |
| 6,728,262 | B1 | 4/2004 | Woram | |
| 6,778,505 | B1 | 8/2004 | Bullman et al. | |
| 6,801,941 | B1 | 10/2004 | Stephens et al. | |
| 6,892,245 | B1 | 5/2005 | Crump et al. | |
| 6,954,785 | B1 | 10/2005 | Martin et al. | |
| 6,965,614 | B1 | 11/2005 | Osterhout et al. | |
| 6,980,556 | B2 | 12/2005 | Vimpari | |
| 7,020,701 | B1 | 3/2006 | Gelvin et al. | |
| 7,020,720 | B1 | 3/2006 | Donahue et al. | |
| 7,027,808 | B2 | 4/2006 | Wesby | |
| 7,039,688 | B2 | 5/2006 | Matsuda et al. | |
| 7,042,988 | B2 * | 5/2006 | Juitt et al. .................. | 379/88.17 |
| 7,080,141 | B1 | 7/2006 | Baekelmans et al. | |
| 7,111,054 | B2 | 9/2006 | Lo | |
| 7,155,493 | B1 | 12/2006 | Weber | |
| 7,177,957 | B2 | 2/2007 | Vance | |
| 7,187,461 | B2 | 3/2007 | Schlonski et al. | |
| 7,200,551 | B1 | 4/2007 | Senez | |
| 7,240,106 | B2 | 7/2007 | Cochran et al. | |
| 7,269,653 | B2 | 9/2007 | Mentze et al. | |
| 7,283,517 | B2 | 10/2007 | Yan et al. | |
| 7,310,664 | B1 | 12/2007 | Merchant et al. | |
| 7,319,873 | B2 | 1/2008 | Zhang et al. | |
| 7,337,910 | B2 | 3/2008 | Cartmell et al. | |
| 7,340,512 | B2 | 3/2008 | Cochran et al. | |
| 7,388,839 | B2 | 6/2008 | Chafle et al. | |
| 7,392,310 | B2 | 6/2008 | Motoyama et al. | |
| 7,421,466 | B2 | 9/2008 | Haines | |
| 7,457,737 | B2 | 11/2008 | Patiejunas | |
| 7,460,546 | B2 | 12/2008 | Anderson, IV | |
| 7,475,133 | B2 | 1/2009 | Nuggehalli | |
| 7,496,660 | B2 | 2/2009 | Blaisdell et al. | |
| 7,499,999 | B2 | 3/2009 | Ocepek et al. | |
| 7,506,048 | B1 | 3/2009 | Motoyama et al. | |
| 7,509,415 | B2 | 3/2009 | Baekelmans et al. | |
| 7,545,762 | B1 | 6/2009 | McConnell et al. | |
| 7,565,418 | B2 | 7/2009 | Ferrari et al. | |
| 7,581,039 | B2 | 8/2009 | Martinez et al. | |
| 7,603,710 | B2 * | 10/2009 | Harvey et al. ................... | 726/23 |
| 7,657,612 | B2 | 2/2010 | Manchester et al. | |
| 7,783,777 | B1 | 8/2010 | Pabla et al. | |
| 7,787,416 | B2 | 8/2010 | Gidwani | |
| 7,823,199 | B1 | 10/2010 | Rathi et al. | |
| 7,853,880 | B2 | 12/2010 | Porter | |
| 8,159,949 | B2 | 4/2012 | Pham | |
| 2001/0039580 | A1 | 11/2001 | Walker et al. | |
| 2002/0004935 | A1 | 1/2002 | Huotari et al. | |
| 2002/0010866 | A1 | 1/2002 | McCullough et al. | |
| 2002/0026503 | A1 | 2/2002 | Bendinelli et al. | |
| 2002/0026505 | A1 | 2/2002 | Terry | |
| 2002/0112076 | A1 | 8/2002 | Rueda et al. | |
| 2002/0116544 | A1 | 8/2002 | Barnard et al. | |
| 2002/0147938 | A1 | 10/2002 | Hamilton et al. | |
| 2002/0161865 | A1 | 10/2002 | Nguyen | |
| 2002/0161867 | A1 | 10/2002 | Cochran et al. | |
| 2002/0174207 | A1 | 11/2002 | Battou | |
| 2002/0191556 | A1 | 12/2002 | Krishnarajah et al. | |
| 2002/0196463 | A1 | 12/2002 | Schlonski et al. | |
| 2003/0005112 | A1 | 1/2003 | Krautkremer | |
| 2003/0018889 | A1 | 1/2003 | Burnett et al. | |
| 2003/0033402 | A1 | 2/2003 | Battat et al. | |
| 2003/0041238 | A1 | 2/2003 | French et al. | |
| 2003/0061336 | A1 | 3/2003 | Van Den Bosch et al. | |

| | | | | |
|---|---|---|---|---|
| 2003/0069947 | A1 | 4/2003 | Lipinski | |
| 2003/0078965 | A1 | 4/2003 | Cocotis et al. | |
| 2003/0078999 | A1 | 4/2003 | Lund et al. | |
| 2003/0086425 | A1 | 5/2003 | Bearden et al. | |
| 2003/0115298 | A1 | 6/2003 | Baker | |
| 2003/0115314 | A1 | 6/2003 | Kawashima | |
| 2003/0187985 | A1 | 10/2003 | Rohling et al. | |
| 2003/0195937 | A1 | 10/2003 | Kircher et al. | |
| 2003/0200303 | A1 | 10/2003 | Chong | |
| 2003/0200318 | A1 | 10/2003 | Chen et al. | |
| 2003/0221122 | A1 | 11/2003 | Hatori | |
| 2003/0229688 | A1 | 12/2003 | Liang | |
| 2004/0003292 | A1 | 1/2004 | Kato | |
| 2004/0005873 | A1 * | 1/2004 | Groenendaal et al. ........ | 455/410 |
| 2004/0015575 | A1 | 1/2004 | Motoyama | |
| 2004/0030620 | A1 | 2/2004 | Benjamin et al. | |
| 2004/0039704 | A1 | 2/2004 | Gilliam et al. | |
| 2004/0040023 | A1 | 2/2004 | Ellis et al. | |
| 2004/0049714 | A1 | 3/2004 | Marples et al. | |
| 2004/0059804 | A1 | 3/2004 | Goto | |
| 2004/0064558 | A1 | 4/2004 | Miyake | |
| 2004/0093383 | A1 | 5/2004 | Huang et al. | |
| 2004/0111505 | A1 | 6/2004 | Callahan et al. | |
| 2004/0146006 | A1 | 7/2004 | Jackson | |
| 2004/0155899 | A1 | 8/2004 | Conrad | |
| 2004/0156346 | A1 | 8/2004 | O'Neill | |
| 2004/0162986 | A1 | 8/2004 | Metzger | |
| 2004/0172469 | A1 | 9/2004 | Takahashi et al. | |
| 2004/0193709 | A1 | 9/2004 | Selvaggi et al. | |
| 2004/0199647 | A1 | 10/2004 | Ramarao | |
| 2004/0204051 | A1 | 10/2004 | Scott et al. | |
| 2004/0215791 | A1 | 10/2004 | Tsao | |
| 2004/0236759 | A1 | 11/2004 | Young | |
| 2004/0255023 | A1 | 12/2004 | Motoyama | |
| 2005/0004866 | A1 | 1/2005 | Bonalle et al. | |
| 2005/0005013 | A1 | 1/2005 | Saint-Hilaire et al. | |
| 2005/0018241 | A1 | 1/2005 | Azami | |
| 2005/0050189 | A1 | 3/2005 | Yang | |
| 2005/0050190 | A1 | 3/2005 | Dube | |
| 2005/0054326 | A1 | 3/2005 | Rogers | |
| 2005/0060535 | A1 | 3/2005 | Bartas | |
| 2005/0063350 | A1 | 3/2005 | Choudhury et al. | |
| 2005/0078681 | A1 | 4/2005 | Sanuki et al. | |
| 2005/0085244 | A1 | 4/2005 | Choi et al. | |
| 2005/0086197 | A1 | 4/2005 | Boubez et al. | |
| 2005/0086282 | A1 | 4/2005 | Anderson et al. | |
| 2005/0091504 | A1 | 4/2005 | Shirogane | |
| 2005/0111420 | A1 | 5/2005 | Fujii | |
| 2005/0114490 | A1 | 5/2005 | Redlich et al. | |
| 2005/0125527 | A1 | 6/2005 | Lu et al. | |
| 2005/0149626 | A1 | 7/2005 | Manchester et al. | |
| 2005/0160138 | A1 | 7/2005 | Ishidoshiro | |
| 2005/0165919 | A1 | 7/2005 | Qian et al. | |
| 2005/0184852 | A1 | 8/2005 | Lee et al. | |
| 2005/0198221 | A1 | 9/2005 | Manchester et al. | |
| 2005/0198274 | A1 | 9/2005 | Day | |
| 2005/0216602 | A1 | 9/2005 | Armstrong et al. | |
| 2005/0229238 | A1 | 10/2005 | Ollis et al. | |
| 2005/0234568 | A1 | 10/2005 | Chung et al. | |
| 2005/0234683 | A1 | 10/2005 | Graves et al. | |
| 2005/0235227 | A1 | 10/2005 | Martineau et al. | |
| 2005/0240665 | A1 | 10/2005 | Gu et al. | |
| 2005/0240758 | A1 | 10/2005 | Lord et al. | |
| 2005/0243777 | A1 | 11/2005 | Fong | |
| 2005/0288000 | A1 | 12/2005 | Harris et al. | |
| 2006/0015939 | A1 | 1/2006 | Aston et al. | |
| 2006/0031457 | A1 | 2/2006 | Motoyama | |
| 2006/0036847 | A1 | 2/2006 | Bush et al. | |
| 2006/0037036 | A1 | 2/2006 | Min et al. | |
| 2006/0037075 | A1 | 2/2006 | Frattura et al. | |
| 2006/0041891 | A1 | 2/2006 | Aaron | |
| 2006/0101109 | A1 | 5/2006 | Nishio | |
| 2006/0106918 | A1 | 5/2006 | Evert et al. | |
| 2006/0120293 | A1 | 6/2006 | Wing | |
| 2006/0129664 | A1 | 6/2006 | Reimert et al. | |
| 2006/0153080 | A1 | 7/2006 | Palm | |
| 2006/0168195 | A1 | 7/2006 | Maturana et al. | |
| 2006/0168263 | A1 | 7/2006 | Blackmore | |
| 2006/0172734 | A1 | 8/2006 | Tak | |

| | | | |
|---|---|---|---|
| 2006/0258341 | A1 | 11/2006 | Miller |
| 2006/0272014 | A1 | 11/2006 | McRae et al. |
| 2006/0280189 | A1 | 12/2006 | McRae et al. |
| 2006/0291443 | A1 | 12/2006 | Harrington et al. |
| 2007/0015463 | A1 | 1/2007 | Abel |
| 2007/0022185 | A1 | 1/2007 | Hamilton et al. |
| 2007/0058567 | A1 | 3/2007 | Harrington et al. |
| 2007/0076621 | A1 | 4/2007 | Malhotra et al. |
| 2007/0106768 | A1 | 5/2007 | Frietsch et al. |
| 2007/0111568 | A1 | 5/2007 | Ferrari et al. |
| 2007/0115950 | A1 | 5/2007 | Karaoguz et al. |
| 2007/0130286 | A1 | 6/2007 | Hopmann et al. |
| 2007/0133569 | A1 | 6/2007 | Lee et al. |
| 2007/0143749 | A1 | 6/2007 | Date et al. |
| 2007/0146782 | A1 | 6/2007 | Lehotsky et al. |
| 2007/0204150 | A1 | 8/2007 | Jokela et al. |
| 2007/0268506 | A1 | 11/2007 | Zeldin |
| 2007/0268514 | A1 | 11/2007 | Zeldin |
| 2007/0268515 | A1 | 11/2007 | Freund et al. |
| 2007/0268516 | A1 | 11/2007 | Bugwadia et al. |
| 2007/0276931 | A1 | 11/2007 | Mahdavi et al. |
| 2008/0008125 | A1 | 1/2008 | Pham et al. |
| 2008/0037552 | A1 | 2/2008 | Dos Remedios et al. |
| 2008/0043989 | A1 | 2/2008 | Furutono et al. |
| 2008/0049779 | A1 | 2/2008 | Hopmann et al. |
| 2008/0052384 | A1 | 2/2008 | Marl et al. |
| 2008/0065760 | A1 | 3/2008 | Damm et al. |
| 2008/0070603 | A1 | 3/2008 | Mao |
| 2008/0134164 | A1 | 6/2008 | Stich et al. |
| 2008/0175187 | A1 | 7/2008 | Lowry et al. |
| 2008/0216154 | A1 | 9/2008 | Fontaine |
| 2008/0243699 | A1 | 10/2008 | Hilerio et al. |
| 2009/0017832 | A1 | 1/2009 | Tebbs et al. |
| 2009/0019141 | A1 | 1/2009 | Bush et al. |
| 2009/0019147 | A1 | 1/2009 | Ahlers et al. |
| 2009/0019314 | A1 | 1/2009 | Younger et al. |
| 2009/0037606 | A1 | 2/2009 | Diab |
| 2009/0046656 | A1 | 2/2009 | Kitazoe et al. |
| 2009/0052338 | A1 | 2/2009 | Kelley et al. |
| 2009/0055514 | A1 | 2/2009 | Tebbs et al. |
| 2010/0020694 | A1 | 1/2010 | Jones |
| 2010/0035595 | A1 | 2/2010 | Duggal et al. |
| 2010/0093278 | A1 | 4/2010 | Abel et al. |
| 2010/0250725 | A1 | 9/2010 | Meenan et al. |
| 2011/0235549 | A1 | 9/2011 | Ahlers et al. |

FOREIGN PATENT DOCUMENTS

| | | | |
|---|---|---|---|
| EP | 1370025 | | 12/2003 |
| EP | 1538792 | | 6/2005 |
| EP | 1553729 | | 7/2005 |
| EP | 1638258 | | 3/2006 |
| EP | 1639751 | A1 | 3/2006 |
| EP | 1701478 | A1 | 9/2006 |
| EP | 1894314 | A2 | 3/2008 |
| EP | 1965541 | A1 | 9/2008 |
| EP | 2324652 | A1 | 5/2011 |
| GB | 2411801 | | 9/2005 |
| JP | 2001-222497 | A | 8/2001 |
| JP | 2001-352328 | A | 12/2001 |
| KR | 2004-0047209 | A | 7/2004 |
| KR | 10-2005-0031175 | A | 4/2005 |
| KR | 2005-0078541 | A | 8/2005 |
| KR | 2005-0094247 | A | 9/2005 |
| WO | WO2005/004401 | | 1/2005 |
| WO | WO2007/001629 | | 1/2007 |
| WO | WO2007/136804 | | 11/2007 |
| WO | WO 2008/156898 | | 12/2008 |
| WO | WO 2009/011962 | | 1/2009 |
| WO | WO 2009/011963 | | 1/2009 |
| WO | WO 2009/011964 | | 1/2009 |
| WO | WO 2009/011965 | | 1/2009 |
| WO | WO 2009/011966 | | 1/2009 |
| WO | WO2010/016855 | | 2/2010 |
| WO | WO2011/119264 | | 9/2011 |

OTHER PUBLICATIONS

"Wireless Network Security 802.11, Bluetooth and Handheld Devices", Tom Karygiannos/Les Owens, pp. 1-119, 2002.*

PCT Notification of the International Search Report and the Written Opinion of the International Searching Authority, or the Declaration, International Application No. PCT/US2008/063318, mailed Sep. 25, 2008, 6 pgs.

Marcia Zangrilli, et al., "Using Passive Traces of Application Traffic in a Network Monitoring System," copyright 2004 IEEE.

Kazuya Kubo, et al., "Hybrid Peer-to-Peer System for Network Monitoring of Field Devices," Downloaded May 14, 2009 at 10:08 from IEEE Xplore, copyright 2003 SICE, 6 pages.

International Search Report for International Application No. PCT/US2008/063335 mailed Sep. 22, 2008 (1 page).

Written Opinion of the International Searching Authority for International Application No. PCT/US2008/063335 mailed Sep. 22, 2008 (4 pages).

International Search Report for International Application No. PCT/US2008/063308 mailed Oct. 30, 2008 (2 pages).

Written Opinion of the International Searching Authority for International Application No. PCT/US2008/063308 mailed Oct. 30, 2008 (4 pages).

International Search Report for International Application No. PCT/US2008/063333 mailed Sep. 26, 2008 (2 pages).

Written Opinion of the International Searching Authority for International Application No. PCT/US2008/063333 mailed Sep. 26, 2008 (4 pages).

International Search Report for International Application No. PCT/US2008/059490 mailed Apr. 21, 2009 (2 pages).

International Preliminary Report on Patentability issued Oct. 6, 2009 (1 page) and Written Opinion of the International Searching Authority mailed Apr. 21, 2009 (3 pages) for International Application No. PCT/US2008/059490.

Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.

Barb Bowman, "Introduction to Windows XP Service Pack 2," Published Aug. 25, 2004, 8 pages; © 2010 Microsoft Corporation http://www.microsoft.com/windowsxp/using/security/expert/bowman_introtosp2.mspx.

Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.

Microsoft Corporation, "Windows Connect Now-UFD for Windows XP Specification," © 2010, Updated Sep. 15, 2006, 1 page; http://www.microsoft.com/whdc/connect/Rally/WCN-UFD_XPspec.mspx.

Microsoft Corporation, "Windows Connect Now-UFD for Windows XP," Version 1.1 © 2010—Sep. 15, 2006, 33 pages; http://www.microsoft.com/whdc/connect/Rally/WCN-Netspec.doc.

Microsoft Corporation, "Windows Connect Now-UFD and Windows Vista Specification," Version 1.0 © 2010—Sep. 15, 2006, 1 page; http://www.microsoft.com/whdc/connect/Rally/WCN-UFD_Vistaspec.mspx.

Microsoft Corporation, "Windows Connect Now-UFD Windows Vista" Version 1.0 © 2010—Sep. 15, 2006, 28 pages; http://www.microsoft.com/whdc/connect/Rally/WCN-UFD_Vistaspec.doc.

Microsoft Corporation, "Windows Connect Now—Access Point has No USB Port in Wireless Networking," © 2010, printed Mar. 24, 2010, 2 pages; http://www.microsoft.com/communities/newsgroups/en-us/default.aspx?dg=microsoft.public.windows.networking.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.

Flip Video, "Quick Start Guide: FlipshareTV," © 2009 Cisco Systems, Inc., 19 pages; http://www.theflip.com/pdf/en-US/FlipShareTVQuickStartGuide.pdf.

"Wi-Fi Certified™ for Wi-Fi Protected Setup™: Easing the User Experience for Home and Small Office Wi-Fi® Networks," © 2007, 14 pages; http://www.wi-fi.org/files/kc/20090123_Wi-Fi_Protected_Setup.pdf.

"Cisco Access Router USB Flash Memory Module and USB eToken Hardware Installation Guide," © 2006 Cisco Systems, Inc., 12 pages; https://www.cisco.com/en/US/docs/routers/access/2800/hardware/notes/mithril.html.
"Wi-Fi Alliance™ for Wi-Fi Protected Setup Specification," Version 1.0h, Dec. 2006, 110 pages.
International Preliminary Report on Patentability issued Jan. 19, 2010 (1 page) and Written Opinion of the International Searching Authority mailed Oct. 30, 2008 (4 pages) for International Application No. PCT/US2008/063308.
International Preliminary Report on Patentability issued Jan. 19, 2010 (1 page) and Written Opinion of the International Searching Authority mailed Sep. 26, 2008 (4 pages) for International Application No. PCT/US2008/063333.
International Preliminary Report on Patentability issued Jan. 19, 2010 (1 page) and Written Opinion of the International Searching Authority mailed Sep. 22, 2008 (4 pages) for International Application No. PCT/US2008/063335.
U.S. Appl. No. 13/029,335, filed Feb. 17, 2011, entitled "Network Management," Inventor(s) Steven M. Bush, et al.
U.S. Appl. No. 13/030,982, filed Feb. 18, 2011, entitled "Network Management," Inventor(s) Steven M. Bush, et al.
U.S. Appl. No. 13/031,121, filed Feb. 18, 2011, entitled "Network Management," Inventor(s) Steven M. Bush, et al.
"Near Field Communication White Paper," Ecma International, 2005; 12 pages http://www.ecma-international.org/activities/Communications/tc32-tg19-2005-012.pdf.
"Universal Plug and Play Device Architecture, UPnP, Version 1.0," Microsoft Corporation, Protocols, Jun. 8, 2000; 54 pages http://upnp.org/specs/arch/UPnPDA10_20000613.pdf.
EPO Nov. 15, 2007 European Search Report and Opinion from European Application No. EP07017509; 8 pages.
Khedr, Mohamed, et al., "Acan-Ad Hoc Context Aware Networks," Online! 2002, XP002300569; 5 pages; http://citeseerx.ist.psu.edu/viewdoc/summary?doi=10.1.1.20.1469.
Krishnamurthy, Lakshman, et al., "Meeting the Demands of the Digital Home with high-Speed Multi-Hop Wireless Networks," Intel Technology Journal, vol. 6, Nov. 15, 2002, pp. 57-68; http://download.intel.com/technology/itj/2002/volume06issue04/vol6iss4_interoperable_home_infrastructure.pdf.
PCT Oct. 27, 2004 International Search Report from International Application No. PCT/US2004/021429; 3 pages.
PCT Jan. 3, 2006 International Preliminary Report on Patentability and Written Opinion of the International Search Authority from International Application No. PCT/US2004/021429.
PCT Dec. 24, 2007 International Preliminary Report on Patentability and Written Opinion of the International Search Authority from International Application No. PCT/US2006/17500; 6 pages.
PCT Aug. 7, 2007 International Search Report from International Application No. PCT/US06/17500; 1 page.
PCT Nov. 21, 2008 International Preliminary Report on Patentability and Written Opinion of the International Search Authority from International Application No. PCT/US2007/012016; 5 pages.
PCT Jan. 4, 2008 International Search Report from International Application No. PCT/US07/12016; 1 page.
PCT Apr. 24, 2009 International Search Report from International Application No. PCT/US2008/08544; 2 pages.
PCT Aug. 2, 2011 International Preliminary Report on Patentability and Written Opinion of the International Search Authority from International Application No. PCT/US2008/08544; 7 pages.
PCT Aug. 25, 2011 International Search Report and Written Opinion of the International Searching Authority from International Application No. PCT/US2011/024462.
Rasheed, Yasser, et al, "Home Interoperability Framework for the Digital Home," Intel Technology Journal, vol. 6, Nov. 15, 2002, pp. 5-16; http://download.intel.com/technology/itj/2002/volume06issue04/vol6iss4_interoperable_home_infrastructure.pdf.
Walker, Mark, et al., "Remote I/O: Freeing the Experience from the Platform with UPnP Architecture," Intel Technology Journal, vol. 6, Nov. 15, 2002, pp. 30-36; http://download.intel.com/technology/itj/2002/volume06issue04/vol6iss4_interoperable_home_infrastructure.pdf.
EPO Apr. 5, 2012 Search Report and Written Opinion from European Application 08769420.4; 8 pages.
U.S. Appl. No. 13/235,007, filed Sep. 16, 2011, entitled "Configuring a Secure Network," Inventor(s) Aaron H. Averbuch, et al.

* cited by examiner

NETWORK MANAGEMENT PROVIDING NETWORK HEALTH INFORMATION AND LOCKDOWN SECURITY

RELATED APPLICATIONS

This application claims priority under 35 U.S.C. §119 to U.S. Provisional Patent Application No. 60/789,522, filed on Apr. 4, 2006, entitled "Network Management" and naming Matthew Tebbs et al. as inventors, which provisional patent application is incorporated entirely herein by reference. This application also claims priority under 35 U.S.C. §120 to U.S. patent application Ser. No. 11/467,534 filed on Aug. 25, 2006, entitled "Network Administration Tool Employing A Network Administration Protocol" and naming Brett Marl as inventor, which application in turn claims priority under 35 U.S.C. §120 to U.S. patent application Ser. No. 11/297,809 filed on Dec. 7, 2005, entitled "Network Management" and naming Steve Bush et al. as inventors, which application in turn claims priority under 35 U.S.C. §120 to U.S. patent application Ser. No. 10/916,642 filed on Aug. 10, 2004, entitled "Service Licensing And Maintenance For Networks" and naming Steve Bush et al. as inventors, and under 35 U.S.C. §119 to U.S. Provisional Patent Application No. 60/634,432, filed Dec. 7, 2004, entitled "Network Management" and naming Steve Bush et al. as inventors, each of which applications is incorporated entirely herein by reference as well.

FIELD OF THE INVENTION

Aspects of the present invention are directed toward management of a network. Various aspects of the invention are particularly suitable for monitoring the devices in a small network, for administering various tasks associated with the network and its devices, and the information hosted on these devices.

BACKGROUND OF THE INVENTION

Computers have become commonplace tools in modern society, and many businesses and residences now have one or more computing devices. In a small business, for example, some employees may each use a desktop computer or laptop computer. Some employees may even use more portable computers such as personal digital assistants or "smart" wireless telephones. Similarly, with a family sharing a residence, each family member may have his or her personal computer, or the family members may share one or more computers. Further, both small businesses and personal residences may include various computing appliances that incorporate or otherwise interact with computers. For example, a home residence may include a refrigerator, a "Voice over Internet Protocol" telephone, a digital music server, a digital camera, or an environmental control system that includes or interacts with a computer.

In order to optimize the use and flexibility of these computing devices, a business or family may link them together to form a small private network. Typically, each of the computing devices is connected to a router through a network adapter. The router then "routes" packets of data to and from each computing device. With this type of small private network, the router can in turn be connected to one or more larger private networks or a public networks, such as the Internet. By sending and receiving messages through the router, each networked computing device may then communicate with computing devices outside of the private network. In this arrangement, the router serves as a "gateway" device that provides a gateway to outside of the private network.

Despite the fact that various devices may exist in the network, the devices do not have the ability to use other devices unless specifically configured. An improved networking system is needed.

BRIEF SUMMARY OF THE INVENTION

Aspects of the present invention relate to establishing and maintaining the security of a private network, such as a home network. According to various examples of the invention, a network management tool controls a gateway device for a network, such as a router. The network management tool may also identify the media access control (MAC) address for each device in the network, and allows a user to identify which devices are authorized to be a member of the network. If the network gateway device supports MAC address filtering, a user can then employ the network management tool to configure the router to exclude non-authorized devices from joining or remaining in the network based upon their MAC addresses.

Various examples of the invention may provide additional security features. For examples, some implementations of the invention may allow a user to configure a wireless gateway device to stop broadcasting its service set identifier (SSID), change the SSID, or both. Some embodiments of the invention also may identify to the user when a wireless gateway device is using encryption, and, if so, what type of encryption (e.g., wired equivalency privacy (WEP) or wireless application protocol (WAP)).

Other aspects of the invention relate to monitoring a network for various conditions relating to the health and security of the network. For example, some embodiments of the invention may provide a network management tool that monitors the status of various software applications on devices in the network, such as firewalls, anti-virus, spyware, or other anti-malware software applications, and operating systems. The network management tool can then alert a user if the status of any of the devices in the network requires attention. Further, with some examples of the invention, the network management tool may provide recommendations to a user for correcting or changing the status of the monitored software applications.

It is noted that various connections are set forth between elements in the following description. It is noted that these connections in general and, unless specified otherwise, may be direct or indirect and that this specification is not intended to be limiting in this respect.

BRIEF DESCRIPTION OF THE DRAWINGS

FIG. 98 illustrates a user interface that may be provided according to various aspects of the invention showing how placing a pointing device over the icon illustrated in FIG. 94 may display a message relating to the status of a network management tool.

DETAILED DESCRIPTION OF THE INVENTION

Overview

Figure 1:
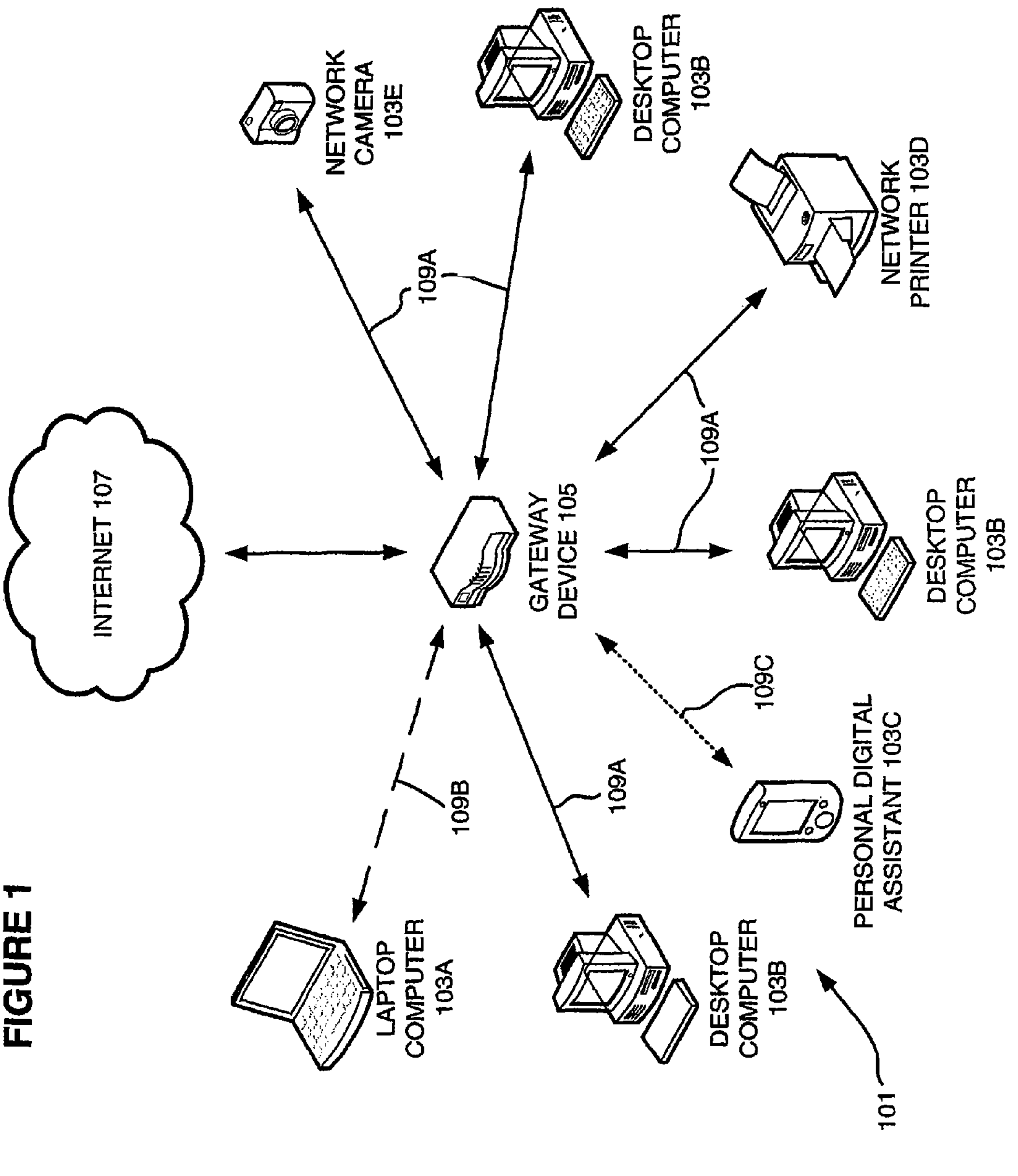
FIG. 1 illustrates an example of a small network that may be used with various aspects of the invention.

Various aspects of the invention provide a tool for managing a network of interconnected devices. Some examples of the invention may be useful, for example, in assisting the owner of a small home network to monitor or otherwise administer the network. As will be described in more detail below, the tool may provide a user with an interface that allows the user to view the type and status of each network device (that is, each device connected to the network), and even the status of the network itself. The tool may alternately or additionally provide a user with services related to the network. For example, the tool may allow a user to perform one or more tasks associated with devices in the network or automatically perform the user.

One aspect includes one agent service directing one or more agent services running on other devices to perform a task. The example is one-step printer sharing. One agent shares the printer and notifies the other agents of the new shared printer. These other agents contact the agent sharing the printer to download the drivers. After downloading the printer drivers, the agent may then install the printer drivers locally so the local computer can access the remotely shared printer. Network notification may trigger a network task execution across one or more agents. Another example is software fulfillment and licensing. Using the user interface on one computer, one may download and license a new software program. The agent then distributes these new software to all of the other agent enabled computers, installs the software, and licenses it to the small network. Some aspects of the tool may even analyze the network, and then suggest steps that a user may take to improve the performance or usability of the network. Further, some implementations of a tool according to aspects of the invention may assist a user in creating a Web page associated with the network.

With some aspects of the invention, the tool may allow one or more network devices to join a trusted association of network devices. The network devices in the trusted association may, for example, exchange information regarding their own status and the status of other network devices. Still further, the tool may allow network devices in the trusted association to share resources, such as data resources, device resources, or a combination of both. The network devices in the trusted association may alternately or additionally limit the network access of devices outside of the trusted association. For example, with some aspects of the invention, the tool may automatically provide a member of the trusted association with the credential information necessary to access and use the network. Still further, the tool may prevent network devices from accessing network resources until they are determined to be trusted. For example, with some embodiments of the invention, the tool may configure the gateway device to use MAC filtering to exclude network devices that have not been designated as trusted devices.

Various aspects of the tool may be implemented by software instructions running on one or more devices in the network. With some examples of the invention, an implementation of the tool on a single network device includes a gateway or router service, an agent service, a network information service, and a user interface service. The tool also may include a network management application for managing the interaction between the services. As will be described in detail below, the gateway service discovers the gateway, which typically is a router, through which the network is connected to other networks, such as the Internet. The agent service allows the tool to initiate a new trusted association or join an existing trusted association. The agent service also communicates with agent services operating on other network devices to allow the network devices to exchange information regarding the network and to perform network tasks. For example, the agent service in can perform a network task response to a network message, such as installing software, updating the user interface on the device, licensing the product, or the like.

The network information service obtains information concerning the network. This network information will include both information relating to the devices making up the network and network itself. The network information service then stores this information in a network information data structure, so that it can be retrieved for use by the tool or shared with the network information services of other tools. Using the information obtained by the network information service, the user interface service provides a user interface that allows the user to monitor the status of the network and the network devices. The user interface service may alternately or additionally allow the user to control the operation of the network, by, for example, modifying the contents in the network information data structure. The network information service caches the network information so the network device can utilize this information even when it is not connected to the network.

Also, network information may remain separate or may be aggregated across network devices and synchronized when changes occur. Each of these services is described in more detail below.

Network Environment

As previously noted, various aspects of the invention may be employed with a small network. FIG. 1 illustrates an example of this type of small network. The network 101 may include a variety of different computing devices or "nodes". For example, the network 101 may include one or more laptop computers 103A, one or more desktop computers 103B, and one or more personal digital assistants 103C. In addition to these computers, the network 101 may also include one or more computing appliances, which are not as versatile as a conventional programmable computer, but which nonetheless may be configured to exchange data over a network. Such network appliances may include, for example, one or more printers 103D and one or more cameras 103E, as illustrated in FIG. 1. Other small networks that can be used with various aspects of the invention may include any suitable computing devices, such as telephones that exchange voice information in data packets (sometimes generically referred to as "Voice over Internet Protocol (VoIP) telephones), digital video recorders, televisions, streaming media players, and digital music servers, among others.

Each of these networked devices 103 communicates, either directly or indirectly, with a gateway device 105. In turn, the gateway device 105 typically will communicate with an external device or network. An external network may be another private network, or it may be a public network, such as the Internet 107. Thus, a gateway device is a device that can steer electronic data from one network to another network. Typically, a gateway device serves as a node on two incompatible networks (i.e., networks that use different communication protocol formats) and it will convert data from one network's communication protocol format into the other network's communication protocol format. As used herein, the term "small network" refers to a network made up of networked devices that each employ the same network address to communicate with the same gateway device, together with the gateway device itself.

The network devices 103 may be connected to the gateway device 105 using any suitable communication medium. For example, in the illustrated network 101, the desktop computers 103B are connected to the gateway device 105 through a hard-wired connection 109A (such as an Ethernet cable), while the laptop computer 103A is connected to the gateway device 105 through a IEEE 802.11 wireless connection 109B and the personal digital assistant 103C is connected to the gateway device 105 through a Bluetooth wireless connection 109C.

It should be appreciated that, as used throughout this application, the term "connect" and its derivatives (e.g., connection, connected, connects) includes both direct and indirect connections. Thus, with the network illustrated in FIG. 1, the laptop computer 103A may be connected to the gateway device 105 using a wireless transceiver incorporated into the laptop computer 103A and a wireless transceiver incorporated into the gateway device 105. Alternately, the laptop computer 103A may be connected to the gateway device 105 using a wireless transceiver external to the laptop computer 103, the gateway device 105, or both.

Typically, the gateway device 105 will be a router. As will be appreciated by those of ordinary skill in the art, a router routes data packets from the networked devices 103 to an external device or network. With some networks, however, the gateway device 105 alternately may be a computer performing router functions, a hub, a bridge, or "layer-3" switch. As will also be appreciated by those of ordinary skill in the art, the computing devices or "nodes" making up the network 101 will communicate with the gateway device 105 using one or more defined communication protocols, such as the Transmission Control Protocol (TCP) and the Internet Protocol (IP).

With these communication protocols, each computing device 103 and gateway device 105 in the network 101 will be assigned a logical address. For example, if the network 101 is connected to the Internet 107 through an Internet service provider, the Internet service provider will assign the gateway device 105 a logical Internet Protocol (IP) address. The Internet service provider may also provide the gateway device 105 with a block of logical Internet Protocol (IP) addresses for the gateway device 105 to reassign to each network device 103. Alternatively, the gateway device 105 can itself assign a range of logical Internet Protocol (IP) addresses to each network device 103, and then use a translation operation (e.g., a Network Address Translation (NAT) operation) to route data packets that it receives to the appropriate network device 103. This type of logical address typically is unrelated to the particular computing device to which it is assigned. Instead, a logical address identifies the relationship of that computing device to other computing devices in the network.

In addition to a logical address, each network device typically will also have a physical address. For example, most computing devices capable of communicating over a network, including routers, employ a network adapter with a media access control (MAC) address. This type of physical address is assigned to a network adapter according to standards (referred to as Project 802 or just 802 standards, which are incorporated entirely herein by reference) set forth by the Institute of Electrical and Electronic Engineers (IEEE). More particularly, these standards define a 48-bit and 64-bit physical address format for network devices. The first 14 bits of the address are assigned by the IEEE Registration Authority, and uniquely identify the manufacturer of the network adapter. The remaining bits are then assigned by the manufacturer to uniquely identify each network adapter produced by the manufacturer. Consequently, the physical address of a network adapter is unique across all networks unless manually changed by the user. The physical address is unique to the network adapter, and is independent of a computing device's relationship to other computing devices in a network. Thus, the physical address does not change over time or between uses in different networks.

Network Device Environment

A network may include both virtual devices and physical devices. Physical network devices will then include both computer devices and computing appliance devices. A "computer" may generally be characterized as a device that can be programmed to perform a number of different, unrelated functions. Examples of computers will thus include programmable personal computers, such as desktop computers and laptop computers. In addition, programmable media-purposed computers (e.g., "media adapters and servers"), network attached storage devices, programmable entertainment-purposed computers (e.g., video game consoles), some programmable personal digital assistants and some telephones (such as wireless "smart" telephones) may be characterized as computers in a network. A "computing appliance" then may generally be characterized as a device that is limited to primarily performing only specific functions. Examples of a computing appliance may thus include, for example, printers, cameras, telephones that exchange voice information in data packets (sometimes generically referred to as "Voice over Internet Protocol (VoIP) telephones or telephone adapters), digital video recorders, televisions, voice over Internet protocol (VoIP) adapters, print servers, media adapters, media servers, photo frames, data storage servers, routers, bridges and wireless access points.

As will be appreciated by those of ordinary skill in the art, there may be no clear defining line between "computer" network devices and "computing appliance" network devices in a network. For example, a sophisticated print server may be programmable to additionally or alternately function as a data storage server, while a programmable media-purposed computer or programmable personal digital assistant may have restricted functionality due to limited memory, input devices or output devices. Accordingly, as used herein, the term "computer" will refer to any network device that is capable of implementing a network management tool according one or more aspects of the invention, such as a personal programmable computer. The term "computer appliance" then will refer to a network device that typically cannot implement a network management tool according to at least one aspect of the invention without additional augmentation. The term "computing device" is then used herein to include both computers and computing appliances.

With conventional networks located in a home, small office or other local environment, a network management tool according to various aspects of the invention will be implanted on a programmable personal computer, such as a desktop or laptop computer. A general description of this type of computer will therefore now be described.

Figure 2:
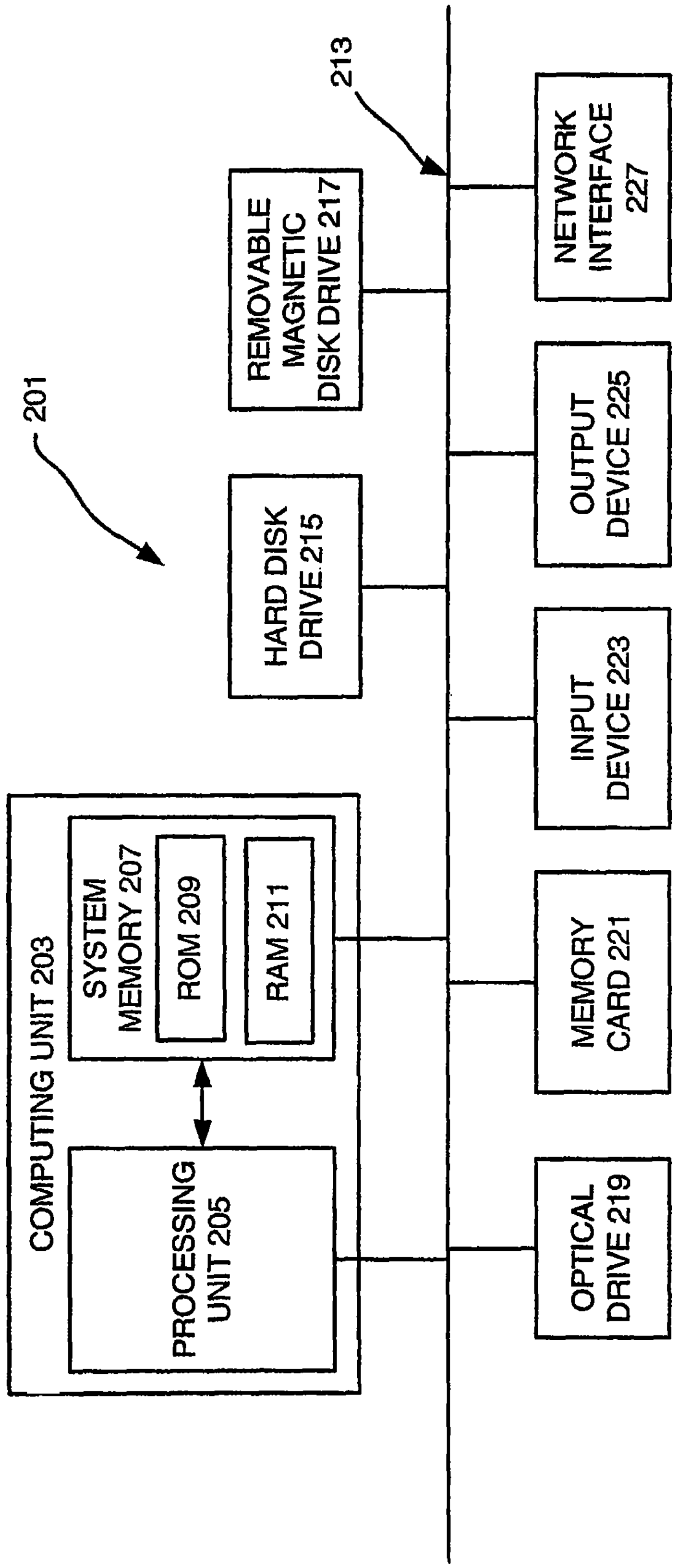
FIG. 2 illustrates an example of a computer that may be used to implement various aspects of the invention.

An illustrative example of such a computer 201 is illustrated in FIG. 2. As seen in this figure, the computer 201 has a computing unit 203. The computing unit 203 typically includes a processing unit 205 and a system memory 207. The processing unit 205 may be any type of processing device for executing software instructions, but will conventionally be a microprocessor device. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 215, the removable magnetic disk drive 217, the optical disk drive 219, and the flash memory card 221. The processing unit 205 and the system memory 207 also may be directly or indirectly connected to one or more input devices 223 and one or more output devices 225. The input devices 223 may include, for example, a keyboard, touch screen, a remote control pad, a pointing device (such as a mouse, touchpad, stylus, trackball, or joystick), a scanner, a camera or a microphone. The output devices 225 may include, for example, a monitor display, television, printer, stereo, or speakers.

Still further, the computing unit 203 will be directly or indirectly connected to one or more network interfaces 227 for communicating with a network. This type of network interface 227, also sometimes referred to as a network adapter or network interface card (NIC), translates data and control signals from the computing unit 203 into network messages according to a communication protocol, such as the Transmission Control Protocol (TCP), the Internet Protocol (IP), and the User Datagram Protocol (UDP). These protocols are well known in the art, and thus will not be described here in more detail. An interface 227 may employ any suitable connection agent for connecting to a network, including, for example, a wireless transceiver, a power line adapter, a modem, or an Ethernet connection.

It should be appreciated that one or more of these peripheral devices may be housed with the computing unit 203 and bus 213. Alternately or additionally, one or more of these peripheral devices may be housed separately from the computing unit 203 and bus 213, and then connected (either directly or indirectly) to the bus 213. Also, it should be appreciated that both computers and computing appliances may include any of the components illustrated in FIG. 2, may include only a subset of the components illustrated in FIG. 2, or may include an alternate combination of components, including some components that are not shown in FIG. 2.

It should be noted that, while a general description of a programmable personal computer was provided above, various aspects of the invention may be implemented on any desired device capable of supporting the invention. For example, with some aspects of the invention, the network management tool may be implemented on special purposed programmable computers, such as a programmable media or entertainment-purposed computers, or personal digital assistants. Accordingly, the above description of a programmable personal computer should be understood as illustrative rather than limiting.

Network Management Tool

Figure 3:
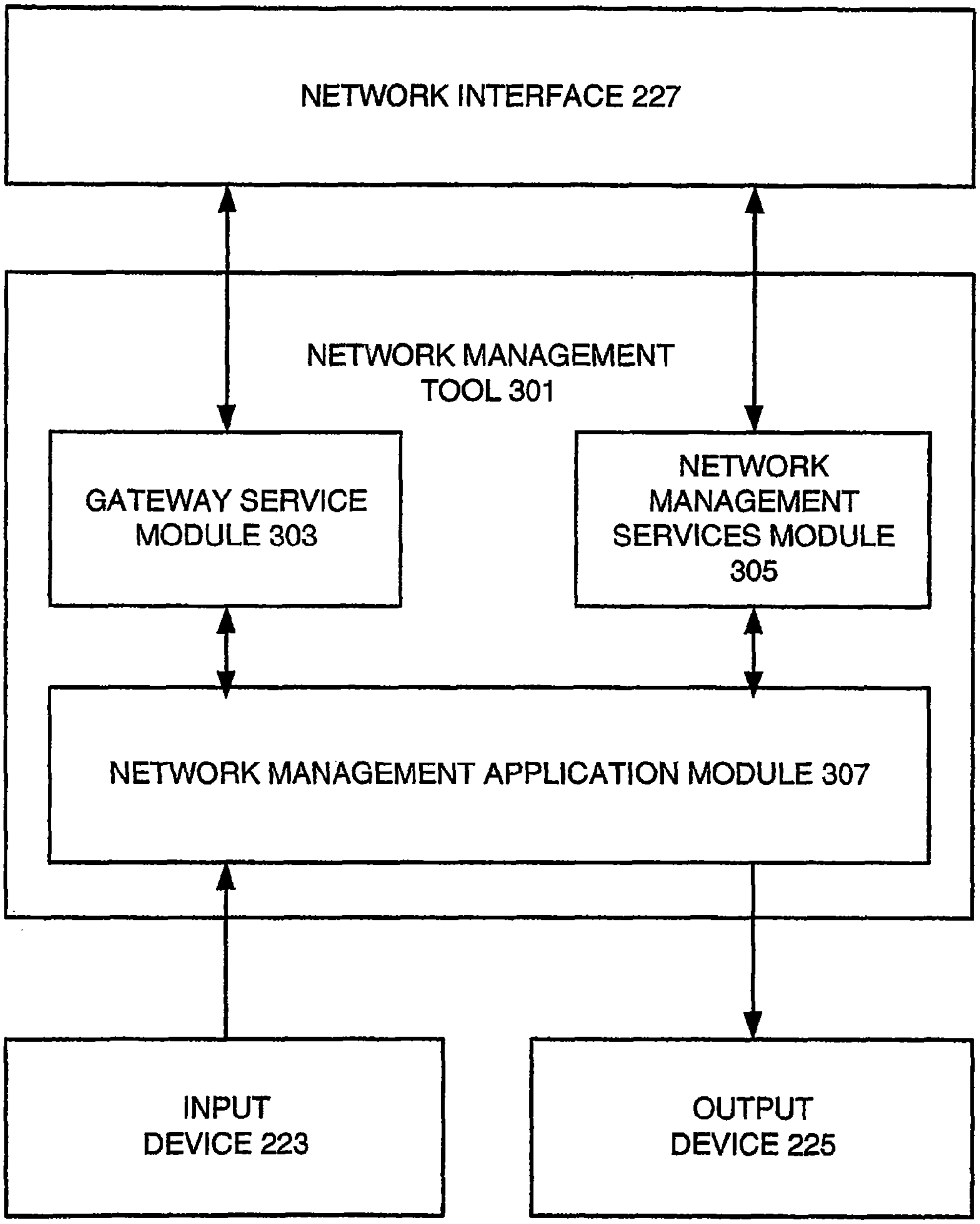
FIG. 3 illustrates an example of a network management tool according to various aspects of the invention.

FIG. 3 illustrates an example of a network management tool according to various aspects of the invention. In the illustrated example, the tool 301 is hosted by a programmable personal computer 201 of the type illustrated in FIG. 2. The network management tool 301 includes a gateway service module 303, a network management services module 305 (which includes a network information services module 1004, as will be explained in more detail below), and network management application module 307. Both the gateway service module 303 and the network management services module 305 are connected, either directly or indirectly, to the network interface 227 of the computer 201. As will be described in detail below, the gateway service module 303 and the network management services module 305 communicate with various network devices through the network interface 227. The network management services module 305 provides a set of network services that are used by the network information service module 1004 and the network application module 307. The network management application module 307 is then connected, either directly or indirectly, to the input device 223 and the output device 225 of the computer 201.

As will be described in further detail below, the network management tool 301 allows a user to monitor the status of devices on an electronic network, such as a network employing the Ethernet protocol located in a home or small business. The network management tool 301 may also allow a user to administer various tasks associated with the network or devices in the network. To perform these functions, the gateway service module 303 detects and identifies the gateway, which typically is a router, through which the network is connected to other networks. The gateway service module 303 also generates a unique name for the gateway.

Once the gateway for the network has been detected, identified and named, the network management services module 305 obtains and stores information relating to the various devices in the network. More particularly, the network management services module 305 detects each device in the network. For example, the network management services module 305 will identify and detect other computers, networked printers and print servers, networked scanners, networked cameras, VoIP telephones and VoIP telephone adapters, networked digital video recorders, networked televisions, data storage servers, bridges, networked game consoles, media adapters, networked photo frames, wireless access points and network adapters for each of these other devices. It then queries those devices, to identify each network device and to collect information relating to each device. For example, the network management services module 305 may determine one or more properties for a network device, such as its Media Access Control (MAC) address, its Internet Protocol (IP) address, and the other network devices to which it is connected. The network management services module 305 also detects and identifies devices locally connected to the computer 201, such as local printers, local cameras, local scanners, and local storage devices.

After collecting this network information, the network management services module 305 constructs a network information data structure to organize and store the information collected by both the gateway service module 303 and the network management services module 305. The network management services module 305 can use the network services in the network information services module 1004 to interact with the services provided by the local operating system for gathering device, network, and operation system status and other statuses. For example, with some aspects of the invention, the network management services module 305 creates a markup language file storing the collected network information. More particularly, the network management services module 305 will create a data object for each network device. The data object may be represented in a markup language, such as the extensible markup language (XML). A data object for a device may include an identifier for the device and the determined properties for that device. The data objects for each device can then be organized in a hierarchical fashion into a single data file.

In addition to determining and storing the properties of network devices, the network management services module 305 also communicates with implementations of the network management tool 301 on other computers in the network. More particularly, the network management services module 305 detects instances of the network management tool 301 running on other computers in the network. The network management services module 305 then establishes a communication channel with those instances of the network management tool 301 that have the proper credentials. In this manner, the instances of the network management tool 301 sharing the proper credentials form an association of trusted network management tools 301. The network management services modules 305 can then exchange determined device properties over the communication channels. By exchanging the device properties, each instance of the network management tool 301 can maintain a current copy of a data structure containing the device properties of all of the devices in the network.

The network management application module 307 then coordinates the information managed by the gateway service module 303 and the network management services module 305. More particularly, the network management application module 307 initiates a call to both the gateway service module 303 and to the network information service module 305 to begin their services. The network management application module 307 also provides one or more user interfaces displaying the information obtained and stored by the network management services module 305. These services may or may not also be made available to other applications through programming interfaces.

A user may employ such an interface to monitor the status of the network and the network devices. For example, with some aspects of the invention, the network management application module 307 employs the connection information stored in the network information data structure to create a graphical map of the network. The map may include a graphical icon representing each device, and another graphic to represent connections between the devices. It may, for example, use one type of icon to indicate a wired connection, and another type of icon to indicate a wireless connection. The map may also show the status of the various devices in the network, such as whether a device is presently connected to the network.

With some aspects of the invention, the network management application module 307 may provide interfaces that allow the user to administer one or more functions related to the operation of the network. For example, the network management application module 307 may provide a user interface that permits a user to modify the contents in the network information data structure maintained by the network management services module 305. As noted above, this change may subsequently be shared with other instances of the network management tool 301 in a trusted association, thereby propagating the change throughout the network. The network management application module 307 may also provide a user interface that allows a user to share one or more resources on the computer 201 with other computers in the network. For example, a user interface provided by the network management application module 307 may allow a user to share a data resource, such as a folder or data file. Alternately or additionally, a user interface provided by the network management application module 307 may allow a user to share a physical resource, such as a printer, scanner, or a storage device.

With some aspects of the invention, the various monitoring and administration functionality available to the user may be provided through a single user interface, such a map of the network. Alternately, the network management application module 307 may provide this functionality through multiple user interfaces that can be selected by a user. Each of these features of the invention will be described in more detail below.

The Gateway Service Module

Figure 4:
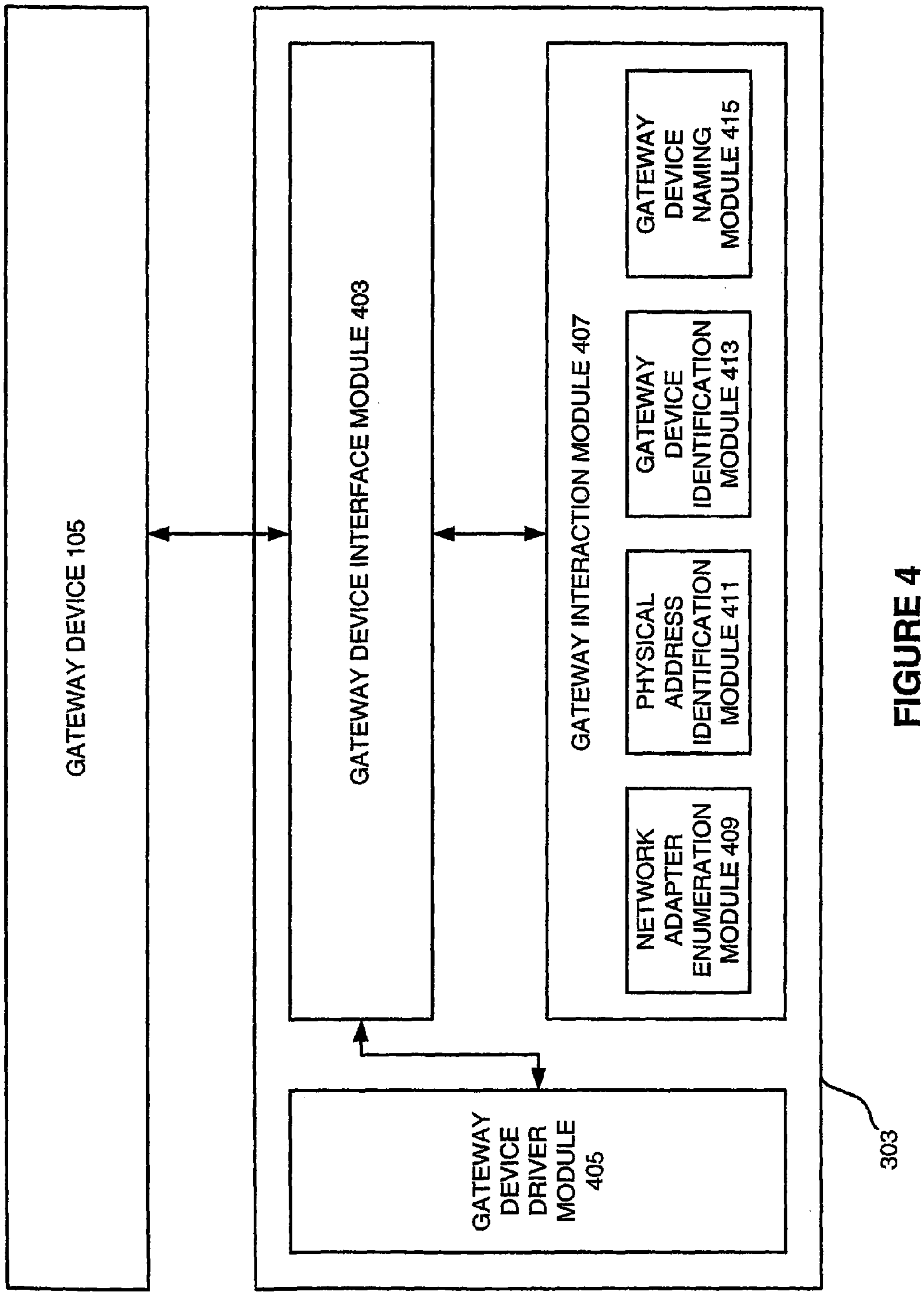
FIG. 4 illustrates an example of a gateway service module that may be employed according to various aspects of the invention.

FIG. 4 illustrates an example of a gateway service module 303 that may be employed according to various aspects of the invention. As seen in this figure, the gateway service module 303 includes a gateway device interface module 403 and a gateway device driver module 405. The gateway service module 303 also includes a gateway interaction module 407. Each of these modules may be implemented by, for example, groups of software instructions executable by a programmable computing device such as the computer 201. Moreover, while the modules may be implemented by the execution of software instructions on a host computing device, various aspects of the invention also may be implemented by the storage of such software instructions on a computer-readable medium.

In the illustrated aspect, the gateway device interface module 403 is used to communicate with the gateway device 105 for the network. For example, the gateway device interface module 403 may include one or more application programming interfaces for controlling or otherwise communicating through a network adapter included in the computing device hosting the software application 401. While the gateway device interface module 403 is illustrated as a portion of the gateway service module 303, it should also be appreciated that, with some implementations, some portion or even all of the gateway device interface module 403 may be implemented by the operating system of the computing device hosting the network management tool 301.

The gateway device driver module 405 provides a driver for controlling the gateway device 105. In order to allow the software application 401 to be useful for a variety of networks, the gateway device driver module 405 may employ gateway specific drivers implemented as code libraries for working with a number of different gateway devices 105. In some embodiments of the invention running on the Microsoft Windows operating system, the code libraries are implemented as dynamically linked libraries (DLLs). With some implementations, the driver code libraries may all be included with the software application 401. With still other implementations, the gateway device driver module 405 may include an interface allowing it to use driver code libraries created and/or provided by third parties. Because the gateway device 105 for a small network is almost always a router, various implementations of the software application 401 may only employ driver code libraries for routers, and omit driver code libraries for more uncommon gateway devices, such as bridges and hubs.

When the gateway service module 303 is initiated, the gateway device driver module 405 employs heuristics to determine the appropriate driver code library to communicate with the gateway device 105. In practice, most gateway devices implement a Web-compatible user interface accessed using the HTTP protocol for allowing a user to configure the settings and functionality of the gateway device. Accordingly, as will be described in more detail below, the gateway service module 303 initially sends the gateway device 105 a HTTP Request. In reply, the gateway device 105 sends the software application 401 a HTTP Response containing a markup language page, such as a hypertext markup language page. That is, the HTTP Response will either include the contents of the page requested (i.e., with the response message HTTP STATUS_CODE=200) or a page containing an error message indicating the user is not authorized to view the requested page (i.e., with the response message containing the status code "Access Denied" or "401"). The gateway device driver module 405 then compares the content of the HTTP Response from the gateway device 105 with at least one corresponding regular expression registered by each driver code library, to determine which driver code library matches the gateway device 105.

By convention, the Web-based user interface for a gateway device typically will require a valid user name and password before allowing a user to manage the gateway device. In practice, however, many users do not change the user name or password from the default values configured by the manufacturer. A driver code library used to communicate with a gateway device 105 will thus include the original default values for the user name and password for that gateway device. These "default access credentials" then are used to communicate with gateway device 105. If the gateway device driver module 405 determines that a selected driver code library cannot be used because these default access credential values have been changed, the gateway service module 303 may instruct the network management application module 307 to prompt the user for the new access credential values. Using access credential information then submitted by the user, the driver code library selected by the gateway device driver module 405 can control the gateway device 105.

As will be explained in more detail below, the network information data structure will include a data cell containing properties of the gateway device 105. In order to distinguish this data cell from the data cells for other network devices, the data cell may include a unique identifier for the gateway device 105. The network information data structure created by the network management tool 301, however, will be synchronized with the network information data structures created by other instances of the network management tool 301. Accordingly, the identifier may be generated using a technique that will allow the same identifier for the gateway device 105 to be consistently generated by every instance of the network management tool 301 in the device.

Figure 5A:
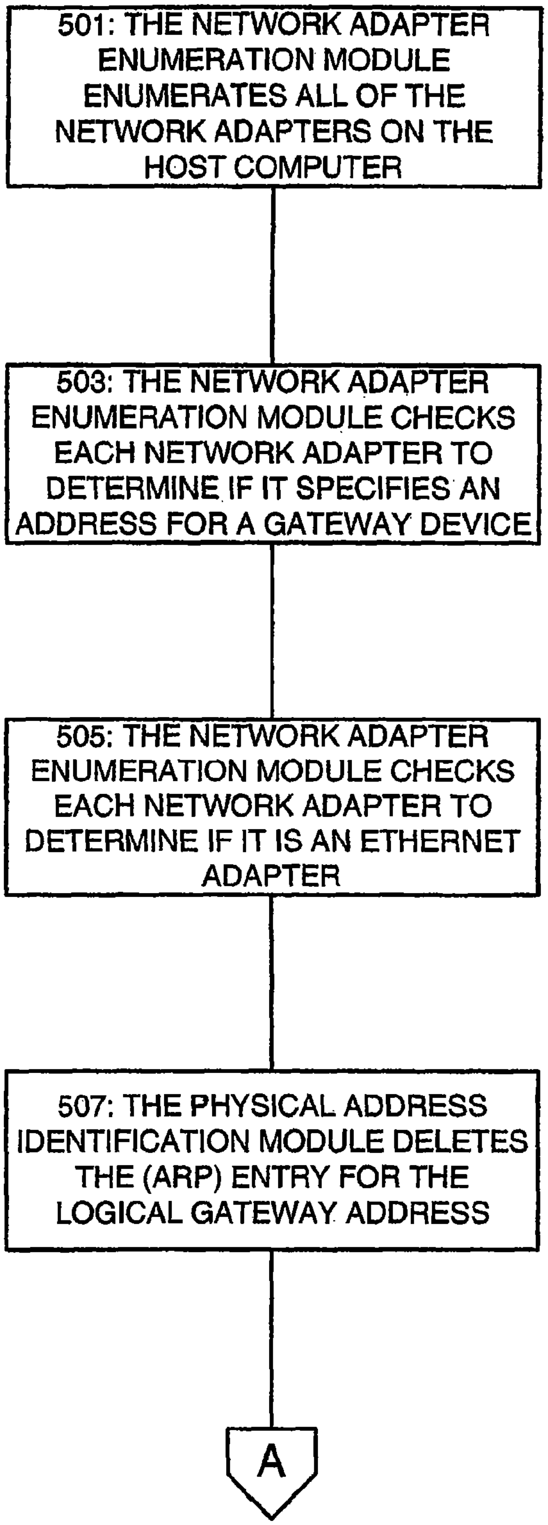
FIGS. 5A-5C illustrate a flowchart showing one process by which the gateway interaction module can determine a unique network identifier from the media access control (MAC) address of the network's gateway device according to various aspects of the invention.
Figure 5B:
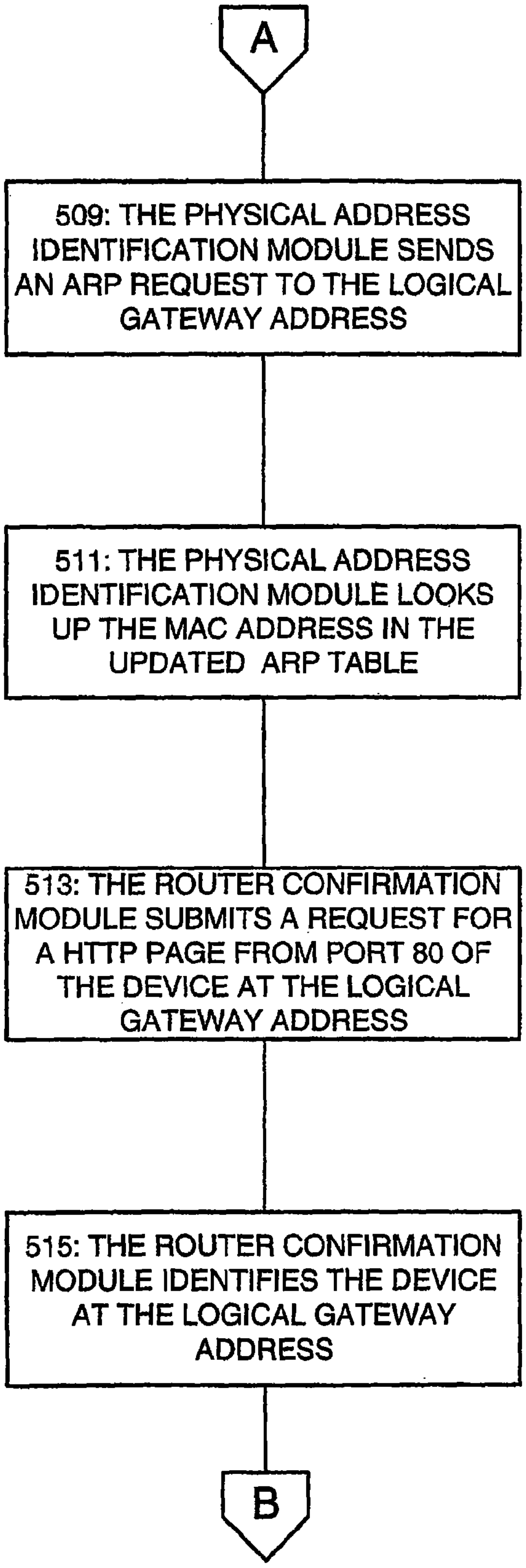
Figure 5C:
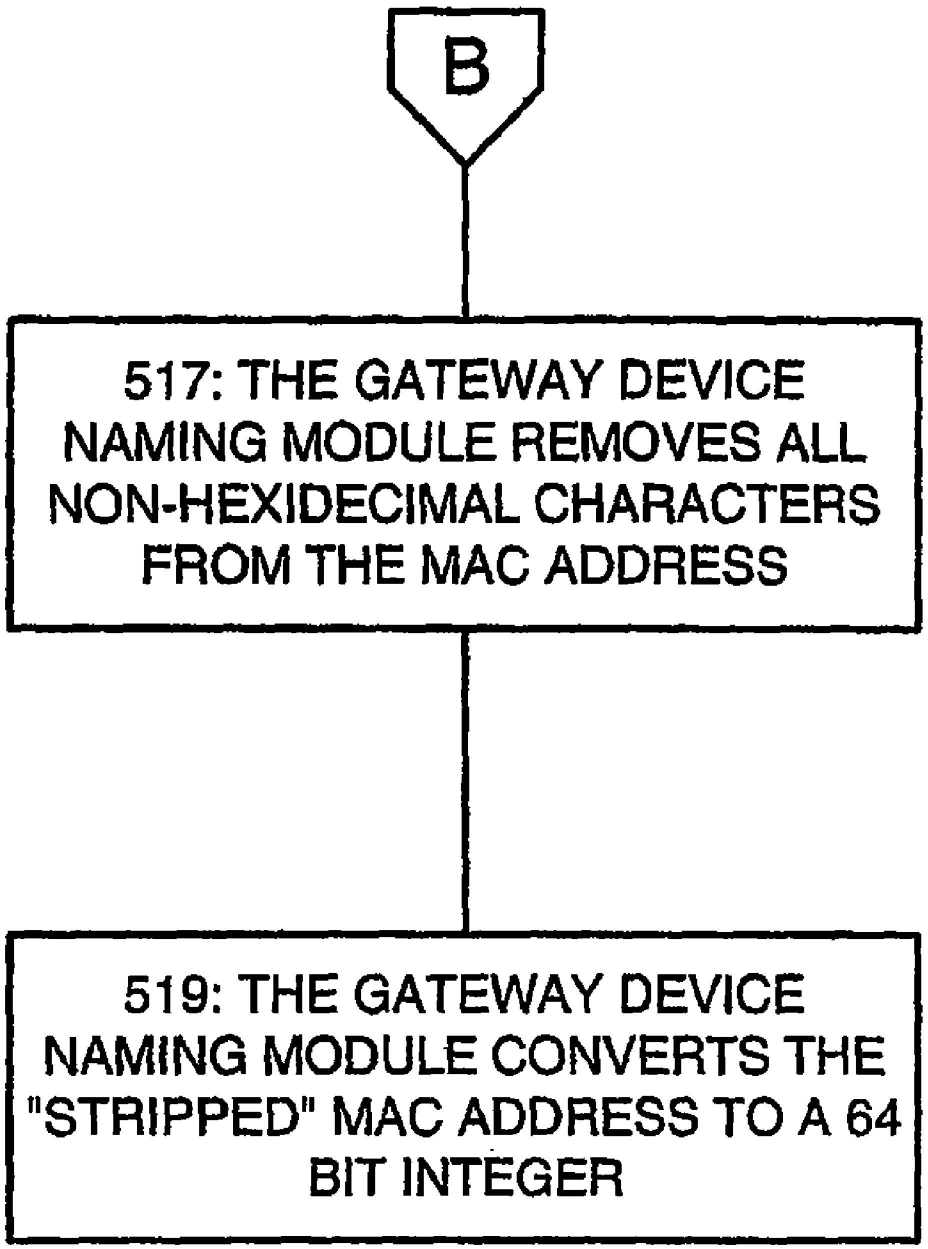

To perform this function, the gateway interaction module 407 includes a network adapter enumeration module 409, a physical address identification module 411, an optional gateway device identification module 413, and a gateway device naming module 415. With various aspects of the invention, any suitable unique identifier associated with the network's gateway device 105 may be used. Various aspects of the invention, however, may employ the physical address of the gateway device 105 as its unique identifier. More particularly, some aspects of the invention will use the media access control (MAC) address for the gateway device 105 as its unique identifier. Accordingly, one process by which the gateway interaction module 407 can determine a unique network identifier from the media access control (MAC) address of the network's gateway device 105 will now be described in detail with respect to FIGS. 5A-5C.

Initially, in step 501, the network adapter enumeration module 409 enumerates the network settings of all of the network adapters on the computer hosting the network management tool 301. For example, if the network management tool 301 is being hosted on a computer employing the Microsoft Windows operating system, the network adapter enumeration module 409 may call the GetAdaptersInfo application programming interface to enumerate the network adapters on the host computer. Other operating systems typically will offer commands or programming interfaces that perform a similar function. Table 1 below illustrates an example of the types of network settings that may be obtained during this enumeration process. More particularly, Table 1 shows the network adapter settings output by the "ipconfig/all" command-line utility provided by the Microsoft Windows operating system.

TABLE 1

| | |
|---|---|
| Connection-specific DNS Suffix: | MyDomain.local |
| Description: | 3Com 3C920 Integrated Fast Ethernet |
| Physical Address: | 00-06-5B-EB-C8-FD |
| Dhcp Enabled: | Yes |
| Autoconfiguration Enabled: | Yes |
| IP Address: | 192.168.1.24 |
| Subnet Mask: | 255.255.255.0 |
| Default Gateway: | 192.168.1.1 |
| DHCP Server: | 192.168.1.172 |
| DNS Servers: | 192.168.1.172 |
| Primary WINS Server: | 192.168.1.172 |
| Lease Obtained: | Wednesday, August 04, 2004 5:44:47 AM |
| Lease Expires: | Thursday, August 12, 2004 5:44:47 AM |

Thus, in addition to identifying the network adapters employed by the host computer, the enumeration process also checks each network adapter in step 503 to determine if it specifies a default logical address for a gateway device. As previously noted, this "default gateway address" is the logical network address of the gateway device 105 that routes data packets from the network to another network. If a network adapter does not specify such a default logical gateway address, then that adapter is eliminated from further processing. Also, if the aspect of the invention is compatible with a specific type of network, it may check each enumerated network adapter to confirm that it is compatible.

For example, the illustrated aspects of the invention employ the media access control address of the gateway device 105, as previously noted. These aspects thus are primarily used with Ethernet networks that employ this type of physical address (i.e., a network meeting the IEEE 802.3 standard). Accordingly, in step 505, the network adapter enumeration module 409 will check each enumerated network adapter in the host computer to confirm that it is an Ethernet network adapter. Any detected network adapter that is not an Ethernet adapter is eliminated from further processing.

Next, the physical address identification module 411 determines the physical address corresponding to each logical gateway address specified by the enumerated Ethernet network adapters. More particularly, in step 507, the physical address identification module 411 deletes the address resolution protocol (ARP) entry maintained by the host computer's operating system that corresponds to the logical address of the gateway device. It then sends an address resolution protocol (ARP) request message to the logical gateway address specified by the network adapter in step 509. In response to the address resolution protocol (ARP) request message, the device at the logical gateway address transmits its physical network address (i.e., its media access control (MAC) address) to the host computer, which creates a new address resolution protocol (ARP) table entry for the gateway's physical network address. In step 511, the physical address identification module 411 then uses the address resolution protocol (ARP) table to look up the media access control (MAC) address for the device at the logical gateway address. If the retrieved media access control (MAC) address is not all zeros, the physical address identification module 411 will save the retrieved media access control (MAC) address.

With various aspects of the invention, the gateway interaction module 407 may be configured primarily for use with small networks that employ a router as the gateway device 105, rather than another computer, a bridge, or a hub. Accordingly, rather than trying to specifically identify the type of device located at the default logical gateway address, various aspects of the invention may optionally check to determine if the device at the default logical gateway address is a router. If it is not, then the device is assumed not to be the gateway device 105 for the network. It should be noted, however, that other aspects of the invention may be employed with any type of gateway device 105, particularly with regard to the creation of a unique identifier for a network.

With some aspects of the invention configured to operate primarily with a router, after the physical address identification module 411 identifies the media access control (MAC) address for the device at the default logical gateway address, the gateway device identification module 413 tests the device to determine whether it is a router and what type of router. More particularly, in step 513, the gateway device identification module 413 tries to connect to Port 80 of the device at the default logical gateway address. If the device at the default logical gateway address allows the gateway device identification module 413 to connect to its Port 80, then the router identification module will conclude that the device at the default logical gateway address hosts a Web server (i.e., provides an HTTP based interface) and is therefore most likely a router.

Next, in step 515, the gateway device identification module 413 will try to identify the type of gateway device 105 at the default gateway address in order to determine which device-specific driver code library should be used with the gateway device 105. First, the gateway device identification module 413 submits a request for a hypertext transfer protocol (HTTP) page from Port 80 of the gateway device 105. This HTTP request may include a universal resource locator (URL) address of the form "http://xxxx.xxxx.xxxx.xxxx" where "xxxx.xxxx.xxxx.xxxx" is the default gateway address for the gateway device 105. Because the gateway device 105 has not yet been identified however, this request is submitted with intentionally incorrect security credential information, as will be explained below.

Conventionally, a Web server hosted on the gateway device 105 will respond to a HTTP Request with the resource associated with the URL contained in the HTTP Request. As also known in the art, gateway devices, such as routers, conventionally employ HTML pages as their native communication format. Accordingly, the gateway device 105 may respond with an HTTP STATUS OK code message (e.g., Status_Code 200) and an HTML page associated with the gateway device 105 (e.g., the gateway device's home page). Table 2 contains an example of a Status Code OK (200) from a D-Link router:

TABLE 2

```
STATUS_CODE: 200
STATUS_TEXT: OK
VERSION: HTTP/1.1
SERVER: Embedded HTTP Server 2.42
Content-Type: text/html
Last-Modified: Wed, 31 Mar 2004 00:12:49 GMT
Connection: close
<HTML>
    <HTML Content of Requested Page>
</HTML>
```

Alternately, if the gateway device 105 employs a security authentication scheme, such as the well-known "Basic Authentication" scheme, the gateway device 105 may return an HTTP ACCESS DENIED status code message (e.g., STATUS_CODE=401). To ensure that this type of response is received for a gateway device 105 employing a security authentication scheme, the original HTTP request is submitted with intentionally incorrect security credential information, as noted above. The HTTP ACCESS DENIED status code message will typically contain the authentication scheme and "realm" for the gateway device 105. For example, Table 3 contains an "Access Denied" HTTP response from a D-Link router, model DI-624. The authentication scheme is "WWW-Authenticate: Basic" with a realm of "DI-624".

TABLE 3

```
STATUS_CODE: 401
STATUS_TEXT: Unauthorized
VERSION: HTTP/1.1
RAW_HEADERS_CRLF: HTTP/1.1 401 Unauthorized
Server: Embedded HTTP Server 2.42
WWW-Authenticate: Basic realm="DI-624"
Connection: close
<HTML><HEAD><TITLE>401 Unauthorized</TITLE></HEAD>
<BODY BGCOLOR="#ffffff"><H4>401
Unauthorized</H4></BODY></HTML>
EOF
```

As previously noted, the gateway device driver module 405 will have a number of gateway device specific driver code libraries, so that the software application 401 can operate with a wide variety of gateway devices. Each driver code library will have one or more regular expressions associated with it, which are used to associate a driver code library with a specific gateway device it supports. More specifically, a driver code library for a particular gateway device will be associated with at least one regular expression corresponding to identifying information that can be obtained from that gateway device. The regular expression may correspond, e.g. to identifying information provided by the gateway device 105 in response to a routine inquiry from the computer hosting the network management tool 301, such as the address resolution protocol (ARP) request described above. Alternately or additionally, the regular expression may correspond to identifying information provided in response to a specific inquiry from the gateway service module 303, such as the HTTP Request to the gateway device 105 also described above. As will be appreciated by those of ordinary skill in the art, a regular expression is a pattern that can match various text strings. Thus, the regular expression '1[0-9]+ will match any string with a '1' followed by one or more digits. Accordingly, the gateway device identification module 413 will compare the regular expressions associated with the driver code libraries to the identifying information obtained from the gateway device 105.

With some aspects of the invention that employ a Microsoft Windows operating system, the regular expressions for each driver dynamically linked library (DLL) may be stored as a Windows Registry Key in the Window Registry. As will be appreciated by those of ordinary skill in the art, the Windows Registry serves as a known, centralized location for storing setting information, and thus provides a convenient and accessible location for storing the regular expressions associated with each driver DLL. For example, with some aspects of the invention a Windows Registry Key for a driver DLL will contain five entries: (1) a path entry, which specifies a fully qualified path to DLL implementing the driver for the associated gateway device, (2) a key entry that is used to sort router DLLs for evaluation order, (3) a "BasicAuth" entry that is a regular expression for evaluating the identity of the gateway device 105 when the gateway device 105 has provided an HTTP_ACCESS_DENIED response, (4) a "NoAuth" entry that is a regular expression for evaluating the identity of the gateway device 105 when the gateway device 105 has provided a HTTP_STATUS_OK response that contains the requested web page, and (5) a MAC entry that is a regular expression for evaluating the MAC address obtained from the gateway device 105 to associate the gateway device 105 with a vendor. An example of a Windows Registry Key for driver DLL to be used with a D-Link router is shown below in Table 4.

TABLE 4

```
[HKEY_LOCAL_MACHINE\SOFTWARE\Pure Networks\Port Magic\
RG\3\DLink.dll]
"Path"="C:\\Program Files\\Pure Networks\\Port
Magic\\RG\\DLink.dll"
"Key"="Dlink"
"BasicAuth"="^{DI-\\a+}|{D-Link DI-\\a+}|{Login as admin}"
"NoAuth"="{D-Link}|{NAME=\"fLogo\"}"
"Mac"="^{00:40:05}|{00:05:5D}|{00:50:BA}|{00:80:C8}"
```

With some aspects of the invention, the HTTP Response returned by the gateway device 105 (i.e., either the HTML page returned with the HTTP ACCESS OK message or the HTTP ACCESS DENIED message) will be evaluated against the set of regular expressions for all of the driver DLLs (i.e., the combination of the regular expressions for all of the driver DLLs). For example, with some aspects of the invention, the gateway device identification module 413 will first compare the contents of the HTTP reply message from the gateway device 105 with a set containing the "BasicAuth" and "NoAuth" regular expression for each driver DLL.

If a portion of the returned message (e.g., identifying information for the gateway device 105) matches a regular expression in the set, then that portion is designated as a Device Identifier value. If no portion of the returned message matches a regular expression in the set, however, then the gateway device identification module 415 will next compare the MAC address obtained for the gateway device 105 with a set containing the "MAC" regular expression associated for each the driver DLL. If the MAC address matches one of a "MAC" regular expression associated with one of the driver DLLs, that matching value is designated as the Device Identifier value. The gateway device driver module 405 can then use this Device Identifier to determine which driver DLL should be used with the gateway device 105. It should be noted, however, that alternate aspects of the invention may compare the "MAC" regular expressions before comparing the "Basic Auth" and "NoAuth" regular expressions, or may combine the different types of regular expressions into a single comparison process.

If no identifying information obtained from the gateway device 105 matches a regular expression associated with a driver DLL, then the gateway device identification module 415 may eliminate that gateway device from consideration as a gateway device 105. Steps 507-515 are then repeated for each of the remaining enumerated network adapters for the host computer.

As noted above, various aspects of the invention may be hosted on portable computer that may connect to one or more networks over time. For example, aspects of the invention may be hosted on a laptop computer that travels between a home network and a work network. Alternatively, aspects of the present invention may be hosted on other portable devices or fixed devices as well. The gateway service module maintains a list of gateways devices that it has identified over time. Each entry in the list is indexed by the unique identifier for the gateway. The gateway service can maintain this list of visited gateway devices in a database, for instance, such as the Windows Registry.

```
[HKEY_LOCAL_MACHINE\SOFTWARE\Pure
    Networks\Router Service\Routers]
[HKEY_LOCAL_MACHINE\SOFTWARE\Pure
    Networks\Router Service\Routers\00:12:17:0C:F8:AF]
"DefaultPrinter"="{6CEC5CD4-3816-400D-9C38-
    C7918696AC6D}"
"Property"="Value"
[HKEY_LOCAL_MACHINE\SOFTWARE\Pure
    Networks\Router Service\Routers\00:12:17:31:7F:0D]
```

In addition to maintaining a list of visited gateway devices, the gateway service may also maintain a list of named properties and their corresponding values associated with each gateway device. For example, the gateway device identified by the MAC Address "00:12:17:0C:F8:AF" has a named property DefaultPrinter with a value of "{6CEC5CD4-3816-400D-9C38-C7918696AC6D}", the unique identifier for a printer. Clients of the gateway service can associate properties with a gateway device or small network. For example, when the computer joins the network serviced by the gateway device identified by "{6CEC5CD4-3816-400D-9C38-C7918696AC6D}", a client of the gateway service can retrieve the default printer setting from the gateway service and change the default printer of the computer to the printer specified as the "DefaultPrinter" property. In other words, the system may include the ability to associate properties with a gateway device. For instance, when a device joins a network serviced by a gateway device, various functions may be performed. For instance, a default printer may be modified to be associated with one printer over the other as dependent upon to which network one is attached.

Further, licensing information may be controlled across multiple networks based on the presence of an individual. For instance, X number of copies of a software title may be licensed for a network. However, more than X copies may be installed on the collection of network devices. In this regard, some of the X copies (for instance, on the last-started applications or on the last device to have joined a network) may be disabled or modified to only perform limited functions until one of the other X licenses are released (application ceased or device shut down). At this point, the last started application or last device to have joined the network may be permitted to use the licensed title.

In addition to maintaining a list of visited gateway devices, the gateway service designates a gateway device as the home gateway device.

[HKEY_LOCAL_MACHINE{SOFTWARE\Pure Networks\Network Magic]

"HomeGatewayId"="100000000-0000-0000-0000-001217317F0D}"

"AwayGatewayIdList"="{00000000-0000-0000-0000-0002B3CCE49A}"

In various aspects of the invention, the home gateway device may be used to designate the default network for the gateway service. The gateway devices that are not the home gateway device are referred to herein as foreign gateway devices.

In various aspects of the invention, switching between gateway devices can result in different behaviors. Connecting to a "foreign network", a network that is not serviced by the home gateway, can result in clients of the gateway service to perform specific actions. For example, connecting to a "foreign network" can trigger actions defined by the hosting application, like disabling Windows file and printer sharing. In other words, switching networks may trigger an event that clients of the gateway service can listen to and respond to in due course. These clients can respond to these events by performing actions like switching the default printer in Windows to the printer associated with this network or disabling file and printer sharing on the computer (aka a higher security mode) because a user is not on his home network. Various examples of the invention can also perform smart things like switching back to the home network when Windows automatically roams to another network. This may be useful in residential housing situations where two neighbors have wireless networks. The system may automatically switch the computer to the wireless network serviced by the access point with the highest signal strength. In some situations this will not be the host computers' home network. Aspects of the present invention may recognize that a host computer is not on the host computer's home network and prompt the user or automatically switch the user back to his home network.

As noted above, various aspects of the invention may be intended for use with small networks. Because this type of network will only include a single gateway device 105, these aspects of the invention may only recognize one gateway device 105 for the host computer at a time. Accordingly, with these aspects of the invention, if two or more gateway devices are identified for the host computer at a single time, they may take no further action. Alternately, some aspects of the invention may allow the host computer to have two or more gateway devices. These alternate aspects of the invention may, for example, generate a unique network identifier corresponding to each gateway device for the host computer. Some aspects of the invention may alternately allow the host computer to determine the "primary" unique network identifier for the computer when more than one unique network identifier exists. The algorithm used to make this determination could be any suitable algorithm that generates a consistent result, such as choosing the numerically lowest or highest network identifier.

Once a gateway device 105 has been validated as a supported and accessible router, the gateway device naming module 415 uses the previously obtained media access control (MAC) address for that router to generate the unique network identifier for the small network. More particularly, in step 517, the gateway device naming module 415 removes all non-hexadecimal characters from the MAC address. Next, in step 519, the gateway device naming module 415 converts this "stripped" MAC address to a 54 bit integer. Finally, in step 521, the gateway device naming module 415 encrypts the 54 bit integer. The gateway device naming module 415 may, for example, use Bruce Schneier's BLOWFISH encryption algorithm, which is incorporated entirely herein, or other suitable encryption algorithm for the encryption. The well-known BLOWFISH encryption algorithm is described in, e.g., *Lecture Notes in Computer Science,* #809, Springer-Verlag, 1994, which is hereby incorporated entirely herein by reference.

Various aspects of the invention may employ the same encryption key for every copy and instantiation of the network management tool 301. The resulting unique network identifiers would thus not securely encrypt the original MAC address, but they would not provide any private information identifying the user. Alternately, with some aspects of the invention, the stripped MAC addresses may be individually and securely encrypted. Still further, some aspects of the invention may perform alternate or additional desired manipulations of the gateway device's MAC address to generate the unique network identifier, such as embedding the MAC address (or a derivative thereof) into a larger block of information. Still further, some aspects of the invention may even use the original MAC address for the gateway device, without modification, as the unique network identifier for the network.

Network Management Services Module

Figure 10:
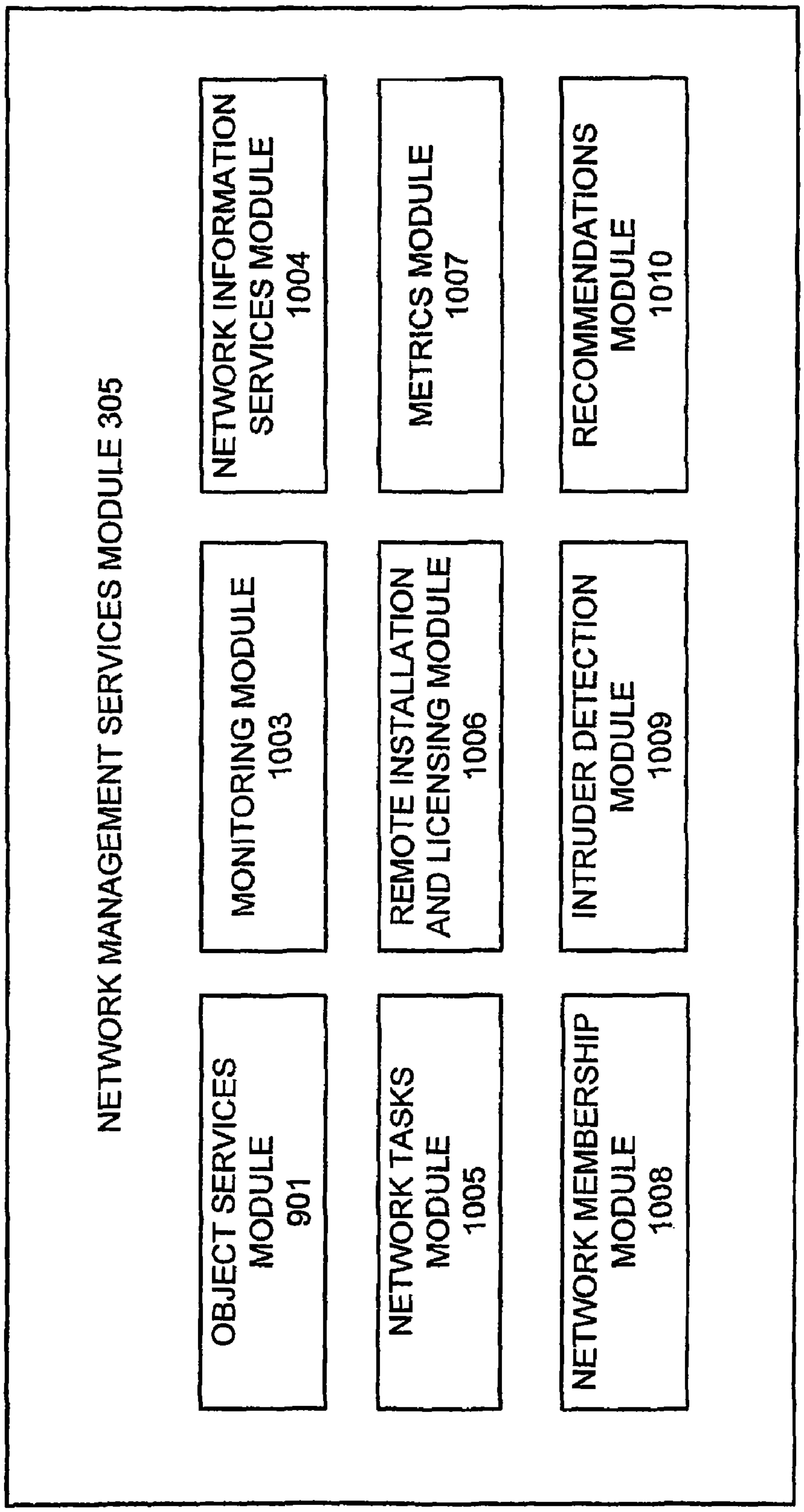
FIG. 10 illustrates an example of a network management services module according to various aspects of the invention.

FIG. 10 illustrates an example of a network management services module according to various aspects of the invention. In the illustrated example, the network management services module 305 is hosted by a programmable personal computer 201 of the type illustrated in FIG. 2. The network management services module 305 includes an object services module 901, a monitoring module 1003, a network information services module 1004, a network tasks module 1005, a remote installation and licensing module 1006, a metrics module 1007, a network membership module 1008, an intruder detection module 1009 and a recommendations module 1010. Both the gateway service module 303 and the network management services module 305 are connected, either directly or indirectly, to the network interface 227 of the computer 201. As described in detail below, the gateway service module 303 and the network management services module 305 communicate with various network devices through the network interface 227. The network management application module 307 is then connected, either directly or indirectly, to the input device 223 and the output device 225 of the computer 201.

The network management services module 305 hosts a set of networking services that are used by the network management tool 301 to monitor, manage, and respond to changes in the operating system hosting the tool, the device hosting the tool, any devices connected to the device hosting the tool, the connectivity between the device hosting the tool and the local network, devices on the network, and connectivity between the device hosting the tool and non-local networks like the Internet. To manage the variety and complexity of devices the network management services module 305 may monitor and manage, it may use an object services module 901 to encapsulate both the common and unique functionality of devices as described below.

Object Services Module

Figure 9:
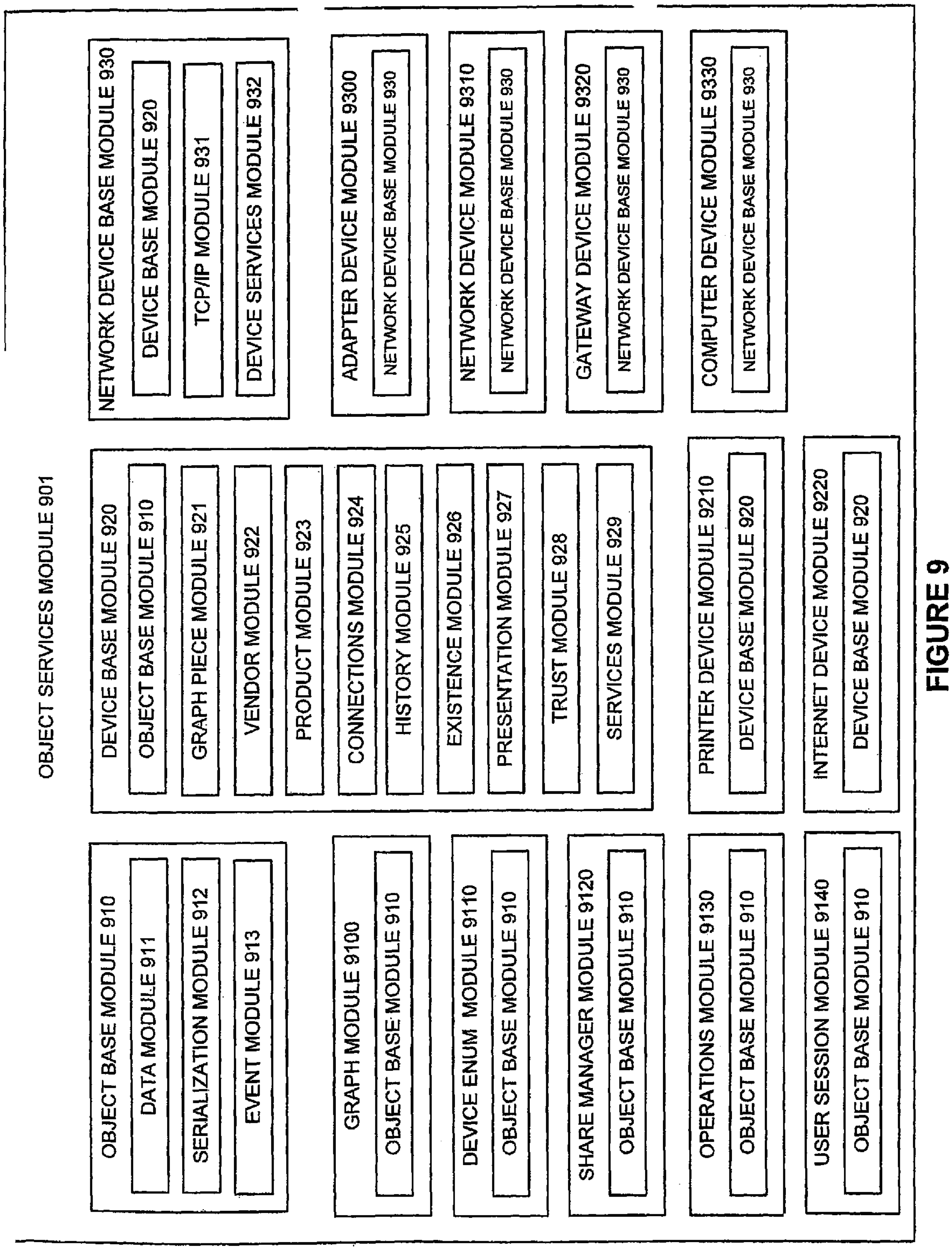
FIG. 9 illustrates an example of an object services module according to various aspects of the invention.

FIG. 9 illustrates an example of an object services module according to various aspects of the invention. In the illustrated example, the object services module 901 is hosted by a programmable personal computer 201 of the type illustrated in FIG. 2. The object services module 901 includes a set of "base" modules: an object base module 910, a device base module 920, and a network device base module 930, and a set of object modules that are derived from these "base" modules. Derived from the object base module 910 are the graph module 9100, the device enum module 9110, the share manager module 9120, the operations module 9130, and the user session module 9140. Derived from the device base module 920 are the printer device module 9210 and the Internet device module 9220. Derived from the network device base module 930 are the adapter device module 9310, the network device module 9310, the gateway device module 9320, and the computer device module 9330. The relationships of these modules and their functionality will be described in detail below.

Object Base Module

The object base module 910 implements a set of basic services that are shared by all modules implemented in the object services module 901. The object base module 910 includes a set of object management services for object creation and cloning, identification, versioning, data management, data serialization, and notifying clients of the object of changes to the object. To implement a generalized mechanism for managing the data of the object, the object base module 910 uses the data module 911. To implement the serialization of the object from an in-memory representation to a structured representation that can be committed to storage or encapsulated in a message, the object base module 910 uses the serialization module 912. To implement the communication of changes to the object to one of more clients, the object base module 910 uses the event module 913. The network management tool 301 needs to not only monitor and manage devices and resources located on the device hosting the tool, but also devices in the network and devices managed by another instance of the network management tool 301. To manage these devices and resources in a consistent manner, a common set of services is required. The object base module 910 implements these common services. The object base module 910 includes a set of services for managing the identity, properties, and versioning of objects. An object is a set of related functionality that gets managed by the object services module 901.

One of the core challenges of managing an object is how to identify the object consistently across multiple instances of the object services module 901. To this end, each object maintains a unique identifier. In some aspects of the invention, this unique identifier may be implemented as a GUID or globally unique identifier. A GUID is a unique 128 bit number that is theoretically unique across space and time. Each object managed by the object services module 901 has a unique identifier. In addition to being locally unique, the unique identifier may be unique across all instances of the object services module 901. More specifically, the unique identifier can be shared with any instance of the object services module 901 and it will always reference the same object.

a. Constant Unique Identifier. A constant unique identifier is a globally unique identifier (GUID) that is known to be associated with a specific object by all instances of the object services module 901. Typically, a constant unique identifier can be used to identify an object of which there is only one instance. For example, the unique identifier for an Internet device can use a constant unique identifier because there is only one such Internet device and the same instance of the Internet device is shared by all instances of the object services module 901.

b. Local Object Unique Identifier. The local object unique identifier uniquely identifies an object, device or resource attached to the device hosting the object services module 901. The local object identifier is created and maintained locally and communicated to other instances of the object services module 901. For example, a computer hosting the object services module 901 may have an attached peripheral like a printer. The attached printer is known only to the computer so the printer is assigned a local object unique identifier. The instance of the object services module 901 running on the computer assigns a local object unique identifier to the printer and communicates this identifier to all other instances of the object services module 901. Other instances of the object services module 901 running on other devices identify the printer attached to the computer by this local object unique identifier. The local object unique identifier is typically implemented as a globally unique identifier which is a 128 bit number that is unique across time and space. In some aspects of the invention, the GUID is generated the GUIDGen utility application employed by the Microsoft Windows operating system or similar utility application. For compatibility with global object unique identifiers, the first 10 bytes of a local object unique identifier cannot be zero.

c. Global Object Unique Identifier. A global object unique identifier uniquely identifies a global object across all instances of the object services module 901. It differs from a local object unique identifier in that a global object unique identifier should be able to be recreated by any instance of the services module 901 and still reference the same object. A global object unique identifier is represented by a GUID, a 128 bit number that is unique across time and space. Some aspects of the invention, for example, will generate a unique identifier for a global object using the standard GUID format, but designating all but the last 6 bytes of the identifier as zeros. Typically, global objects are devices connected to a TCP/IP based network. For these network devices, the last 6 bytes of the identifier are then set to be the media access control (MAC) address of the globally detectable device. Using this technique, every instance of the object services module 901 in a network will generate the same unique identifier for network device or global object. For example, a gateway device is a global object managed by the object services module 901. The global object unique identifier for the gateway device is constructed by using the standard GUID format, designating all but the last 6 bytes of the identifier as zeros, and replacing the last 6 bytes of the identifier with the media access control (MAC) address of the gateway's internal network adapter. Using this technique, all instances of the object services module 901 may generate the same unique identifier for the gateway device.

Figure 13:
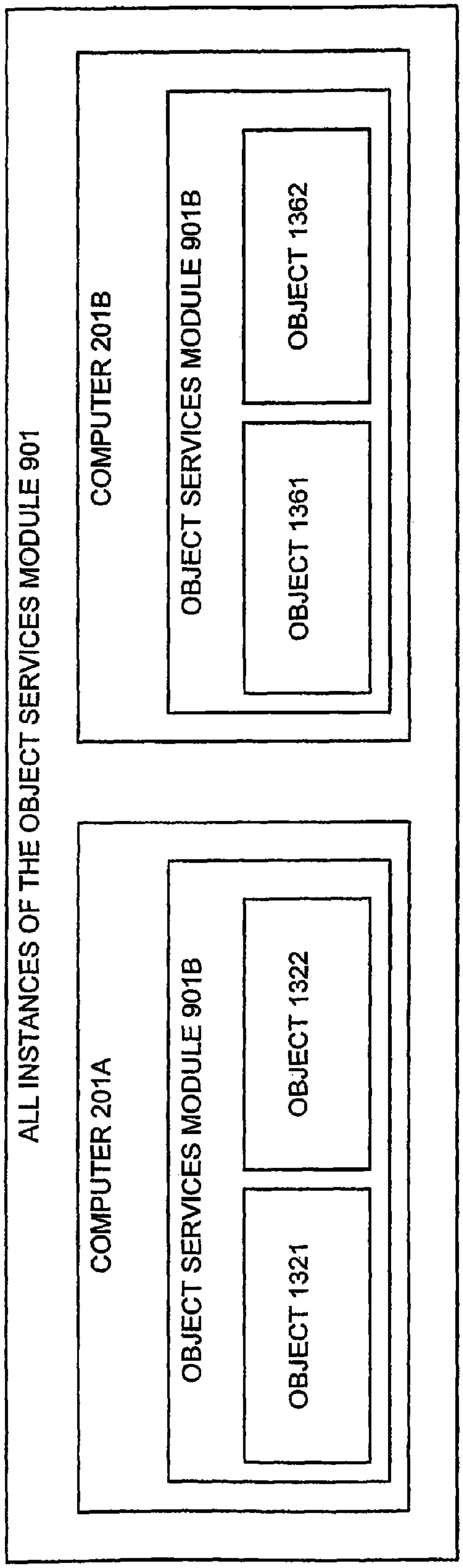
FIG. 13 illustrates multiple instances of the object services module according to various aspects of the invention.

Given that all objects managed by the object services module 901 can be uniquely identified, the properties and functionality of each object can be accessed by any instance or client of the object services module 901. For example, an object running on one instance of the object services module 901 can instruct an object running on another instance of the object services module 901 to perform an action. The action can cause the remote object to update its properties and notify other objects of its changes. As shown in FIG. 13, any object hosted by any instance of the object services module 901 can be manipulated by referencing the unique identifier for the device hosting the object services module 901 and the unique identifier for the object managed by the object services module 901 on that device. Thus, the object 1321 on computer 201A can communicate with object 1361 on computer 201B.

The object services module 901 provides a set of services for maintaining quick access to lists of object references and testing the equality of two objects. Clients of the object services module 901 need to reference objects by the object's unique identifier, an object provided identifier, or a combination of the two. The object services module implements lookup tables that allow a client to find a reference to an object from the object's unique identifier. In some embodiments of the invention, the lookup of an object's unique identifier is implemented as a hash table with the key being the object's unique identifier and the value being a reference to the object. Further, the object services module 901 implements a hash table with the key being a combination of the object's unique identifier and a unique identifier provided by the object. The unique identifier provided by the object may not be globally unique, but by combining it with the unique identifier of the object the composite key is unique. For example, a printer object needs to be able to associate the name of the printer with the unique identifier for the printer. All notifications and services provided by the operating system to manage the printer require the printer name to uniquely identify the printer. The unique identifier provided by the object for a printer object is the name of the printer, e.g. "HP DeskJet 850CsePrinter". The composite hash key that combines the object's unique identifier with the object provided unique identifier would be: "{8ED3654F-5140-4CEE-BF41-779DFDE95A95}:HP DeskJet 850Cse Printer". Using the clients of the object services module 901 can look up a reference to a printer object using the printer name (object provided unique identifier) or the unique identifier for the object.

As part of the core set of object services, the object services module 901 provides mechanisms for testing the equality of two objects. Simply, the unique identifiers for the two objects are compared. If they are the same, then the objects are considered to represent the same object in the object services module 901.

Each object managed by the object services module 901 contains a set of object properties. These properties are used to store information about the object, such as the MAC address of the object on the network. As previously described, objects managed by the object services module 901 are hierarchical in nature. For example, a gateway device module 9320 is based on a network device base module 930 which in turn is based on a device base module 920 which in turn is based on an object base module 910. Each of these "base" objects has a set of data that needs to get managed and serialized using a generalized mechanism. The object base module 910 includes a data module 911 to manage the manipulation of data on the object.

The data module 911 provides a generalized mechanism for manipulating the data on an object managed by the object services module 901. When an object managed by the object services module 901 gets defined, it specifies a set of attributes and properties that it wants to have persisted across running instances. The data module 911 uses these specifications to serialize the object's memory into a form that can be written to disk or be encoded and sent in a message between instances of the object services module 901 running on different devices. The data module 911 maintains a set of structures that map a variable in an in-memory object to a property that can be serialized to XML and de-serialized from XML.

An attribute map defines a set of attributes that get included in an XML Element. For example, the following code sample defines two attributes for an object of type NmDeviceBase: a unique identifier and a local identifier.

TABLE 5

```
BEGIN_XMLATTR_MAP(NmDeviceBase)
   XML_GUID_WT(SZ_XMLELEM_ID,
   NmPI_Device_UniqueId, m_guidUs)
   XML_GUID_WT(SZ_XMLELEM_LOCALID,
NmPI_Device_LocalDeviceId, m_guidDeviceLcl)
END_XMLATTR_MAP( )
```

The entry "BEGIN_XMLA TTR_MAP(NmDeviceBase)" defines the start of an attribute map for the object with a class of NmDeviceBase. The next lines define a list of one or more attributes to be included with the class. The attribute definition has a syntax of "<Element Type>(<Element Name>, <tag>, <member variable>)". In the example described in Table 5, the "Element Type" is "XML_GUID_WT" which describes the variable as being a GUID. The second parameter "SZ_ELEM_ID" is a reference to a string with a value of "id". The third parameter "NmPLDevice_UniqueId" is the unique identifier of "SZ_XMLELEM_ID". The fourth parameter is a reference to the member variable on the NmDeviceBase class called "m_guidUs". The same process is repeated for additional attribute entries. The entry "END_XMLATTR_MAP( )" denotes the end of the attribute entry map.

The object serialization module 912 uses the attribute map to transform the in-memory values of the object into an XML representation. The example in Table 5 gets translated by the object serialization module 912 for a printer object as follows:

<printer id="{D98E520C-DED1-44DE-A1F0-C75A74A6A3F5}" localid="{8EF7E28A-5F6F-4859-90A2-04559ED21C2A}">

Since the printer object is derived from device base object module 920, it inherits all of the element maps of the device base object. The value of the member variable "m_guidUs" in the printer object has the value of "{D98E520C-DED1-44DE-A1F0-C75A74A6A3F5}" and the member variable "m_guidDeviceLcl" has a value of "{8EF7E28A-5F6F-4859-90A2-04559ED21C2A}". This technique allows member variables of an object to be converted to and from representations in XML.

Element maps work similarly to attribute map, except that they map XML elements to members of a class. Table 6 illustrates an element map for the class NmDeviceBase.

TABLE 6

```
BEGIN_XMLELEM_MAP(NULL /* not used */, NmDeviceBase)
   XML_Enum_WT(SZ_XMLELEM_EXISTENCE,
   NmPI_Device_Existence,
m_existence, NmXmlExistenceConv)
   XML_BString_WT(SZ_XMLELEM_FRIENDLYNAME,
NmPI_Device_FriendlyName, m_bstrFriendlyName)
   XML_CustomMap(SZ_XMLELEM_CONNECTIONS,
   m_vecConnections)
```

The element map begins with a start definition "BEGIN_XMLELEM_MAP" which takes two parameters: 1) the string representation of Element; and 2) the name of the class. What follows next is a list of element definitions. In the first example, "XML_Enum_WT" describes a member variable called "m_existence" whose type is an enumeration. Like the attribute map, the second parameter is a string representation of the variable or "existence" in this example. The third parameter is a numerical unique identifier for the member variable or "NmPI_Device_Existence". The fourth parameter is the member variable of the class with which the XML element is to be associated. The final member, which is specific to elements of type "XML_Enum_WT", is an XML conversion routine. The XML conversion routine converts to and from a string representation of the member variable "_existence". For example, the string "Confirmed" gets stored in the member variable as the number "2". If the value of the member variable is 2, it will get serialized in XML as the string "Confirmed". Table 7 illustrates the XML representation of the member variable "m_existence" as serialized in XML.

TABLE 7

| |
|---|
| <existence _tlc="12744546501710">Confirmed</existence> |

The next entry in Table 6, "XML_BString_WT(SZ_XMLELEM_FRIENDLYNAME, NmPI_Device_FriendlyName, m_bstrFriendlyName)" defines the member variable "m_bstrFriendlyName" as a string and maps it to its XML representation "friendly_name". The next entry in Table 6 defines a custom map for the member variable "m_vecConnections". When the XML serializer encounters a custom map it calls the function "OnXmlCustomMapSerialize" to have the object serialize the variable. Similarly, when the XML deserializer encounters a customer map it calls the function "OnXmlCustomMapDeserialize" on the object to convert the string representation of the member variable to its in-memory representation. In this manner, custom structures can be converted to and from their XML representations.

Attribute and element maps allow objects based on the object base module 910 to convert its member data to and from XML encoded representations. As will be described later, this XML representation can be exchanged and synchronized across instances of the object services module 901 running on different devices in a network.

Further, the attribute and element maps allow the object base module 910 to manage the status of member variables. For example, a member variable may have the status of "dirty," which implies that the member variable has been changed. Further, a member variable may have an attribute that indicates a "timestamp", the date and time in which the variable was last changed. This "timestamp" can be automatically calculated when the member variable gets serialized to XML. Further, a member variable may have an access property such as "read only" which denies all updates to the member variable. Further, a member variable may have a derived attribute "default value" which indicates whether or not the member variable has never been changed. The derived attribute "default value" is calculated by the absence of a "timestamp".

Further, the attribute and element maps allow the object base module 910 to return a string representation of it. This enables the serialization of the object to a stream so that it can be written to permanent storage or encoded and transmitted in a message.

Further, changes in a member variable can be tracked by setting the "dirty" attribute for the member variable. All member variables with the "dirty" flag set can be serialized to XML. Further, property change events can be raised every time a member gets changed. These property change events can be used to communicate changes in member variables to other instances of the object services module 901 and to clients of the object services module 901 like a user interface that need to respond to changes in member variables.

Further, updates to a member variable can be assigned a "ranking" for reliability. This "ranking" indicates the relative certainty that the member variable is correct. One client of the object base module 910 could be less reliable (have a lower ranking) than another client. The "ranking" allows the object base module 910 to decide whether or not to override a value provided by one client if the "ranking" of the client is greater than the "ranking" currently associated with the member variable.

As previous described, changes to member variables of the any object derived from object base module 910 can be communicated as events. Clients of the object services module 901 can register to receive these events.

Device Base Module

The device base module 920 is derived from the object base module 910 and inherits all of the functionality and properties of the object base module 910. As such, the device base module 920 inherits the core services of the object base module 910: the data module 912, the serialization module 912, and the event module 913. In addition to these object base module 910 services, the device base module 920 implements eight other services: the graph piece module 921, vendor module 922, product module 923, connections module 924, history module 925, existence module 926, and trust module 928. The graph piece module 921 provides a set of services for adding the device base module 920 to a graph of devices. The vendor module 922 provides a set of services for describing information about the vendor or manufacturer of a device. The product module 923 provides a set of services for describing product information about the device. The connections module 924 provides a set of services for managing the connections between the device and other devices connected to the device directly or through a network. The history module 925 provides a set of services for managing a history of changes to the device. The existence module 926 provides a set of services for determining whether or not the device is online or exists either locally or in the network. The trust module 928 provides a set of service for managing the level of trust the device has in a trusted network of devices. In addition to modules described above, the device base module 920 implements a set of core services for devices which is described in detail below.

The device base module 920 implements a set of core services for manipulating devices. The device base module 920 maintains a type and subtype property for a device. The type property is used to determine the type of the device. For example, a computer will be of type "NmDT_Computer". In some aspects of the invention, the type also implies that the device is an object of this type. For example, a device with type "NmDT_Computer" will be a "Computer Object" and have a set of functionality designed to manage and interact with computers. Similarly, the device module 920 implements a "subtype" property which is used to further clarify the type of device. For example, a computer object with a type of "NmDT_Computer" may have a subtype of "NmDTS_ComputerLaptop" to designate that the device is a laptop computer. Clients of the device base module 920 can use the type and subtype information to treat the device differently. For example, a user interface could display an icon of a laptop computer if the device had a type of "NmDT_Computer" and a subtype of "NmDTS_ComputerLaptop".

The graph piece module 921 provides a set of services that enable an object derived from the device base module 920 to be represented in a network graph. Specifically, each device includes the ability to retrieve and store a graph revision number for the device. Any modifications to the graph or the relationships in the graph between devices increment the graph's revision number. When a device being represented in the graph is added or modified, the current graph revision number is stored with the device. The graph revision number stored with the device associates a device with a specific version of the graph. The graph revision number stored with the device thus provides a mechanism for comparing the age of two devices in the graph. For example, device A has a graph revision number of 4 and device B has a graph revision number of 8; therefore, device B is more current than device A. Storing the graph revision number in the device facilitates the pruning or deletion of old devices, e.g. devices with a graph revision number less than a specified graph revision number.

The vendor module 922 provides a set of services for describing information about the vendor or manufacturer of a device. The information may include:

a. VendorID. The VendorID is a unique identifier for a vendor. For example, the symbol "NmVID_DUNK", the string "D-Link" or the value 1 all reference D-Link Corporation. The VendorID is used to associate the vendor or manufacturer of a device with information about the vendor.

b. Vendor Name Short. A string that describes the short name of the vendor. For example, "D-Link" instead of "D-Link Corporation"

c. Vendor Name. A string that describes the name of the vendor. For example, "D-Link Corporation".

d. Vendor URL. The URL of the vendor's web site. For example, D-Link's Vendor URL would be "http://www.dlink.com/".

e. Vendor Email. The email address of the support contact at the vendor. For example, D-Link's Vendor Email address would be "support@dlink.com".

f. Vendor Phone. The telephone number of the support line at the vendor. For example, D-Link's Vendor Phone would be "(877) 453-5465"

Using a VendorID as a key, the vendor module 922 retrieves the vendor information from a lookup table. The lookup table is populated from an XML file vendors.xml. Vendor information can be updated without modifying the vendor module 922 by changing values in vendors.xml. Table 8 illustrates a sample entry for vendor.xml for D-Link Corporation.

TABLE 8

```
<vendor vendorid="D-Link" regex="D(-)?Link">
  <vendor_sname>D-Link</vendor_sname>
  <vendor_name>D-Link Corporation</vendor_name>
  <vendor_url>http://www.dlink.com/</vendor_url>
  <vendor_email>support@dlink.com<vendor_email>
  <vendor_phone>(877) 453-5465<vendor_phone>
</vendor>
```

Each XML element maps to its corresponding vendor information as described above. The <Vendor> element contains two attributes: "vendorid" and "reg ex". The "vendorid" attribute is the string representation of the VendorID. This value is converted to the appropriate number, 1 in this example, and stored as the VendorID. The "regex" attribute provides a regular expression for matching the "vendor name" in a stream of characters. In some aspects of the invention, this stream of characters could be obtained from a Web page retrieved from the device or information returned from the device. If the stream of characters matches the regular expression then the device is assumed to be manufactured from this vendor.

The product module 923 implements a set of services for managing the product information associated with the device. The product information includes the following information:

a. Product Identifier. The product identifier is a unique identifier for a product. The product identifier is a combination of the vendor of the product, the model number of the product, and the firmware version of the product. The Product Identifier is used to provide product specific information across a line of products.

b. Friendly Name. The Friendly Name is a user friendly version of the product information. For example, the friendly name for a computer might be its more friendly comment field "Steve's Laptop" instead of its less friendly hostname "sblaptop".

c. Presentation URL. The Presentation URL is a Uniform Resource Locator (URL) that references a Web-based management tool hosted on the device. Network devices like a gateway device typically host a Web-based management tool for configuring the device. For example, the Presentation URL for a gateway device with an IP address of 192.168.1.1 is http://192.168.1.1/.

d. Model Name. The Model Name provides a friendly description of the model of the device. For example, the model name for the Linksys Phone Adapter is "Linksys Phone Adapter (PAP2)".

e. Model Description. The Model Description provides a more detailed description of the model of the device. For example, the model description for the Linksys Phone Adapter is "Linksys Phone Adapter with 2 Ports for VoIP".

f. Model Number. The Model Number provides the model number for the device. For example, the model number for the Linksys Phone Adapter is "PAP2".

g. Firmware. The firmware provides a description of the firmware version for the device. For example, some versions of the D-Link D-624 router have a firmware version of "2.50, Mon, 13 Sep. 2004". The firmware version is product specific.

The product module 923 manages product information that can be used to identify a product from a particular vendor, of a particular model, and running a particular version of firmware. Clients of the product module 923 can use this information to display product specific information and to enable or disable functionality tied to a specific product.

The connections module 924 maintains a list of connections between a device and other devices. A connection may be a physical connection like a USB cable connecting a printer to a computer. Connections can also be logical, connecting two devices over a medium like a network. For example, a "Network Connection" is a logical connection between network adapters on two network devices. The <connections> XML element contains a list of device connections between the parent device and other devices. Table 9 provides a list of device connections between a computer, a network adapter and a gateway device.

TABLE 9

```
  <computer id="{8EF7E28A-5F6F-4859-90A2-04559ED21C2A}"
localid="{8EF7E28A-5F6F-4859-90A2-04559ED21C2A}">
  <connections>
  <device id="{B6922EFF-FABD-4224-8791-EDAA1AC7FC82}" />
  <device id="{ACDB40C9-4E93-4A20-8B2D-46DCF8B35A0D}" />
  <device id="{AA622D2D-4EEE-4628-9FC5-3FD0365D614A}" />
  <device id="{D98E520C-DED1-44DE-A1F0-C75A74A6A3F5}" />
  </connections>
  </computer>
  <adapter id="{B6922EFF-FABD-4224-8791-EDAA1AC7FC82}"
localid="{8EF7E28A-5F6F-4859-90A2-04559ED21C2A}"
aliasid="{E93383A2-E2C0-4218-8976-CBA65FAD9E26}">
  <connections>
    <device id="{8EF7E28A-5F6F-4859-90A2-04559ED21C2A}" />
    <device id="{00000000-0000-0000-0000-004010111BAA}" />
    </connections>
  </adapter>
  - <gateway id="{00000000-0000-0000-0000-004010111BAA}"
localid="{00000000-0000-0000-0000-000000000000}">
  - <connections>
  <device id="{21A3719F-2D37-4D89-823A-4643F89FE478}" />
  <device id="{B6922EFF-FABD-4224-8791-EDAA1AC7FC82}" />
  <device id="{00000000-0000-0000-0000-00508DF5D6E1}" />
  <device id="{00000000-0000-0000-0000-000F3DAA81D3}" />
  <device id="{00000000-0000-0000-0000-00045A0F9D6B}"/>
  <device id="{00000000-0000-0000-0000-00095B886469}" />
  <device id="{00000000-0000-0000-0000-00B0D019462E}" />
```

TABLE 9-continued

```
</connections>
</gateway>
```

Figure 12:
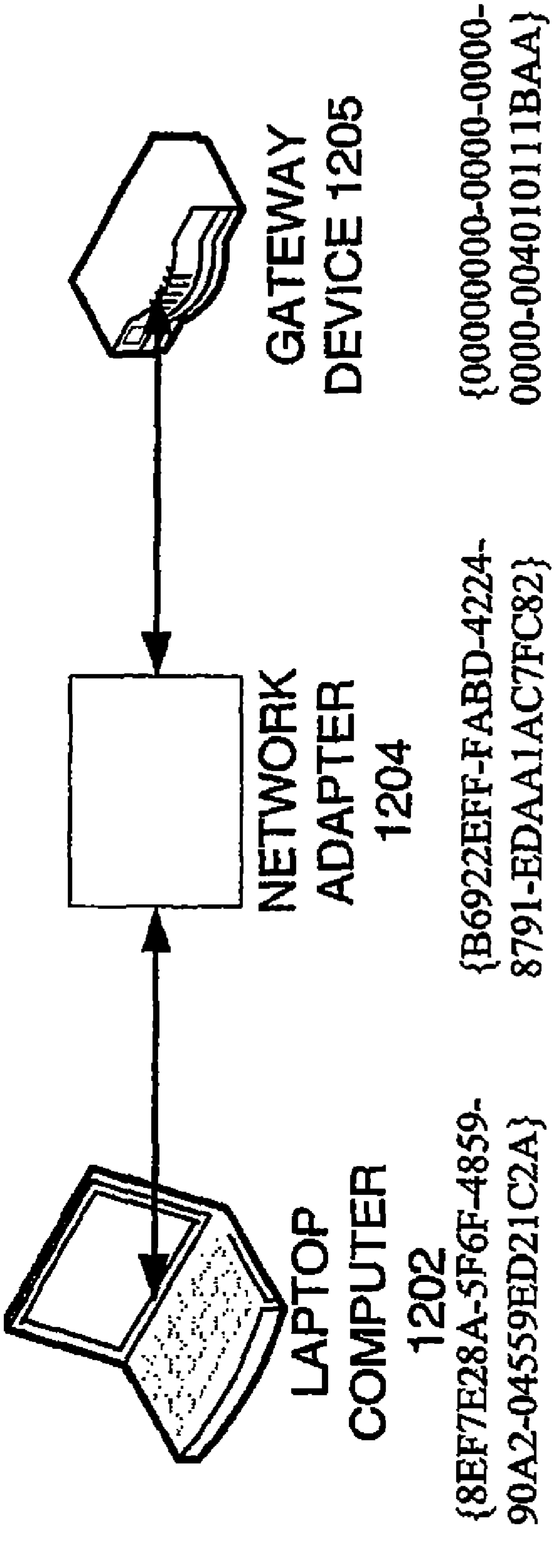
FIG. 12 illustrates the device connections between a laptop computer, its network adapter and a gateway device according to various aspects of the invention.

The "<connections>" XML element manages a list of one or more device connections between its parent device and the devices represented by the XML element "<device>". The "<device>" XML element contains an XML attribute of "id" that is the unique identifier of the device to which the parent device is connecting. For example, the computer device has a device connection to the adapter device identified by the unique identifier id with a value of "{B6922EFF-FABD-4224-8791-EDAA1AC7FC82}". The adapter device connects the computer and the gateway device. The adapter device has two connections. One device connection to the computer device identified by "{8EF7E28A-5F6F-4859-90A2-04559ED21C2A}" and another device connection to the gateway device identified by the id of "{00000000-0000-0000-0000-004010111BAA}". The aggregation of device connections across all devices forms a graph of how devices are connected together. The relationship and functionality of the device graph will be described in more detail below. FIG. 12 illustrates the device connections between a laptop computer 1202, its network adapter 1204 and a gateway device 1205.

The connection module 924 maintains a list of connections between devices. Clients of the connection module 924 can tell the service to add or remove a connection between devices. For example, the device monitoring module 1003 can request a device connection to be removed when a device goes offline or is no longer accessible on the network.

The history module 925 maintains a list of "Device Operations" that have been applied to the device over time. A "Device Operation" is a command and a set of arguments that, when executed, cause a status change to the device or a child device or resource attached to the device. For example, the operation configuring a computer to share an attached printer and configuring every computer to use this newly shared printer is described by the following XML:

TABLE 10

```
<computer id="{8EF7E28A-5F6F-4859-90A2-04559ED21C2A}"
localid="{8EF7E28A-5F6F-4859-90A2-04559ED21C2A}">
<history _tlc="12746581651918">
<operation type="SharePrinter" opid="{6683D284-8A60-4BC1-98B4-
18D8FD8B1D1A}" opgrpid="{88E6E935-5887-4126-AE84-
214D8AA90AB9}">
<objectid>{00DD33BD-ED56-46BA-8B68-5167677703BB}</objectid>
<result>0x0</result>
<args>
<arg>Canon i80</arg>
</args>
<time_utc yr="2004" mth="12" dyofwk="5" dy="3" hr="21"
min="7" sec="29" msec="545" />
</operation>
</history>
</computer>
```

The "computer" XML element includes a "history" XML element to maintain a history of operations applied to the computer. The XML element "history" maintains a list of operations that have been applied to a device over time. The "_tlc" XML attribute on the "history" XML element indicates a timestamp for when the "history" element last changed. The generalized functionality of the "_tlc" XML attribute is described later in the application. Each "operation" has an XML element attribute called a "type" that describes the operation to be performed. In this example, the operation is "SharePrinter", indicating that a local printer has been shared by the computer for other network devices to print to it. In addition to the "type" XML element, the "operation" XML element contains an XML element attribute "opid". The "opid" XML element attribute uniquely identifies operation. Typically, the value of "opid" will be a GUID. In addition to the "opid" XML element, the "operation" XML element contains an XML element attribute "opgrpid". The "opgrpid" XML element attribute uniquely identifies membership of the operation in a group of related operations. In practice, some operations can be broken down in multiple operations or steps. As any single operation can succeed or fail, the "opgrpid" XML element attribute associates the sub-operations (and their associated status) with the parent operation. For example, the "SharePrinter" operation involves multiple operations for distributing printer drivers and configuring remote network devices to access the shared printer. A child of the operation XML element, the "objectid" XML element, is the unique identifier for the device for which the operation should be applied or directed. For example, the "objectid" of "{00DD33BD-ED56-46BA-8B68-5167677703BB}" refers to a Canon i80 printer device that has just been shared by a computer device identified by "{8EF7E28A-5F6F-4859-90A2-04559ED21C2A}". The "result" XML element denotes the status of the operation, e.g. whether the operation failed or succeeded. The "args" XML element is a list of arguments required to perform the operation. The "args" element may be empty if no arguments are required, or contain one or more arguments. The "arg" element denotes an argument for the operation and the value of the argument, e.g., "Canon i80" in Table 10 above. The "time_utc" element denotes the universal time in which the operation was first executed. For example, this is the network time when the printer was shared for use by others in the network or "Friday, Dec. 3, 2004 21:07:29:545 UTC".

The history module 925 keeps track of operations that have been executed by its parent device. Network devices such as laptop computers are not always connected to the network. In some circumstances, "device operations" will take place while a network device is offline but need to be applied when a network device rejoins the network or goes online. When a network device transitions from being offline to online, the list of device operations maintained by the history module 925 is synchronized with other instances of the history module 925 running on other devices on the network. Operations that were executed by the offline network device while it was offline are also communicated to the other running instances of the history module 925 located on other network devices. These "new" operations are then executed against the remote network device and their list of operations is updated to be consistent with across all instances of the history module 925. Similarly, as part of the synchronization process, the offline device receives new operations (operations it has not performed yet) from other instances of the network module on the network. The local, now online, history module 925 executes the operations and updates its list of operations so it is consistent across all instances of the history module 925. For example, a laptop computer may be offline (not connected to the network) when another computer in the network shares a printer. When the laptop computer goes online (connects to the network and synchronizes its list of operations with all instances of network devices running the history module 925), the operation that shares the printer will be applied to the laptop computer. If the operation completes successfully, the laptop computer will be configured to use the shared printer even though the printer was shared when the laptop computer was offline.

In addition to "basic" operations, i.e., operations with an XML element of "<operation>", the history module 925 also supports "specialized operations". These specialized operations are derived from and include the functionality of the base operation but include more information that is specific to the operation being performed. For example, the XML snippet in Table 11 describes a specialized operation for sharing a directory of files called a "sharechange_operation".

TABLE 11

```
<computer id="{8EF7E28A-5F6F-4859-90A2-04559ED21C2A}"
localid="{8EF7E28A-5F6F-4859-90A2-04559ED21C2A}">
  <history _tlc="12746581651918">
<sharechange_operation type="AddedShare" opid="{4F08DFEC-8058-
4307-A18C-BF2806D77CCC}"
opgrpid="{00000000-0000-0000-0000-000000000000}">
    <objectid>{0DD33F9F-9D77-4B1F-AE72-904C203D9BF1}</objectid>
    <result>0x1</result>
    <args />
    <time_utc yr="2004" mth="11" dyofwk="3" dy="10" hr="7" min="48"
sec="47" msec="610" />
    <directory>C:\My Documents\My Pictures</directory>
  </sharechange_operation>
  </history>
</computer>
```

The "sharechange_operation" includes all of the information and functionality from a "basic" operation, but includes another XML element "<directory>" which denotes pathname of the directory to make available for file sharing. Like the printer sharing example above, if an instance of the history module 925 was offline when the directory was shared and now goes online, the now online history module 925 will receive the new operation and execute it, configuring the remote computer to use the newly shared file share.

When a group of device operations needs to be executed on a network device, they are ordered by the time the device operations were created. This ordering ensures that device operations get performed in the order they were first executed. Multiple device operations are pruned before executing to remove device operations that would otherwise cancel either other out. For example, a sharing operation followed by an unsharing operation would be pruned. The pruning operation would result in no operation being executed, rather than executing both the share and unshare operations. Periodically, the list of operations is truncated so that the number of operations doesn't become unmanageable.

The existence module 926 implements a set of services for managing the existence of a device. Existence is a generic term used to describe the following conditions:
  a. Connected. The device is connected to local device either through a direct connection like a USB cable or through the network.
  b. Disconnected. The device is not connected to the local device either through a direct connection like a USB cable or through the network.
  c. Online. Device is connected, online and should be functioning normally.
  d. Offline. Device is offline and may have no or limited functionality. Note the device may be connected but offline or disconnected and offline.

The existence module 926 maintains the existence state of the device. It provides a generalized service called PollExistence that is implemented by all devices. The PollExistence implements the device specific functionality to test whether or not the device is connected, disconnected, online, or offline. There are three existence states:

a. Unknown. The existence of the device is indeterminate. This may be caused by a broken network connection or the existence of the device has not been checked for the first time.
  b. Removed. The device has been removed from the list of devices being maintained by the connection module 924.
  c. Confirmed. The existence of the device has been confirmed. The device is connected and may or may not be online.

The existence module 926 provides a generalized mechanism for testing and updating the online/offline and/or connected/disconnected state of a device.

The trust module 927 manages the trust relationship between this devices and a trusted network of devices. A device initially starts out with an "unknown" level of trust. Clients of the trust module 927 can modify the "trust level" of the device, making the device more or less trusted by its peers. The following table lists the levels of trust maintained by a device:
  a. Unknown. The device has just been created and initialized to a default trust value of Unknown.
  b. Weakly Trusted. A caller of the trust module 927 service has designated that the device should be weakly trusted by its peers. In some aspects of the invention, the initial scan of the network, also called "one-shot" discovery, marks all devices as Weakly Trusted. Further, it should be noted that the user has not explicitly defined the device as either an intruder or trusted. Explicit user initiated trust assignments (e.g. intruder or trusted) takes precedence over implicit trust assignments (e.g. weakly trusted).
  c. Intruder. The device has been designated an Intruder. An Intruder is a device that is not a trusted member of the trusted network of devices. In some aspects of the invention, new devices discovered on the network after the initial scan of the network are designated at Intruders. A device that is designated as an Intruder may have restricted functionality in the trusted network of devices. Further, clients of the trust module 927 may display a device that has an Intruder trust value differently from other trust levels.
  d. Trusted. The device has been designed as Trusted. The device is a trusted member of a trusted network of devices. In some aspects of the invention, the device may exchange its device information with other trusted devices.

The trust module 927 only manages the trust level of a device. Callers of the trust module 927 determine the policy associated with a particular trust level. For example, a caller of the trust module 927 service may define a "Trusted" device as a device having been authenticated by the calling service. In some aspects of the invention, this may be a shared secret like a username and password or cryptographic information like a public/private key exchange.

Network Device Base Module

The network device base module 930 is derived from the device base module 920 and inherits all of the functionality and properties of the device base module 920. The network device base module 930 implements a set of core services for managing a network device. A network device is a device that is hosted on a local or public network like the Internet. The network device base module 930 includes a TCP/IP module 931, and a device services module 932. The TCP/IP module 931 provides a set of services for managing the network information of the device such as its IP address, media access control (MAC) address, and hostname. The device services module 932 provides a set of services for common to all network devices.

The TCP/IP module 931 provides a set of services for managing a network device on a TCP/IP based network. Specifically, the TCP/IP module 931 manages the following network information for the device:

a. IP Address. A device hosted on a TCP/IP network needs an IP address.

An IP address maps a network address to a physical device on the network. IP addresses are either statically or dynamically allocated to networking clients. For example, the IP address for a gateway device in a typical home network is "192.168.1.1".

b. Subnet Mask. TCP/IP networks can be broken into smaller networks called subnets. Subnets allow for the efficient routing of network packets to a subset of a larger network. For example, the subnet mask for a typical home network is "255.255.255.0".

c. Media Access Control (MAC) address. The MAC address is the physical address of the device on the network. The MAC address of the device uniquely identifies it on the network.

d. Hostname. A hostname is a unique name by which a network device is known on a network. For example, the hostname of a sample computer could be "SBLaptop".

The TCP/IP module 931 provides a set of services for retrieving and modifying the TCP/IP settings described above for a network device.

The device services module 932 provides a set of services for managing network devices. The device services module 932 provides the network device specific implementations for a device base module 920. Specifically, the device services module 932 implements a network device specific version of the existence module 926, a set of device support services, and an extensibility mechanism for network devices.

The device services module 932 implements the network specific functionality of the device base module 920. Specifically it implements the PollExistence and IsLegalConnection services. The network specific implementation of PollExistence involves testing to determine whether or not the network device is available on the network. When the PollExistence service is called on the device services module 932, it uses the TCP/IP module 931 service to determine the IP address of the network device. It then sends an address resolution protocol (ARP) request message to the IP address returned by the TCP/IP module 931 service. The device services module 932 then examines the results of the ARP request to determine the degree of certainty as to whether or not the device still exists on the network. The device services module 932 assigns an existence certainty level based on the results of the analysis of the ARP request. If the existence certainty level reaches a threshold, then the network device is marked as "Confirmed". If the threshold is not met, then the network device is marked as "Unknown". As networking environments are dynamic, having a threshold for positive or negative results offers a greater degree of certainty that the device exists in the network and can respond to requests.

The device services module 932 implements a set of network device services that can be shared by all network devices. Specifically, the ability to open and close ports on a gateway or router. Using the gateway service module 105, the device services module 932 manages the gateway on behalf of a network device. In some aspects of the invention, a network device, when initialized, can automatically open the appropriate ports on the router. For example, a network device can direct the gateway service module 105 to automatically forward the appropriate ports to a network camera when it gets discovered and trusted on a network. After the ports are automatically forwarded to the IP address of the network camera, the network camera will be available on the Internet for viewing. Further, the user interface of the network management tool 301 may be modified to add additional functionality. In other aspects of the invention, the detection of a network device of a specific type may result in notifying other network devices not running the network management tool 301 of the existence of the new device. Further, the network devices may be reconfigured to use or interact with the new device. For example, the detection of a network attached storage device generates a notification to the share manager module 9120 that a new device capable of sharing has been detected on the network.

The device services module 932 implements a set of facilities for extending the functionality of the network management tool 301. These facilities query the network device for capabilities and reconfigure the network management tool 301 to incorporate these new facilities. For example, the device services module 932 queries a specific URL on a network device to get a set of capabilities for the network device. If the URL returns valid information, the network management tool 301 is reconfigured to incorporate the capabilities of the network device. Further, the network device may direct the network management tool 301 to extend its user interface to support capabilities hosted on the network device.

Derived Object Base Modules

As previously described, objects managed by the object services module 901 need to inherit from the object base module 910. These objects provide a set of object services that are used by the object services module 901 to manage the relationships between objects, user credentials, and shared resources like shared files. The graph module 9100 derives from the object base module 910 and provides a set of services for managing a graph of devices. The device enumeration module 9110 derives from the object base module 910 and provides a set of services for traversing the graph of devices maintained by the graph module 9100. The share manager module 9120 derives from the object base module 910 and provides a set of services for managing directories of shared files. The operations module 9130 derives from the object base module 910 and provides a set of services for managing network operations. The user session module 9140 derives from the object base module 910 and provides a set of services for managing user session information. All of these objects and their related functionality and relationships will be described in more detail below.

The graph module 9100 provides a set of services for managing a graph of devices. A graph is a symbolic representation of a network. A graph G is a set of nodes (vertexes) n connected by edges (links) e. Thus, G=(n, e). A local or public network like the Internet can be represented as a graph of connected devices. For example, a gateway device connects a local network with another network such as the public Internet. All network devices on a local network have a connection to the gateway device. As two network devices on the local network share a common connection to a gateway device, a graph can be constructed of the connections between all network devices in a local network. The graph module 9100 maintains a graph of devices on the network and provides a set of services for iterating through nodes of this graph.

The graph module 9100 contains a graph object and a graph iteration object. The graph object maintains the relationships between nodes and edges in the graph. The graph iteration object provides a mechanism for a client of the graph object module 9100 to traverse the graph in a structured way. A graph edge is comprised of a reference to another graph edge and a graph node. A graph node is comprised of a list of graph edges and a set of flags to determine whether or not the graph node has been visited by a graph iteration object. Finally, the graph module 9100 maintains a list of graph nodes that represents all of the devices managed by the graph module 9100.

The graph object allows a client of the graph module 9100 to add, replace, and remove nodes from the graph. As nodes in the graph are modified, the graph revision number associated with the modified node is automatically updated to reflect the current graph revision number at the time of the change. In some aspects of the invention, the graph object will raise an event to inform other clients of the graph module 9100 of a modification of the graph object. The types of graph modification events are described below.

a. Added Node. The added node graph modification event indicates a new node was added to the graph. In some aspects of the invention, recipients of an added node graph modification event can perform any post-processing after a node has been successfully added to the graph. For example, the device enumeration module 9110 is a client of graph modification events and completes the operation of adding a device to the graph by confirming the device's existence, e.g. setting the existence property of device to "Confirmed".

b. Removed Node. The removed node graph modification event indicates an existing node in the graph was removed from the graph. In some aspects of the invention, recipients of a removed node graph modification event can perform any post-processing after a node has been successfully removed from the graph. For example, the device enumeration module 9110 is a client of graph modification events and completes the operation of removing a device from the graph by removing all references to the old device and freeing its resources.

c. Replaced Node. The replaced node graph modification event indicates an existing node in the graph was replaced by a new node. In some aspects of the invention, recipients of the replaced node graph modification event can perform any post-processing on the old node (node being replaced) and the new node (the node replacing the old node) after a node has been successfully replaced in the graph. For example, the device enumeration module 9110 is a client of graph modification events and completes the operation of replacing a device in the graph by performing the removed node post-processing on the old node (see description under removed node above) for the device and performing the added node post-processing (see description under added node above) for the device.

d. Added Edge. The added edge graph modification event indicates a graph edge was added to the graph. In some aspects of the invention, recipients of the added edge graph modification event can perform any post-processing on the addition of a new edge to the graph. For example, the device enumeration module 9110 is a client of graph modification events and notifies its client that a new device connection has been established. The device enumeration module 9110 uses graph edges to track connections between devices. A new edge in the graph means that a new connection between two devices has been established.

e. Removed Edge. The removed edge graph modification event indicates a graph edge was removed from the graph. In some aspects of the invention, recipients of the removed edge graph modification event can perform any post-processing on the removal of an edge from the graph. For example, the device enumeration module 9110 is a client of graph modification events and notifies its client that a connection between two devices has been removed. As previously described, the device enumeration module 9110 uses graph edges to track connections between devices. The removal of a graph edge means that two devices are no longer connected.

As previously described, the graph modification events inform clients of the graph module 9100 service of changes to the graph. Clients of the graph module 9100 service can interpret these events, as in the previously described examples of the device enumeration module 9110, to modify the relationships and representations of the graph in a user interface. For example, a "removed edge" graph modification event is interpreted by the device enumeration module as a device losing its connection to another device. This loss of connectivity can be shown visually in a graphical representation of the graph of devices maintained by the device enumeration module 9110.

The graph module 9100 contains a graph iteration object that allows a client of the graph module 9100 to walk or iterate through nodes and/or edges in the graph. The graph iteration object keeps track of nodes already visited and the current position of the graph iteration object in the graph. Clients of the graph iteration object can traverse the graph in a particular order (breath first or depth first). In a breath first traversal of the graph, the graph is walked recursively down through child nodes last. In a depth first traversal of the graph, the graph is walked recursively down through child nodes first. For example, the device enumeration module 9110 uses a "breath first" traversal of the graph to find all children of a device.

The device enumeration module 9110 uses a graph module 9110 to maintain the relationships between devices and to provide its client with a set of services for traversing a graph of connected devices. The device enumeration module 9110 is discussed in more detail below.

The share manager module 9120 provides a set of services for managing directories of shared resources for a device. The share manager module 9120 maintains a list of shared directories and interacts with devices to configure a directory of resources for sharing. In some aspects of the invention, a directory may be a physical directory in the file system of the device hosting the share. Further, a resource may be a physical or virtual file within the directory. For example, the share manager module 9120 configures Microsoft Windows File Sharing to designate a directory of files as being shared.

The share manager module 9120 manages share objects. A share object manages a shared resource such as a directory in the file system. The share manager module 9210 provides services for creating, adding, removing, and setting properties on shared resources. Further, the share manager module 9120 provides a service for finding and iterating through a list of shared resources managed by the share manager module 9120. The share manager module 9120 aggregates shared resources across network devices. For example, a shared resource on a remote computer can be viewed from the local computer and vice-versa. The share manager module 9120 thus provides a consistent list of all shared resources within a network of trusted devices.

One significant benefit of aggregating a view of shared resources across multiple network devices is that the shared content does not need to be moved or copied to a shared location. The content is shared in place. The share manager module 9120 provides a set of services for enumerating all of the shared resources across the network and a user interface for accessing them.

Figure 15:
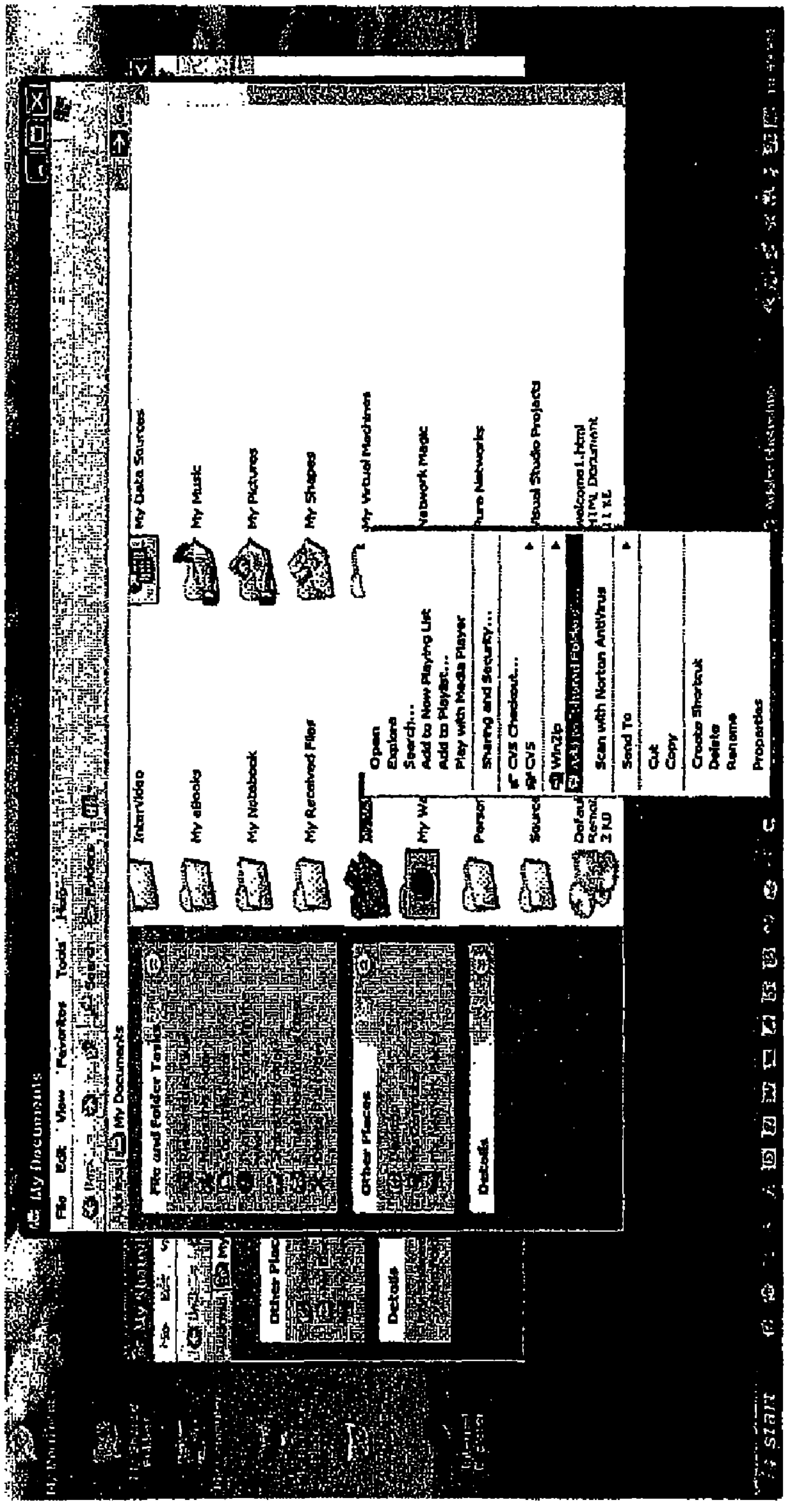
FIG. 15 illustrates a user interface showing how the "Add to Shared Folders" menu item launches from the user interface to "share" the folder according to various aspects of the invention.

In some embodiments of the invention running on the Microsoft Windows operating system, the share manager module 9120 implements a Windows Shell Extension. The Windows Shell Extension provides a set of services for integrating with the Windows Shell, commonly referred to as the Microsoft Windows Explorer or just Windows Explorer. The Windows Shell Extension extends Windows explorer to add an "Add to Shared Folders" menu item when brings up a context menu on a folder by right-clicking the mouse on the folder. As illustrated in FIG. 15, the "Add to Shared Folders" menu item launches a user interface to "share" the folder with the share manager module 9120. The "shared folder" is added to the list of shared resources managed by the share manager module 9120 and is now accessible to remote network devices. If the folder is already being shared and managed by the share manager module 9120, the menu item changes to "Stop sharing this folder". If the menu item "Stop sharing this folder" is selected then the folder is no longer shared and removed from the share manager module 9120.

Figure 16:
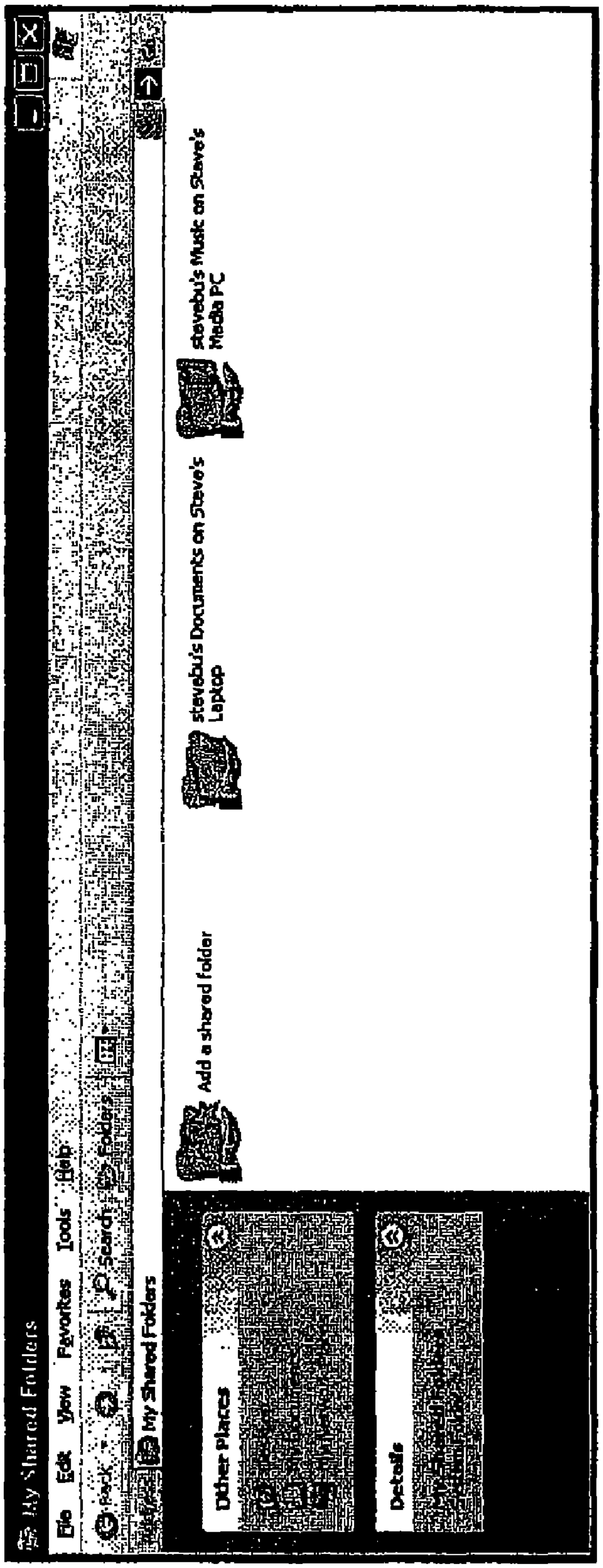
FIG. 16 illustrates a user interface showing how the client area of a window may contain a list of icons according to various aspects of the invention.

Further, the Windows Shell Extension implements a namespace extension. The namespace extension adds a virtual "My Shared Folders" to the Windows Desktop. The "My Shared Folders" desktop icon, when activated, brings up a Windows Explorer window rooted at the "My Shared Folders" position in the Windows namespace. The Windows Shell Extension is responsible for rendering the contents of the client area of the Windows Explorer window. As illustrated in FIG. 16, the client area of the Windows Explorer window contains a list of icons. The first icon, "Add a shared folder," launches a user interface that allows a user to pick a folder to share and the folder's associated sharing attributes such as, for example, the name of the shared folder, and whether it is read-only or not. The remaining icons represent folders that have been shared with the share manager module 9120. By default, the user interface may display a shared folder as a generic folder with a "sharing hand" underneath. The display of the folder may change based on the content of a specific type: documents, music, videos, or photos. For example, a folder containing MP3 or music files is displayed with a musical note as shown in FIG. 16.

Figure 17:
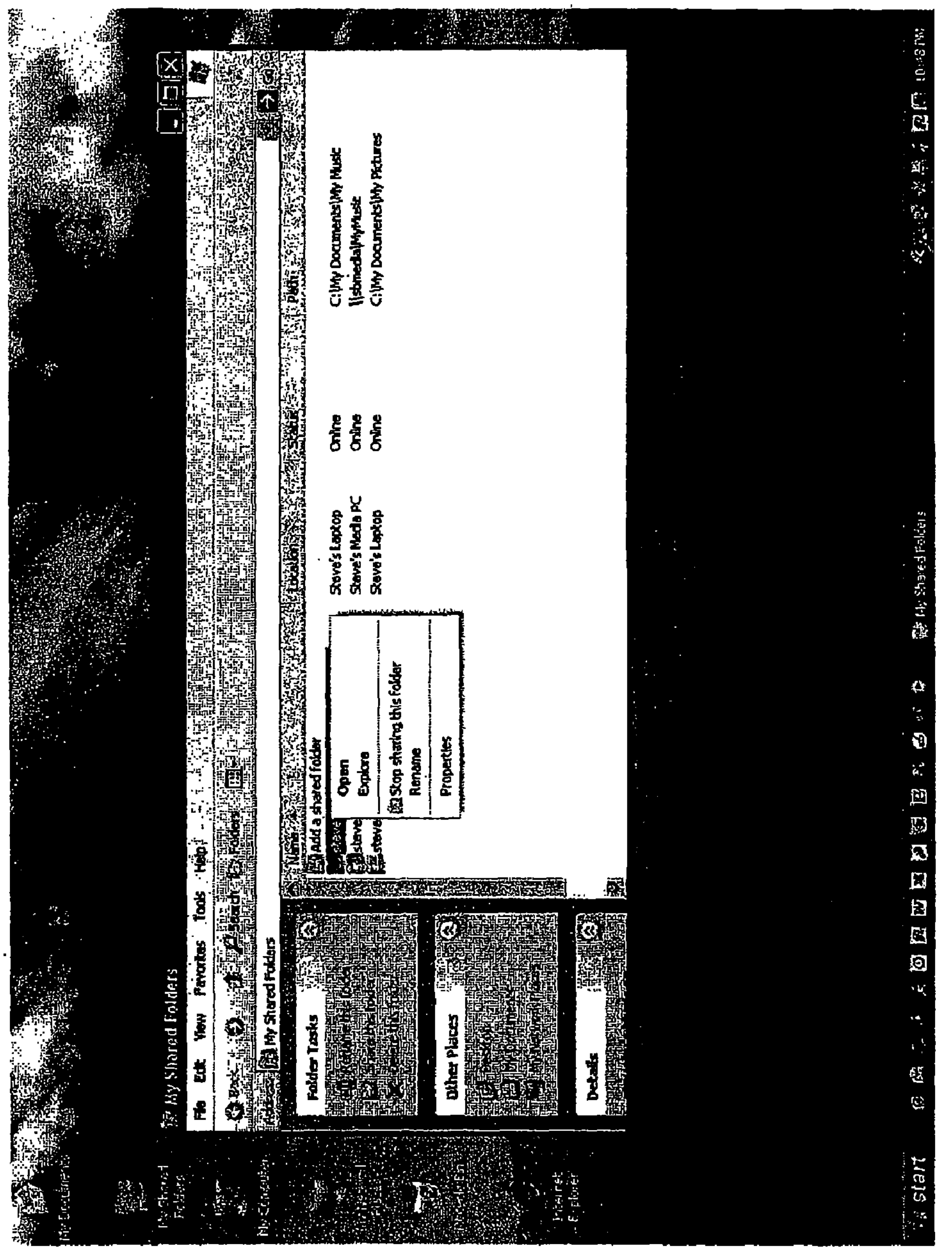
FIG. 17 illustrates a user interface showing how a Windows Shell Extension displays shared resources on the local computer and a remote computer according to various aspects of the invention.

As illustrated in FIG. 17, the Windows Shell Extension displays shared resources on the local computer and a remote computer. The shared resources on the local computer are accessed using a local path. The shared resources on a remote computer are accessed using a Uniform Naming Convention (UNC) path. By using a local path to access shared resources on the local computer, these shared resources can be accessed even when the computer is disconnected from the network. Further, the Windows Shell Extension is a client of the user session module 9120 and uses the services of the user session module 9120 to establish a network connection to the remote shared resource. When the user clicks on a remote shared folder, the user session module 9120 is called to establish a network connection to the remote shared resource. If the remote resource is unavailable or offline, a friendly message box is displayed to inform the user that the shares are inaccessible because the remote shared resource is unavailable (e.g. the remote computer is not connected to the network).

Like other objects managed by the object services module 901, the share manager module 9120 assigns each share object a unique identifier. In addition to the unique identifier for the shared resource, the share manager 9120 assigns the unique identifier of the device hosting the shared resource to the share object. This allows the share manager module 9120 enumeration service to be able to return a list of uniquely identified shared resources hosted on a device with a specified unique identifier.

As previously discussed, a share object manages a shared resource on the local device. The share object interacts with the local operating system to configure the operating system to share the resource. Modifications to share objects are validated before changes are committed and the share object reflects the modifications. The validation process ensures that the sharing policy of the operating system hosting the actual shared resource can be enforced. For example, in the Windows file sharing the share name of a shared directory must be unique. As existing operating system shared resources may exist that are not being managed by the share manager 9120, the share manager 9120 should ensure that new or modified share objects have unique share names. The validation step ensures the shared resource is valid before the local operating system is configured to share the resource.

Figure 18:
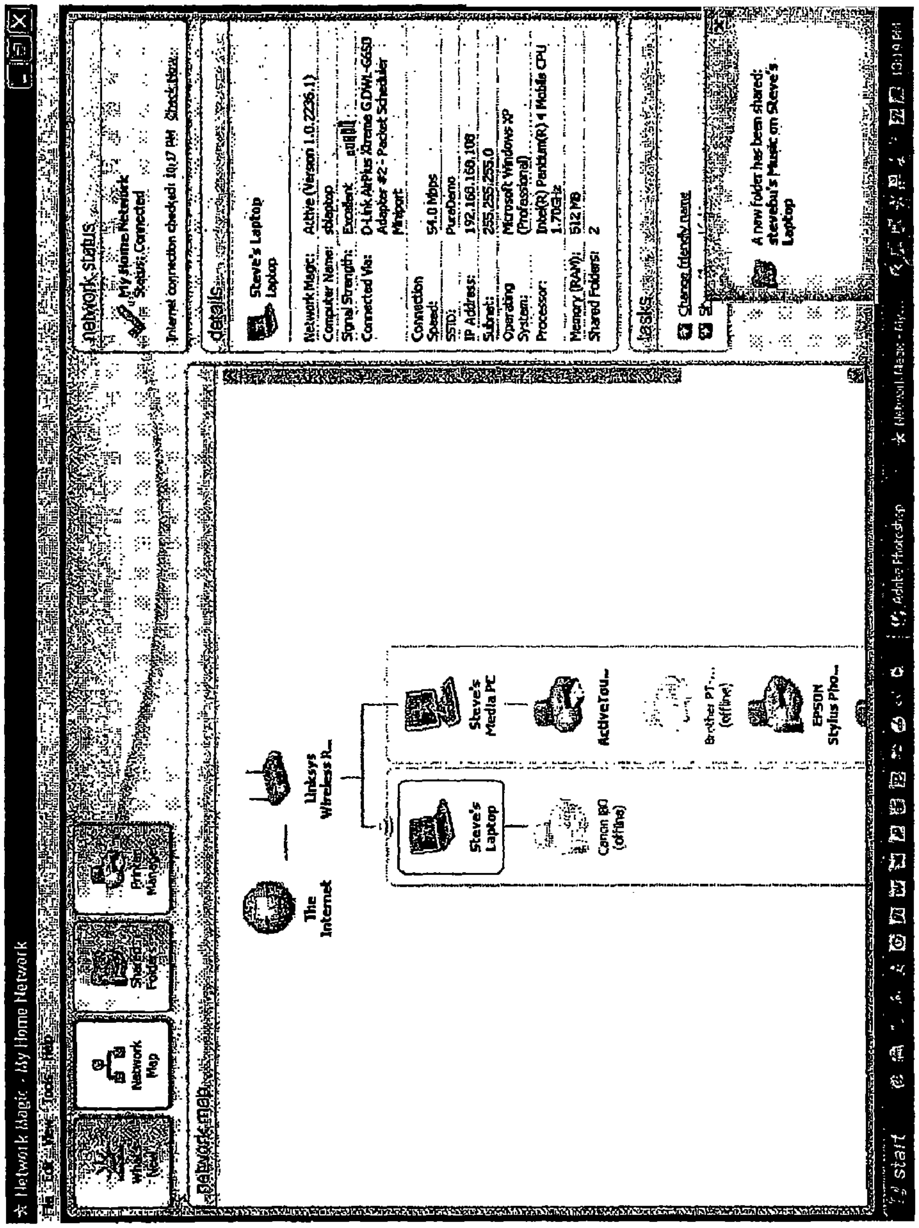
FIG. 18 illustrates a user interface showing how a new share notification may include a link to a new shared folder according to various aspects of the invention.
Figure 19:
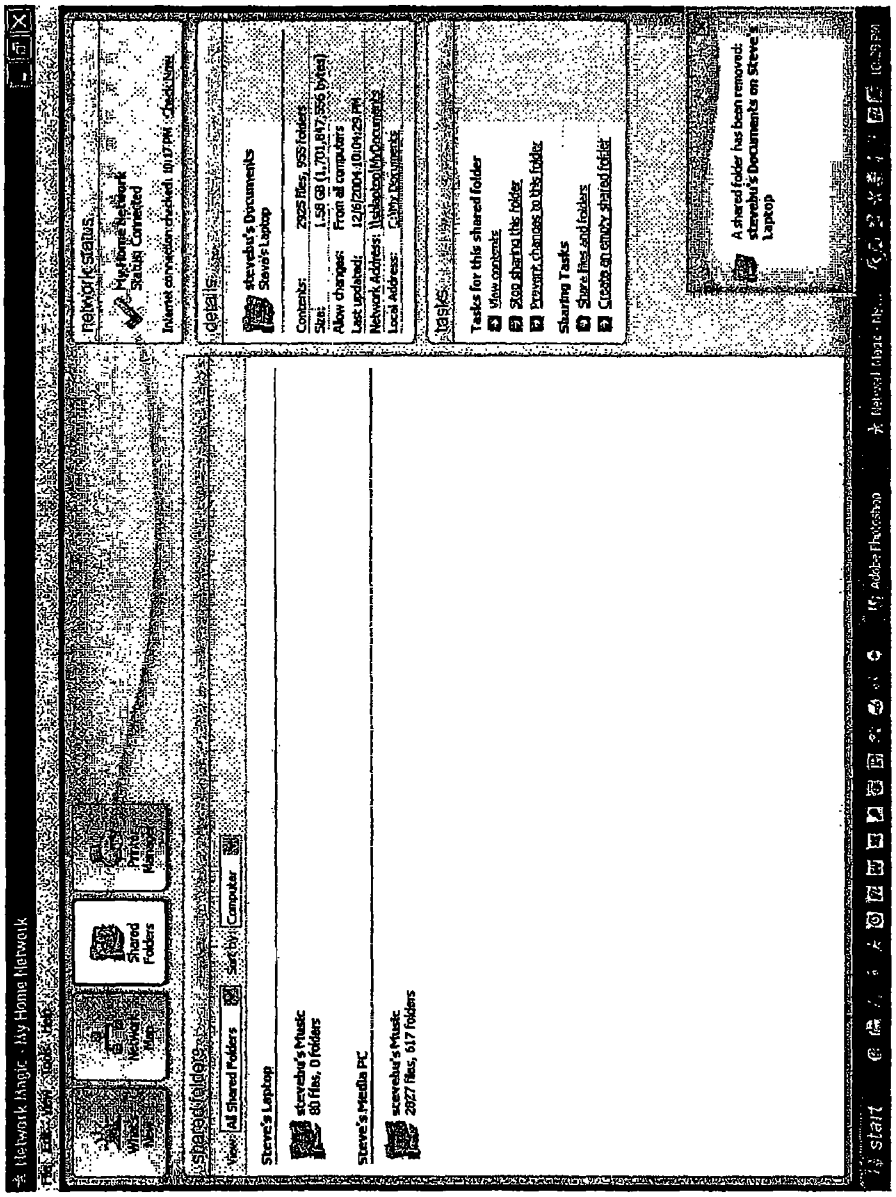
FIG. 19 illustrates a user interface showing how a device that is a member of a trusted network of devices may receive a notification when a shared folder gets removed according to various aspects of the invention.

Clients of the share manager module 9120 can receive notifications when a shared resource is added or removed. Further, every device that is a member of the trusted network of devices may receive a notification when a shared resource is added or removed. In some embodiments of the invention running the Microsoft Windows operating system, a user interface called a notification can be displayed which informs the user of the new content being shared. As illustrated in FIG. 18, the new share notification includes a link to the new shared folder. By clicking on the new share notification, the contents of the new shared resource will be displayed in a new Windows Explorer window. Further, as illustrated in FIG. 19, with various embodiments of the invention every device that is a member of a trusted network of devices receives a notification when a shared folder gets removed.

The share manager module 9120 also provides a set of services that manage shared folders that are shared locally or on a remote device. It provides a set of user interface services that make it easy to navigate and manipulate shared folders.

The operations module 9130 provides a set of services for managing operations. An operation is a change to a device or the network. In some embodiments of the invention, operations are remembered so that they can be applied to offline devices when they come back online. For example, the "SharePrinter" operation listed in Table 12 needs to be repeated for offline devices when they come online before these devices can print to a newly shared printer.

There are two classes of operations: device and network. Device operations are scoped to a device and are described in detail in the section describing the history module 925. Network operations are scoped to the network and are described below in more detail. Operations perform a task or operation on a device. Table 12 illustrates a list of device and network operations, a description of each operation, and the parameters required to execute the operation.

TABLE 12

| Operation | Description | Parameters |
|---|---|---|
| EnumerateDevices | Enumerate network devices | |
| UPnPDiscovery | UPnP network discovery | |
| DHCPDiscovery | DHCP network discovery | |
| AgentCommunication | Agent communication | |
| PrepareFileDepot | Prepare filedepot$ file interchange point | 1) Local directory of filedepot$<br>2) UNC name of filedepot$ |

TABLE 12-continued

| Operation | Description | Parameters |
|---|---|---|
| SharePrinter | Share a printer | 1) Name of printer |
| UnSharePrinter | Unshare a printer | 1) Name of printer |
| UsePrinter | Use a printer that has been previously shared | 1) Name of printer |
| UnUsePrinter | Stop using a printer that has been previously shared | 1) Name of printer |
| InstallPrinterDriver | Install a printer driver | |
| CopyLocalFile | Copy a file locally | 1) Source path 2) Destination path |
| MoveLocalFile | Move a file locally | 1) Source path 2) Destination path |
| ContentChange | Content change. | |
| DeviceOnline | Device online | |
| DeviceOffline | Device offline | |
| AddedShare | Added share | |
| RemovedShare | Removed share | |
| HomeNetworkActive | Home Network is now active | |
| ForeignNetworkActive | Foreign Network is now active | |
| ConnectedInternet | Connected to the Internet | |

Operations enable the delayed execution of tasks on a trusted network of devices. There is no guarantee that, when a task or operation needs to be executed, all of the devices in a trusted network of devices will be online and available to execute the operation. The operations module 9130 allows the operation to be performed locally and then stored for future execution on remote devices.

The user session module 9140 provides a set of services to manage a list of connections to network resources. In some embodiments of the invention, a network connection is required to access a shared resource on another device. For example, the Microsoft Windows operating system requires a valid network connection between the local device and the device hosting the resource. Before a network resource is accessed, the user session module 9140 establishes the network connection to the resource using the proper user credentials.

Derived Device Base Modules

The printer device 9210 is an object derived from the device base module 920 and provides a set of services for managing printers. The printer device 9210 is an object with a type of "NmDT_Printer". The printer device 9210 supports a set of subtypes that further specify the type of printer. Table 13 describes the different printer subtypes.

TABLE 13

| Printer Subtypes | Description |
|---|---|
| NmDST_Printer | Generic Printer |
| NmDST_PrinterLaser | Laser printer, e.g. an 'HP LaserJet Si' |
| NmDST_PrinterPhoto | Photo printer, e.g. an 'Epson Photo Stylus' |
| NmDST_PrinterInkJet | InkJet Printer, e.g. HP DeskJet |

Figure 20:
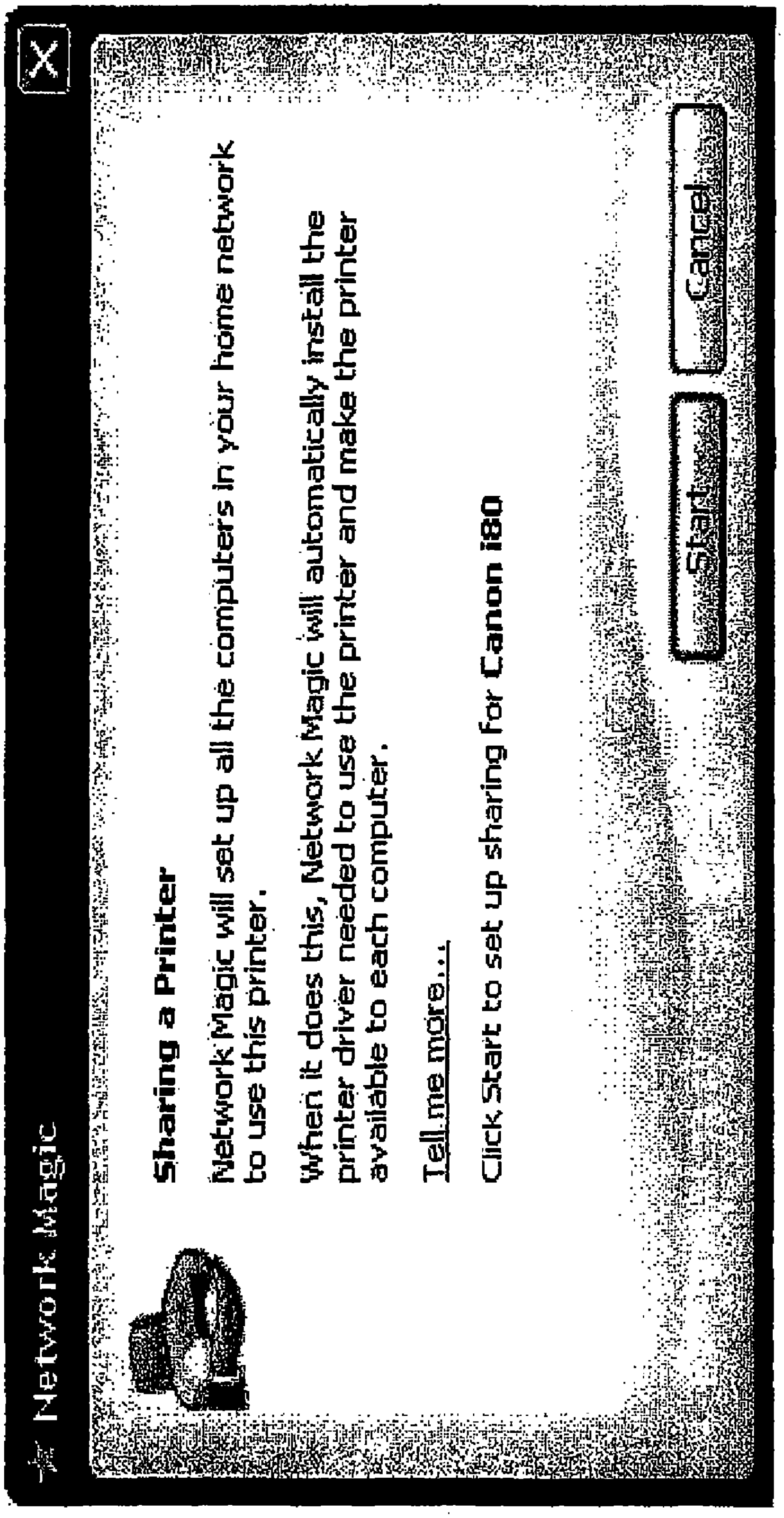
FIG. 20 illustrates a first step in a "Sharing a Printer" wizard that may be implemented according to various aspects of the invention.
Figure 21:
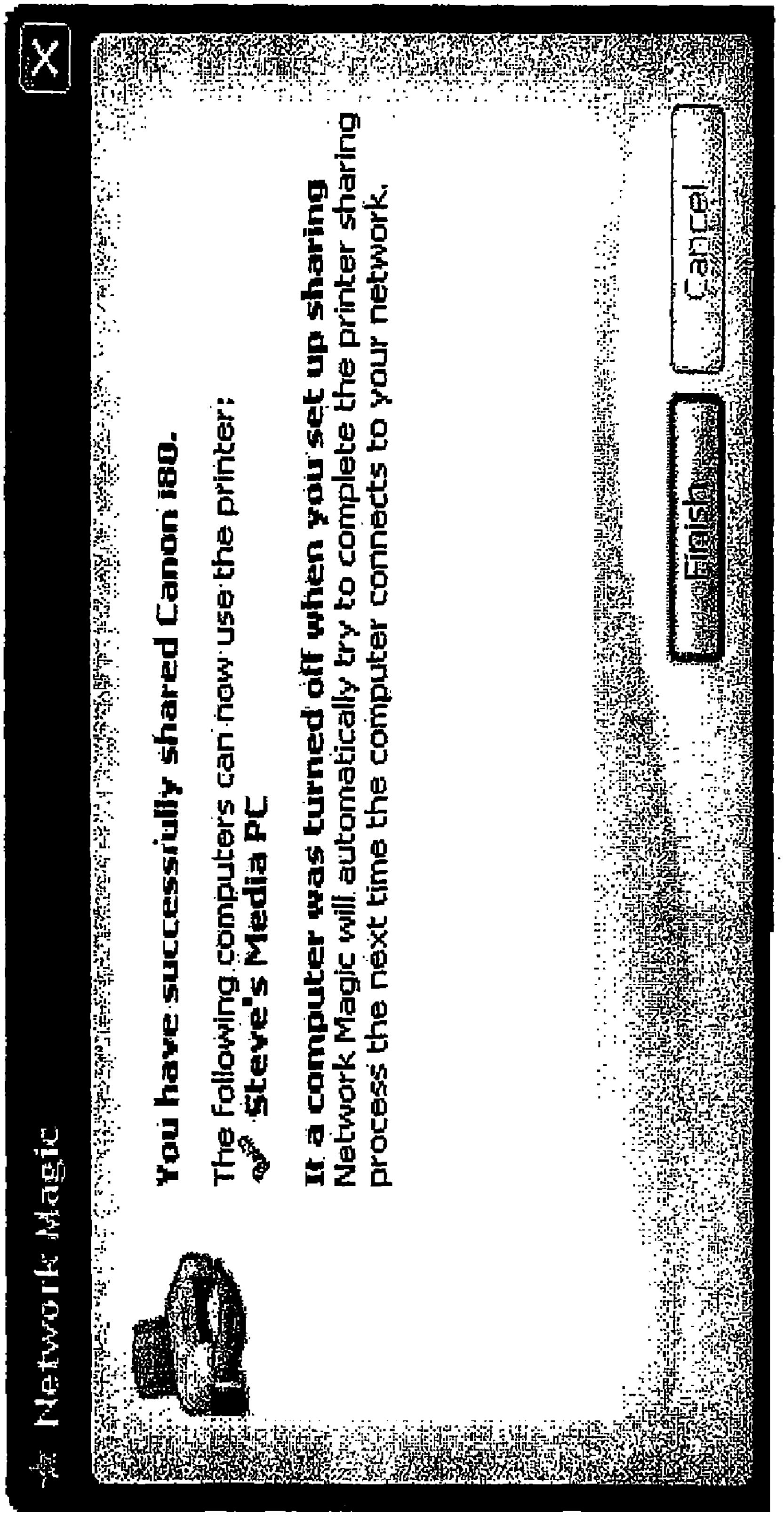
FIG. 21 illustrates a notice indicating that printer has successfully been shared that may be provided according to various aspects of the invention.
Figure 22:
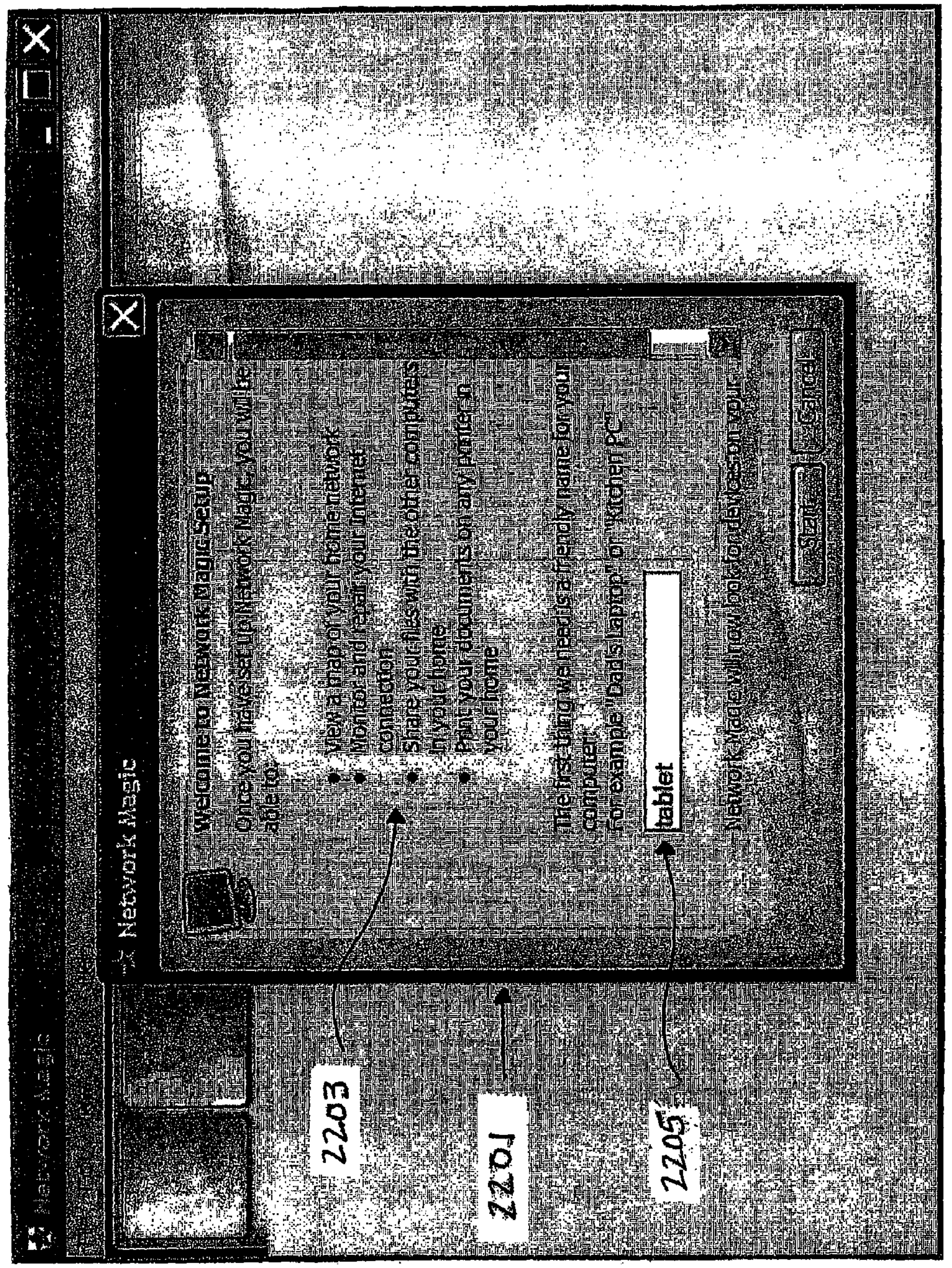
FIGS. 22-29 illustrates user interfaces that may be provided by the operation of the network management application module according to various aspects of the invention.

The printer device module 9210 displays a user interface for helping a user share a printer. FIG. 20 illustrates the first step in the "Sharing a Printer" wizard. After the user starts the wizard by clicking on the "Start" button, the wizard attempts to share the printer on the local computer. Next, the wizard creates a "SharePrinter" operation using the operations module 9130. As part of the preparation for remote execution of the "SharePrinter" operation, the appropriate drivers for the printer are relocated to a shared network location. The "SharePrinter" operation is communicated to all instances of the network management tool using the agent communication service. The remote instances of the network management tool 301 receive the "SharePrinter" operation and execute it.

The remote execution of a "SharePrinter" operation may involve copying printer drivers to the local computer and installing a compatible printer driver. In some embodiments of the invention, the printer drivers are automatically installed. Alternatively, the network management tool 301 could ask permission of the user to install new printer drivers and configure the local device to use the shared printer.

The Internet device module 9220 is an object derived from the device base module 920 and it provides a set of services for managing the Internet device module 9220 and its associated gateway device. As there is only one Internet, the Internet device module 9220 has a constant unique identifier of "{21A3719F-2D37-4d89-823A-4643F89FE478}". The value of the Internet unique identifier is constant and known by all instances of the network management tool 301. The Internet device module 9220 manages the "home gateway" for the network management tool 301. A "home network" is a group of network devices that share a common "home gateway". The functionality of a "home network" is discussed in more detail below with regard to the network membership module 1008.

The adapter device module 9300 provides a set of services for managing a network adapter. In some embodiments of the invention, the network adapter is separate from a network device. For example, a computer may have a PCMCIA wireless network adapter card that can be removed from the computer. Alternatively, the network adapter may be combined with the network device. For example, a gateway device includes the functionality of a network adapter.

The adapter device module 9300 manages network connectivity between two devices in the network. For example, a network adapter bridges connectivity between a gateway device and a computer device. More specifically, the network adapter maintains connections to both the gateway device and the computer device in the graph of network devices. The adapter device module 9300 interfaces with the host operating system to manage network settings. For example, for a network device running the Microsoft Windows operating system, the adapter device module 9300, calls Windows to extract adapter and interface information. The results of the operating system call to retrieve network settings are stored as properties of the adapter device module 9300. As previously discussed, the adapter device module 9300 also receives operating system events when the status of the network adapter changes. The adapter device module 9300 updates its internal cache of the network setting and communicates the adapter changes to clients wanting to receive notifications of network adapter changes. For example, if the network adapter changes the gateway device needs to update its information to reflect a connection to a new gateway device.

The adapter device module 9300 also provides a set of services for manipulating the settings of the network adapter it is managing. For example, a client of the adapter device module 9300 can request that the network adapter renew its DHCP allocated IP address. The adapter device module 9300 services the request of the client and calls the appropriate service in the host operating system to perform this function.

The adapter device module 9300 further provides a set of helper functions for its clients to query the status and capabilities of the network adapter. For example, the status of the network adapter can be analyzed and synthesized into the state of the adapter. In some embodiments of the invention, an adapter device module 9300 can have the following states as illustrated in table 14:

TABLE 14

| Adapter Status | Description |
|---|---|
| Unknown | Adapter state is unknown or not initialized |
| Disabled | Adapter is disabled |
| Down | Adapter is not responding to networking traffic |
| NoCarrier | Adapter does not have a carrier |
| CableDisconnected | The network cable has been unplugged |
| DHCP_RenewNeeded | The network adapter needs to renew it' DHCP address. |
| DHCP_BadConfigure | The network adapter is configured incorrectly |
| Static_NoIPAddress | The network adapter is configured for static IP addresses but is missing an IP address. |
| Static_NoIPSubnetMask | The network adapter is configured for static IP addresses but is missing a subnet mask. |
| Static_NoGateway | The network adapter is configured for static IP addresses but is missing a gateway IP. |
| NoRoutableGateway | The network adapter has no routeable gateway |
| Operational | The network adapter is operational. |

For example, the adapter device module 9300 requests event notifications from the host operating system whenever the adapter status changes or when adapter settings, like link speed, wireless signal strength, or wireless network ID (SSID) change. Clients of the adapter device module 9300 can register for notifications when these properties change. Further, the user interface of the network management tool 301 can be updated to reflect near real-time updates to these properties. Further, the updated network settings can be broadcast to remote instances of the adapter device module 9300. In some embodiments of the invention, the user interface of the remote device can be dynamically updated in near real-time to show the links peed, wireless signal strength, and current wireless network SSID of a remote network device.

The network device module 9310 provides a set of services for managing a network device. All devices detected on the network default to being a network device. The subtype property of a network device determines the functionality and display of the network device. For example, a network camera detected on the network is assigned a type of "NmDT_NetworkDevice" and a subtype of "NmDST_NetworkCamera". The user interface uses the subtype property of a network device to display the appropriate visuals and to surface the appropriate features of the network device. Table 15 lists all of the subtypes supported by a network device.

TABLE 15

| Network Device Subtype | Description |
|---|---|
| NmDST_NetworkDevice | Generic Network device |
| NmDST_NetworkPrinter | Network printer, e.g. a printer directly connected to the network |
| NmDST_NetworkCamera | Network camera |
| NmDST_AccessPointWiFi | Wi-Fi access point, e.g. a 'Buffalo' wi-fi access point |
| NmDST_DigitalPlayerDVR | Digital video recorder, e.g. a 'Tivo' |
| NmDST_DigitalPlayerJukebox | Digital jukebox, e.g. an 'Audtiotron' |
| NmDST_MediaAdapter | Media Adapter or UPnP Render, e.g. D-Link Media Lounge |

TABLE 15-continued

| Network Device Subtype | Description |
|---|---|
| NmDST_NetworkDrive | Network Attached Storage, e.g. Linksys Network Storage Link for USB 2.0 Disks |
| NmDST_PhotoFrame | Digital Photo Frame, e.g. Wallflower, PacificDigital |
| NmDST_NetworkPDA | Network PDA, e.g. Treo PDA with WiFi Card, Compaq IPAQ |
| NmDST_NetworkPrintServer | Network Print Server, e.g. D-Link DP-G310 |
| NmDST_NetworkGameConsole | Network Game Console, e.g. Xbox, Playstation 2 |
| NmDST_VOIPDevice | 'Voice-Over-IP' device |

The network device module 9310 inherits all of its functionality from the network device base module 930.

The gateway device module 9320 derives from the network device base module 930 and inherits all of the properties and functionality of the network device base module 930. The gateway device module 9320 provides a set of services for managing a gateway device. A gateway device module 9320 has an object type of "NmDT_Gateway" and supports a generic and wireless subtype as described in Table 16.

TABLE 16

| Gateway Subtypes | Description |
|---|---|
| NmDST_Gateway | Generic Gateway, displayed without antennae |
| NmDST_GatewayWithWiFi | Gateway with wi-fi, e.g. a 'LinkSys Wi-Fi Router' |

A gateway device connects a local network with another network such as the Internet. A gateway device hosts a local area network adapter and a wide area network adapter. Typically, the gateway device defines a local network as it connects the local network with another network such as the Internet. The functionality of the gateway device is inherited from the gateway service module 303.

The computer device module 9330 derives from a network device base module 930 and inherits all of the properties and functionality of a base network device. The computer device module 9330 provides a set of services for managing a computer. A computer device has a type of "NmDT_Computer" if the computer is the local device running the network management tool 301. A remote computer has a type of "NmDT_RemoteComputer". Computer objects can be assigned a subtype to further define the type of computer. Table 17 describes all of the subtypes of a local or remote computer.

TABLE 17

| Computer Subtype | Description |
|---|---|
| NmDST_Computer | Generic Computer |
| NmDST_ComputerLaptop | Laptop computer, e.g. a 'PowerBook' |
| NmDST_ComputerWorkstation | Workstation computer, e.g. a 'Windows98' PC |
| NmDST_ComputerServer | Server computer, e.g. a 'Windows 2000' server |

Monitoring Module

Figure 11:
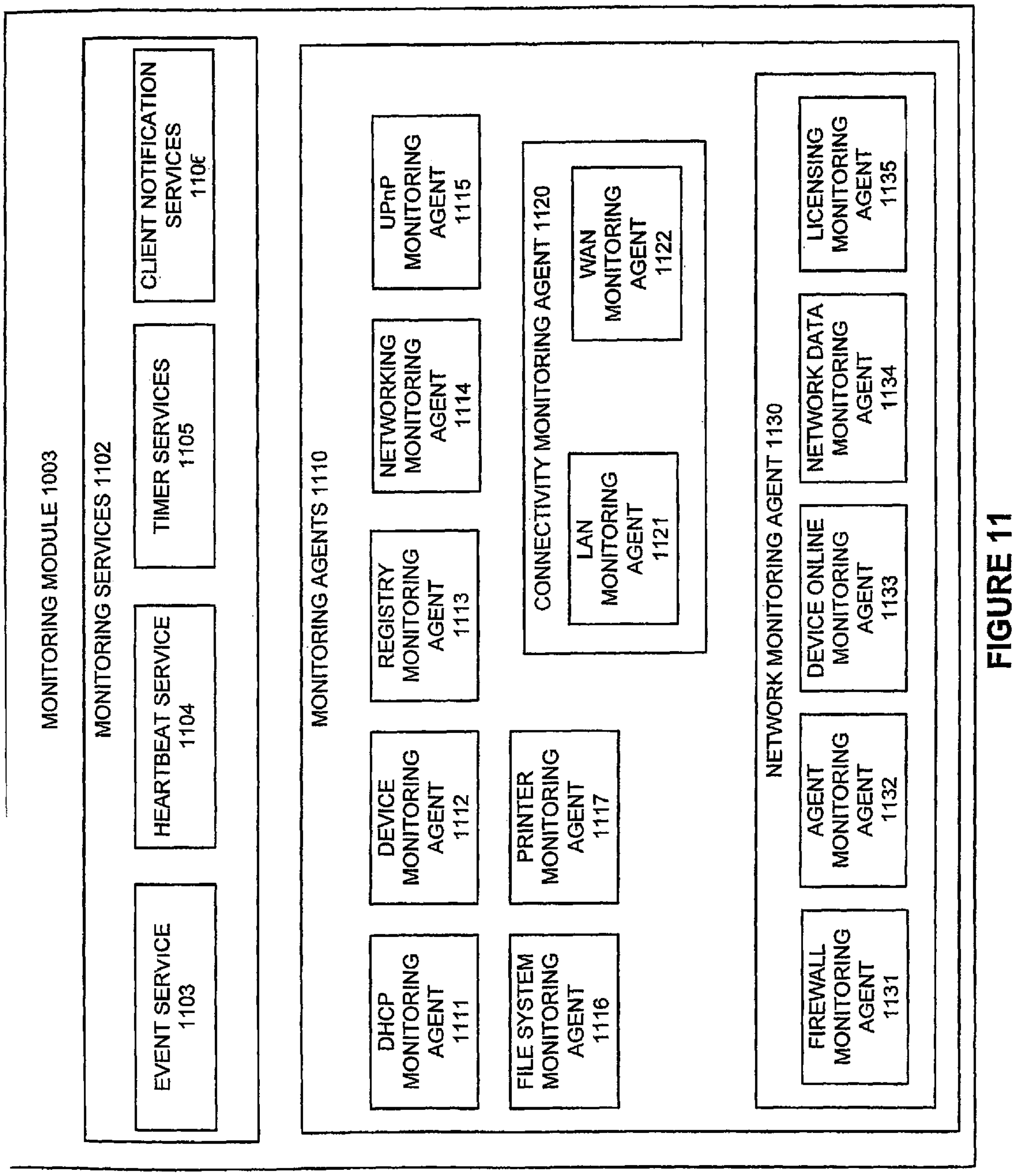
FIG. 11 illustrates an example of a monitoring module that may be employed according to various aspects of the invention.

FIG. 11 illustrates an example of a monitoring module 1003 that may be employed according to various aspects of the invention. The monitoring module 1003 contains a set of common monitoring services 1102 that are used by all of the monitoring agents 1110. The monitoring agents are specialized and use the monitoring services 1102 to wait for events or perform tests at specific intervals. A monitoring agent 1102 can optionally have one or more monitoring clients that get informed when a change in what the monitoring agent 1102 has been tasked to monitor has occurred.

Monitoring Services

Figure 14:
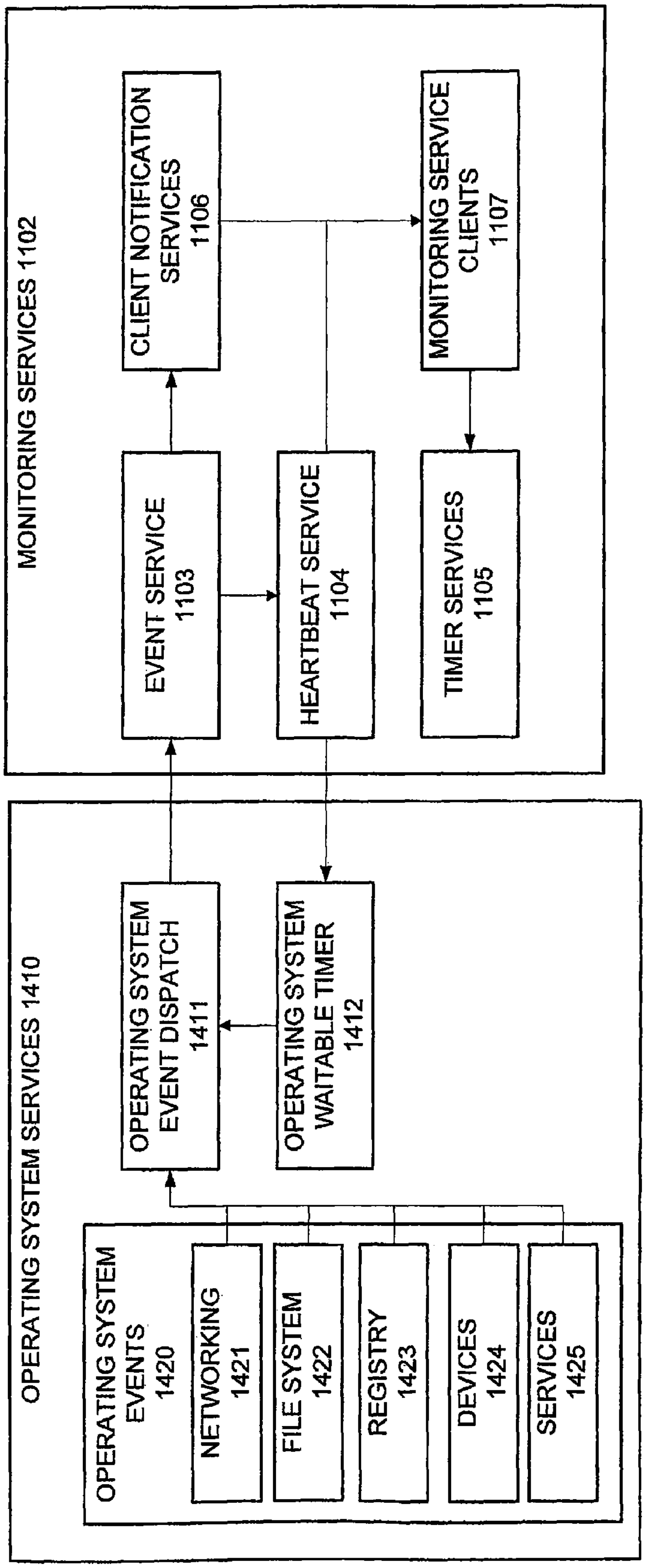
FIG. 14 illustrates a block diagram showing how monitoring services provide a set of common services used by monitoring agents according to various aspects of the invention.

As illustrated in FIG. 14, the monitoring services 1102 provide a set of common services used by the monitoring agents 1407 to monitor events and to perform tasks at specific intervals. The monitoring services 1102 allow a client of the monitoring services 1102 to be notified when specific operating system events 1420 have occurred. Clients of the monitoring services 1102 can register operating system event handlers with the event service 1103. For example, a client 1407 can register for networking events 1421, file system events 1422, registry events 1423, devices events 1424, and services events 1425. A networking event 1421 includes any changes to the networking status of the device hosting the monitoring service 1102. For example, the network monitoring agent 1114 would generate a network event 1421 for any of the following: network adapter changes (e.g. IP address change), changes in the default routing for the network adapter, and/or changes in the socket service provided by the operating system (e.g. Windows sockets or Winsock). A file system event 1422 may include any changes to the file system and its associated resources (e.g. files and folders). For example adding, modifying, or deleting a file or directory within a directory being monitored by the file system service 1116 would generate a file system event 1422. A registry event 1423 includes any changes to the registry, e.g. Windows system registry. For example, the registry monitoring agent 1113 generates a registry event 1423 whenever a registry being monitored by the registry monitoring agent 1113 gets modified or deleted.

With some embodiments of the invention, the monitoring services 1102 will monitor various items relating to the health and security of the device. For example, the monitoring services 1102 may monitor the status of various aspects of software applications that are installed (or not installed) on the device, such as firewall software applications, anti-virus, spyware, or other anti-malware software applications. The monitoring services 1102 also may monitor the status of various aspects of the device's operating system. For example, the monitoring service 1102 may monitor the operating system to determine when it requires an update, when an update needs to be installed, etc. The monitoring services 1102 may use any desired technique to monitor the status of various software applications (including the operating system). For example, with devices that employ the Windows operating system, the monitoring services 1102 may employ the Windows Management Instrumentation (WMI) application programming interfaces to monitor the status of aspects of software applications that are installed (or not installed) on the device. As known in the art, WMI APIs provide management data about computer systems, the operating system, and applications on a given managed system.

As will be discussed in more detail below, the various status information collected for each device may be combined into a single list, and displayed in a user interface of the network management tool. A user can then employ the user interface to address various issues relating to the updated status. For example, if the user interface indicates that a firewall software application is disabled in a network device, then the user may employ the network management tool to enable the firewall software application on that device.

When an operating system event 1420 is triggered, the client 1407 is notified of the event 1420. One of the services provided by the monitoring services 1102 is a heartbeat service 1104. A heartbeat is a callback to a client 1407 of the monitoring services 1102 with a heartbeat value at regular intervals. The heartbeat value represents an increasing count of time. In some embodiments of the invention, the heartbeat service 1104 uses an operating system provided waitable timer 1412. The operating system waitable timer 1412 generates a timer event at a specific interval, e.g. every 1/10 of a second. The heartbeat value is the system time increased by 1/10 of a second for each event. For example, a waitable timer 1412 may be created to generate a timer event every 1/10 of a second. This timer event is directed at the event service 1103 which in turn calls all of the clients 1407 of the event service 1103 with the new heartbeat value. A client of the heartbeat service 1104 can use the heartbeat value to determine if a specific time interval has passed and the client 1407 should now perform a task.

Monitoring Agents

The DHCP monitoring agent 1111 monitors Dynamic Host Configuration Protocol (DHCP) messages on the network. On a network managed by a DHCP server, DHCP enabled network devices can request an IP address from the DHCP server using the DHCP protocol. The DHCP monitoring agent 1111 listens for these messages and notifies clients of the DHCP monitoring agent 1111 when a new DHCP message needs to be processed. The DHCP monitoring agent 1111 is used by the device detection module 601 which is described in detail below.

The device monitoring agent 1112 monitors the device connections between a network of trusted devices. The device monitoring agent 1112 uses the PollExistence facility of the existence module 926 implemented in the device base module 920 to verify the existence of devices connected to the local device or connected via a network. The device monitoring agent 1112 uses the device enumeration module 9110 to traverse all devices. For each device, the device monitoring agent calls the PollExistence service to determine whether or not the device continues to exist (e.g. online or offline, connected or disconnected status). The device monitoring agent 1112 generates an event when the existence or connection status of the device changes. Further the device monitoring agent 1112 also scans the local subnet of the network periodically to discover new network devices. Using the heartbeat service 1404 in combination with the timer services 1105, the device monitoring agent 1112 waits for a period of time and then initiates a device enumeration task, a scan of the local subnet for new network devices. The functionality of the device enumeration task is described in more detail below under the device detection module 601.

The registry monitoring agent 1113 monitors the registry of the local operation system for application and system setting changes. For example, the Windows registry maintains a hierarchical list of user, application, and system settings. In some embodiments of the invention, the registry monitoring agent 1113 monitors the Windows registry for changes in a single or group of user, application, or system settings. When a registry setting being monitored is added, modified, or deleted the registry monitoring agent 1113 generates a registry event 1423. Clients of the registry monitoring agent 1113 get notified when these changes occur and can respond to these changes.

The network monitoring agent 1114 monitors changes in the networking. Changes in networking include setting or status changes in the network adapter that attaches the device hosting the network monitoring agent 1114 to the network. In some embodiments of the invention running on a Microsoft Windows operating system, the network monitoring agent 1114 receives network change events from the Windows Socket service or WinSock. The network monitoring agent 1114 registers with Winsock for changes in the status or settings of a network adapter, routing information for the network adapter, or general networking status changes. The network monitoring agent 1114 passes these Winsock events and their associated status on to clients of the network monitoring agent 1114. For example, changing the IP address of the network adapter that connects the device to a network results in Winsock generating a network event. This network event is then dispatched by the network monitoring agent 1114 to all of its clients. The clients can respond accordingly by changing their internal data structures or updating a user interface that displays the current information of the network adapter.

The UPnP monitoring agent 1115 monitors Universal Plug and Play (UPnP) messages on the network. UPnP is an industry standard for discovering new devices on a network and the capabilities of these devices. In some embodiments of the invention hosted on the Microsoft Windows operating system, the UPnP monitoring agent 1115 registers with Windows to receive new UPnP messages for devices being added or removed from the network. The Windows UPnP monitoring service generates a new UPnP event when a new device is discovered on the network or an existing device is removed from the network. The UPnP monitoring agent 1115 receives this UPnP event, extracts the UPnP information referenced by the event, and forwards the UPnP event information onto the device detection module 601. The contents of the UPnP event information are discussed in more detail in the device detection module 601 section below.

The file system monitoring agent 1116 monitors changes to the file system on the host operating system. A file system event 1422 is generated when a file or directory in the file system is modified. This includes but is not limited to when one or more files or directories get added, deleted, or modified. Modifications to a file or directory include edits to the file or directory and changes to the properties of the file or directory, for example: read-only, file size, hidden, archived, or access permissions properties. For embodiments of the invention hosted on the Microsoft Windows operating system, the file system monitoring agent 1116 registers the Windows operation system to receive file and directory change notifications.

The file system monitoring agent 1116 maintains a list of file and directories to monitor. The file system monitoring agent 1116 also maintains statistics about the file and directories being monitored. These statistics include when the monitored file or directory was last modified, the number of files in a monitored directory, the cumulate size of all files in a monitored directory, the number of files added or deleted since monitoring of the directory was started, and whether or not the directory was unshared or deleted since monitoring was started. In practice, the multiple changes to a file system occur in a short period of time, such as, for example, when a user copies files from one location to another. The file system monitoring agent 1116 batches up file system events 1422 so the client is not inundated with file system event 1422 notifications. Therefore, a client of the file system monitoring agent 1116 will receive a file system event 1422 that contains one or more file or directory change events.

The printer monitoring agent 1117 monitors changes to printers attached to the local device. The printer monitoring agent 1117 generates a printer device event 1424 when a printer changes status. In some embodiments of the invention hosted on the Microsoft Windows operating system, the printer monitoring agent 1117 registers with Windows for printer change notifications. Specifically, the printer monitoring agent 1117 registers for printer change notifications in Windows using the "FindFirstPrinterChangeNotification" service. When a printer changes status, Microsoft Windows notifies the printer monitoring agent 1117 which in turn notifies all of its clients of the change in printer status. For example, a client of the printer monitoring agent 1117 receives a notification of the name of the printer changes or the printer changes from online to offline status or vice-versa. A client of the printer monitoring agent 1117 can modify its user interface to reflect the change in printer status or display a user interface, like a notification, that communicates the change in printer status.

The connectivity monitoring agent 1120 monitors network connectivity between the device hosting the agent and other network devices. Network connectivity is divided into two realms of connectivity: local area network (LAN) and wide area network (WAN). LAN connectivity is the ability to communicate with network devices hosted on the local network. A local network is an association of network devices that are hosted behind a common gateway device. For example, a computer connected to the LAN or internal network connection of a Linksys WRT54G wireless router is on a local network. WAN connectivity is the ability to communicate with network devices hosted beyond the gateway device servicing the local network. More specifically, communication with a WAN network requires the network communication to be routed through a gateway device to an external network such as the Internet.

The connectivity monitoring agent 1120 implements a LAN monitoring agent 1121 for monitoring connectivity between the local device and other devices on the local network. The connectivity monitoring agent 1120 also implements a WAN monitoring agent 1122 that monitors connectivity between the local device and the network devices connected on the WAN. Both the LAN connectivity agent 1121 and the WAN connectivity agent 1122 use a set of common services to probe connectivity between the local device and the appropriate network.

To check connectivity, the connectivity monitoring agent 1120 sends an Internet Control Message Protocol (ICMP) packet to a designated network device and analyzes the results. Clients of the network monitoring agent 1120 register a "target" with the network monitoring agent to test connectivity between the local device and a "target" network device with a specific IP address. For example, the WAN monitoring agent 1121 monitors connectivity between the local device and the Dynamic Name Service (DNS) server used by the local device to communicate with the Wide Area Network. If the ICMP packet fails to reach its "target" IP address then the connectivity monitoring agent 1120 generates a loss of connectivity event. Clients of the connectivity monitoring agent 1120 can register to receive notifications when a LAN and/or WAN connectivity status change occurs.

The LAN monitoring agent 1121 monitors connectivity between the local device and other network devices on the local network. Specifically, the LAN monitoring agent 1121 monitors connectivity between the local device and the gateway device that services the local network. The WAN monitoring agent 1122 then monitors connectivity between the local device and network devices hosted on the WAN. Specifically, the WAN monitoring agent 1122 monitors connectivity between the local device and the DNS server used by the local device to access network devices hosted on the WAN.

The network monitoring agent 1130 provides a set of monitoring services for the network. The network monitoring agent 1130 includes a firewall monitoring agent 1131, an agent monitoring agent 1132, a device online monitoring agent 1133, a network data monitoring agent 1134, and a licensing monitoring agent 1135.

The firewall monitoring agent 1131 monitors the running status of a software firewall located on the local device. In some embodiments of the invention hosted on the Windows operating system, a software firewall service may not be completely up and running properly when the network monitoring agent 1130 is started and fully functional. The firewall monitoring agent 1131 monitors the startup status of a software firewall and notifies its client when the firewall has started up and available.

The agent monitoring agent 1132 monitors the network for new instances of the network management tool 301 on the network. The communication agent module 611 is a client of the agent monitoring agent 1132. The functionality of the agent monitoring agent 1132 is discussed in more detail in the section describing the communication agent module 611.

The device online monitoring agent 1133 uses the device enumeration module 9110 to enumerate and poll for the existence all known devices. For each network device managed by the device enumeration module 9110, the PollExistence service is called to determine whether or not the device continues to be available on the network. Clients of the device online monitoring agent 1133 can register for notifications when the online status of a device changes.

The network data monitoring agent 1134 periodically checks the status of the network data maintained by the network management services module 305. If the network data or information has changed, then the network data monitoring agent 1134 triggers the network management services module 305 to update its clients and write up a new version of the network data to permanent storage.

The licensing monitoring agent 1135 monitors the status of the license of the product incorporating the network management tool. The product incorporating the network management tool may be licensed to a single device, a limited number of devices, or an unlimited number of devices in the local network. The licensing monitoring agent 1135 validates the licensing policy of the application hosting the device with the number of devices detected in the local network. Further, clients of the licensing monitoring agent 1135 can register for a notification when licensed devices are added or removed from the network. Further, the status of the license can be communicated to a computer located outside of the local network for license tracking and billing purposes.

Network Tasks Module

The network tasks module 1005 provides a set of services for managing network tasks. A network task may be, for example, a recommendation on how to improve the features, security, or reliability of a trusted network of devices. Examples of network tasks are listed below.

a. Change the Password for Your Router. The router is using the default username and password provided by the manufacturer. To improve the security of the local network serviced by the router, it is recommended that you change the router username and/or password from default values.

b. Complete Printer Setup. In some circumstances, the "one-step" printer sharing feature fails to complete. This network task helps the user complete the process of configuring the local device to use the shared printer.

c. Make Your Wireless Network More Secure. Make Your Wireless Network More Secure. This network task is displayed if the local network is wireless and not using a wireless security mechanism like WEP or WPA.

d. Install Product on Other Computers. Reminder to install the product on other computers. This network task only gets displayed when there are computer devices on the local network that are not running the licensed product.

e. Upgrade Product. The version of the product is not the most current.

This network should obtain an updated version of the product The network tasks module 1005 analyzes the status of the network using the network management services module 305. Each network task has a set of criteria that needs to be met before the network task gets displayed in a user interface. The network tasks module 1005 iterates through the network tasks and evaluates its associated criteria to see if it should be displayed. For example, the "Make Your Wireless Network More Secure" network task is only displayed if the local network is wireless and not using a wireless security mechanism like WEP or WPA.

Remote Installation and Licensing Module

The remote installation and licensing module 1006 provides a set of services for installing and licensing products to a network of trusted devices on a local network serviced by a common gateway device. A local network is a set of network devices that share a common gateway device. The manufacturer or designated third party of a software product may want to license a product to a local or home network. Further, the manufacturer or designated third party may want to bill for the product license based on the number of devices using the product on a local network. Further, the manufacturer may want to restrict the number of devices using the product to the number of licenses purchased by the end user. Still further, the licensing terms may specify that an unlimited number of devices can use the product but only when serviced by a common gateway device. The remote installation and licensing module 1006 provides a set of services that allow a manufacturer or designed third party to license a product to local network.

The remote installation and licensing module 1006 is a client of several of services provided by the network management services module 305. The remote installation and licensing module 1006 may use the network information services module 1004 to examine the attributes of network devices to determine the following about each network device:

a. Trusted Member of Network. Whether the network device is a trusted member of the network of trusted devices. If not, whether the network device is a trusted member of another network of trusted devices. If so, which network.

b. Software Installed. Whether the licensed software has been installed on the network device, and if the version of the software is the most recent.

c. Software Usage. Whether the software is being used on the network device. If so, how many user sessions are using the software.

d. Software License Status. For expiration-based software licenses, whether the software license is still current (has not expired).

Using the information gathered from the network information services module 1004, the remote installation and licensing module 1006 can apply the product licensing policy to the local network. The results of comparing the product licensing policy to the information gathered from the network information services module 1004 can be used to determine how to respond when the product licensing policy is not being met (non-compliance). In some embodiments of the invention, non-compliance for too many products using the licensed product results in the software product being disabled on the local device until more licenses are purchased. Alternatively, the product can continue to function normally and the user is messaged in a user interface to purchase more licenses. Still further, a billing record could be automatically sent to a computer outside of the network to license the product.

Commonly, the installation of licensed software involves visiting every network device and manually starting the installation process. The remote installation and licensing module 1006 provides a set of services to enable remote installation of a software application on a remote device. Using services provided by the operations module 9130, the remote installation service can schedule the installation of the licensed product on the remote network device. The remote installation service stores the installation program in a shared folder managed by the share manager module 9120. The remote network device executes the operation and installs the software silently by executing the installation program on the shared folder. The results of the remote installation operation are communicated to the local device. In some embodiments of the invention, a user interface gets displayed on the local device that tracks installation progress and results.

The remote installation operation can be generalized to instruct a remote network device to download and install software from a remote location. For example, the remote network device downloads the software from a remote computer and installs the software. The remote computer can be running an instance of the remote installation service or be just a simple web, ftp, or file server. The parameters passed on the request for the installation program are included in the remote installation operation. These parameters may optionally include licensing information.

Metrics Module

The metrics module 1007 periodically gathers metrics about the local device and devices that are members of the local device's trusted network of devices. These metrics are used to better understand how the network management tool 301 is being used in the field. At a specific interval, the metric data collected is submitted to a computer outside of the local network.

Table 18 illustrates a list of metrics captured and submitted by the metrics module 1007. The first entry is the name of the metric, followed by a description of the metric. The final column contains the query string metric id used to submit the metric data to the remote computer.

TABLE 18

| Metric | Description | Metric ID |
|---|---|---|
| Build Number | Build number of application hosting metrics service | a |
| Build Flavor | Build flavor of application hosting metrics service | b |
| Install Date | Installation date of application hosting metrics service | c |
| Install Date Router Service | Install date of router service | d |
| First Run Date | Date when the application hosting metrics service was first run | e |
| Encrypted Router MAC | Encrypted Media Access Control address for internal network adapter of the local network's router | f |
| Encrypted ComputerId | Encrypted unique identifier for computer | g |
| Router Info1 | Extended router information value 1 | h1 |
| Router Info2 | Extended router information value 2 | h2 |
| Router Info3 | Extended router information value 3 | h3 |
| Router WANIP | Internet IP address of the local network router's WAN connection | i |
| Network Device Count | Number of network devices in local network | j |
| Computer OS | Operating system of computer hosting the metrics service | k |

TABLE 18-continued

| Metric | Description | Metric ID |
|---|---|---|
| Computer Printer Count | Count of printers attached to computer hosting the metrics service | } |
| Computer Printer Share Count | Count of printer shares attached to computer hosting the metrics service | m |
| Troubleshoot Count | Count of the number of times the network troubleshooter was started | n |
| Troubleshoot Count LAN Success | Count of the number of times the network troubleshooter completed successfully for a LAN connection problem | o |
| Troubleshoot Count WAN Success | Count of the number of times the network troubleshooter completed successfully for a WAN connection problem | p |
| UI Hits Whats New Page | Count of the number of times a user viewed the What's New User Interface | q |
| UI Hits Network Map Page | Count of the number of times a user viewed the Network Map User Interface | r |
| UI Hits Shared Places Page | Count of the number of times a user viewed the Shared Places User Interface | s |
| UI Hits Manage Printers Page | Count of the number of times a user viewed the Managed Printers Interface | t |
| UI Hits Remote Access Page | Count of the number of times a user viewed the Remove Access User Interface | u |
| Computer Is Wireless Network | Whether or not the Computer is attached to a wireless network | v |
| Shared Places Count | The number of Shared Places for the device hosting the metrics service | w |

At the appropriate interval, the collected metric data may be packaged into a URL of the format:
"http://<metric_server>/<product>?<MetricID_1>=<MetricValue_1>&<MetricID_2>=<MetricValue2>"

The metric module 1007 submits the URL to a metrics Web server as an HTTP request. An example metric submission follows:
"http://acc.purenetworks.com/netmagic10?w=2&t=3"

The logs of the metrics web server as processed and the metric data is collected and stored in a database for analysis.

Network Membership Module

The network membership module 1008 provides a set of policies and services that manage the membership of a device into a trusted network of devices. A trusted network of devices is group of network devices that mutually agree to trust each other according to a mutual agreed upon policy. Each network device subscribes to a common definition or policy for establishing the trust relationships between devices. In some embodiments of the invention, the trust relationship between network devices in a local network is based on access to the local network. More specifically, a network connection from the device to the local network implies the device should be trusted. In an alternative embodiment of the invention, the trust relationship between network devices in a local network is based on the exchange and validation of a shared secret. The shared secret could be a password, a username and password combination, or a piece of cryptographic data like a public/private key exchange. A device seeking to be trusted presents the "join" credential to existing member of the trusted devices to be validated. The validation of the credential can be performed by the member device or delegated to another network device or a third party service.

In some embodiments of the invention, membership in a trusted network of devices is determined by all devices sharing a common gateway device and a member device designating the device seeking membership as being trusted. Network devices that do not share a common gateway device are not trusted. Any trusted device in the trusted network of devices can grant membership to a non-trusted device. The network membership module 1008 may employ a user interface to facilitate the designation of a network device as trusted. Further, if the membership policy warrants the user interface may prompt for and validate a credential before granting access for a network device to the trusted network of devices.

In some embodiments of the invention, a network device can only be a member of one network of trusted devices at a time. More specifically, a network device cannot join two different networks of trusted devices. Joining one network of trusted devices removes the device from another network of trusted devices.

In some embodiments of the invention, the policy for establishing membership in a trusted network of devices requires sharing a common gateway device. Network devices like laptop computers have the ability to roam between networks. For example, a laptop computer can connect to a home network or a wireless network at an Internet coffee shop. When the network device is connected to the gateway device specified in its membership policy then the network device is considered to be on its "home network". When the network device is not connected to the gateway device specified in its membership policy it is considered to be on a "foreign network".

In some embodiments of the invention, the functionality of the network management tool 301 is altered when the network device is on a "foreign network". Network devices in a "home network" are assumed to be not malicious. In a "foreign network", the other network devices are considered to be untrustworthy. As a result, the policy of a "foreign network" may disable networking services to protect the network device when it is on a "foreign network". Further, when a network device connects to a "foreign network," the user interface changes to reflect the network device has joined a potentially hostile network, e.g. not the network device's home network.

In some embodiments of the invention, joining a "foreign network" disables networking services. More specifically, file and printer sharing is disabled and access to the network device is curtailed. For embodiments of the invention on a Microsoft Windows operating system, the file and printer sharing service is disabled and the "guest" account is disabled. The network membership module 1008 may employ a user interface that allows a user to optionally specify what networking service should be disabled if any. Further, the user interface of the network management tool changes to reflect that it connected to a "foreign network".

Intruder Detection Module

The intruder detection module 1009 implements policy for new devices discovered on a local network serviced by a common gateway device. The intruder detection module 1009 receives notifications from the device enumeration module 9110 when a new device is detected on the local network. If the network device is not being tracked by the network information services module 1004 then the device is considered an intruder. An intruder is a network device that has not been detected previously by any instance of intruder detection module 1009.

The intruder detection module 1009 implements a "policy" for how the network management tool 301 responds to a new device. The intruder detection module 1009 is a client of the trust module 928 and uses the services of the trust module 928 to set the trust level of a device to "intruder". The intruder detection module 1009 provides a set of user interface features that enable a user to classify network devices as intruders or as familiar, the opposite of intruder.

When the intruder detection module 1009 receives a new device notification and determines it is an intruder based on its intruder policy, it proceeds to enforce its intruder policy. In some embodiments of the invention, the enforcement of the intruder policy may be to display a notification to a user that an intruder has joined the network. Further, the enforcement of the intruder policy may involve displaying the network device differently in the user interface. Specifically, the network devices gets designated as an intruder in the user interface and a set of additional services are displayed to the user to manage designating the network device as familiar or an intruder.

In some embodiments of the invention, the presence of an intruder may result in network services, like file and printer sharing, to be disabled when the intruder is online. Further, the networking services for the intruder may be disabled altogether until a "trusted" device designates the "intruder" network device as a non-intruder. In some embodiments of the invention, the networking services for a network device designated as an intruder are disabled using services on the router.

For example, many routers include a service for allowing or denying access to network resources based on the media access control (MAC) address of the device. In some embodiments of the invention, the intruder detection module 1009 will automatically configure the router to deny access to the network device designated as an intruder. Specifically, the intruder detection module 1009 will obtain the MAC address of the network device designated as an intruder from the network information service. The intruder detection module 1009 will use the gateway service module to contact the router and add the MAC address of the "intruder" network device to the list of MAC addresses that should be denied access to networking services. Alternatively, the intruder detection module 1009 may use the gateway service module 303 to contact the router and add only MAC addresses of "trusted devices" to the list of MAC addresses that have access to networking services. Network devices designated as "intruders" will be denied access to networking services until a "trusted device" running the intruder detection module 1009 designates the "intruder" network device as "trusted". As part of the process of converting a network device from "intruder" to "trusted" or vice-versa, the relevant changes are communicated by the gateway service module 303 to the router. The net effect is that network devices cannot access networking services until a "trusted" device running the intruder detection module 1009 designates the network device as "trusted".

Recommendations Module

The recommendations module 1010 provides a set of services for recommending new products or services to the user of the network management tool 301. Specifically, the recommendations module 1010 employs heuristics to recommend new products or services based on the configuration and usage of network resources. The heuristics used to recommend products or services are automatically downloaded by the manufacturer or designated third party of the network management tool 301. The heuristics run locally and employ the network data managed by the network information service to decide on the appropriate recommendations to display. For example, the recommendation module 1010 downloads a set of heuristics to decide whether or not to display a recommendation for a network media adapter.

A network media adapter enables viewing and listening to music, photos, and videos located on a network device on the user's television or stereo. The recommendation module executes the downloaded heuristics. The downloaded heuristics in turn query the network information module for whether or not the user already has a media adapter. Further, the downloaded heuristics query the network information services module 1004 to count the number of files the user has shared on the network. If the user has a threshold amount of files shared and no media adapter exists on the network, then the recommendation module 1010 notifies the user interface to display a recommendation for purchasing a media adapter. It should be noted that no personal information has left the user's computer and the heuristics are downloaded and executed locally so no personal or private information leaves the local network. Alternatively, the recommendations module 1010 may download heuristics that analyze the product versions of the network devices hosted on the local network. If there are newer versions of the network devices, then the recommendations module 1010 notifies the user interface to display a recommendation for upgrading the network device. The upgrade recommendation may also include instructions or computer code that displays a user interface that assists the user in upgrading the network device. Further, the recommendation may instruct the network management tool 301 to provide an additional user interface so that user can perform the recommendation's task at a later date. For example, notifying the network task module to add an "Upgrade Firmware" network task.

Included in the heuristics downloaded by the recommendation module is the visual representation of the recommendation. Further, the visual representation of can be displayed when the network device is not connected to a network as all of the visual representation is cached locally. In some embodiments of the invention, the visual representation of a recommendation is packaged as a MHTML document. MIME encapsulation of aggregate HTML documents (MHTML) is an Internet standard that defines the MIME structure used to send HTML content in message bodies along with those resources referenced from within the HTML.

In some embodiments of the invention, the user interface of the recommendations feature may be branded with the brand of the manufacturer. In other embodiments, the recommendations may display the brand of the distributor of the network management tool 301 or some combination of branding, e.g. co-branding. In some embodiments of the invention, the recommendations module 1010 uses the metrics service to upload metrics on the effectiveness of a recommendation displayed to the user of the network management tool 301. The metrics include the number of impressions (views of the recommendation), the amount of time the user spent viewing the recommendation, and the number of times the end user clicked on the recommendation.

The Network Information Services Module

Figure 6:
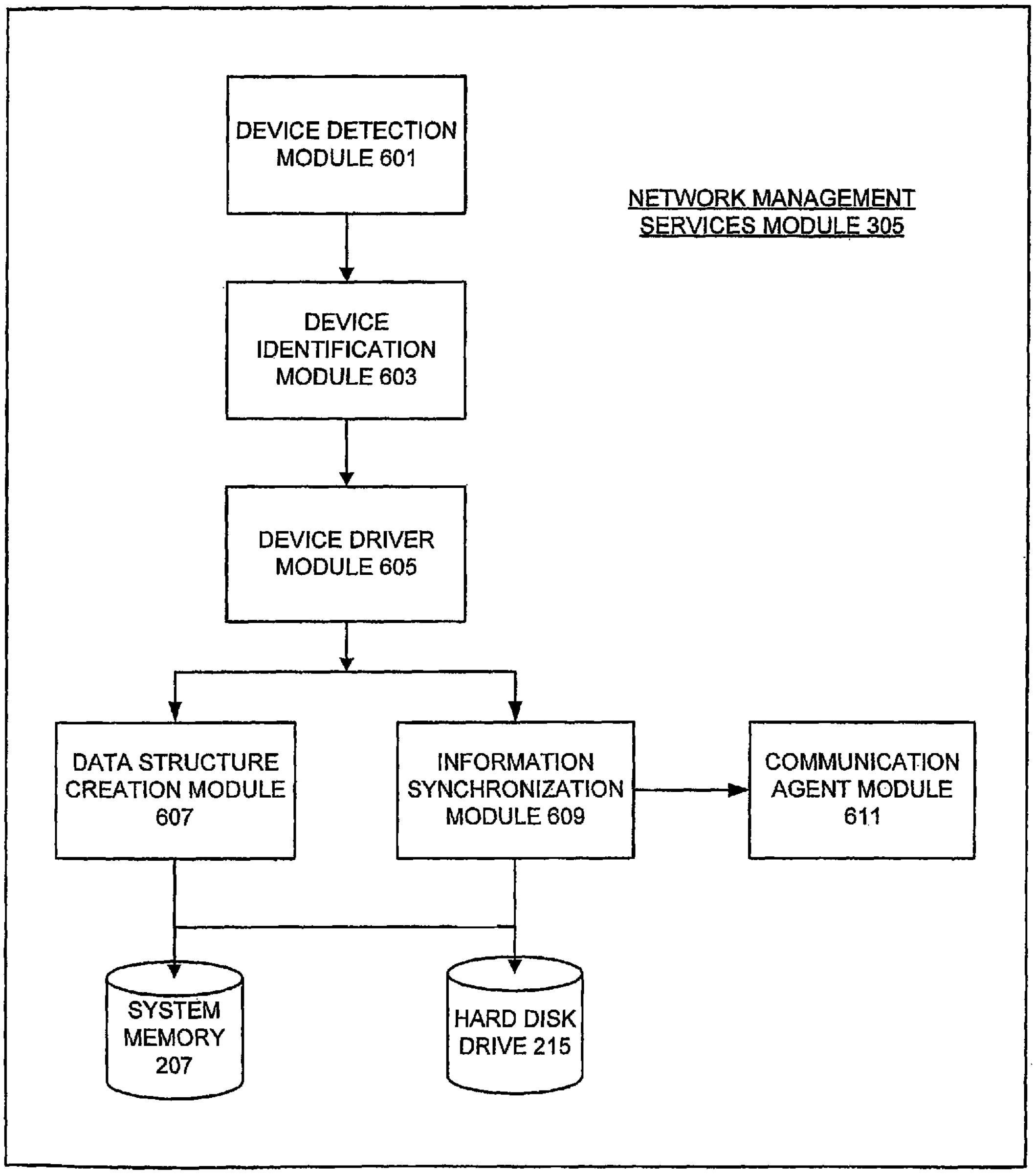
FIG. 6 illustrates a network configuration user interface that may be provided by an example of a router setup utility to prompt a user for router information according to various aspects of the invention.

Once the gateway service module 303 has detected, identified and named the gateway device 105, the network management application module 307 initiates the network management services module 305 to detect devices on the network. As shown in FIG. 6, the network management services module 305 includes a device detection module 601, a device identification module 603, and a device driver module 605. The network management services module 305 also includes a data structure creation module 607, an information synchronization module 609, and a communication agent module 611. In the illustrated aspect, the information synchronization module 607 and the data structure creation module 609 can store and retrieve information from both the system memory 207 and the hard disk drive 215.

When the network management tool 301 initially calls for the services of the network management services module 305, the device detection module 601 attempts to detect every device in the network. As previously noted, network devices can be both virtual and physical. After the device detection module 601 has detected various network devices, the device identification module 603 then attempts to identify the detected devices. Once a network device has been identified, the device driver module 605 selects and initiates an appropriate driver for the device. In addition to identifying network devices, the device identification module 603 also identifies devices connected to the computer 201 hosting the network management tool 301, such as local printers, scanners, cameras, and the like.

In the process of detecting and identifying network and local devices, the device identification module 603 determines one or more properties of the devices. The data structure creation module 607 creates a network information data structure containing the determined properties for each of the devices, and stores a copy of the network information data structure on the hard disk drive 215. After the data structure creation module 607 has created the network information data structure, the information synchronization module 609 synchronizes the network information data structure with the network information data structure created by one or more other instances of the network management tool 301.

While the device detection and identification process and the network information data structure creation process take into account the devices that are in the network when the network management services module 305 is initiated, devices can be added to or removed from the network over time. Accordingly, the device detection module 601 and the device identification module 603 continue to detect and identify new devices added to the network, while the device detection module 601 also detects when a device has left the network. As new devices are added to or removed from the network, the data structure creation module 607 updates the content of the network information data structure to reflect these incremental changes. The information synchronization module 609 then synchronizes these changes with other instances of the network management tool 301 in the network, so that the network information data structure for each of the network management tools 301 in the network remain current and in synchronism.

Devices hosting the network management services module 305 may not be online when a network change is recorded. When an offline network device hosting the network management services module 305 goes online, its offline version of the network information is synchronized with the other online instances of the network management tool 301 in the network.

Figure 7A:
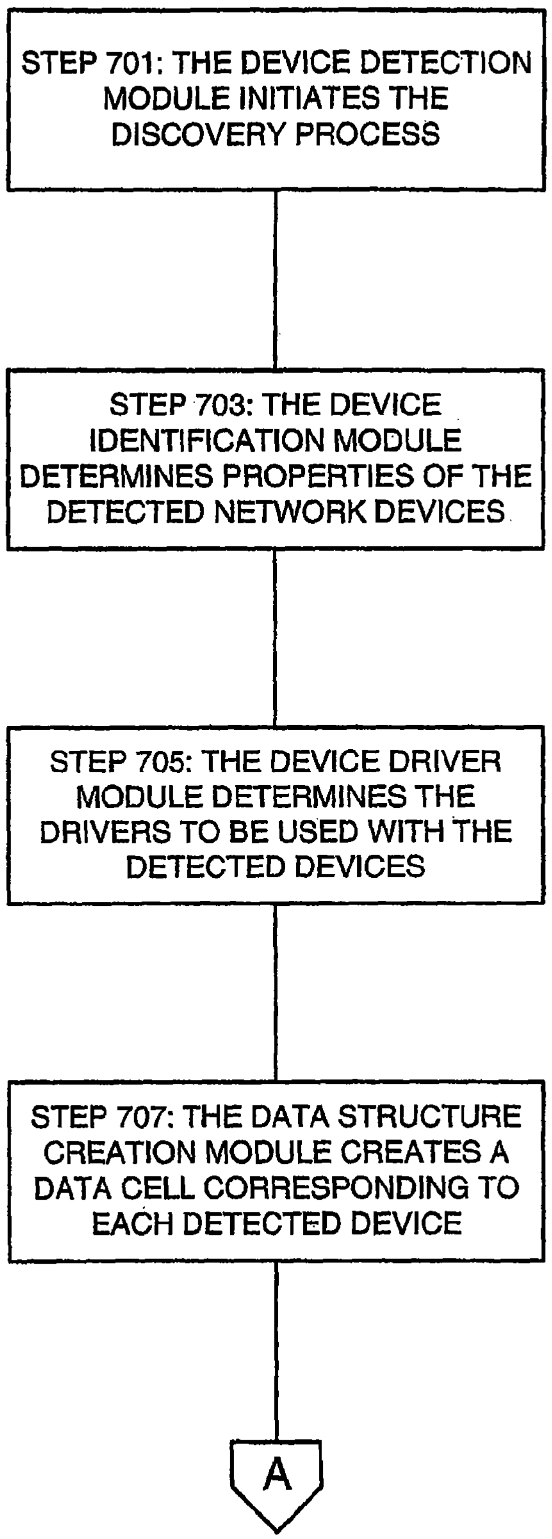
FIGS. 7A-7B illustrate a flowchart showing a process performed by the network management services module according to various aspects of the invention.
Figure 7B:
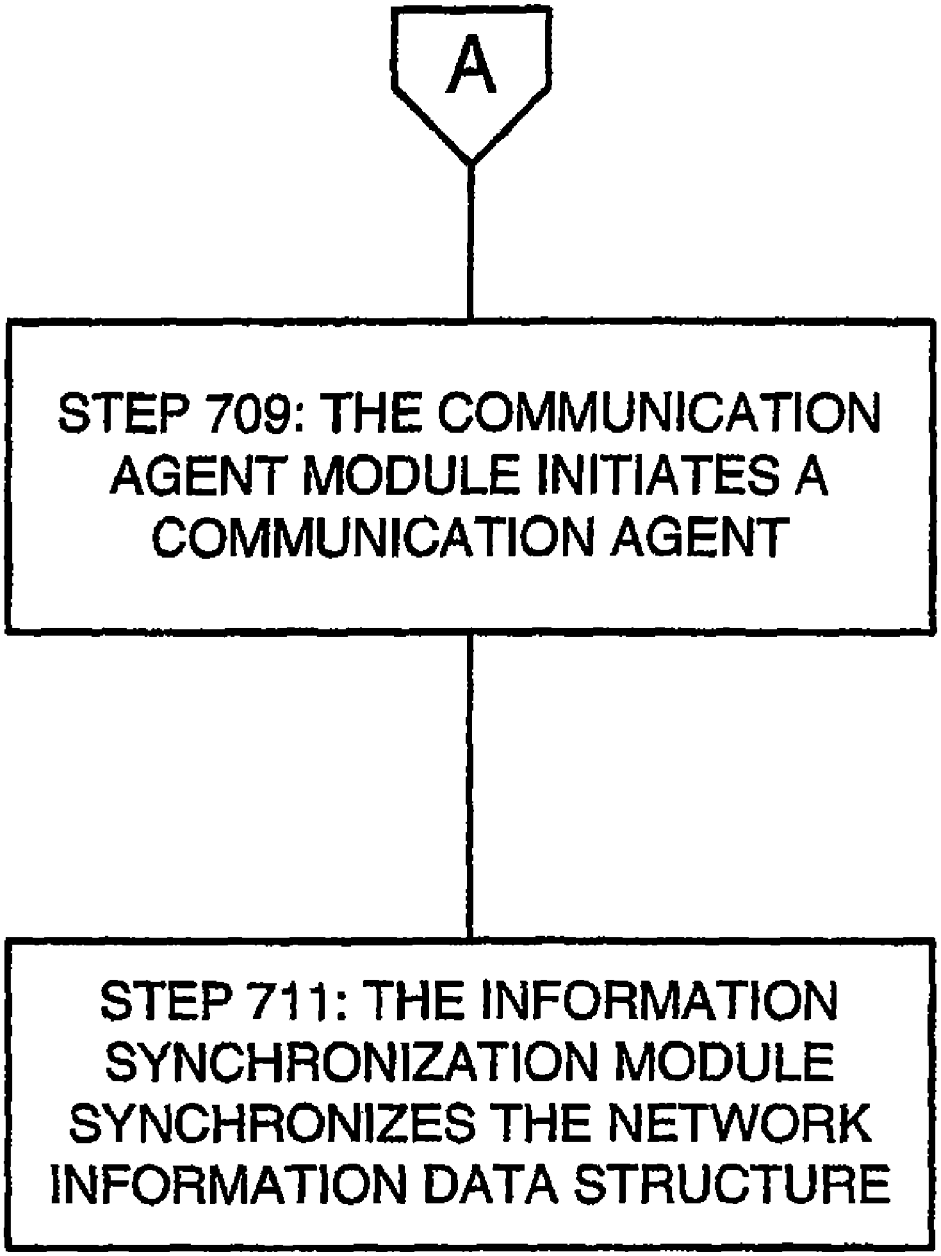

During or after the initial device detection, identification and network information data structure creation process, the communication agent module 611 establishes a communication channel with the communication agent module 611 of other instances of the network management tool 301 running on the network. As will be described in more detail below, the communication agent modules 611 can thus form a trusted association of network management tools 301 in the network. With various aspects of the invention, the information synchronization module 609 uses this communication channel to synchronize its copy of the network information data structure with copies maintained by one or more other instances of the network management tool 301. In addition, the network management application module 307 may employ this communication channel to propagate user-designated information and files through the trusted association of network management tools 301. The process performed by the network management services module 305 is illustrated in FIG. 7, and will now be described in more detail.

Device Detection

In step 701, the device detection module 601 initiates the discovery process to detect devices in the network. That is, the device detection module 601 attempts to detect devices connected directly or indirectly to the local area network "side" of the gateway device 105. Various aspects of the device detection module 601 may employ a variety of discovery techniques to detect devices in the network.

For example, with some aspects of the invention, the device detection module 601 will use a network subnet IP address scan discovery process by scanning all of the Internet Protocol (IP) addresses in the subnet defined for the "network side" of the gateway device 105 (i.e., addresses 1-255 associated with the gateway device 105). More particularly, the device detection module 601 sends out a "ping" to every address in the gateway device 105 subnet. The device detection module 601 may, for example, send the pings using the packet Internet groper protocol, IP&P, or other suitable message protocol. If a device is located at an address, it will respond to the ping with a reply message. With some aspects of the invention, the device detection module 601 may employ multiple threads to ping multiple addresses simultaneously. For example, one thread may ping addresses 1-64, while another thread pings addresses 65-128, a third thread pings addresses 129-196, and a fourth thread pings addresses 197-255.

Some aspects of the invention may alternately or additionally employ the universal plug and play (UPnP) discovery protocol to detect devices in the network. This discovery protocol, in which the device detection module 601 sends out a query over the network asking for UPnP devices to reply, is a well-known industry standard, and thus will not be described here in more detail. The universal plug and play discovery process may be conducted simultaneously with the network subnet IP address scan discovery process described above. It should be appreciated, however, that replies to the UPnP queries are received asynchronously from the requests, while replies to the network subnet IP address scan discovery process are received synchronously with the requests. The device detection model continuously listens for UPnP devices to broadcast their presence and the status of the services hosted by the UPnP device.

Various aspects of the invention may alternately or additionally employ a third discovery process based upon the dynamic host configuration protocol (DHCP). As well known in the art, this protocol allows a network to automatically assign a temporary IP address to a network device when that device joins the network. A DHCP server hosted on a computer in the network responds to requests by network devices for an IP addresses over the DHCP protocol. Many network devices use DHCP to obtain an IP address, so conventional routers will typically have an imbedded DHCP server to assign IP addresses. In order to obtain an IP address using this protocol, a device will send out a broadcast message over the network requesting an IP address from the network's DHCP server.

Accordingly, the network management services module 305 for some aspects of the invention may include both a DHCP client and a DHCP server listener. Thus, when a computer running another instance of the network management tool 301 joins the network, its DHCP client broadcasts a message notifying the network of its presence and requesting an IP address. The DHCP server listener of an existing instance of the network management tool 301 will then receive the message identifying the new computer. In this manner, the device detection module 601 will detect when a new computer running an instance of the network management tool 301 joins the network. Additionally, the DHCP server listener can be used to detect the presence of other devices using a DHCP client joining the network.

As part of the DHCP message exchange, the DHCP client sends information to the DHCP server requesting information about the services hosted on the network. The network detection module 601 uses the information provided by the DHCP client in the DHCP request message to help identify the network device. Specifically, the network detection model looks at list of DHCP options requested by the DHCP client hosted on the network device to determine the type of network device. Network devices request different DHCP options and these differences can be used to help identify the device. For example, the DHCP client in Microsoft Windows 95 sets the vendor string to be "MSFT 95" while the DHCP client in Microsoft Windows 98 sets it to "MSFT 98". In addition to the vendor string, DHCP clients request different options. For example, Microsoft Windows Me sets vendor string to "MSFT 98" and requests the router discovery DHCP option. Windows 98 doesn't request the router DHCP discovery option so the router discovery DHCP option can be used to differentiate between a Windows 98 and Windows Me DHCP client. Another example is the Microsoft Xbox game console sets the vendor string to "XBOX X.Y" where X is the major version of the Xbox console software and Y is the minor version number.

In addition to DHCP options like router discovery and vendor, the DHCP request message may include the hostname of the network device. This hostname can be used to provide a friendly name for the device or to uniquely identify the device. For example, the Linksys Digital Phone Adapter sets the hostname in the DHCP request message to be "LinksysP AP". This information can be used to uniquely identify the network device as a Linksys Digital Phone Adapter.

The system thus may include heuristics that analyze the contents of a DHCP request packet to determine the DHCP client's operating system and the actual device.

It should be appreciated that the DHCP-based discovery process typically is not part of the initial discovery process, but may be implemented subsequent to the initial discovery process. It also should be noted that the DHCP-based is an asynchronous discovery process as well. Discovery of a network device is triggered by when a network device requests a DHCP allocated IP address from the DHCP server on the network.

As described above, the device detection module 601 will attempt to detect devices that are directly connected to the network. These devices will sometimes be referred to as "globally discoverable" devices, since any instance of the network management tool 301 running in the network will normally be able to detect these devices. With some aspects of the invention, however, the device detection module 601 may also detect devices that are indirectly connected to the computer. That is, the device detection module 601 may also detect devices that are not directly connected to network, but which are connected, either directly or indirectly, to another device that is directly connected to the network.

In some instances, these indirectly connected devices will be locally maintained by the computer hosting the device detection module 601. For example, the computer hosting the device detection module 601 may be connected to a local printer through a universal serial bus (USB) port or other type of serial or parallel bus connection. The device detection module 601 may detect these locally maintained devices through, for example, the operating system for the host computer. For example, the device detection module 601 may review registry information or call operating system information services to detect locally maintained devices. For example, the network device detection module may ask the operating system to enumerate all of the printers attached to the host computer. Because these devices will typically be more reliably discovered by a local instance of the device detection module 601, these devices will sometimes be referred to as "locally discoverable" devices.

With some aspects of the invention, the device detection module 601 may even detect locally connected devices on remote computing appliances in the network. For example, using UPnP information, the device detection module 601 may detect a printer or other device connected to a remote computer through a USB port. While these devices are not directly connected to the network, no instance of the device detection module 601 will typically be able to more reliably detect these device than any other instance of the device detection module 601 (other than an instance running on the remote computing appliance actually maintaining those devices). Accordingly, these devices will also be considered "globally discoverable" devices for every instance of the device detection module 601 other than an instance hosted by the computing appliance actually maintaining those devices.

After the initial device detection process has been completed, new devices may be connected to or removed from the network. Similarly, new devices may be connected to or removed from the computer hosting the device detection module 601. Accordingly, various aspects of the invention will continue to monitor the network and the host computer to detect the presence of new devices or the removal of previously detected devices. For example, the device detection module 601 may periodically repeat the network subnet IP address scan discovery process described above. It may additionally periodically repeat the UPnP discovery process also described above. For locally discoverable devices, various aspects of the device detection module 601 may periodically query the operating system to determine if a device has been connected to or disconnected from the host computer. Alternately or additionally, the device detection module 601 may detect when a device has been connected to or disconnected from the host computer based upon event messages issued by the host computer. For example, the device detection module 601 may ask the operating system when a registry value associated with a printer changes.

As new globally discoverable devices are added to or removed from the network, the device detection module 601 reports these changes to the device identification module 603. Similarly, as the device detection module 601 detects the addition or removal of locally connected devices, these changes also are reported to the device identification module 603.

Device Identification

Next, in step 703, the device identification module 603 identifies the detected devices. More particularly, the device identification module 603 will employ various properties of the detected devices that were obtained by the device detection module 601 to identify the devices. If the device detection module 601 did not provide sufficient information to identify a device, then the device identification module 603 will use various additional heuristics to accurately identify that device.

During the discovery process, the device detection module 601 will determine one or more properties of a detected device. For example, if the device detection module 601 detects a device using the network subnet IP address scan discovery method, then the device detection module 601 can determine the IP address and media access control address for the device. If the device detection module 601 detects a device using the universal plug and play protocol, then the device detection module 601 may determine additional information regarding that device provided by the UPnP device.

When a new device is detected by the device detection module 601, the device identification module 603 will initially identify that device as an unknown device. With some aspects of the invention, the device identification module 603 will then attempt to identify the device based upon the device's MAC address. For example, the device identification module 603 will compare the MAC address for the device with the MAC address of the router (or other gateway device) detected by the gateway service module 303. If the MAC addresses match, then the device identification module 603 will identify the device as the gateway device. IP addresses can change (new DHCP leases for example) so the network may identify network devices by MAC address. The system may also store these devices in a hash map to facilitate easy lookup of network devices. Also, one may generalize the hash map as a unique identifier for the device.

The device identification module 603 may then check the value of a device's media access control (MAC) address using the process described in detail above with regard to the gateway service module 303. As known to those of ordinary skill in the art, portions of the MAC address will uniquely identify the vendor that produced the device, and the entire MAC address will uniquely identify the device itself. Still further, the device identification module 603 will employ information obtained through the DHCP discovery or universal plug and play discovery process to identify a device. As known in the art, a device responding to the universal plug and play discovery process will conventionally provides information regarding itself.

If the device identification module 603 cannot identify a device from the information obtained during the discovery process, it will then seek to obtain more information from the device by, for example, attempting to access a NetBIOS application programming interface (API) or similar service on the device. As known in the art, the NetBIOS service is an application programming interface (API) that may be used on computers employing an operating system such as MS-DOS, Windows, OS/2, Linux, or UNIX. The NetBIOS application programming interface provides a uniform set of commands for requesting the lower-level network services required to conduct sessions between nodes on a network and to transmit information back and forth. The NetBIOS API conventionally listens for incoming messages on Port 139. Accordingly, the device identification module 603 sends a "get server info" message or other message to Port 139 or other port of the device, requesting access to the device's network directory service. Before issuing the "get server info" message and waiting for it to time out, the device identification module first attempts to connect to Port 139. This optimization results in NetBIOS queries being sent only to devices which support this service. Without this optimization, the device identification would need to wait for the NetBIOS request to time out. If this service is available to the device identification module 603, the device will reply with a detailed report of the device's properties that the device identification module 603 can then use to identify the device. The detailed report from NetBIOS can be used to identify the type of device (e.g., computer), operating system (e.g., Windows XP), operating system version, hosted services (e.g., Windows Domain Controller), hostname, and friendly name (aka comment) of the network device.

In addition to sending a “get server info” message to the NetBIOS service, the device identification module 603 issues a “gethostbyaddr” query to get the hostname (friendly name) of a network device. The “gethostbyaddr” query uses the NetBIOS service to query a network device at a specific IP address for its hostname. In many situations, however, this service is turned off for security reasons. If the NetBIOS service (or similar service) is unavailable, various aspects of the invention will then check to see if the device has submitted a DHCP request for an IP address. More particularly, when a device employs the DHCP process to request an IP address from a DHCP server, it will provide the DHCP server with information about itself. The requesting device may also ask for additional options, such as additional information or functionality. The requested options, however, typically will be dependent upon the operating system of the requesting device. For example, a device employing the Microsoft Windows 98 operating system will have a vendor tag of MSFT 98, while a device employing the Microsoft Windows NT operating system will have a vendor tag of MSFT 5.0. The Microsoft Windows NT and Windows XP operating systems both have a vendor tag of MSFT 5.0. However, the Microsoft Windows XP operating system will additionally request a “classless route” option. The addition of the “classless route” option allows the network identification service to distinguish between network devices using the Windows NT and Windows XP operating systems. Similarly, the Microsoft Windows 98 and Windows Me operating systems both have a vendor tag of MSFT 98. The Microsoft Windows Me operating system requests an additional “router discovery” option which can be used to distinguish a network device running the Windows 98 versus Windows Me operating system.

Accordingly, based upon the information provided when requesting additional options with the IP address, the device identification module 603 may determine the operating system employed by the requesting device, and thus the identity of the device (e.g., a computer). Also, the device identification module 603 may determine the identity of the device and product model. As previously noted, various aspects of the invention may previously attempt to identify a device based upon information provided by a NetBIOS service. Various aspects of the invention may therefore arrange information obtained from a DHCP request into the same format as information provided by a NetBIOS service. This advantageously allows the same software code to analyze both information provided by a NetBIOS service and information obtained from a DHCP request to identify a device.

The following is a table of DHCP options and how the values and existence of options are used to identify the operating system of the network device. Options highlighted in bold are used to distinguish network devices that have some similar values.

TABLE 19

| Operating System | Vendor Class DHCP Option | Router Discovery DHCP Option | Classless Route DHCP Option | Vendor Specific DHCP Option | NetInfo Address |
|---|---|---|---|---|---|
| Windows 95 | <NONE> | | | 0x237 | |
| Windows 98 | MSFT 98 | N | | | |
| Windows Me | MSFT 98 | Y | | | |
| Windows NT | MSFT 5.0 | N | | | |
| Windows 2000 | MSFT 5.0 | Y | N | | |
| Windows XP and above | MSFT 5.0 | Y | Y | | |
| Mac OSX | Mac OS | | | | Y |
| XBOX | XBOX | | | | |

Similarly, the following is a table of DHCP options and how the values and existence of options are used to identify specific model versions of network devices. Options highlighted in bold are used to distinguish network devices that have some similar values.

TABLE 20

| Network Device | Vendor Class DHCP Option | Hostname |
|---|---|---|
| Linksys Phone Adapter, Model PAP2 | <NONE> | LinksysPAP |

If the device identification module 603 still cannot determine a device’s identify, the device identification module 603 may then test which ports, if any, are open on the device. For example, if the device is listening to messages on Port 1720 and will respond to messages using the H.232 protocol, then the device identification module 603 will determine that the device is video conferencing equipment. If, on the other hand, a device is listening on Port 80 and responds to a request for information using a hypertext transfer protocol (HTTP) message, then the device identification module 603 will determine that the device hosts a web server. The authentication realm, HTTP header information, and/or contents of the home page of the Web server can be used to further identify the device.

The device identification module 603 may also attempt to retrieve a Web page or other content from a device. It can then compare text from the Web page or other content with regular expressions to identify the device, as described in detail with regard to the gateway service module 303. This may be performed for more than routers. In the non-router case, one may use the same or a different technique. For instance, one may maintain lists of regular expressions grouped by detection technique in an XML file called devregex.xml. The rational is that one can easily update the XML file to detect new devices without having to change the device identification model. Also, this can be updated with new information from the Web. Finally, if the information does not match a regular expression, one can query a Web-based service with the device discovery information to identify the device.

The device identification module 603 may also represent the mapping between a regular expression and detailed identification information in a markup language, such as the extensible markup language (XML). This may be generalized as being able to take any information discovered on a device and apply a list of regular expressions to it until a match is found. The matched information on the device can also be used to “override” incorrect values. For example, the Linksys Wireless-B Media Adapter returns the manufacturer as Intel Corporation. Once the system identifies the device, one can override the “incorrect” values with the right values from the XML file.

Matching UPnP universal resource name (URN) to a device subtype, the value regex is the regular expression to match against. The subtype value is the device subtype to assign.

```
<!-- match the UPnP URN to a device sub-type -->
<UPnPmatch_URN_to_subtype>
<!-- intentional mis-spelt match -->
<sz_to_subtype regex=“Netwo(r)?kCamera”>
<subtype>NetworkCamera</subtype>
</sz_to_subtype>
<!-- match D-Link DCS camera line -->
<sz_to_subtype regex=“DCS-\d+”>
```

```
<subtype>NetworkCamera</subtype>
</sz_to_subtype>
<sz_to_subtype regex=“WLANAccessPointDevice”>
<subtype>WiFiAccessPoint</subtype>
</sz_to_subtype>
<sz_to_subtype regex=“MediaServer”>
<subtype>DigitalJukebox</subtype>
</sz_to_subtype>
<!-- match MediaRenderers, e.g. D-Link Media Lounge -->
<sz_to_subtype regex=“MediaRenderer”>
<subtype>MediaAdapter</subtype>
</sz_to_subtype>
<sz_to_subtype regex=“PhotoServer”>
<subtype>DigitalJukebox</subtype>
</sz_to_subtype>
<sz_to_subtype regex=“InternetGatewayDevice”>
<subtype>Gateway</subtype>
</sz_to_subtype>
<!-- Linksys -->
<sz_to_subtype regex=“Network Storage Link for USB2.0 Disks”>
<subtype>NetworkDrive</subtype>
</sz_to_subtype>
</UPnPmatch_URN_to_subtype>
```

Matching UPnP model to a device subtype, the value regex is the regular expression to match against the UPnP model number. The subtype value is the device subtype to assign.

```
<!-- match the UPnP model to a device sub-type -->
<UPnPmatch_model_to_subtype>
<!-- match Windows Media Connect computers -->
<sz_to_subtype regex=“Windows Media Connect”>
<subtype>Computer</subtype>
</sz_to_subtype>
<!-- match Sony VAIO Media servers computers -->
<sz_to_subtype regex=“VAIO Media \w+Server”>
<subtype>Computer</subtype>
</sz_to_subtype>
<!-- match D-Link DSM-60X series network drives -->
<sz_to_subtype regex=“DSM-60\d+”>
<subtype>NetworkDrive</subtype>
</sz_to_subtype>
<!-- match D-Link DP-series network print servers -->
<sz_to_subtype regex=“DP-[G]\d+”>
<subtype>NetworkPrintServer<subtype>
</sz_to_subtype>
<!-- match Linksys Media Adapter WMA11B -->
<sz_to_subtype regex=“UPnP Application Loader 1.0”>
<subtype>MediaAdapter<subtype>
</sz_to_subtype>
</UPnPmatch_model_to_subtype>
```

Matching HTTP authentication realm to a vendor, device type, and device subtype, the value regex is the regular expression to match against the authentication realm of an HTTP request when ACCESS_DENIED (status code 401) is returned. The brackets {Match Item} define a regular expression match group. If brackets are specified in the regular expression, this information (match group) is used to determine the model name of the network device. The vendorid is a unique identifier for the vendor or manufacturer of the device. The type value is the device type. The subtype value is the device subtype to assign.

```
<!-- match the HTTP auth realm to a device -->
<httpmatch_realm_to_device>
<!-- match Linksys wireless AP model ‘WAP54G’ -->
<sz_to_device regex=“{WAP54G}”>
<deviceinfo>
<vendorid>Linksys</vendorid>
<type>NetworkDevice<type>
<subtype>WiFiAccessPoint</subtype>
<deviceinfo>
</sz_to_device>
<!-- match Linksys wireless AP model ‘WAP55AG’ -->
<sz_to_device regex=“{WAP55AG}”>
<deviceinfo>
<vendorid>Linksys</vendorid>
<type>NetworkDevice<type>
<subtype>WiFiAccessPoint</subtype>
<deviceinfo>
</sz_to_device>
<!-- match Buffalo wireless AP models ‘WLA-???’, e.g. ‘WLA-G54C’ -->
<sz_to_device regex=“BUFFALO {WLA-\a\d+\a+}”>
<deviceinfo>
<vendorid>Buffalo</vendorid>
<type>NetworkDevice</type>
<subtype>WiFiAccessPoint</subtype>
<deviceinfo>
</sz_to_device>
</httpmatch_realm_to_device>
```

Matching HTTP home page contents to a vendor, device type, and device subtype, the value regex is the regular expression to match against the contents of the home page of an HTTP request when STATUS_OK (status code 200) is returned. The brackets {Match Item} define a regular expression match group. If brackets are specified in the regular expression, this information (match group) is used to determine the model name of the network device. The vendorid is a unique identifier for the vendor or manufacturer of the device. The type value is the device type. The subtype value is the device subtype to assign.

```
<!-- match the HTML admin page to a device -->
<htmlmatch_page_to_device>
<!-- match D-Link wireless AP model ‘DWL-2100AP’ -->
<sz_to_device regex=“<title>{DWL-2100AP}</title>”>
<deviceinfo>
<vendorid>D-Link</vendorid>
<type>NetworkDevice</type>
<subtype>WiFiAccessPoint</subtype>
<deviceinfo>
</sz_to_device>
<!-- match D-Link network camera model ‘DCS-5300’ or ‘DCS-5300W’ -->
<sz_to_device regex=“<title>{DCS-5300W?}</title>”>
<deviceinfo>
<vendorid>D-Link</vendorid>
<type>NetworkDevice</type>
<subtype>NetworkCamera</subtype>
<deviceinfo>
</sz_to_device>
<!-- match Linksys network camera model ‘WVC11B’ -->
<sz_to_device regex=“<title>{Linksys Web Camera}</title>”>
<deviceinfo>
<vendorid>Linksys</vendorid>
<type>NetworkDevice</type>
<subtype>NetworkCamera</subtype>
<deviceinfo>
</sz_to_device>
<!-- match D-Link network camera model ‘DCS-900’ -->
<sz_to_device regex=“{DCS-900})</title>”>
<deviceinfo>
<vendorid>D-Link</vendorid>
```

```
<type>NetworkDevice</type>
<subtype>NetworkCamera</subtype>
<deviceinfo>
</sz_to_device>
<!-- match Veo network camera -->
<sz_to_device regex="{Veo Observer(XT)?}">
<deviceinfo>
<vendorid>Veo</vendorid>
<type>NetworkDevice</type>
<subtype>NetworkCamera</subtype>
<deviceinfo>
</sz_to_device>
</htmlmatch_page_to_device>
</data>
```

Matching HTTP header information to a vendor, device type, and device subtype, the value regex is the regular expression to match against the HTTP header information of an HTTP request for the device's home page, e.g. http://192.168.1.1/. The following is an example of HTTP headers returned

```
STATUS_CODE=200
STATUS_TEXT=OK
VERSION=HTTP/1.0
CONTENT_TYPE=text/html; charset=UTF-8
RAW_HEADERS_CRLF=HTTP/1.0 200 OK
Server: SonicWALL
Content-type: text/html; charset=UTF-8
```

The brackets {Match Item} define a regular expression match group. If brackets are specified in the regular expression, this information (match group) is used to determine the model name of the network device. The vendorid is a unique identifier for the vendor or manufacturer of the device. The type value is the device type. The subtype value is the device subtype to assign.

```
<!-- match the HTML admin page to a device -->
<htmlmatch_http header_to_device>
<!-- match SonicWall wireless AP model 'SOHO TZW' -->
<sz_to_device regex="Server: {SonicWall}">
<deviceinfo>
<vendorid>SonicWall</vendorid>
<type>NetworkDevice<type>
<subtype>WiFiAccessPoint<subtype>
<deviceinfo>
<sz_to_device>
```

The device identification module 603 also may use the information obtained from one or more of these processes in combination to identify a device. For example, if a device has Port 80 open but has Port 67 closed, the first octets of its MAC address correspond to the vendor D-Link, and the device provides a port for various UPnP services, then the device identification module 603 will determine that the device is a camera. If the device still cannot be identified, then the device identification module 603 may identify the device generically as a network device.

The device identification model determines that a network device is a network printer or printer server by looking for a set of ports to be open. If a network device has one or more of the following ports open then it is deemed a network printer.

UNIX printer spooler (TCP port 515)

Internet Printing Protocol (TCP port 631)

HP JetDirect (TCP port 9100)

The device identification module 603 also may prioritize the validity of the information from one or more of these processes in combination to identify a device. For example, the Linksys Wireless-B Media adapter discovered using the UPnP based discovery method returns "Intel Corporation" instead of "Linksys" as the manufacturer. The device identification model can match this device to information stored in a XML file of devices using regular expressions and override the "incorrect" values with the correct values retrieved from the XML file. These correct values can also be retrieved from a Web-based service. Another example is UPnP information for a network print server that overrides the information discovered from a port scan. In general, one may override current information and update the current information with remote product and vendor information for a device.

The device identification module 603 often uses multiple mechanisms to discover a device. For example, the D-Link DCS-5300 network camera will get identified using three discovery mechanisms: scan of the network for network devices, HTTP discovery on its web management page, and UPnP discovery for the root device type of "Netwo(r)?kCamera". Each discovery mechanism provides information about the device. However, some discovery mechanisms provide more reliable information than others. A method was required to rank the validity of information provided by the discovery mechanisms so that less reliable or incorrect information could be overridden by more reliable information. For discovered devices, properties initially receive a "pseudo" timestamp (TLC). The "pseudo" TLC values are not based on the actual local time but rather on how these values "rank" against others. For example, the rank of information discovered by UPnP is higher than information discovered by examining the default Web page hosted by the device. The information discovered using the UPnP discovery mechanism will have a rank of Average (50) while the information discovered by HTTP discovery will have a rank of Low (25).

As illustrated in the code sample below, an object behavior scope can be used to modify the default behavior of an object. In this example, the object behavior is being changed to use the passed in "rank" instead of a local timestamp for the TLC of the property.

```
/*
Pseudo 'weak' TLC values that are not based on the actual local time but rather some concept of how these values 'rank' against others.
*/
static const ULONG c_ulNoTLC=0; /* no TLC-considered 'default value' */
static const ULONG c_ulVeryLowTLCRank=10; /* very lowly ranked TLC */
static const ULONG c_ulLowTLCRank=25; /* lowly ranked TLC */
static const ULONG c_ulAverageTLCRank=50; /* average ranked TLC */
static const ULONG c_ulHighTLCRank=75; /* highly ranked TLC */
static const ULONG c_ulExcellentTLCRank=100; /* excellently ranked TLC */
static const ULONG c_ulBaseInfoTLCRank=c_ulVeryLowTLCRank;
static const ULONG c_ulHTTPScanRank=c_ulLowTLCRank;
static const ULONG c_ulUPnPInfoRank=c_ulAverageTLCRank;
static const ULONG c_ulDHCPInfoRank=c_ulAverageTLCRank;
static const ULONG c_ulWANHostRank=c_ulAverageTLCRank;
static const ULONG c_ulVendorInfoRank=c_ulHighTLCRank;
static const ULONG c_ulRegexInfoRank=c_ulExcellentTLCRank;
```

```
// Any gleaned UPnP information we can set in?
if (SUCCEEDED(hr) && cpupnpdevinfo.p)
{
/* set in the property TLC 'ranking' for these 'weak' properties */
NmObjBehaviorScope bpvc(NmObj ectBase::NmOB_WeakProperties,
static_cast<NmDeviceBase*>(cpdevice.p), c_ulUPnPInfoRank);
static_cast<NmDeviceBase*>(cpdevice.p)->extractUPnPInfo(cpupnpdevinfo);
}
```

As the underlying information service compares the TLC values to determine which property is newer, a property with a higher rank will automatically overwrite a property with a lower rank. In this manner, the functionality of the TLC is reused to ensure properties with a higher rank overwrite properties of a lower rank. In some embodiments of the invention, the rank attribute can also be scoped to a particular type of object. For example, for devices of subtype networkcamera, HTTP discovered properties have a higher rank than UPnP discovered properties. This enables the rank property prioritization to be type specific.

The device identification module 603 will also create unique identifier for each detected device. With some aspects of the invention, the device identification module 603 will generate a unique identifier based upon a standard identification format, such as the global unique identifier (GUID) employed by the Microsoft Windows operating system. The device identification module 603 may employ a technique to generate a unique identifier for a globally detectable device that is different from the technique used to generate a unique identifier for a locally detectable device.

A globally detectable device may be detected and identified by different instances of the network management tool 301 in a network. In order for different instances of the network management tool 301 to synchronize data regarding a globally detectable device, however, all of the instances should identify the globally detectable device with the same unique identifier. Accordingly, the technique used to generate a unique identifier for a globally detectable device should consistently create the same unique identifier for each instance of the network management tool 301 detecting the device. To accomplish this, various aspects of the device identification module 603 will create a unique identifier for a globally detectable device based upon the device's unique physical network address.

Thus, for a globally detectable device in an Ethernet network, the device identification module 603 will generate a unique identifier for the device based upon the device's media access control (MAC) address. Some aspects of the invention, for example, will generate a unique identifier for a globally detectable device using the standard GUID format, but designating all but the last 6 bytes of the identifier as zeros. The last 6 bytes of the identifier are then set to be the media access control (MAC) address of the globally detectable device. Using this technique, every instance of the network management tool 301 in a network will generate the same unique identifier for a globally detectable device.

With locally detectable devices, the device will only be detected and named by the instance of the network management tool 301 running on the local host computer. Accordingly, various aspects of the device identification module 603 will generate a unique identifier for a locally detectable device using, for example, the GUIDGen utility application employed by the Microsoft Windows operating system or similar utility application. The device identification module 603 ensures, however, that the first 10 bytes in the unique identifier are non-zero to avoid any possible clash with a unique identifier for a globally detectable device.

It should be noted that the device identification module 603 also creates a unique identifier for the computer 201 hosting the network management tool 301. While the host computer is a globally detectable device, with some aspects of the invention the device identification module 603 may assign the host computer a unique identifier that does not include the computer's media access control (MAC) address. For example, the device identification module 603 may assign the host computer a unique identifier used by its operating system, or generate a unique identifier using the GUIDGen (or similar utility). As will be described in detail below, the synchronization of data between the computers running an instance of the network management tool 301 allows each instance of the network management tool 301 in the network to identify a host computer using its own unique identifier.

It should be noted that the device identification module 603 also assigns a well-known unique identifier for virtual devices like the Internet. All instances of the device identification module create this virtual device and assign it the same well-known unique identifier. For example, the virtual device named the Internet is identified by the GUID {21A3719F-2D37-4d89-823A-4643F89FE478}.

Once the device identification module 603 has determined the identity of a device, the device driver module 605 will determine which driver, if any, should be used to control the device in step 705. More particularly, the device driver module 605 will create a data object corresponding to the device. For example, if a detected device has been determined to be a network adapter, the device driver module 605 may create a data object of the type "adapter" representing the device. Similarly, if the device identification module 603 has determined that a device is a computer, the device driver module 605 may create a data object of the type "computer" to represent the device, and if the device identification module 603 has determined that a device is a printer, the device driver module 605 may create a data object of the type "printer" to represent the device. Other data object types may include a "gateway" type to represent detected gateway devices, such as routers, and a generic "network device" type to represent network devices that cannot be more precisely identified.

With various aspects of the invention, the network management tool 301 maintains a set of drivers for various network devices. Once the device driver module 605 has determined the object type for a device, it tests each potential driver in the set corresponding to that object type. For example, if the detected device is a printer, the device driver module 605 will test each potential printer driver in the set to determine which driver should be used to control the printer. It should be noted that the device driver module 605 may employ the information obtained by the device identification module 603 to reduce the number of potential drivers to be tested. For example, the device driver module 605 may use a portion or all of the media access control (MAC) address for a device to reduce the number of potential drivers to be tested for the device. The first 3 bytes of a MAC address represent an organizationally unique identifier (OUI). The IEEE industry standards body assigns unique OUI's to identify manufacturers of networking equipment. Once an appropriate driver for a device is determined, the device driver module 605 loads the dynamic linked library (DLL) for the driver. Also, for instances of the network management tool 301 hosted on computers running the Microsoft Window operating system, the device driver module 605 will call regsvr32/install to add the appropriate entry for the DLL-based driver into the operating system registry.

The drivers maintained by the network management tool 301 perform several functions. First, the drivers provide the network management tool 301 with common application programming interfaces (APIs) for all of the detected devices. Also, the drivers provide the network management tool 301 common APIs for devices of a particular class or type. They then provide the network management tool 301 with APIs specific to a particular device. Moreover, the drivers make the same set of APIs available to every instance of the network management tool 301 running in the network. As will be described in more detail below, this allows each instance of the network management tool 301 to provide its user with the ability to control the network devices through a user interface.

Network Information Data Structure Creation

In step 705, the data structure creation module 607 creates a data cell corresponding to each detected device. More particularly, for each device, the data structure creation module 607 will create a data cell within the data object for the device. As previously noted and will be described in more detail below, the name of the object containing the data cell will be the unique identifier for the device. The contents of the data cell within the object will then include one or more of the properties determined for the devices. It some aspects of the invention, each instance of the network management tool will maintain a local copy of the information data structure. The local copy allows the network management tool to continue to perform its function even when it's not connected to the network. The network management tool also will contain a timestamp for each property. As will also be described in more detail below, the timestamps can be used when the contents of the data object are synchronized with network information data structures maintained by other instances of the network management tool 301 in the network. With some aspects of the invention, the particular content of the data object will depend upon its type. For example, the data object corresponding to a computer may contain different properties from the data object for a printer. In order to facilitate a complete understanding of the invention, an example of various data objects will now be described in more detail.

TABLE 21

```
<internet id="{21A3719F-2D37-4D89-823A-4643F89FE478}"
  localid="{00000000-0000-0000-0000-000000000000}">
<existence _tlc="12744580846895">Confirmed</existence>
<level_of_trust>WeaklyTrusted</level_of_trust>
<subtype>Internet</subtype>
<friendly_name />
<vendorid>NotRecognised</vendorid>
<vendor_sname />
<vendor_name />
<vendor_url />
<vendor_email />
<vendor_phone />
<model_description />
<model_name />
<model_number />
<firmware />
<presentation_url />
<connections>
<device id="{00000000-0000-0000-0000-004010111BAA}" />
<device id="{00000000-0000-0000-0000-000F3D37CB2C}" />
  </connections>
<home_url
    _tlc="12744546501680">http://smithfamily.networkmagic.com/</
    home_url>
  </internet>
```

Table 21 illustrates an example of a data object representing the external network node in a network. This type of node will typically correspond to an Internet connection or a connection to another external network, such as a private intranet network. In the illustrated aspect, the external network node represents an Internet connection.

As seen in this table, the Internet XML element contains an XML attribute "id" which is assigned the unique identifier of the Internet node. With various aspects of the invention, the Internet node is treated as a "virtual" device. Also because the Internet or other external network node will always be present in the network, some aspects of the device identification module 603 may always assign the same value to be the unique identifier for this virtual device. Because the same value is employed by every instance of these aspects of the network management tool 301, the unique identifier will consistent be assigned by every instance of the network management tool 301 in the network.

With the illustrated aspect, each data object is scripted in the extensible markup language (XML). In addition, most properties have an associated timestamp value (represented in the illustrated aspect by the abbreviation "_tlc" for "time last changed"). Accordingly, an entry for a property in a data object typically will take the form:

<propertyname_tlc="timestamp value"> property value</ propertyname>

With some aspects of the invention, the timestamp value will be generated when the property for the device is determined or changed. For other aspects of the invention, the timestamp value will be generated when the property value is initially stored or updated in the network information data structure.

Returning now to Table 21, the first property in the object represents the existence of the Internet node. It may have multiple uses including helping to determine when a device is connected to a network, among others. The next property in the object is "level of trust." As will be described in more detail below, the value of this property determines the device's access to the content of the network information data structures maintained by instances of the network management tool 301. Following this property is the subtype property. In this example, the value of this property is "Internet," since this data object represents a connection to the Internet rather than to some other category of external network. It should be noted that neither the "level of trust" property nor the "subtype" property has an associated timestamp value because they contain default, unmodified values.

The next property is "friendly name." As will be described in more detail below, this value corresponds to a user friendly name assigned to a device for use in the user interfaces provided by the network management application module 307. In the illustrated example, the Internet node does not have a friendly name associated with it. This property is followed by the "vendorid," the "vendor sname," the "vendor name," the "vendor url," the "vendor email," and the "vendor phone" properties. It also has the "model description," the "model name," the "model number," the "firmware," and the "presentation url" properties. Because this data object represents an Internet connection, these properties are not applicable. Accordingly, the property "vendor id" has the value "Not Recognised," and the remaining property values are empty.

The next property in data object is the "connections" property. As illustrated above, this property may have more than one sub-property. Each sub-property will be a device identification property assigned the value of a unique identifier of a device to which the data object device is connected. In this particular example, the host computer 201 has employed the network management tool 301 on two separate networks serviced by two different gateway devices. Accordingly, this property has two values. The first value, “00000000-0000-0000-0000-004010111BAA,” is the unique identifier for the gateway device connecting the first network (e.g. my home network) to the Internet. The second value (e.g. my office network), “00000000-0000-0000-0000-000F3D37CB2C,” is the unique identifier for the gateway device connecting the second network to the Internet. Alternatively, the second network could be a result of the user purchasing a new gateway for my home network and re-licensing the network management tool 301 from the old to the new gateway. As will become apparent from a further description of the data objects, various aspects of the network management tool 301 can use these connection property values to create a map of the network in a user interface.

The final property in this data object is the “home url” property. With various aspects of the invention, the network management tool 301 may create a “home” web page by which the network can be accessed from the Internet. For example, if the network management tool 301 is being used on a network located at a residence, this “home” Web page can be used to post family pictures, share data resources such as folders or individual files, or to provide access to music or other media, such as home movies. Accordingly, the “home url” property is the universal resource locator address (URL) of this home Web page. In the illustrated example, the value of this property is “smithfamily.networkmagic.com.” With some aspects of the invention, the network management tool 301 may create the home Web page automatically. For still other aspects of the invention, however, the network management tool 301 may only create the home Web page at the direction of a user. For still other aspects of the invention, however, the network management tool 301 may just refer to a home Web page hosted on another computer on the network.

TABLE 22

```
<gateway id=“{00000000-0000-0000-0000-000F3D37CB2C}”
     localid=“{00000000-0000-0000-0000-000000000000}”>
<existence _tlc=“12744582123007”>Confirmed</existence>
<level_of_trust>WeaklyTrusted</level_of_trust>
<subtype _tlc=“12744579893684”>GatewayWithWiFi</subtype>
<friendly_name _tlc=“12744579893684”>D-Link Wireless
     Router</friendly_name>
<vendorid>NotRecognised</vendorid>
<vendor_sname _tlc=“12744579888377” >D-Link</vendor_sname />
<vendor_name _tlc=“12744579888377”>D-Link</vendor_name>
<vendor_url _tlc=“12744579888377”>http://www.dlink.com/</vendor_url />
<vendor_email _tlc=“12744579888377”>support@dlink.com</vendor_email />
<vendor_phone _tlc=“12744579888377”>(877) 453-5465</vendor_phone />
<model_description _tlc=“12744579888377”>D-Link Wireless Router Model DI-
     624</model_description />
<model_name _tlc=“12744579888377”>DI-624</model_name>
<model_number _tlc=“12744579888377”>DI-624<model_number />
<firmware _tlc=“12744579888377”>2.50 , Mon, 13 Sep 2004</firmware>
<presentation_url
     _tlc=“12744582123007”>http://192.168.0.1:80/</presentation_url>
<connections>
<device id=“{21A3719F-2D37-4D89-823A-4643F89FE478}” />
<device id=“{ACDB40C9-4E93-4A20-8B2D-46DCF8B35A0D}” />
</connections>
<mac_address _tlc=“12744582122507”>00:0F:3D:37:CB:2C</mac_address>
<hostname />
<ip_address _tlc=“12744582122507”>192.168.0.1</ip_address>
<ip_subnetmask _tlc=“12744582122507”>255.255.255.0</ip_subnetmask>
<network_name>My Home Network</network_name>
<ip_address_wan _tlc=“12744579888707”>64.94.116.194</ip_address_wan>
<hostname_wan />
<wireless_cap _tlc=“12744579890400”>802.11g</wireless_cap>
<wireless_cap_enabled
     _tlc=“12744579893544”>802.11g</wireless_cap_enabled>
<wireless_seccap _tlc=“12744579893544”>WAP</wireless_seccap>
<wireless_seccap_enabled
     _tlc=“12744579893684”>WAP</wireless_seccap_enabled>
<history />
</gateway>
```

Table 22 is the data object for a gateway device connected to the Internet. The name of this object is the unique identifier generated for the gateway based upon the media access control (MAC) address for the device. Like the Internet data object, the first property in this data object is the “existence” property. XML allows for the properties to be listed in any order. For example, this could just have easily have been listed last. Again, the “existence” property has a value of “confirmed” and an associated timestamp value. The next property is “level of trust,” and the value of this property is “WealdyTrusted.” Following this property is the “subtype”. This property provides additional type information about the device. For example the “subtype” of “GatewayWithWiFi” describes a gateway with a wireless network adapter. Following the “subtype” property is the friendly name” property and its corresponding value of “D-Link Wireless Router”. This value provides a convenient and descriptive name for the device that can easily be recognized by a user. The friendly name property allows the user to designate a friendly name or easily recognizable label for a device without changing any settings on the device. This data object also has the properties “vendorid,” “vendor sname,” “vendor name,” “vendor url,” “vendor email,” and “vendor phone” properties which are used to specify information about the vendor or manufacturer of the device. It also has the properties “model description,” “model name,” “model number,” and “firmware” which are used to specify product model and version information of the device. With some aspects of the invention, some or all of these property values may be determined by the device detection module 601 or the device identification module 603. Alternately or additionally, one or more of these property values may be provided by the driver selected for the device.

represents a combination of one or more wireless standards or capabilities that the gateway supports, (e.g. 802.11a, 802.11b, 802.11g, and/or 802.11n). In the illustrated example, the value of this property "802.11g" indicates that this wireless gateway device is currently operating according to the 802.11g standard.

TABLE 23

```
- <adapter id="{ACDB40C9-4E93-4A20-8B2D-46DCF8B35A0D}"
    localid="{8EF7E28A-5F6F-4859-90A2-04559ED21C2A}"
    aliasid="{28EEEAA1-E4BE-487E-A170-9BEDC2ECEDCD}">
  <existence _tlc="12744546501690">Confirmed</existence>
  <level_of_trust>WeaklyTrusted</level_of_trust>
  <subtype>Adapter</subtype>
  <friendly_name _tlc="12744580868947">3Com 3C920 Integrated Fast
    Ethernet Controller (3C905C-TX Compatible) - Packet Scheduler
    Miniport</friendly_name>
  <vendorid>NotRecognised</vendorid>
  <vendor_sname />
  <vendor_name />
  <vendor_url />
  <vendor_email />
  <vendor_phone />
  <model_description />
  <model_name />
  <model_number />
  <firmware />
  <presentation_url />
- <connections>
  <device id="{8EF7E28A-5F6F-4859-90A2-04559ED21C2A}" />
  <device id="{00000000-0000-0000-0000-000F3D37CB2C}" />
    </connections>
  <mac_address
    _tlc="12744580868947">00:06:5B:BB:55:F8</mac_address>
  <hostname />
  <ip_address _tlc="12744580868947">192.168.0.100</ip_address>
  <ip_subnetmask
    _tlc="12744580868947">255.255.255.0</ip_subnetmask>
  <index _tlc="12744580868947">4</index>
  <description _tlc="12744580868947">3Com 3C920 Integrated Fast
    Ethernet Controller (3C905C-TX Compatible) - Packet Scheduler
    Miniport</description>
  <status _tlc="12744580869017">Operational</status>
  <connection _tlc="12744580868957">Wired</connection>
  <linkspeed _tlc="12744580868957">100000000</linkspeed>
  <dhcp_enabled _tlc="12744580868947">true</dhcp_enabled>
  <ip_gateway _tlc="12744580868947">192.168.0.1</ip_gateway>
  <ip_dhcp_server _tlc="12744580868947">192.168.0.1</ip_dhcp_server>
  <wireless_ssid />
  <wireless_rssi>-2147483648</wireless_rssi>
  <routable_gateway>true</routable_gateway>
    </adapter>
```

With the illustrated example, the vendor of the device has not been recognized. Accordingly, the value of the "vendor id" property is "NotRecognised". The device has been recognized as a D-Link DI-624 wireless router, so the value of the "vendor name" property is "D-Link," while the value of the module name is "DI-624." The firmware being employed by the device also has been identified as "version 2.50, dated Monday, Sep. 13, 2004".

Like the "Internet" data object, this "gateway" data object also has a "connections" property with two sub-properties. The first sub-property, a device identification property, has a value of "{21A3719F-2D37-4D89-823A-4643F89FE478}" which represents a reference to a connection to the Internet "virtual" device. The second device identification property refers a network adapter object. The network adapter object connects a device of type computer to the gateway. Additional properties for the gateway object that were not in the previously-described data object include the "gateway" property with a value of "GatewayWithWiFi", indicating that this wireless gateway device is capable of operating according to the 802.11g standard. The "wireless cap enabled" property Table 23 shows a data object for the network adapter device connected to the gateway device described above. As seen in this table, the title of the data cell is the unique identifier for the adapter. This data object shares a number of properties with the previously described data objects including, for example, an "existence" property, a "level of trust" property a "vendorid" a "vendor sname", "vendor name", "vendor url", "vendor email", and a "vendor phone". It also has a "model description", a "mode name", "model number", a "firmware", a "presentation url" a "mac address" property, an "ip address" property, and an "ip subnet mask" property. The connection property for this data object also includes two sub-properties. The first sub-property, a "device id" property, has a value of "8EF7E28A-5F6F-4859-90A2-04559ED21C2A." As will be described further below, this value is the unique identifier for a computer to which the adapter is connected. The second sub-property, another "device id" property, has a value of "00000000-0000-0000-0000-000F3D37CB2C," which is the unique identifier of the previously-described gateway device. Accordingly, the values of these sub-properties indicate that this adapter device forms a connection from the computer to the gateway device. This data object also includes properties that were not included in the previously-described data objects. More particularly, this data object includes an “index” property and a “description property” with a value of “3Com 3C920 Integrated Fast Ethernet Controller (3C905C-TX Compatible)-Packet Scheduler Miniport”. It also includes a “status” property and a “connection” property. In the illustrated example, the value of the “status” property is “Operational,” indicating that the adapter is operating normally. The value of the “connection” property is “Wired,” indicating that the adapter is connected to the gateway device by a wired connection rather than by a wireless connection. Still further, this data object includes a “linkspeed” property that provides the communication transfer speed provided by the adapter device, and the “dhcp enabled” property, which indicates that the adapter device is configured to request an IP address from a DHCP server.

It also includes an “ip gateway” property, which provides the IP address of the gateway device to which the adapter device is connected, and an “ip dhcp server” property that provides the IP address assigned to the adapter device by the DHCP server. Still further, this data object includes a “wireless ssid” property that provides the service set identifier for the network created by the gateway, and a “wireless rssi” property which indicates the signal strength of the wireless adapter. It also includes a “routable gateway,” property, which is used to indicate whether the adapter is connected to a routable gateway.

TABLE 24

```
-<computer id="{8EF7E28A-5F6F-4859-90A2-04559ED21C2A}" localid="{8EF7E28A-
5F6F-4859-90A2-04559ED21C2A}">
  <existence _tlc="12744546501680">Confirmed</existence>
      <level_of_trust _tlc="12744546501680">WeaklyTrusted</level_of_trust>
      <subtype _tlc="12744546501680">LaptopComputer</subtype>
      <friendly_name _tlc="12744546501680">Steve's Laptop</friendly_name>
      <vendorid>NotRecognised</vendorid>
      <vendor_sname />
      <vendor_name />
      <vendor_url />
  <vendor_email />
  <vendor_phone />
  <model_description />
  <model_name />
  <model_number />
  <firmware />
  <presentation_url />
- <connections>
  <device id="{B6922EFF-FABD-4224-8791-EDAA1AC7FC82}" />
  <device id="{ACDB40C9-4E93-4A20-8B2D-46DCF8B35A0D}" />
  <device id="{AA622D2D-4EEE-4628-9FC5-3FD0365D614A}" />
  <device id="{D98E520C-DED1-44DE-A1F0-C75A74A6A3F5}" />
    </connections>
  <mac_address>00:00:00:00:00:00</mac_address>
  <hostname _tlc="12744546501760">sblaptop</hostname>
  <ip_address _tlc="12744579862600">192.168.0.100</ip_address>
  <ip_subnetmask
    _tlc="12744579862600">255.255.255.0</ip_subnetmask>
  <nm_version _tlc="12744546501680">1.0.0.1</nm_version>
  <cpu_speed _tlc="12744546501680">1694</cpu_speed>
  <cpu_vendorid _tlc="12744546501680">GenuineIntel</cpu_vendorid>
  <cpu_name _tlc="12744546501680">Intel(R) Pentium(R) 4 Mobile CPU
    1.70GHz</cpu_name>
  <osversion_raw _tlc="12744546501680">5.1.2600</osversion_raw>
  <osversion _tlc="12744546501680">Windows XP</osversion>
  <osvariant _tlc="12744546501680">Professional</osvariant>
  <osservicepack _tlc="12744546501680">1.0.0</osservicepack>
  <comment _tlc="12744546501680">Steve's Laptop</comment>
  <domainname
    _tlc="12744546501770">PureNetworks.com</domainname>
- <dns_entries _tlc="12744580868626">
  <ip_address>64.94.116.132</ip_address>
  <ip_address>63.251.161.1</ip_address>
  <ip_address>63.251.161.33</ip_address>
  <ip_address>128.3.255.56</ip_address>
  <ip_address>128.36.203.248</ip_address>
  <ip_address>128.42.110.236</ip_address>
  <ip_address>128.50.126.152</ip_address>
  <ip_address>10.0.0.80</ip_address>
    </dns_entries>
  <default_adapter _tlc="12744579893734">{ACDB40C9-4E93-4A20-8B2D-
    46DCF8B35A0D}</default_adapter>
  <phys_memory _tlc="12744546501680">536272896</phys_memory>
- <shares _tlc="12744546528888">
- <share id="{0DD33F9F-9D77-481F-AE72-904C203D9BF1}"
    deviceid="{8EF7E28A-5F6F-4859-90A2-04559ED21C2A}">
  <type>Photo</type>
  <name>stevebu's Pictures</name>
  <share>MyPictures</share>
  <path>C:\My Documents\My Pictures</path>
```

TABLE 24-continued

```
<domain />
<username />
<readonly>false</readonly>
<count_files>26</count_files>
<count_folders>2</count_folders>
<total_filesize>40743320</total_filesize>
<disabled>false</disabled>
  </share>
  </shares>
- <history _tlc="12744546527610">
- <sharechange_operation type="AddedShare" opid="{4F08DFEC-8058-
  4307-A18C-BF2806D77CCC}" opgrpid="{00000000-0000-0000-0000-
  000000000000}">
<objectid>{0DD33F9F-9D77-4B1F-AE72-904C203D9BF1}</objectid>
<result>0x1</result>
<args />
<time_utc yr="2004" mth="11" dyofwk="3" dy="10" hr="7" min="48"
  sec="47" msec="610" />
<directory>C:\My Documents\My Pictures</directory>
  </sharechange_operation>
  </history>
  </computer>
```

Table 24 illustrates the data object representing the computer to which the previously-described adapter was attached. As previously described, the name of the data object is the unique identifier used by the computer to identify itself, rather than a unique identifier generated using the computer's media access control (MAC) address or the GUIDGen utility.

Like the previous data objects, this data object includes an "existence" property, a "level of trust" property, a "vendorid" a "vendor sname" "vendor name" "vendor url" "vendor email" and a "vendor phone". It also has a "model description" a "model name" "model number" a "firmware" a "presentation url" a "property, an "ip address" property, and an "ip subnet mask" property. The value of the "subtype" property indicates that this computer device is a laptop computer, and the value of the "friendly name" property indicates that the computer is "Steve's laptop."

The "connections" property for this data object has four sub-properties, each of which is a "device id" property. The value of the first "device id" property is the unique identifier for an adapter device other than the previously-described adapter device, while the value of the second "device id" property is the unique identifier for the previously-described adapter device. Thus, these connection sub-property values indicate that this computer is connected to two separate adapters. The third "device id" property is the unique identifier for a printer device, which will be described in more detail below. The fourth "device id" property is the unique identifier for another printer device.

This data object also has an "nm version" property, a "cpu speed" property, a "cpu vendor id" property, and a "cpu name" property. The value of the "nm version" property is the version of the network management tool 301 installed on the computer. The values of the "cpu speed" property, the "cpu vendor id" property, and the "cpu name" property are the speed of the computer's microprocessor, the name of vendor that manufactured or sold the computer's microprocessor, and the name of the microprocessor itself. Thus, with the illustrated example, the data object property values indicate that the computer is using an Intel® Pentium® 4 Mobile CPU operating at 1.680 GHz.

The data object also includes an "osversion raw" property, an "osversion" property, an "osvariant" property, and an "osservicepack" property. The values of these properties respectively specify the numeric description of the operating system employed by the computer, the common name of the operating system employed by the computer, the variant of that operating system, and the most recent service pack update for the operating system. Thus, with the illustrated example, these property values indicate that the computer is using the Microsoft Windows XP professional operating system with the service pack 1.0.0 update.

Still further, the data object includes a "comment" property. It also includes a "domain name" property that specifies the domain to which the computer belongs. Still further, in includes a "dns entries" property. This property has a number of sub-properties, each of which is an "ip address" property. The values of these "ip address" properties identify the Domain Name Service (DNS) IP addresses assigned to the computer. The "default adapter" property identifies the default network adapter for the computer. In this example, the default adapter is the previously-described adapter device. Accordingly, the value of the "default adapter" property is the unique identifier for that adapter. The "phys memory" property indicates the amount of physical microcircuit memory available to the computer.

It should be noted that this data object also includes a "shares" property. As will be described in further detail below, the network management application module 307 may provide a user interface that allows a user to share one or more of a computer's resources with other computers executing an instance of the network management tool 301. Various aspects of the invention may allow a user to share a physical resource, such as an input device like a scanner, an output device like a printer, or a storage device like an external hard disk drive. Still other aspects of the invention may allow a user to share data resources, such as a folders or individual data files. Still other aspects may allow a user to share both physical and data resources.

With these aspects, when the user selects a resource to share, the network management tool 301 generates a unique identifier for the resource. The network management tool 301 may create the unique identifier for the resource using, for example, the GUIDGen utility program or similar identifier generation utility program. The data structure creation module 607 then creates a "share id" property as a sub-property of the "share" property in the data object for the computer. The value of the "share id" is the unique identifier for the resource to be shared. The data structure creation module 607 also adds a number of sub-properties for the "share id" properties. The values of these sub-properties would include the information another computer running an instance of the network management tool 301 would need to access and use that resource.

For example, in Table 24, the sub-properties making up the "shares" property include a single "share id" property. The value of this "share id" property is a unique identifier that identifies a data folder maintained by the computer. This "share id" property itself has a number of sub-properties, including a "device id" property, a "type" property, a "name" property, a "share" property, and a "path" property. The value of the "device id" property is the unique identifier for the computer maintaining the resource. In this example, the value of this "device id" property is the same as the unique identifier for the data object itself. The value of the "type" property then provides a general description of the intended use for resource being shared. In the illustrated example, the value of this property is "Photo," indicating to a user that this shared data resource is intended to store photo data. In some embodiments of the invention, the contents of the folder are analyzed and the appropriate folder type is set automatically. For example, a folder of JPEG images (*.jpg) indicates a folder of type "Photo". The "name" property provides a convenient, user-friendly name for the resource that can be displayed and easily recognized in a user interface.

The "share" property identifies the folder (or other organizational structure) in which the shared resource should be displayed. For example, recent versions of the Microsoft Windows operating system will automatically create a "My Pictures" folder. Many users and software applications conventionally use this folder as a well known and easily accessible location to reference data resources relating to picture or other photo data. As previously noted, the shared resource in this example is intended for storing photo data. Accordingly the value of the "share" property for this resource indicates that a computer sharing it should place the reference to this resource in its "My Computers" folder.

The "share id" property also includes a "domain" property, a "username" property, a "read only" property, a "count files" property, a "count folders" property, a "total file size" property, and a "disabled" property. The value of the "read only" property determines whether other computers sharing this resource can change its content. The values of the "count files" property, the "count folders" property, and the "total file size" property then provide the number of individual files in the data resource, the number of folders in the data resource, and the total amount of memory required to store the data resource, respectively. The "disabled" property indicates whether the resource can presently be accessed by other computers running an instance of the network management tool 301. For example, in Table 22, the value of this property is "false," indicating that this resource is presentably accessible to other computers. If however, the computer hosting the share was connected to a "foreign network" then the share could be disabled temporarily without having to remove the share.

As previously noted and will be described in more detail below, the content of the network information data structure is synchronized among instances of the network management tool 301 that have formed a trusted association. Accordingly, another computer in the association can use the information in the data object for the shared resource to access that resource. With various aspects of the invention, another computer in the trusted association will use the shared resource information in the data object together with conventional techniques, such as conventional local area network (LAN) management and universal naming convention (UNC) techniques, to access and employ the shared resource.

It should be noted that, while specific properties for a shared resource have been described above, shared resource information in a data object can include any desired property values or other information that could be used to share access to the resource among the computers in the trusted association. Also, it should be noted that different types of information may be provided in a data structure in order to share different types of resources. For example, a "shares" property used to share a printer resource may include different sub-properties from the "shares" property used to share a data resource described above.

The last property in Table 24 is the "history" property. As described above with respect to the adapter data object, the history property can be used to store information regarding the history of the operation of the computer.

TABLE 25

```
<printer id="{D98E520C-DED1-44DE-A1F0-C75A74A6A3F5}"
   localid="{8EF7E28A-5F6F-4859-90A2-04559ED21C2A}">
<existence _tlc="12744546501710">Confirmed</existence>
<level_of_trust>WeaklyTrusted</level_of_trust>
<subtype>Printer</subtype>
<friendly_name _tlc="12744546501710">ActiveTouch Document
   Loader</friendly_name>
<vendorid>NotRecognised</vendorid>
<vendor_sname />
<vendor_name />
<vendor_url />
<vendor_email />
<vendor_phone />
<model_description />
<model_name />
<model_number />
<firmware />
<presentation_url />
<connections>
<device id="{8EF7E28A-5F6F-4859-90A2-04559ED21C2A}" />
   </connections>
<identifier _tlc="12744546501710">ActiveTouch Document
   Loader</identifier>
<comment />
<driver _tlc="12744546501710">ActiveTouch Document
   Loader</driver>
<share />
<port _tlc="12744546501710">LPT1:</port>
<status _tlc="12744546501710">0x0</status>
<workoffline>false</workoffline>
   </printer>
```

Table 25 illustrates a data object for the printer noted above. Like the previous data objects, this data object includes an "existence" property, a "level of trust" property, a "vendorid" a "vendor sname", "vendor name", "vendor url", "vendor email", and a "vendor phone". It also has properties for a "model description", a "model name", a "model number", a "firmware", and a "presentation url". The value of the "subtype" property indicates that this device is a printer, and the value of the "friendly name" property indicates that the printer is an "ActiveTouch Document Loader." This data object also has a "connections" property. This property has a single sub-property, which is a "device id" property. The value of the "device id" property is the unique identifier for the computer described above, indicating that this printer is a local printer for the computer.

This data object also has properties that were not included in the previously-described data objects. For example, this data object includes an "identifier" property with an associated timestamp. The value of this property indicates that the printer is an "ActiveTouch Document Loader." The "identifier" property is used by the printer object as a unique key to access printers maintained by the local operating system. This data object also includes a "comment" property, and a "driver" property with an associated time stamp. The value of this property, "ActiveTouch Document Loader," identifies the driver being used to control this device. It also has a "share" property like that described in detail above. As this printer has not been shared, the value of this property is empty. In addition, this data object also includes a "port" property, which identifies the computer port through which the printer is connected, and a "status" property, which indicates the current status of the printer. Lastly, this data object has a "work offline" property. The value of this property is "false," indicating that the printer is not offline.

As previously noted, the data structure creation module 607 creates a data object like those described above for virtual devices and each globally and locally discoverable device in the network. The data structure creation module 607 then collects those data objects together to form the network information data structure, which it stores in memory. The network information data structure is serialized from memory and stored persistently on a storage medium, such as on hard disk drive 215. In this manner, the data structure creation module 607 creates a network information data structure that describes various properties of the network and the devices in the network. The contents of the network information data structure are available to the network management tool even when the tool is offline or not connected to the network.

Once the network information data structure has been created, the data structure creation module 607 may occasionally change the network information data structure to reflect changes in the network. For example, when the device detection module 601 detects the addition of a device to or the removal of the device from a network, it will notify the data structure creation module 607 of this change. The data structure creation module 607 will then update the network information data structure to create a new object for an added device or modify the properties (e.g., the connections or status properties) of the removed device. Similarly, when the device identification module 603 determines new properties for an existing device or properties of a newly added device, it will provide the new or changed properties to the information synchronization module 609. Again, the information synchronization module 609 will update the network information data structure to include the new or changed properties, including updating the timestamps on each property. Still further, a user may employ a user interface provided by the network management application module 307 to change, add or delete a property in the network information data structure.

Thus, the network information data structure provides a reference tool for monitoring the status of the network. For example, as will be described further below, a map of the devices and their interconnections can be created from the unique identifier information and connection information for each data object in the structure. This map can then be graphically displayed to a user. A user can also employ the information stored in the data structure to monitor the current and past operation of the device. For example, a user can employ the information stored for the "history" property for a device to review how that device has operated in the past.

Still further, the network information data structure can be used to administer various functions and features of a network and the devices in the network. More particularly, a computer running an instance of device detection module 601 will use the information in the information data structure to interact with the network and the device in the network. Thus, for example, if a user changes a value in an information data structure, such as the value of a "type" property for a device, then the computers in the network sharing that information data structure will use the newly specified "type" and its associated driver to control the device. Also, as previously described, a user can share a physical or data resource on a computer by modifying the network information data structure. More particularly, by instructing the data structure creation module 607 to add a property to a device's data object containing the information needed to share the access to and use of that resource, such as a "shares" property, a user can share the resource with other computers in the network.

Still further, changes to the network information data structure are broadcast to clients of the network data structure creation tool, such as a user interface. The broadcast of these property changes allow a client of the network data structure creation tool to update its information or display to reflect the new or modified values. As previously described, some of the properties in the network information data structure represent dynamic values, e.g. signal strength of the wireless adapter for a computer. The network management tool "listens" for changes in the signal strength of the wireless adapter for a computer and modifies the network information data structure. These changes are broadcast to a client of the network information data structure. The result is the user interface displays a signal strength meter with the updated value.

Once the data structure creation module 607 has created the network information data structure, various aspects of the invention may maintain the network information data structure in persistent memory. Thus, the network information data structure will be maintained even if the computer hosting the network management tool 301 is disconnected from the network. This feature advantageously allows the network management tool 301 to be used while the network management tool 301 is disconnected from the network. For example, a user may use the network management tool 301 to review static or cached properties of other network devices while traveling.

Some aspects of the invention will even maintain the network information data structure in persistent memory when the network management tool 301 or its host computer is shut down. When the network management tool 301 is restarted, it can then immediately use the saved copy of the network information data structure. This feature allows the network management tool 301 to omit the device detection and identification process and the network information data structure creation process when it restarts.

The Communication Agent

Figure 8:
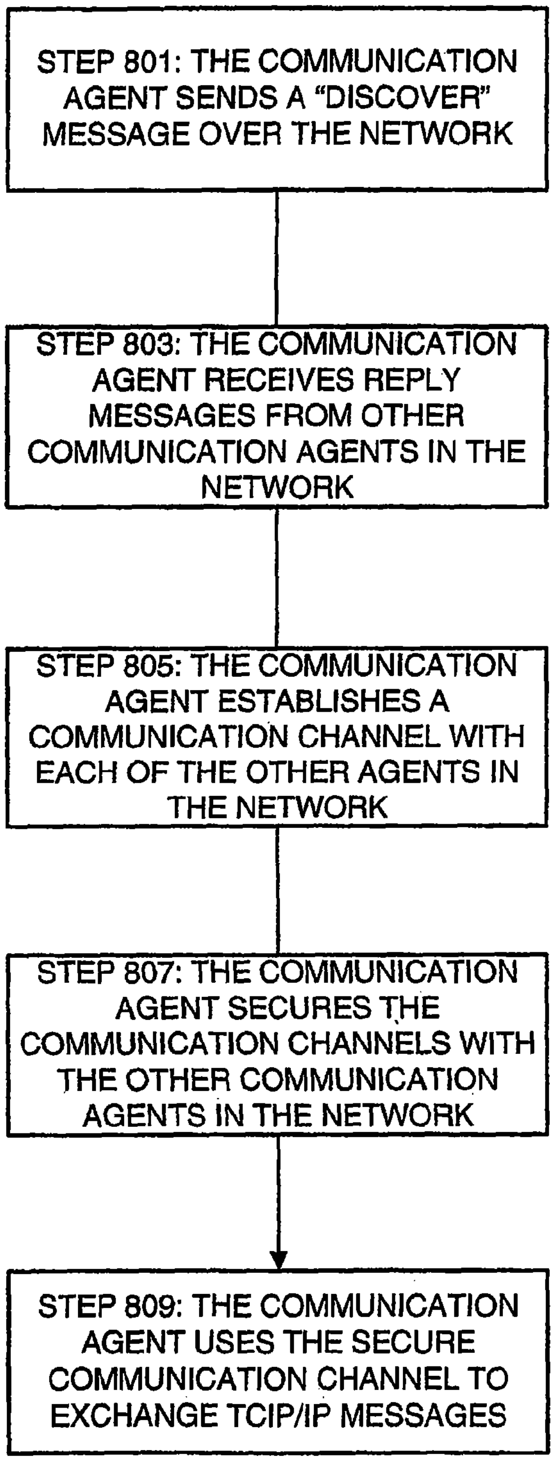
FIG. 8 illustrates a flowchart showing the operation of a communication agent according to various aspects of the invention.

At some point before, during, or after the identification of the devices in the network and the creation of the information data structure, the communication agent module 611 initiates a communication agent in step 707. This communication agent establishes a communication channel with other instances of the network management tool 301. The operation of this communication agent will be described in more detail with reference to the flowchart illustrated in FIG. 8.

Initially, in step 801, the communication agent begins the discovery process by sending out a "discover" message over the network. With various aspects of the invention, the communication agent for each network management tool 301 will listen for network messages through a socket on a particular port. Accordingly, the communication agent will send the "discover" message on the specified port, to ensure that it is received by other communication agents in the network. The message can be, for example, a broadcast message using the universal datagram protocol. By using a broadcast message, the communication agent can ensure that it will be received by every other instance of the network management tool 301 running on the network. Also, with various aspects of the invention, the message is broadcast only over the local area network itself (i.e., it is a directed subnet broadcast).

If the network management tool 301 sending the discover message is the first instance of network management tool 301 running on the network, then the communication agent will not receive a reply to it's discovery message. In this situation, the communication agent will create a trusted association for other, subsequently activated instances of the network management tool 301 to join. For example, in the absence of a reply, the communication agent of the first network management tool 301 will establish the name for the network.

If, however, instances of the network management tool 301 already are running in the network, the communication agents for these tools 301 will send a reply in response to the discovery message. More particularly, the existing communication agent for each network management tool 301 running in the network will send a "present" message to the new communication agent in response to the "discover" message. Thus, in step 803, the new communication agent receives these reply messages from other instances of the network management tool 301 in the network. With various aspects of the invention, a "present" message will specify the responding agent's IP address and the identity of the network node hosting it. For some aspects of the invention, the identification of the network node will be the unique identifier for the computer hosting the agent. The "present" message will also specify a port through which the responding communication agent will conduct future communications. With various aspects of the invention, the "present" message will also be sent as a UDP broadcast message.

Once the new communication agent receives a "present" message from an existing communication agent, the new communication agent uses the information in the "present" message to establish a TCP/IP connection with the existing communication agent. Thus, in step 805, the communication agent establishes a communication channel with each of the other agents in the network. After a communication channel is established with an existing agent, the new communication agent secures the communication channel in step 807. More particularly, the new communication agent sends an identification message to the existing agent. This message will authenticate the identity of the new communication agent to the existing communication agent. The identification message can, for example, use a certificate or public key encryption to authenticate its identity and establish a secure connection with every other communication agent in the network.

In some aspects of the invention, the payload of the message sent between communication agents will be encrypted. The payload is the application defined contents of the message. The encryption of the payload ensures the contents of an inter-agent communication remain private. Further, the payload will contain a digital digest of the message to prevent tampering with the contents of the message.

A communication agent will maintain a list of other agents with which it has established a secure communication channel. This list for example, can be used by the communication to determine if a specific remote computer in the network is running an instance of the network management tool 301. With some aspects of the invention, the list may employ different identifiers for other computers than the unique identifiers employed in the network information data structure. For these aspects, a hash function can be used to hash an existing the identifiers used in the list (e.g., a Windows GUID generated by the GUIDGen utility) to the unique identifiers created by the network management tool 301.

After the communication agents have established a secure communication channel, the channel can then be used to exchange TCIP/IP messages in step 809. With some aspects of the invention, these messages may be text based. A message between communication agents may, for example, include the source node (that is, the unique identifier for the computer sending the message), the destination node (that is, the unique identifier for the computer that should receive the message), and data indicating the type of content included in the message. The message will then also include the desired content, which may be, for example, an encoded binary value.

With some aspects of the invention, the messages may be point-to-point messages sent from one communication agent to one other communication agent. For still other aspects of the invention, the communication agents may send broadcast TCP messages. This messaging technique allows a communication agent to simultaneously send a message to every other communication agent in its list of agents. Advantageously, this messaging technique allows the communication agents to circumvent the conventional UDP protocol limit on message size. Still further, it allows a communication agent to send a message to several other communication agents simultaneously, but limits the message reception to only other communication agents. This type of message may be used, for example, to simultaneously notify other network management tools 301 when a user has selected a resource to share with other computers running an instance of the network management tool 301.

As previously noted and will be described in more detail below, the communication agents use the secure communication channels to synchronize copies of the network information data structure. As will also be described in detail below, a communication agent will send a notification message to other communication agents when specified events occur, such as when a user has instructed the agent's network management tool 301 to share a resource. It should be noted, however, that various aspects of the invention may allow the communication agent to be used by other applications, to thereby facilitate communication between computers in the network.

In addition to establishing communication channels between instances of the network management tool 301, the communication agents may also help to establish an association of trusted instances of the network management tool 301. As previously noted, instances of the network management tool 301 will share information, such as copies of the network information data structure. Members of a trusted association of network management tools 301 may also share one or more resources, such as physical or data resources. It will therefore often be important to limit members of the trusted association to only those instances of the network management tool 301 that are being executed on computers with reliable, trustworthy users that will not interfere with other members of the trusted association. Accordingly, the communication agents may cooperate to ensure that unwanted or untrustworthy computers do not join a trusted association.

For example, with some aspects of the invention, the communication agents may themselves create a trusted association of network management tools 301. In these aspects, the first communication agent running in a network will establish identification information for the trusted association. It also will establish credential information needed to join the trusted association. This first communication agent may, for example, prompt the user to specify a name for the trusted association of network management tools 301 and a password to join the trusted association.

Alternately, the first communication agent may automatically assign an identifier (e.g., the unique identifier for the computer executing the first communication agent) and/or credential information needed to join the trusted association. For example, the communication agent may use the user name and password for the network's gateway (e.g., the network's gateway router) as the name and credential information for the trusted association. With this aspect, the communication agent can confirm the credential information provided by a new instance of the network management tool 301 by checking the provided credential information against the gateway's current name and password. This feature advantageously allows a user to change the credential information required to join a trusted association simply by changing the name and/or password information used to access the network's gateway.

Alternatively, the communication agent may validate credential information against a third party trust service. A trust service takes a credential as input and returns whether or not the credential is valid. Examples of a trust services are AOL's screen name service or Microsoft's passport service. These trust services take a username and password and return where or not the credentials are valid.

Once the trusted association has been established, all subsequently executing instances of the communication agent in the network should provide the credential information to join the trusted association. Typically, this will require the user of the subsequently executing instance of the communication agent to obtain the credential information. Once the user has the association name and credential information, he or she can provide it to the network management tool 301. The communication agent of the network management tool 301 will then provide the credential information to at least one member of the trusted association in order to join the trusted association. This technique advantageously allows a network management tool 301 to establish a trusted relationship with all of the members of the trusted association in a single process.

With some aspects, the communication agent may send the credential information to every communication agent in the trusted association using, for example, a broadcast message. For other aspects of the invention, however, the communication agent may provide the credential information to only a single communication agent that is a member of the trusted association. That member will then relay the identity of the joining network management tool 301 to the other members of the trusted association. This information may be conveyed, for example, by an update to the network information data structure that identifies the computer hosting the joining instance of the network management tool 301 as current member of the trusted association.

With still other aspects of the invention, however, the communication agent may help enforce membership information for the trusted association provided by a user rather than by another communication agent. For example, with some aspects of the invention, the network management application module 307 will provide a user interface identifying all of the devices in the network. When a new computer joins the network, the network management application module 307 may display the new computer in the user interface, and further identify this new computer as a possible "intruder" to the network. If the user determines that the new computer should be trusted, the user can employ the user interface to designate the new computer as trustworthy. Based upon the user's designation of trust, the communication agent will then accept information from the computer as a member of a trusted association. With these aspects, the user may alternately confirm that the new computer is an intruder. For these aspects, the user's communication agent may thereafter refuse to accept communications from that computer.

With various aspects of the invention, the user's indication that a new computer is trustworthy may be conveyed to other members of the trusted association. This technique advantageously allows a new computer to join an established trusted association in a single process. For still other aspects of the invention, however, the user of each instance of the network management tool 301 should personally designate which other computers should be trusted. This technique advantageously allows each user to determine which computers are trustworthy, rather than relying upon the judgment of another user.

Once a communication agent joins a trusted association, it may provide the other members of the association with a public key for encrypted communications. This allows the members of a trusted association to securely communicate with each other, and to prevent unwanted computers from obtaining information regarding the network.

Synchronization of Data Information

As described above, the communication agent module 611 for a new instance of the network management tool 301 creates an instance of a communication agent. The communication agent then establishes a communication channel with other communication agents belonging to network management tools 301 that are members of a trusted association. Once this has been done, in step 711 the information synchronization module 609 uses the communication agent to synchronize the network information data structure with at least one other network management tool 301 in the trusted association running on a remote computer in the network. This process of synchronizing the network information data structure created by a new instance of the network management tool 301 with the network information data structure maintained by a previously existing instance of the network management tool 301.

After the network information data structure has initially been created, the synchronization process will entail synchronizing the entirety of the newly created network information data structure with other instances of the network management tool 301 running on the network. In this process, the new instance of the information synchronization module 609 first sends only local information from its network information data structure to the previously existing instance of the information synchronization module 609 in the remote computer. As used herein, the term "local information" or "local data" refers to information relating to devices that are locally discoverable for the computer hosting the information synchronization module 609. The previously existing instance of the information synchronization module 609 then uses the portion of the network information data structure received from the new instance of the information synchronization module 609 to update its own copy of the network information data structure.

Next, the previously existing instance of the information synchronization module 609 sends the new instance of the information synchronization module 609 all of the non-local data from its copy of the network information data structure. As used herein, the term "non-local information" or "non-local data" refers to information relating to all of the detected devices other than the locally discoverable devices for the computer hosting the information synchronization module 609. The new instance of the information synchronization module 609 uses this received portion of the network information data structure to update its own copy of the network information data structure.

The new instance of the information synchronization module 609 subsequently sends a message to the previously existing instance of the information synchronization module 609 to continue with the complete synchronization process. In reply, the previously existing instance of the information synchronization module 609 sends the local data from its copy of the network information data structure to the new instance of the information synchronization module 609 in the remote computer. The new instance of the information synchronization module 609 then uses the received portion of the network information data structure to update its own copy of the data structure. Finally, the new instance of the information synchronization module 609 sends the previously existing instance of the information synchronization module 609 the non-local data from its copy of the network information data structure. The previously existing instance of the information synchronization module 609 then uses this received portion of the network information data structure to update its own copy of the network information data structure.

In this manner, the new instance of the information synchronization module 609 will synchronize its newly created copy of the network information data structure with another copy of the network information data structure maintained by a previously existing instance of the information synchronization module 609 running on a remote computer in the network. It should be noted that, with some aspects of the invention, an information synchronization module 609 will ignore its own local information received from another computer. That is, the information synchronization module 609 will assume that the information in its own copy of the network information data structure regarding locally discoverable devices will be more accurate than information it receives from another computer. Accordingly, the information synchronization module 609 may simply ignore information from another computer for locally discoverable devices.

As previously noted, an information synchronization module 609 will perform a complete synchronization process for a newly created copy of the network information data structure. It should be noted that, with some aspects of the invention, the information synchronization module 609 also will perform a complete synchronization process after the network management tool 30 I rejoins the network after having been absent from the network. The network management tool 301 will be absent from the network when, or example, the network management tool 301 (or the computer hosting the network management tool 301) is shut down.

While the network information data structure may be maintained in persistent memory while the network management tool 301 is absent from the network, as described above, various features of the network may have changed during that absence. Accordingly, rather than have the information synchronization module 609 attempt to identify any such changes on an individual basis, the information synchronization module 609 may instead simply resynchronize its entire copy of the network information data structure with a current copy of the network information data structure maintained on a remote computer in the network.

Once the network management tool 301 has synchronized its copy of the network information data structure after its initial activation or after rejoining the network following an absence, the information synchronization module 609 may only perform a partial synchronization process for changes in the network. More particularly, after executing the complete synchronization process, the information synchronization module 609 may only synchronize changed information thereafter.

As previously noted, after the data structure creation module 607 has created the network information data structure, it will update the network information data structure as needed to reflect changes in the network. These changes may occur, for example, when the device detection module 601 detects the addition of a device to or the removal of a device from a network, when the device identification module 603 determines new properties for an existing device or properties of a newly added device, or when a user employs a user interface to change, add or delete a property in the network information data structure.

When the data structure creation module 607 receives new data creating a change to the network information data structure, it will first examine the new data to confirm that it actually will lead to a change in the network information data structure. For example, a user may resubmit the existing friendly name for the host computer as a change of the friendly name. While the resubmitted name may be presented to the data structure creation module 607 as a change, it is not actually new data and should be ignored. Once the data structure creation module 607 has confirmed that data submitted to change the content of the network information data structure actually will create a change, it will make the required change to the network information data structure.

At the same time, the data structure creation module 607 will mark the change using, for example, a flag. This type of changed property may be referred to as a "dirty" property. After the data structure creation module 607 has made the change and marked it as a change, it issues a call back to any services or other objects that have requested notification of changes to the network information data structure. Each of these services and objects can then identify the change, and employ the change according to its function. With various aspects of the invention, the information synchronization module 609 will be included in the list of services and other objects receiving notification of a change.

Upon receiving the notice of the change, the information synchronization module 609 will obtain the changed information, and forward it to at least one other information synchronization module 609 in the trusted association running on a remote computer. More particularly, the information synchronization module 609 will send both the name of the object containing the property being changed and the new property.

At the same time, the information synchronization module 609 will send a notification to each communication agent in the trusted network, including its own. This notification message will alert each remote computer receiving the change information to update its copy of the network information data structure based upon the change information. In addition, this notification message will alert each computer receiving the message, including the host computer, to update any processes using information in the network information data structure that was the changed. For example, the network management application module 307 running on the host computer will use this notification message to update any user interfaces displaying data in the network information data structure that has been changed.

As previously noted, the network information data structure may be stored as an extensible markup language (XML) file. Accordingly, when synchronizing all or a portion of the network information data structure, various aspects of the information synchronization module 609 will serialize the necessary data form memory into a structured XML document format. In some embodiments of the invention, the structured XML document can be encoded into binary format so that it can be more readily transmitted over a network connection. More particularly, these aspects of the information synchronization module 609 will examine a map that describes the in-memory representation of the object and its associated properties. The information synchronization module 609 will use this map and its associated metadata to serialize the in-memory representation of the properties into a structured XML document.

Using the same metadata, the information synchronization module 609 will serialize the received binary data back into an in-memory "working copy" of an object represented in the information synchronization data structure. More particularly, the information synchronization module 609 receiving change data for the network information data structure will create another "working" copy for changed objects in the network information data structure. With various aspects of the invention, this "working" copy of the network information data structure will only be a shell, with garbage property information.

The information synchronization module 609 will then enter the changed XML data back into the appropriate locations of the "working" copy of the network information data structure, flagging the changed properties as "dirty." Once this process is completed, the information synchronization module 609 will then clone the flagged property information from the working copy of the network information data structure into actual copy of the network information data structure used by the network management tool 301. By using this process, communication interruptions during the synchronization process will not corrupt the data in the actual copy of the network information data structure.

With various aspects of the invention, both the complete and partial synchronization processes will be performed on a master-slave basis. Using this technique, a single instance of the network management tool 301 in the trusted association (or some particular subset of the trusted association) will be responsible for providing change data for the network information data structure to all of the other instances of the network management tool 301 in the trusted association (or particular subset thereof). Thus, if a user changes the content of network information data structure on a first instance of the network management tool 301, that instance will synchronize the changes with the master instance of the network management tool 301. The master instance of the network management tool 301 will then synchronize that change with every other instance of the network management tool 301 in the trusted association (or particular subset of the trusted association).

With still other aspects of the invention, the network information data structure may be synchronized on a peer to peer basis. For example, an instance of the network management tool 301 may individually synchronize change data with every other instance of the network management tool 301 running in the network. Alternately, an instance of the network management tool 301 may synchronize change data with another instance of the network management tool 301, which in turn will then synchronize that change data with yet another instance of the network management tool 301, until every instance of the network management tool 301 in the trusted association has received the change data. With any such peer-to-peer synchronization technique, the synchronization order can follow any desired arrangement. For example, the order in which the network management tools 301 are synchronized to receive change data may follow the value of each host computer's unique identifier, from highest to lowest or vice versa.

When synchronization is performed on a peer-to-peer basis, an information synchronization module 609 updating its copy of the network information data structure normally will use a property's time stamp information during the synchronization process. More particularly, it will compare the time stamp information of the newly presented change property value with the time stamp information for the existing property value, to determine if the change property value is more recent. If change property value is older than the existing property value, the information synchronization module 609 will simply ignore the change property value and leave the existing property value unchanged.

It should be noted, however, that the time stamp information may be omitted when the network management tool 301 synchronizes using the master-slave technique. Because the master instance of the network management tool 301 will be responsible for consistently synchronizing all corresponding slave instances of the network management tool 301, the master instance of the network management tool 301 will be able to determine which property value in a synchronization process is the most recent.

When the time stamp information is employed, however, each time stamp value is generated for a local copy of the network information data structure based upon a local clock value. Accordingly, if two computers hosting an instance of the network management tool 301 have different clock times, their time stamp information cannot be accurately compared.

To address this concern, various aspects of the invention may normalize the time stamp information so that it can be accurately compared among different host computers. For example, some aspects of the invention may subtract the current clock value from a time stamp value before sending the time stamp value to another instance of the network management tool 301 during a synchronization process. The instance of the network management tool 301 receiving this modified time stamp value will then add the current value of its own clock before comparing the received time stamp value with the time stamp value for an existing property. If the delay in sending the modified time stamp value is not too large, this technique ensures that any offset between the clocks of different host computers are accounted for during the synchronization process.

The Network Management Application Module

As noted above, the network management application module 307 coordinates the operation of the gateway service module 303 and the network management services service module 305. In addition, the network management application module 307 provides one or more user interfaces to a user of the network management tool 301. Accordingly, the operation of the network management application module 307 will now be described in more detail with regard to FIGS. 22-29.

When the network management tool 301 is first initiated, the network management application module 307 may provide the user with a user interface requesting a "friendly name" for the computer hosting the network management tool 301. For example, the network management application module 307 may provide the user interface 2201 shown in FIG. 22. As seen in this Figure, the user interface 2201 provides a short description 2203 of the services provided by the network management tool 301. The user interface 2201 will also include a field 2205 in which the user may enter a desired "friendly name" for the host computer. With various aspects of the invention, the network management application module 307 may automatically generate a proposed "friendly name" based upon information obtained from the host computer.

It should be noted that, with some aspects of the invention, the network management tool 301 may automatically start each time that the host computer is activated. With still other aspects of the invention, the network management tool 301 may postpone initiation until after a preset condition is met. For example, some aspects of a network management tool 301 according to the invention may be provided to a user through an Internet service provider (ISP). With these aspects, the ISP may wish to postpone initiating the first initiation of the network management tool 301 until after the user has configured the host computer to obtain Internet access through the ISP. With these aspects, the network management tool 301 may thus first implement the services of the gateway service module 303 before taking any other action. The network management tool 301 may then postpone any other activity until the gateway service module 303 has identified a properly configured gateway 235 providing a connection to the internet through the ISP.

After the user has selected a "friendly name" for the host computer, the network management application module 307 will then call for the services of the gateway service module 303. After the gateway service module 303 has detected a gateway device providing a connection to the internet (or to another external network), the network management application module 307 will then initiate the operation of the network management services module 305 to detect and identify devices in the network. As described in detail above, the network management services module 305 will also create a network information data structure, and attempt to establish a communication channel with other instances of the network management tool 301 running in the network.

Figure 23:
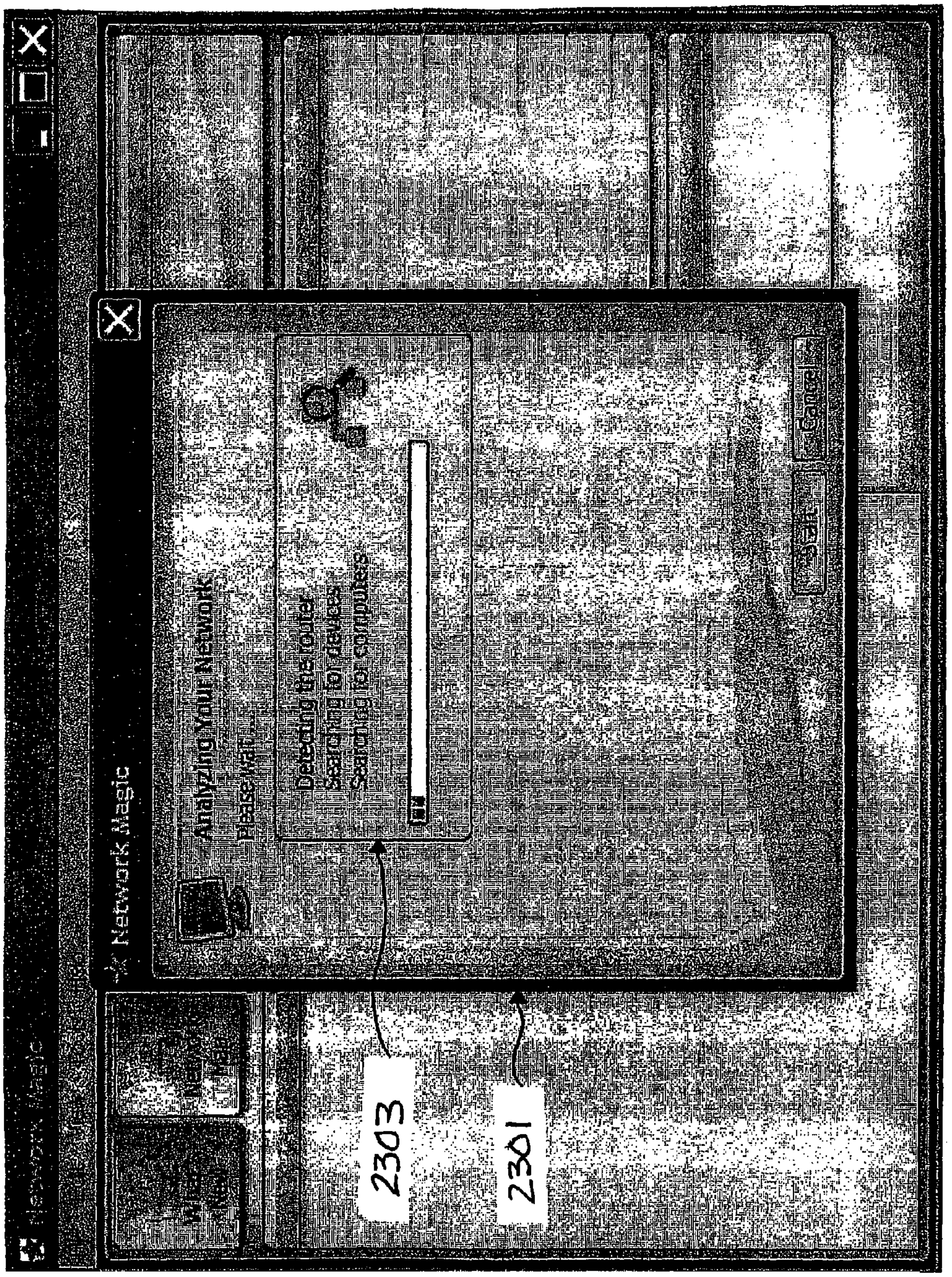
Figure 24:
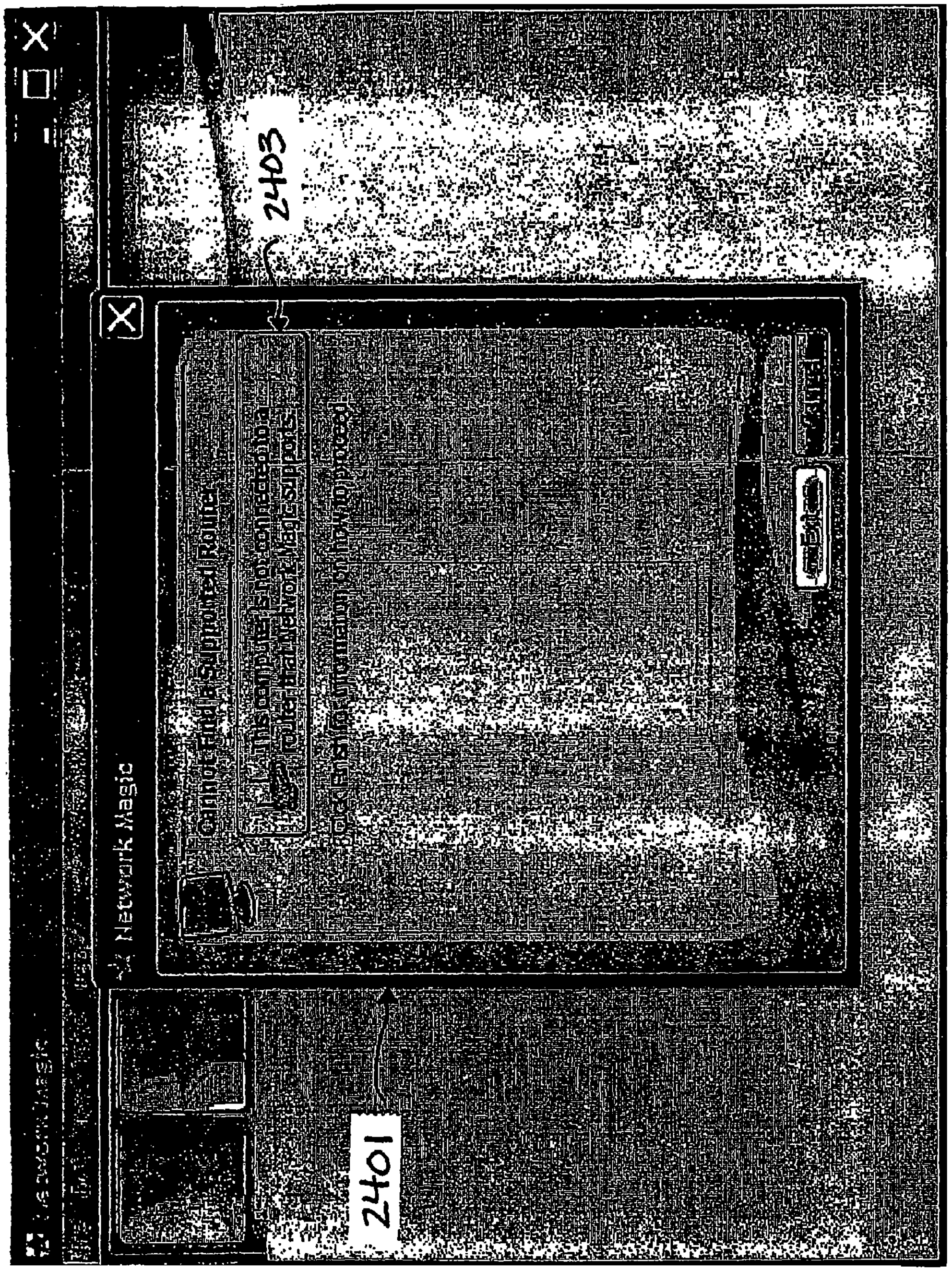
Figure 25:
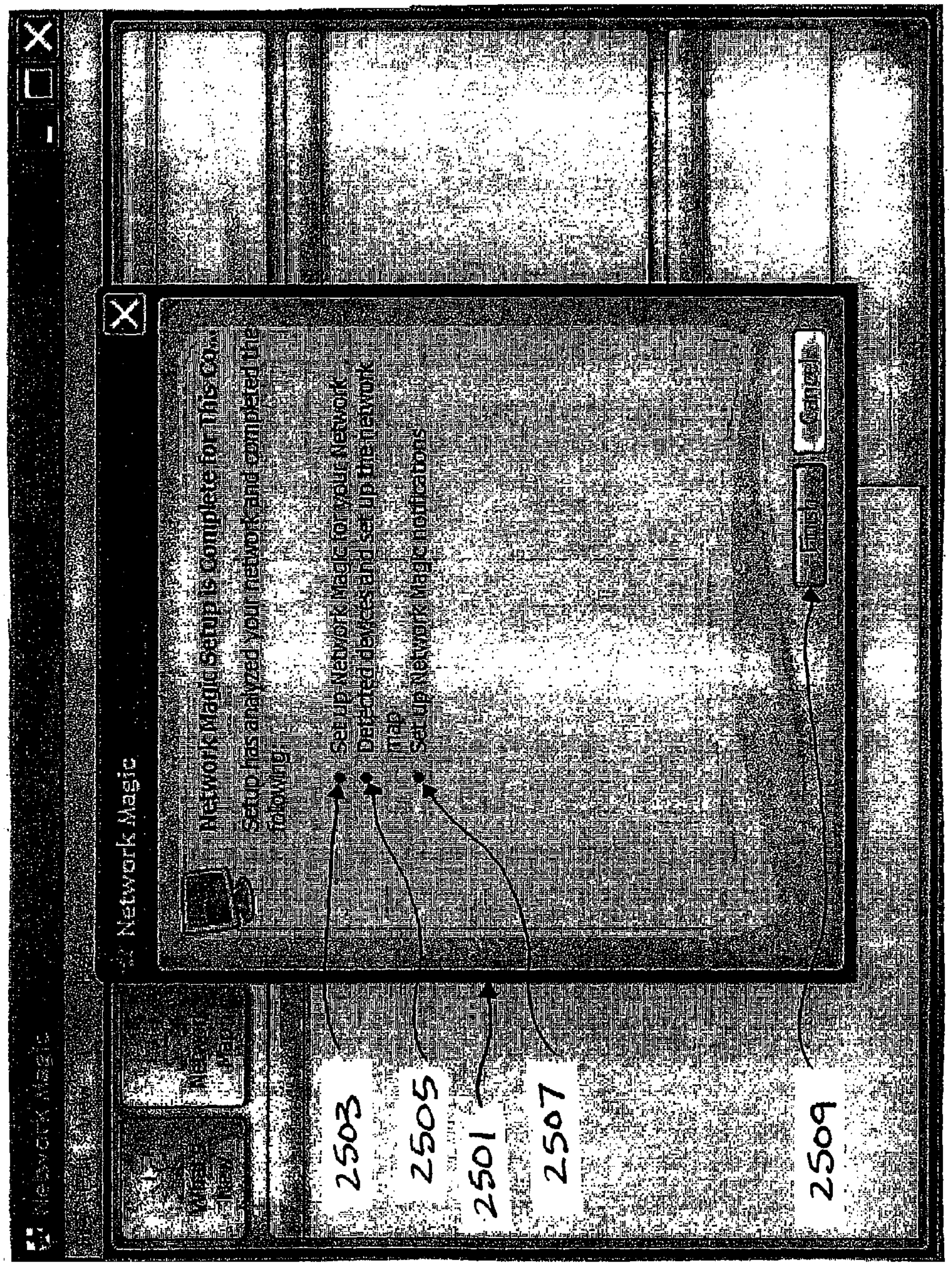
Figure 26:
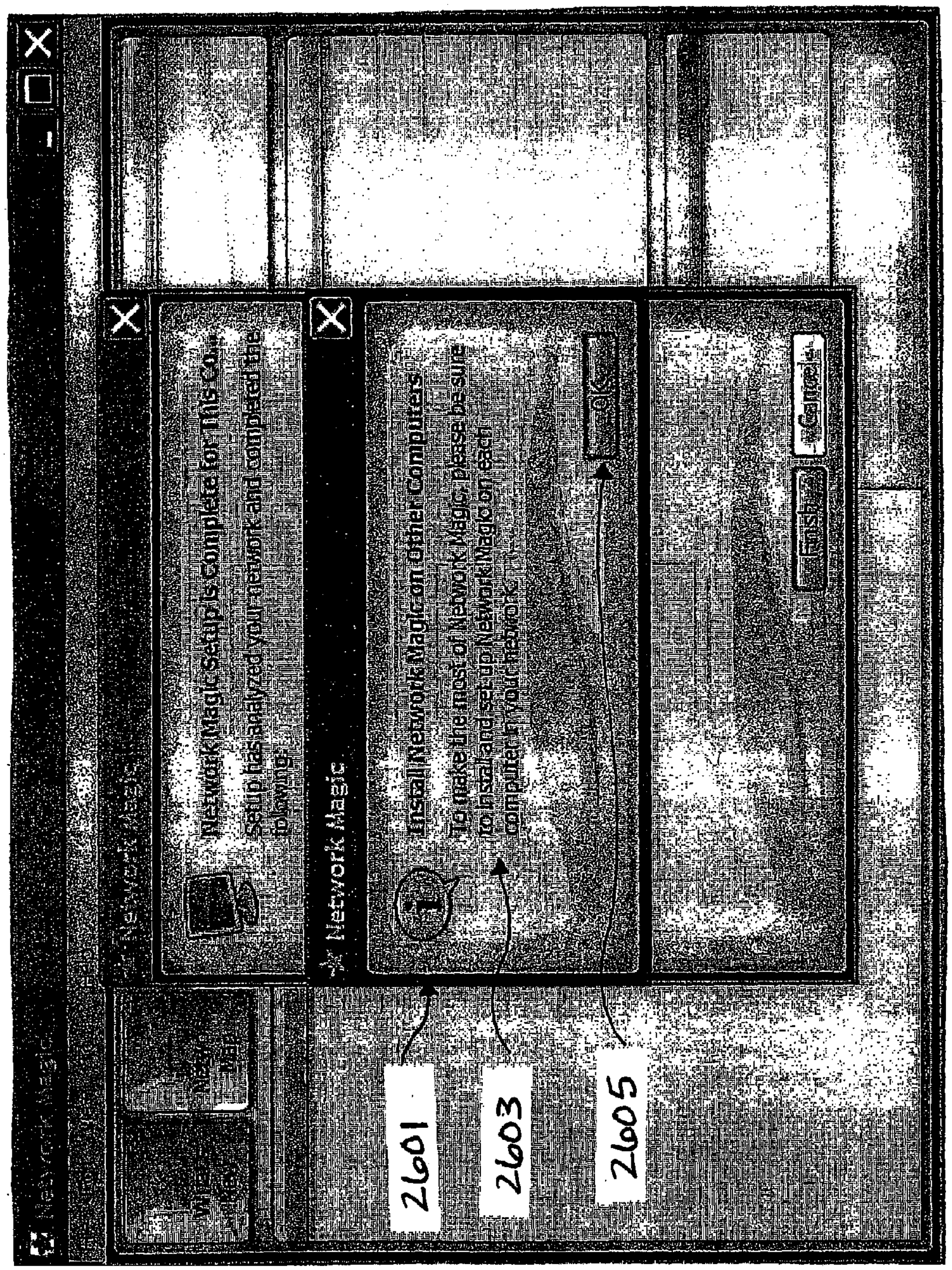

While the gateway service module 303 and the network management services module 305 are operating, the network management application module 307 may provide the user with the interface 2301 shown in FIG. 23. As seen in this figure, the interface 2301 displays a task status message 2303 indicating the task currently being performed by the network management tool 301.

If the gateway service module 303 is unable to detect a gateway device 235 with a connection to the Internet or other external network (or if the network management tool 301 cannot locate a driver to support a gateway device 235 detected by the gateway service module 303), then the network management application module 307 may display a user interface alerting the user of this problem. For example, various aspects of the network management application module 307 may display the user interface 2401 shown in FIG. 24. As seen in this Figure, the interface 2401 includes a brief message 2405 indicating that the host computer is not connected to a gateway device supported by the network management tool 301.

If, however, the network management tool 301 is able to successfully detect a useable gateway device 235, detect and identify devices on the network, and construct a network information data structure containing properties relating to these devices, then the network management application module 307 may display a user interface informing the user of the successful operation of the network management tool 301. For example, the network management application module 307 may display the user interface 2501 shown in FIG. 25. As seen in this figure, the interface 2501 includes a message 2503 that the network management tool 301 has been successfully initiated on the host computer. It may also include a message 2505 indicating that the network management tool has detected various devices on the network, constructed a network information data structure containing properties for those devices, and then created a graphical map of the network based upon the properties contained in the network information data structure. Still further, the interface 2501 may include a short message confirming that the network management tool 301 has configured various notification functions, which will be described in more detail below. Once the user has reviewed the messages 2503-2507, and any other messages provided in the interface 2501, the user can dismiss the user interface 2501 by, for example, activating a command button 2509 included in the interface 2501.

With some aspects of the invention, the network management application module 307 may then prompt the user to install copies of the network management tool 301 on other computers in the network. For example, the network management application module 307 may display a user interface 2601 recommending that the user install a copy of the network management tool 301 on each computer in the network. Once the user has read the message 2603, the user can dismiss the user interface 2601 by activating the command button 2605.

Still other aspects of the invention may provide the user with more proactive options for installing copies of the network management tool 301 on other computers in the network. For example, some aspects of the invention may provide a user interface with commands for sending a copy of the network management tool 301 to a remote computer, and then creating a task for the remote computer to subsequently install and initiate the received copy of the network management tool 301. More particularly, these aspects of the invention may provide the user with a command for selecting a remote computer in the network. Once the user has selected a desired remote computer, the network management tool may then send a copy of itself to that remote computer using, for example, TCP/IP communications. The network management application module 307 may then additionally obtain credential information from the user (or other available source) required to create a task on the remote computer. Using these credentials, the network management application module 307 will then create a task on the remote computer, instructing it to install and initiate the received copy of the network management tool 301. In this manner, a user may conveniently install the network management tool 301 on any computer in the network for which the user is authorized to manage.

After the user has received and dismissed any notifications regarding the initiation and setup of the network management tool 301, the network management application module 307 may then provide a user interface that graphically displays a map of the network using the information contained in the network information data structure stored on the host computer. One example of such a user interface 2701 is shown in FIG. 27. As seen in this figure, the interface 2701 may include a task bar 2703, network status display area 2705, a selection display area 2707, a main display area 2709, and at least one secondary display area 2711.

The task bar 2703 provides titles for command menus, such as a "File" command menu, an "Edit" command menu, a "View" command menu, a "Tools" command menu, and a "Help" command menu. As known in the art, each of these menus will provide various commands and sub commands that the user may employ to perform various functions or view various information related to the network management tool 301. The use of such a task bar 2703 is conventionally known, and thus will not be described here in further detail.

As will be described in further detail below, the main display area 2709 will display various information related to the network and devices on the network. For example, in FIG. 27A, the main display area 2709 shows a topographical map 2721 of the devices in the network detected by the network management services module 305. The selection display area 2707 then displays command objects, such as buttons, by which a user can control the information displayed by the network management application module 307. For example, in FIG. 27A, the selection display area 2707 includes a new information selection button 2713, a network map selection button 2715, a shared folders selection button 2715, and a printer manager selection button 2719. Further, in this figure, the network map selection button 2715 is activated. In response, the network management application module 307 displays the network map 2721 in the main display area 2707.

As seen in this figure, the network map includes an icon 2723 representing the Internet. As will be appreciated by those of ordinary skill in the art, various aspects of the invention may use the same or similar icon to represent another type of external network, such as an Internet. The map of 2721 also includes an icon 2725 representing the gateway device providing the connection between the network and the internet. During the device identification process, the network management services module 305 identified the gateway device as a Linksys wireless router. This identification name was then included in the data object corresponding to the gateway device. Accordingly, the icon 2725 representing the gateway device obtains the name of the device from the network information data structure, and displays it beneath an image corresponding to the identified device.

The map 2721 also includes an icon 2733 corresponding to the computer hosting the network management tool 301, and an icon 2729 representing an unknown device in the network. Again, because the network management services module 305 identified the host computer as a laptop, an image corresponding to a laptop computer is displayed in the icon 2727. Also, the friendly name of the computer selected when the user first initialized the network management tool 301 is displayed below the laptop image. With regard to the icon 2729, because the identity and type of this device is unknown, the icon includes a generic box with a question mark, to indicate to the user that the corresponding device has not been identified. Further, the device has been given the title "unknown" in the icon 2729.

In addition to an icon representing each detected device in the network, the map also includes connection indications 2731 and 2733 to graphically display for the user topological connections between the devices in the network. For example, a connection indicator 2731 is located between the internet icon 2723 and the gateway device icon 2725 to visually indicate to the user that the gateway device is connected to the internet. Further, a connection indicator 2731 is positioned between the gateway icon 2725 and the unknown device icon 2729, to graphically indicate to the user that a network connection exists between the gateway device and the unknown device. Similarly, a connection indicator is provided between the gateway icon 2725 and the laptop computer icon 2733 to likewise indicate that the laptop computer (i.e., the host computer) is connected to the gateway device. In addition to representing connections between devices, the connection indicators 2731 and 2733 may further graphically show the type of connection between devices. For example, the connection indicator 2731 is a straight line, indicating that the represented connection is a wired connection. The connection indicator 2733, on the other hand, is a series of concentric arcs, indicating that the represented connection is a wireless connection.

The secondary display area 2709 is used to display more detailed information regarding an item selected in the main display area 2707. For example, in FIG. 27, the laptop icon 2727 (representing the host computer) is selected, as indicated by a dark-lined box surrounding the images in the icon. In response, the network management application module 307 causes the user interface 2701 to display two secondary display areas 2709*a* and 2709*b*. The first secondary display area 2709*a* is entitled "details," and displays various information relating to the host computer selected in the main display area 2707. For example, the secondary display area 2709*a* includes an entry 2737 listing the version of the network management tool 301 running on the host computer. It also includes an entry 2739 indicating the name of the host computer, an entry 2741 indicating the signal strength at which the host computer is maintaining the wireless connection to the gateway device, and an entry 2743 indicating the adapter used to establish the connection with the gateway device.

Figure 27A:
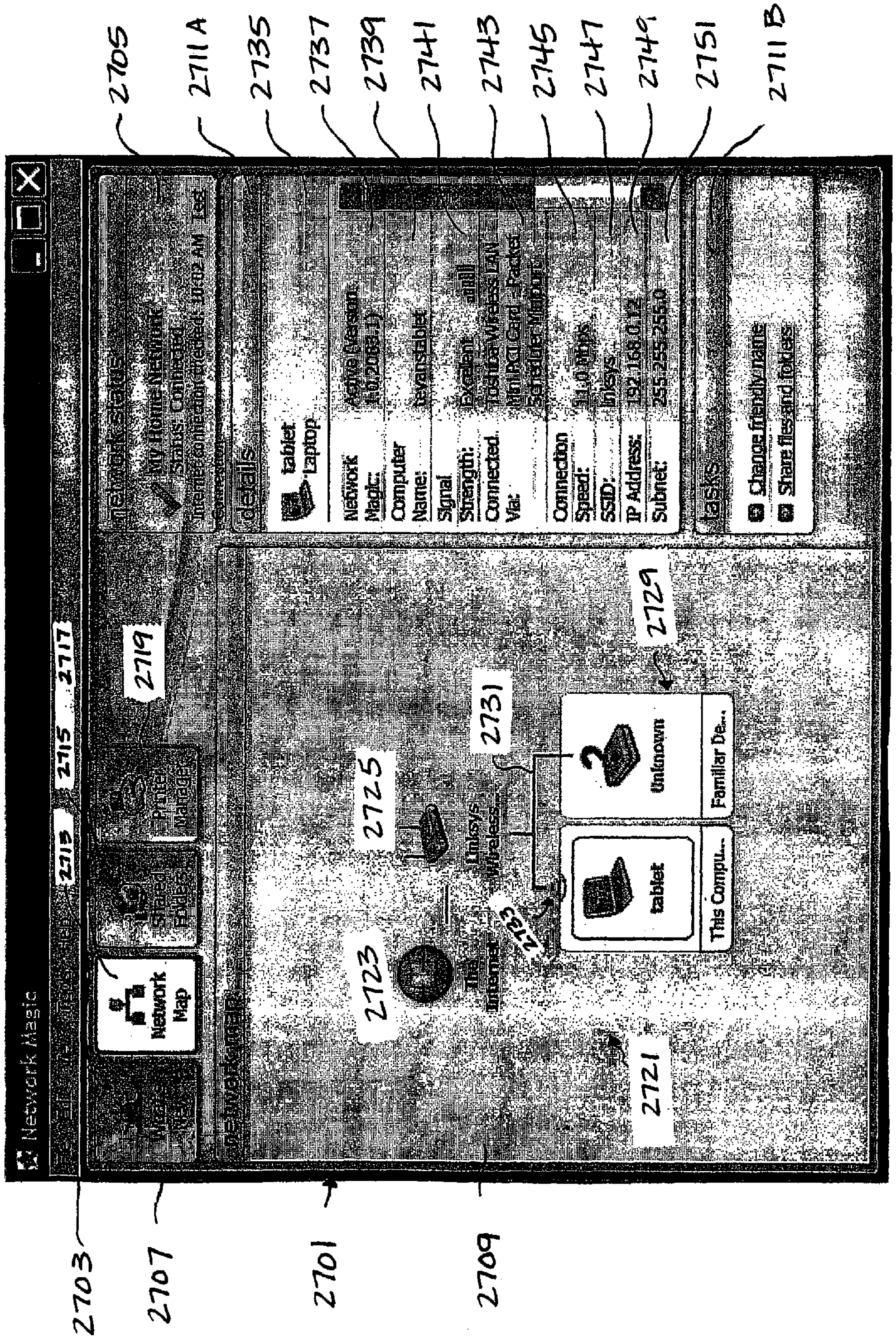
Figure 27B:
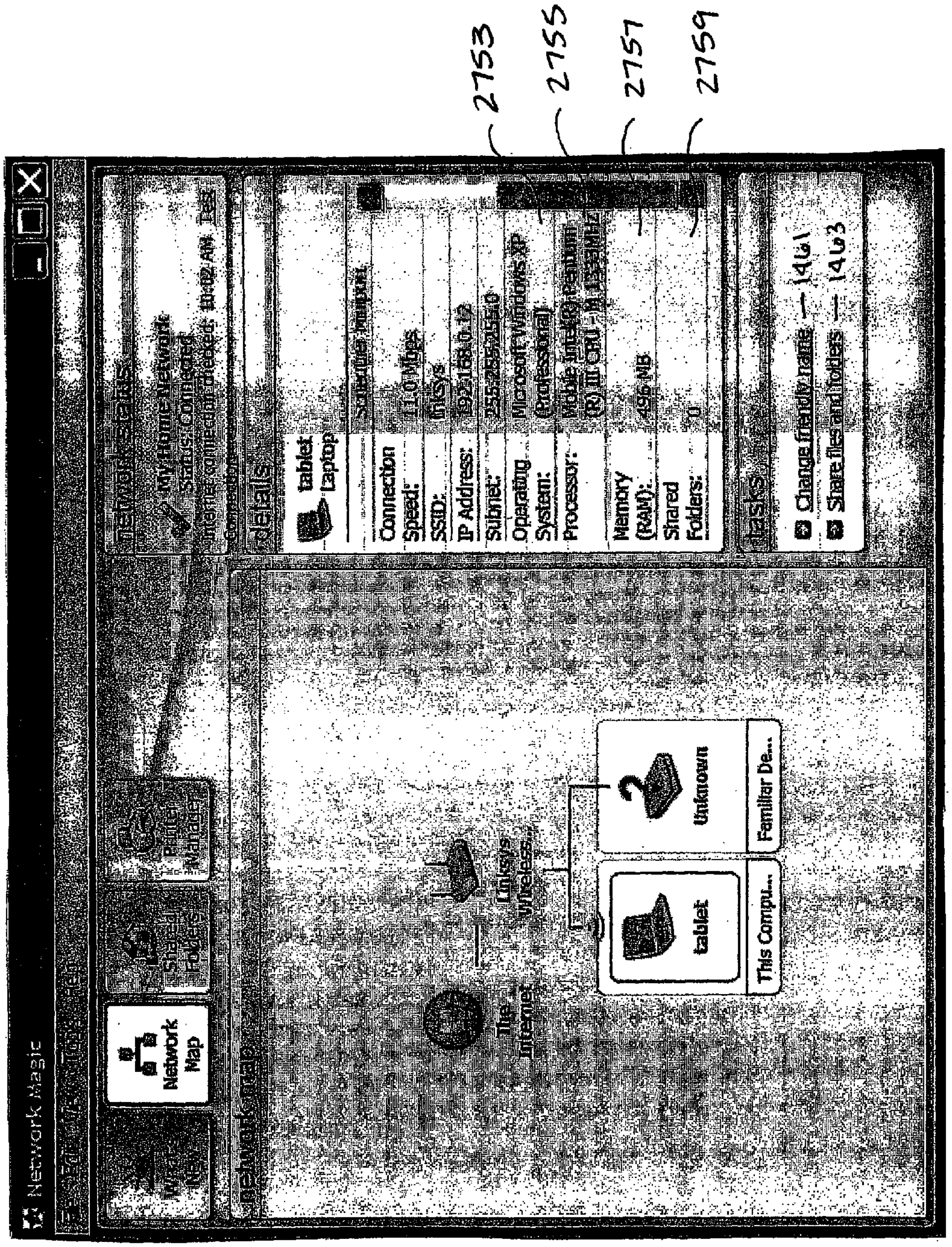

Still further, as shown in FIG. 27*b*, the secondary display area 2709 also includes an entry 2745 showing the connection speed between the selected computer and the gateway device, an entry 2747 showing the SSID identification of the gateway device being used by the host computer, an entry 2749 showing the IP address of the host computer, and an entry 2751 showing the subnet address of the host computer. As shown in FIG. 27*b*, the secondary display area 2709 also includes an entry 2753 indicating the operating system currently employed by the host computer and an entry 2755 indicating the type of processor being used by the selected computer. Still further, it includes an entry 2757 showing the amount of memory on the selected computer, and an entry 2759 indicating the number of folders on the selected computer that have been shared with other devices in the network through the network management tool 301.

From the foregoing description, it will be apparent that much of the information displayed in the secondary display area 2709 will be obtained from the data object in the network information data structure corresponding to the selected device. Additional information may be obtained, where possible, directly from the selected device. Also, it should be noted, that while a particular combination of device properties are displayed in the illustrated example of the secondary display area 2709, various aspects of the invention may alternately display any desired combination of properties relating to a selected item in the main display area 2707.

As previously noted, the user interface 2701 also includes another secondary display area 2709*b*. As shown in FIGS. 27*a* and 27*b*, the title of this secondary display area is "tasks." The secondary display area 2709*b* then includes instructions for performing various tasks associated with the object selected in the main display area 2707. For example, as previously noted, the laptop computer 2727 (corresponding to the host computer) is selected in the network map 2721 shown in the main display area 2707. Accordingly, the secondary display area 2709*b* includes a command 2761 to change the "friendly name" of the selected device. The secondary display area 2709*b* also includes a command 2763 to share files on the selected device with other devices in the network, as described in detail above.

Figure 28:
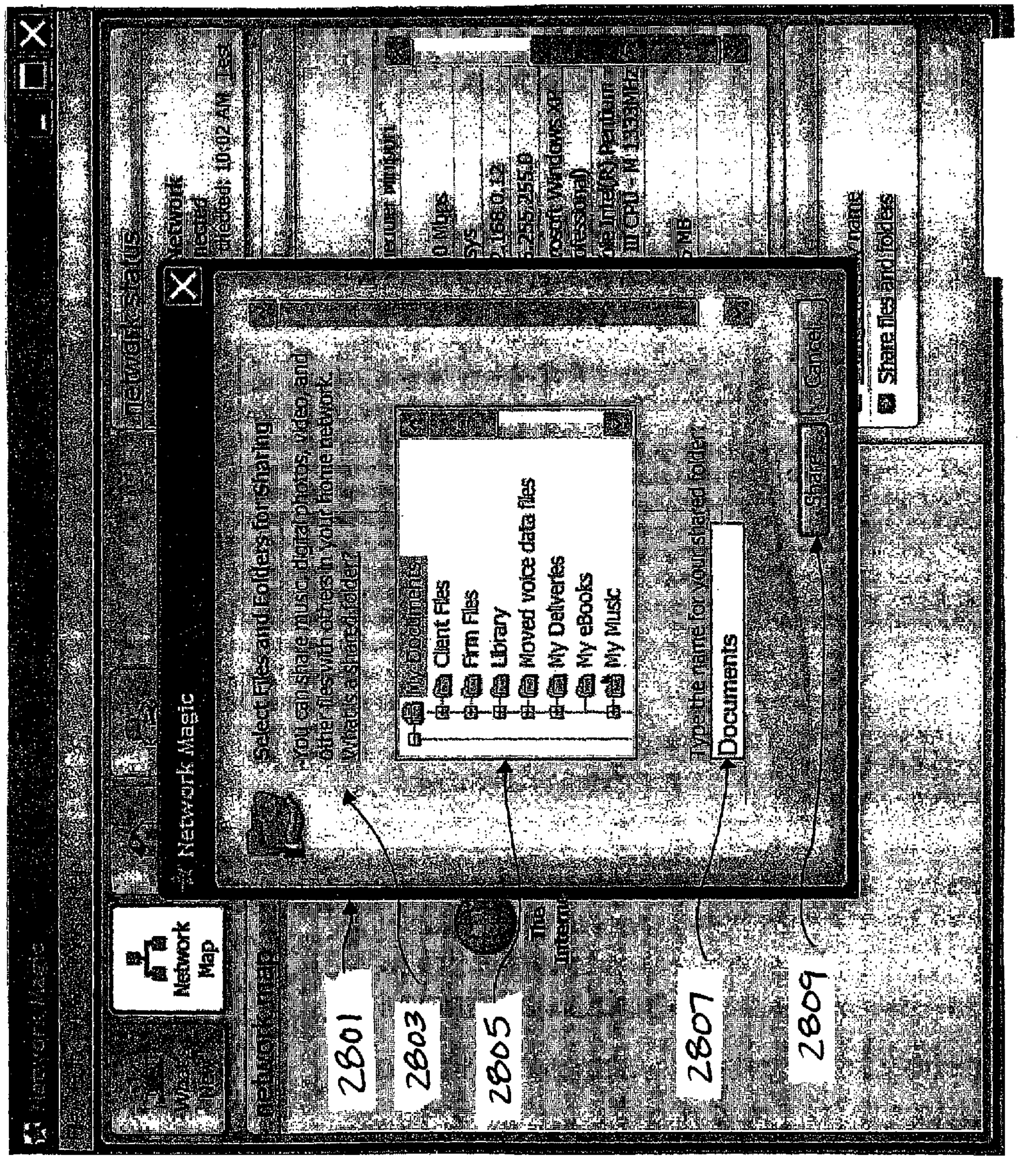

For example, if the user selects the command 2763 to share files and folders maintained by the computer represented by the selected icon in the network map 2721, the network management application module 307 may display a user interface for selecting files and folders to be shared, such as the user interface 2801 shown in FIG. 28. As seen in this figure, the user interface 2801 includes a brief description 2803 of the purpose of sharing files and folders. It also includes a control 2805 with a tree diagram of the file and folder directory for the computer represented by the selected icon in the network map 2721. Using this control 2805, a user may browse through and select one or more files or folders to be shared with other computers in the network. The user interface 2801 also includes a control 2807, which a user can employ to designate a title for the shared folder. Once the user has selected one or more desired files and folders to share, and specified the name for the shared folder, the user can activate the control button 2809 to initiate the sharing process.

In response to the user activating the command button 2809, the network management application module 307 will share information designated by the user in the interface 2801 through the network management services module 305. More particularly, the network management application module 307 will provide the relevant information needed to share the selected files and folders, such as their directory pathways, file size, and the like, to the network information service module 305. The network management application module 307 will also provide the name of the shared folder to the network management services module 305.

Upon receiving the shared information from the network management application module 307, the network management services module 305 updates the network information data structure to include the shared information designated by the user. More particularly, the network management services module 305 will create a "shares" property in the data object corresponding to the device selected through the network map 2721. This new "shares" property will contain the share information provided by the network management application module 307. The network management services module 305 will then synchronize this updated information with other instances of the network management tool 301 running in the network, as previously described. In addition, the network information service module 305 will fire an event to all of the instances of the network management tool 301 running in the network through the communication agent, as also previously described. This event message will inform every instance message of the network management tool 301 in the trusted association of the update to the network information data structure. In response, each instance of the network management application module 307, including the instance displaying the user interfaces 2701 and 2801, will update its user interfaces to reflect this new information.

In addition, various aspects of the network management application module 307 may provide a notification service. With this service, the network management application module 307 will display a corresponding user interface when an event message is received. More particularly, when an event message is received indicating that an instance of the network management tool 301 running on the network has detected a new device, the network management application module 307 will create a user interface reflecting this new information. For example, the user interface may simply state that a new device has been detected. Similarly, when the network management application module 307 receives an event message indicating that an instance of the network management tool running in the network has shared a resource, such as a data resource or a physical resource, then the network management application module 307 will create a user interface to alert the user of the newly-shared resource. With various aspects of the invention, these notification user interfaces may appear for only a short period of time, so as not to interfere with the user's interaction with other interfaces. Also, various aspects of the invention may allow a user to disable the notification feature of the network management tool 301.

Figure 29:
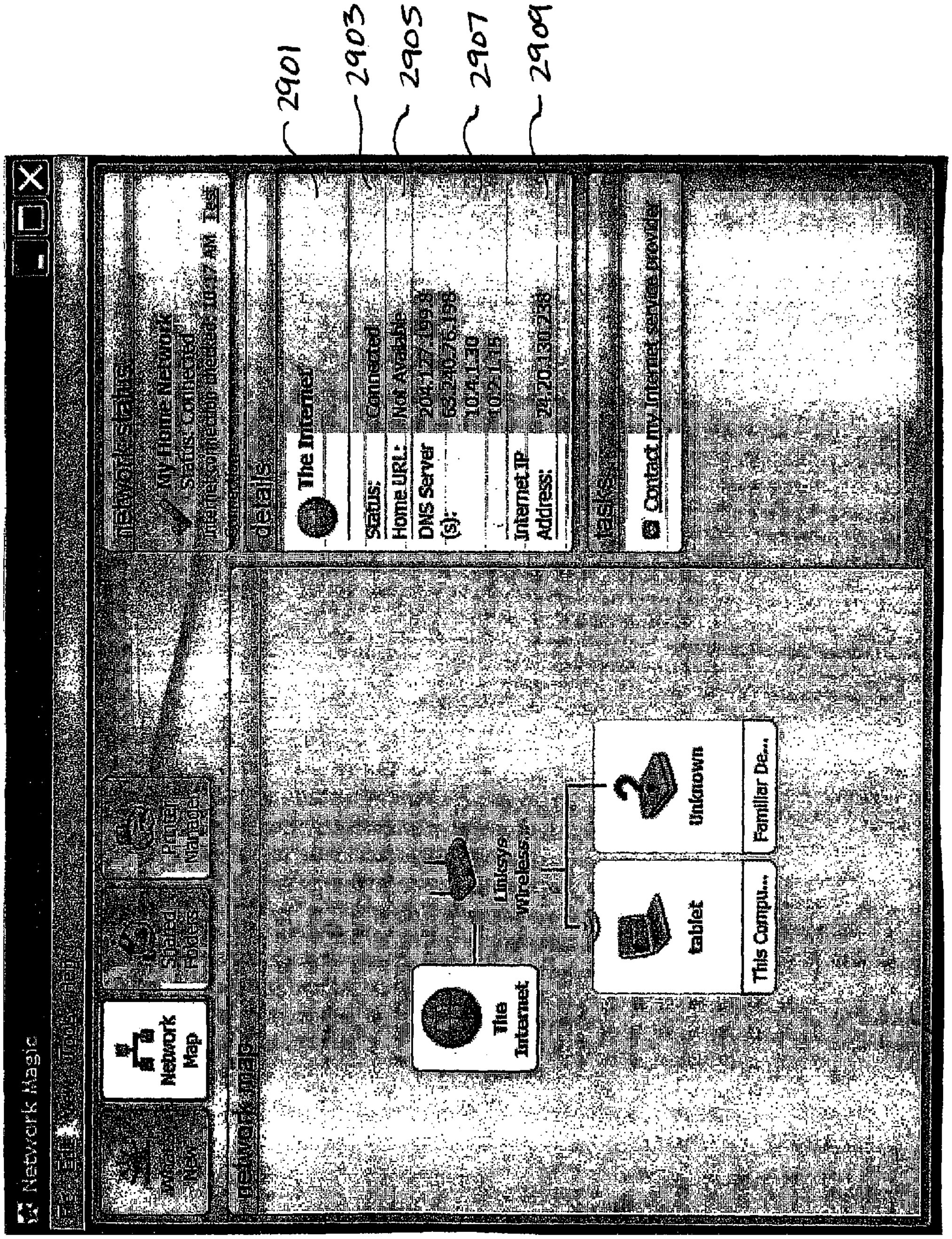

Turning now to user interface 2701, a user can select an icon representing any device in the network map 2721 using, for example, a pointing device such as a mouse or stylus, or any other suitable input device. For example, as illustrated in FIG. 29, the Internet icon 2723 has been selected. In response to this selection, the secondary display area 2709*a* displays the properties of the selected device. Because the selected device is a virtual device (i.e., an external network connection), the secondary display area 2709*a* will display fewer properties for the selected device than for the previously selected host computer. For example, as seen in this figure, the secondary display area 2709*a* will include an entry 2901 with the title of the device, an entry 2903 indicating the status of the selected device, and an entry 2905 indicating a home universal resource locator (URL) at which a web page for the device may be obtained, if available. The secondary display means 2709*a* also includes an entry 2907 listing the IP addresses associated with a DNF server implemented by the selected device, and an entry 2909 indicating the internet IP address for the device.

Similarly, the secondary display area 2709*b* typically will display fewer tasks for a virtual device corresponding to an outside network connection than for the previously-described host computer. For example, in the illustrated aspect, the secondary display area 2709*b* includes a single command to instruct the network management tool 301 to connect to the internet service provider maintaining that internet connection. Activating this command may, for example, cause a web browser on the host computer to display a web page provided by the internet service provider. Again, the information displayed in the secondary display means 2709*a* and used to execute the tasks shown in the secondary display means 2709*b* will be obtained from the network information data structure maintained by the network management services module 305.

Figure 30:
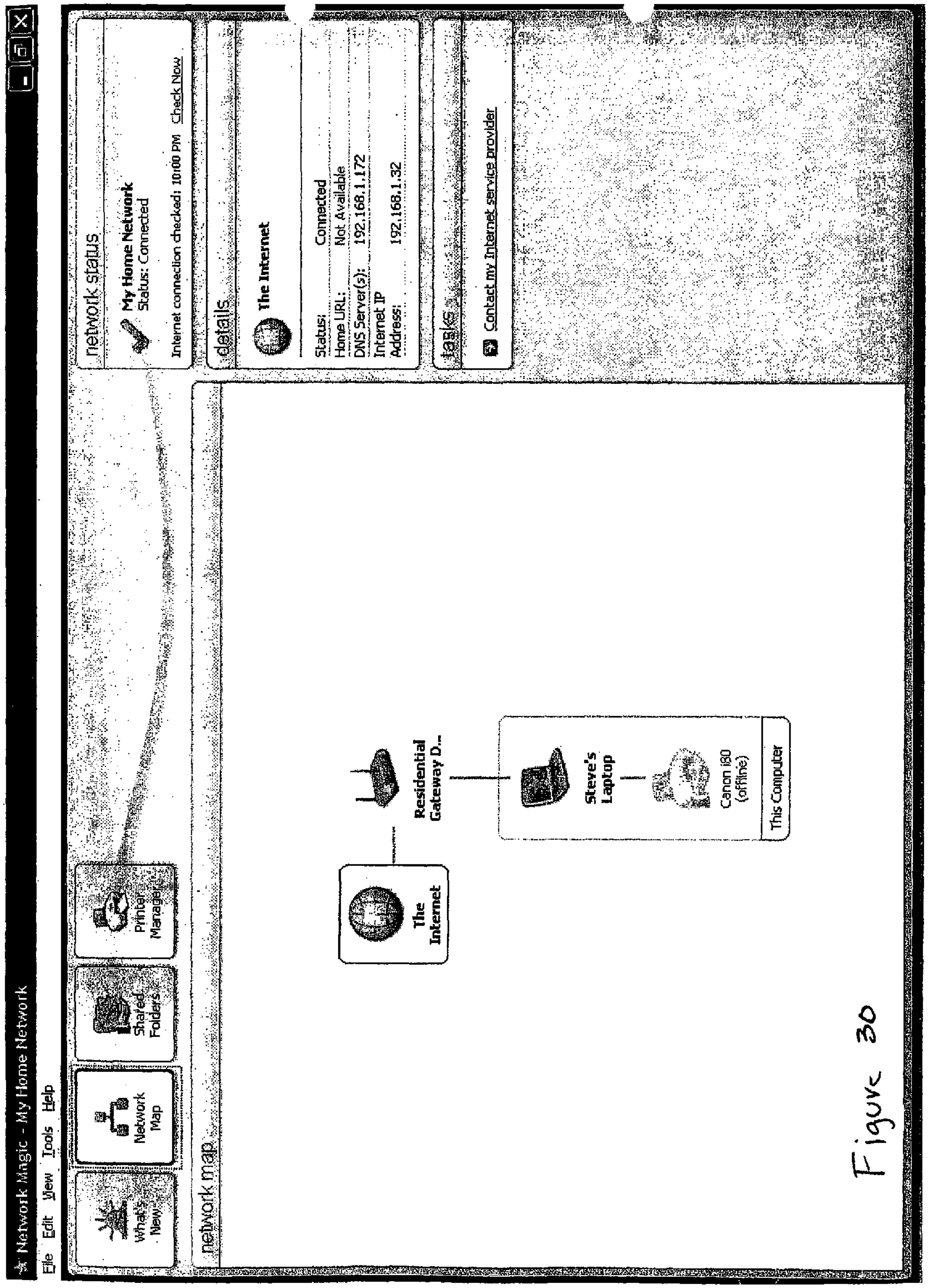
FIG. 30 illustrates an example of a network map that may be presented according to various embodiments of the invention.

FIG. 30 illustrates another example of a network map that may be presented according to various embodiments of the invention. As seen in this figure, the map display icons representing a laptop computer connected to a residential gateway, which in turn is connected to the Internet. The map also displays an icon representing a printer device. In this figure the printer device is shown as being off-line. As also seen in this figure, the user has selected the icon representing the Internet in the primary display area. Accordingly, the secondary display areas display information related to the Internet node for the network.

Figure 31:
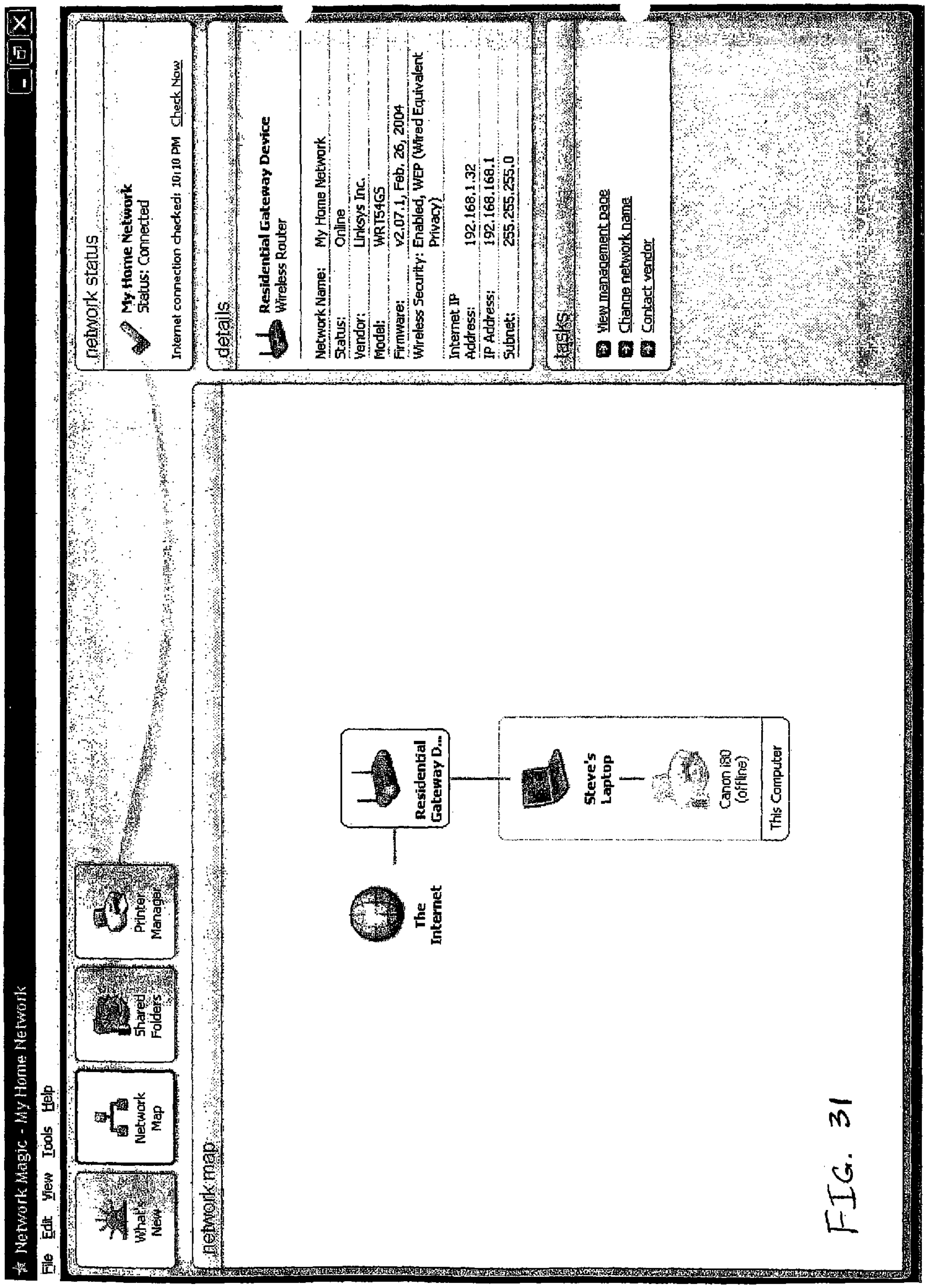
FIG. 31 illustrates the network map shown in FIG. 30 showing that a user has selected the icon representing the gateway device for the network.

FIG. 31 illustrates the same network map, but in this figure the user has selected the icon representing the gateway device for the network. Accordingly, the secondary display areas display information relating to the gateway device, such as status information for the gateway device and tasks that can be executed on or for the device.

Figure 32:
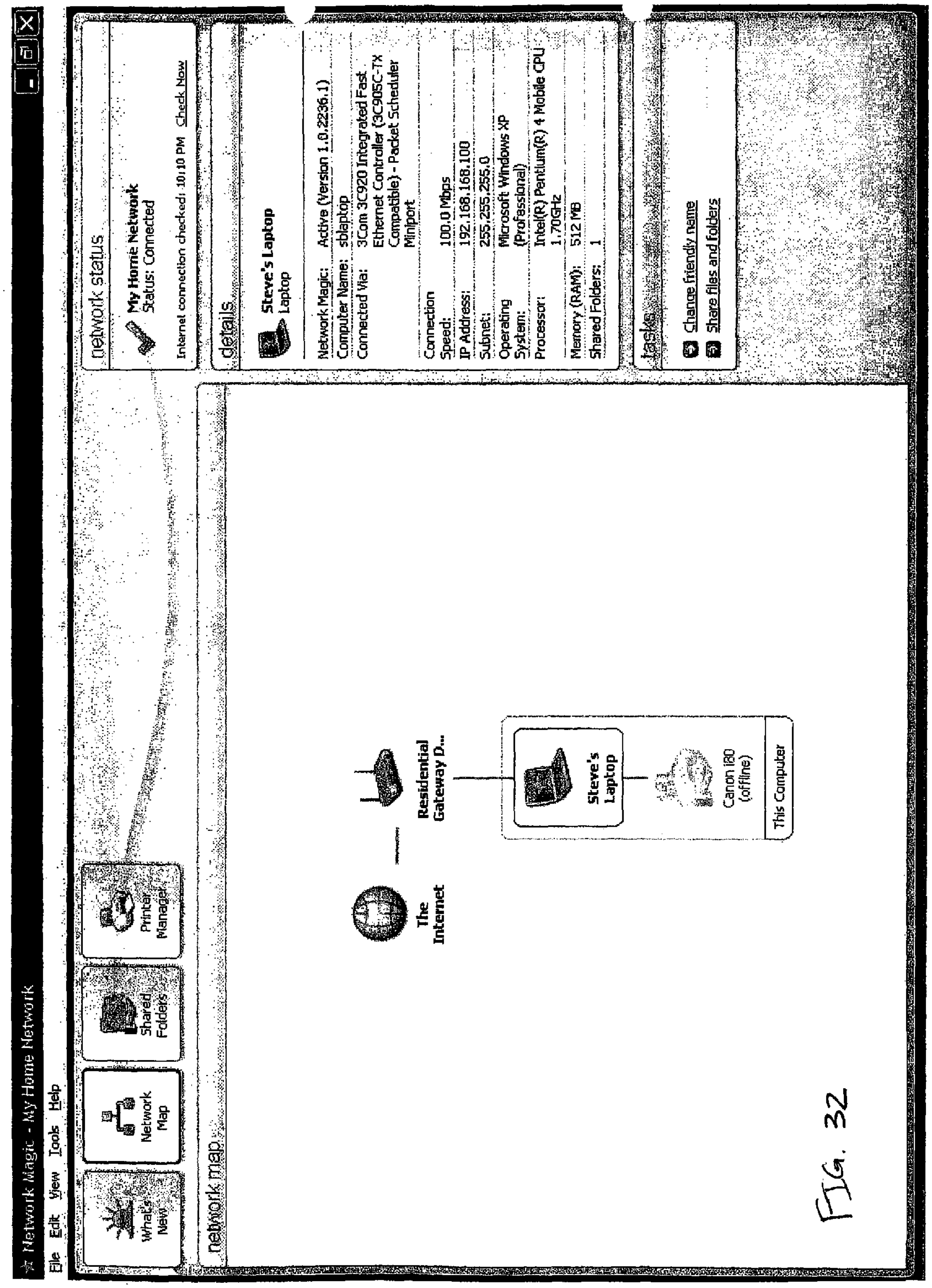
FIG. 32, illustrates the network map shown in FIG. 30 showing that a user has selected the icon representing the laptop computer device.

Turning now to FIG. 32, in this figure the user has selected the icon representing the laptop computer device. Again, the secondary display areas display information relating to this laptop device, as discussed in detail above. The series of three half circles above the laptop computer indicate the computer has a wireless connection to the network.

Figure 33:
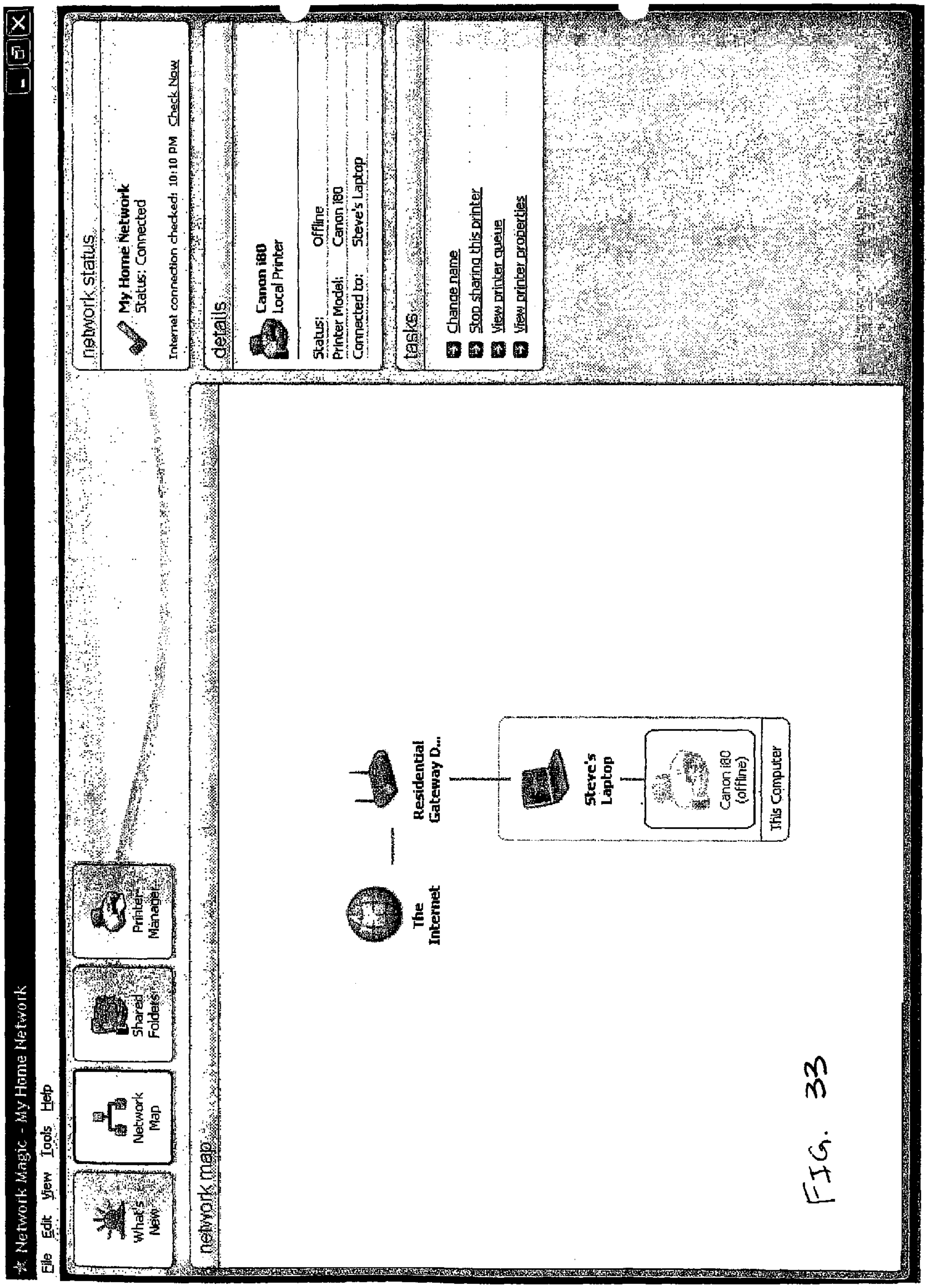
FIG. 33 illustrates the network map shown in FIG. 30 showing that a user has selected the icon representing the printer device.

FIG. 33 illustrates the network map displayed in the primary display area where the user has selected the printer device (identified in this figure by the name "Canon i80"). As indicated by the grayed-out representation of this icon in the map, the tool has detected that the printer is off-line (e.g., disconnected from the laptop computer device or turned off). Accordingly, the secondary display areas indicate the off-line status of this printing device, along with the other displayed information relating to this device. It should be noted that the secondary display area entitled "Tasks" still provides the user with the option of sharing this printer. As discussed in detail above, various embodiments of the invention may allow a user to select to share an off-line printer. The information required to share the printer is then disseminated among the computers in the trusted association. In this manner, when the printing device comes back on-line, the device can be shared among the computers in the trusted association.

Figure 34:
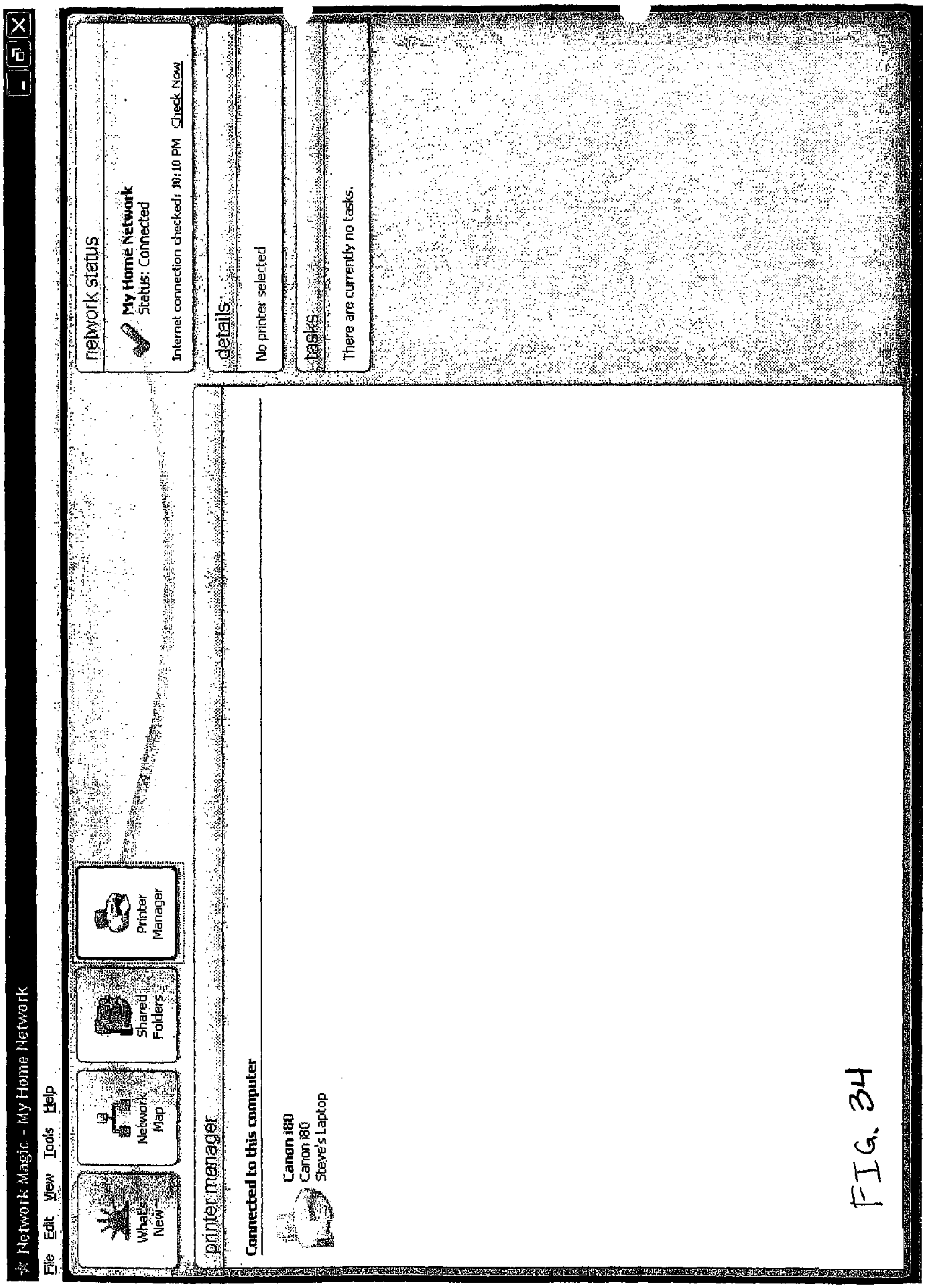
FIG. 34 shows a user interface that may be displayed when the user activates the printer manager selection button according to various aspects of the invention.

FIG. 34 shows a corresponding user interface that may be displayed when the user activates the printer manager selection button 2719. As seen in this figure, the primary display area displays the printers available to the computer hosting the tool. Accordingly, an icon representing of the printing device continues to be displayed in the primary display area. Also, because the printing device is off-line, the icon representing the printing device continues to grayed-out to indicate that status.

Figure 35:
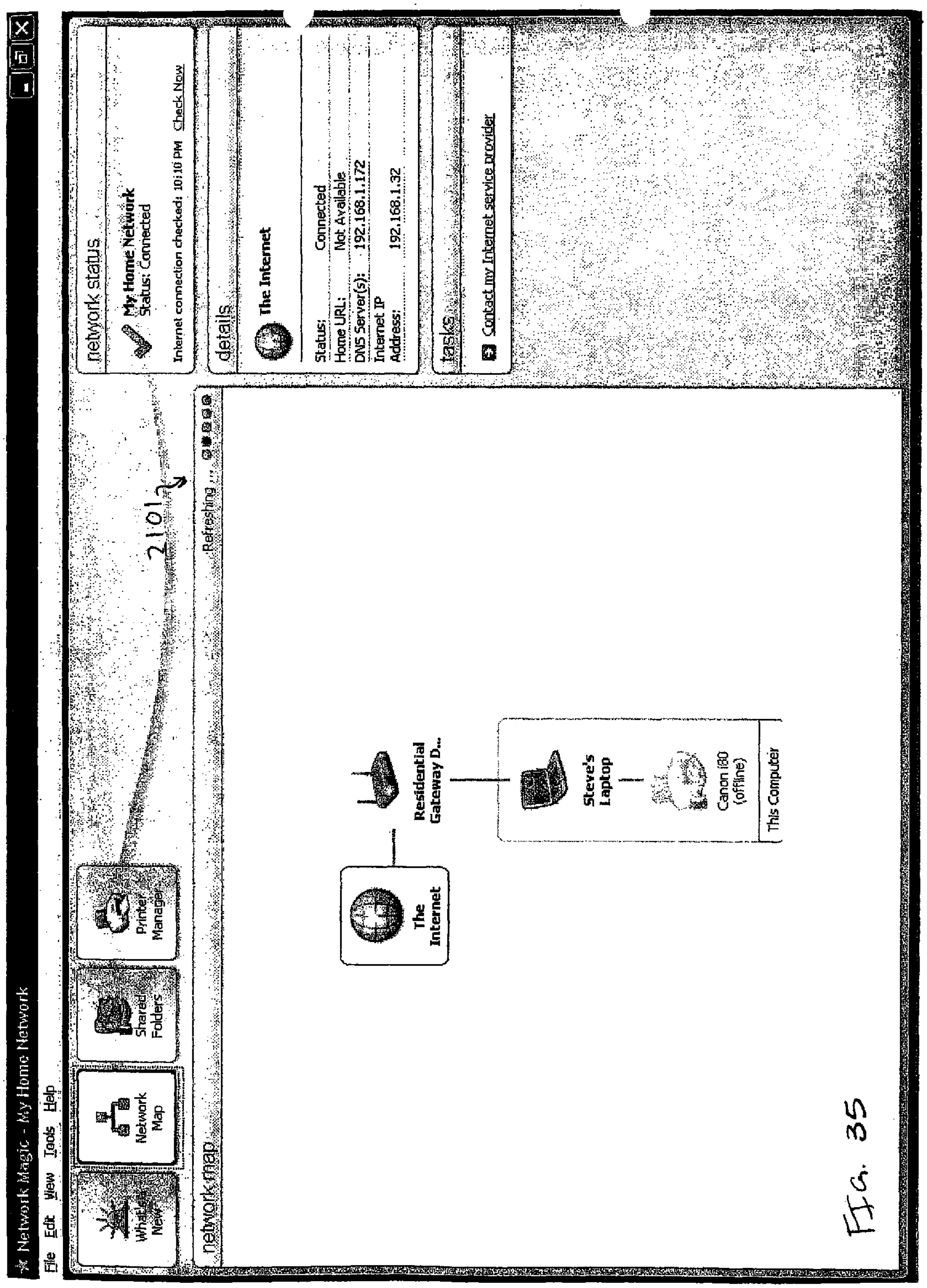
FIG. 35 illustrates a user interface that may be displayed according to various embodiments of the invention when the network management tool receives an update of the information to be displayed in the user interface.

FIG. 35 illustrates a user interface that may be displayed according to various embodiments of the invention when the tool receives an update of the information to be displayed in the user interface. As discussed in detail above, this may occur when an event message is triggered indicating that the network information data structure has been updated to include new or changed information. Accordingly, the user interface includes an icon message 3401 indicating that the information displayed in the user interface is currently being updated.

Figure 36:
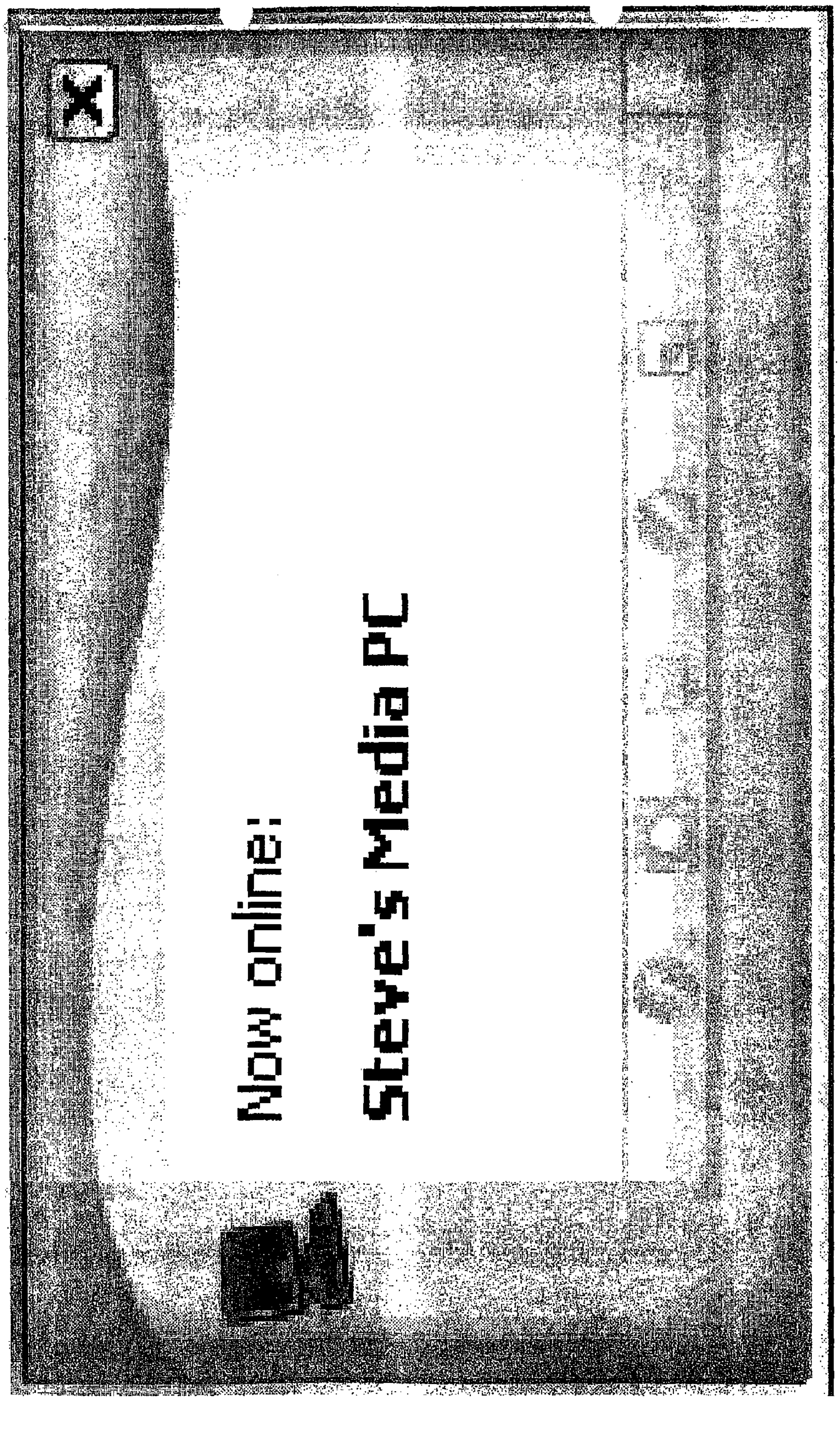
FIG. 36 illustrates an example of a notification message that may be provided according to various aspects of the invention, indicating that a new device has joined the network, and providing the name of the new device.
Figure 37:
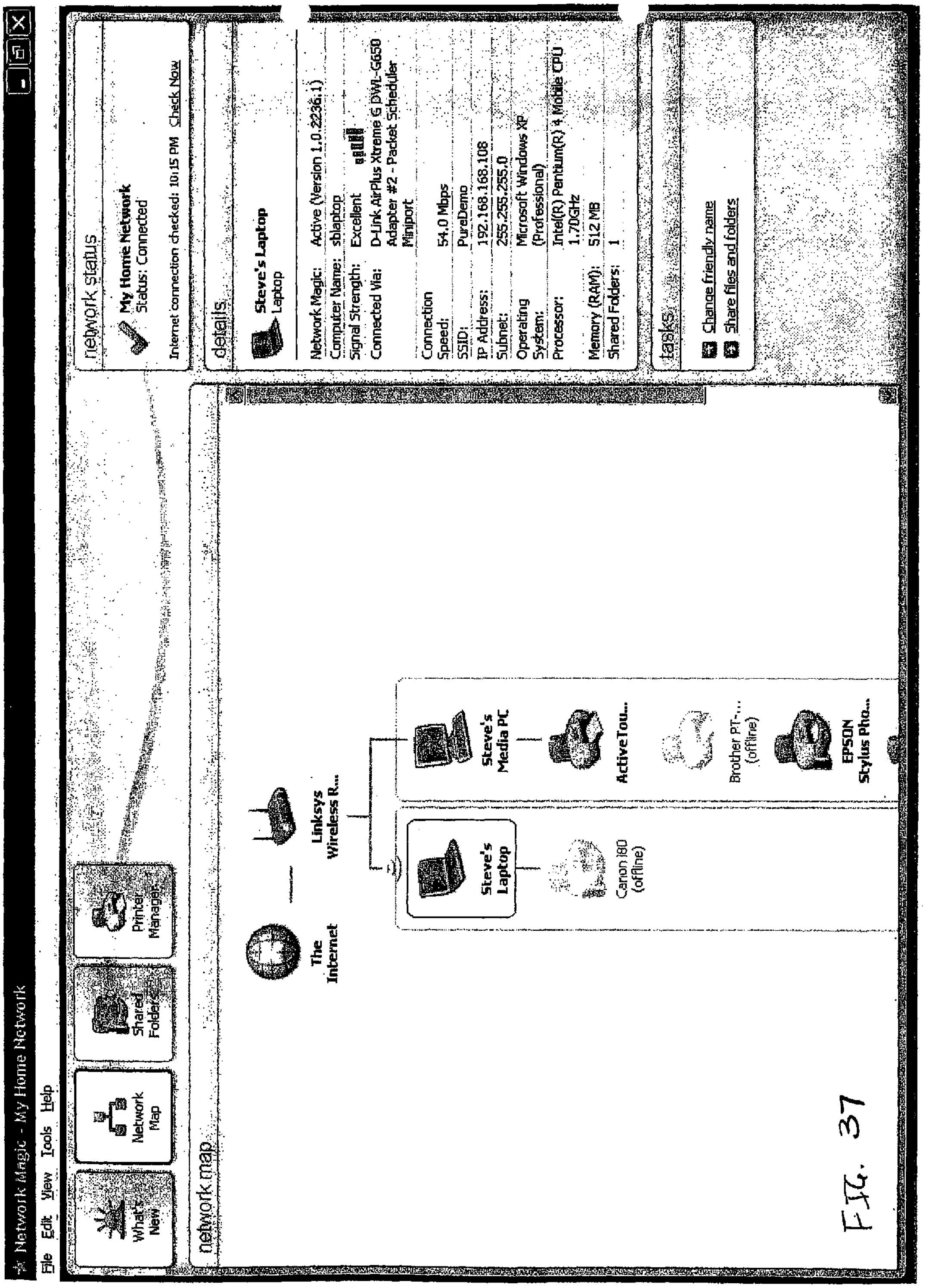
FIG. 37 illustrates the network map shown in FIG. 30 updated to reflect the new addition to the network.

If, for example, the user interface is being updated due to the addition of information in the network information data structure indicating that a new computer has joined the network, various embodiments of the invention may additionally provide a related notification message. One example of such as the notification message is shown in FIG. 36, indicating that a new device has joined the network, and providing the name of the new device. Similarly, the network map displayed in the primary display area is updated to reflect the new addition to the network as shown in FIG. 37. In addition, the network map illustrated in the primary display area is updated to display an icon representing the computer that joined the network. The map also displays icons showing various printing devices that are connected, either directly or indirectly to the computer device joining the network. Both computers in FIG. 37 are running the management tool 301 as indicated by the yellow star. Computers not actively running the management tool 301 are displayed without a star.

Figure 38:
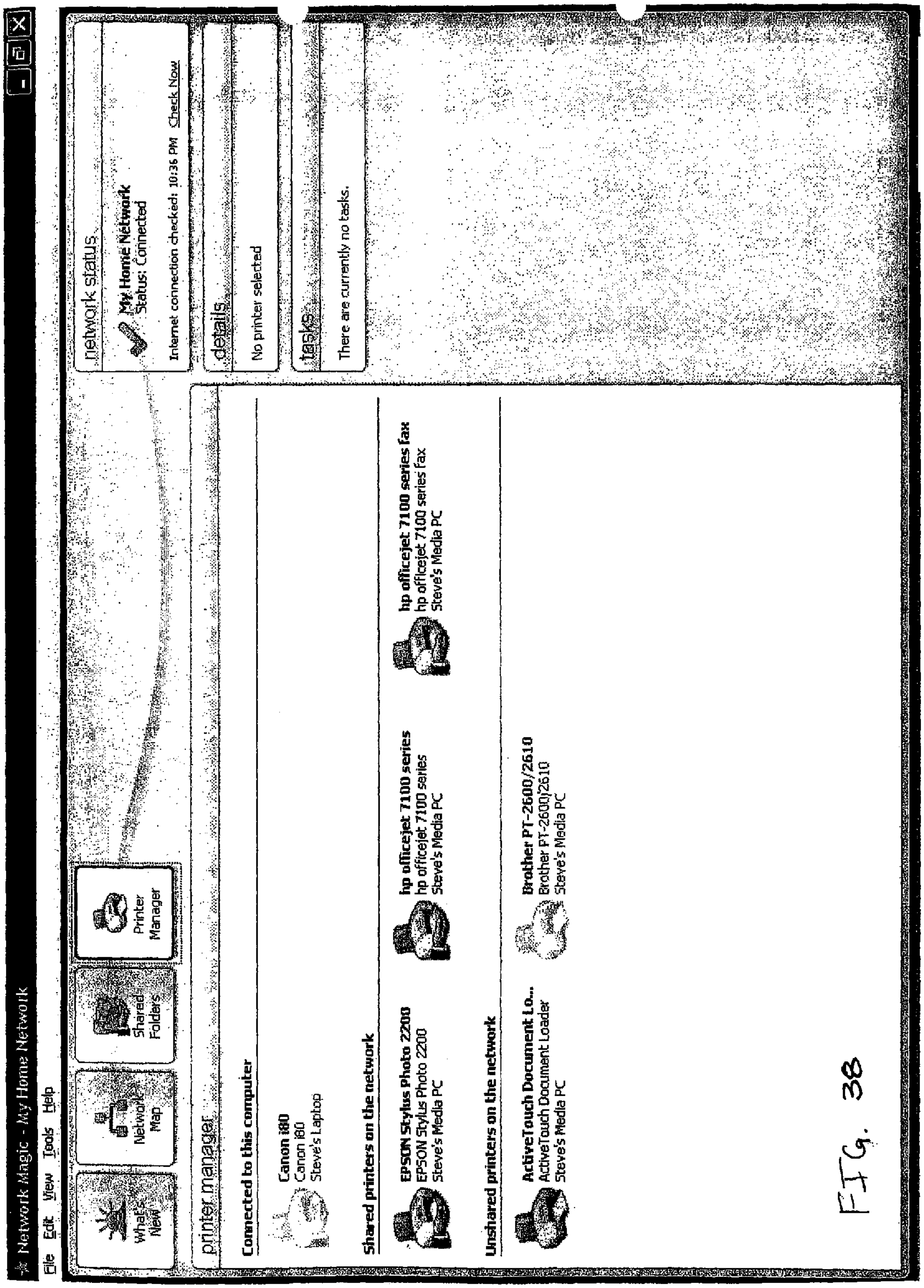
FIG. 38 illustrates a user interface showing the display all of the printing devices accessible through a network according to various aspects of the invention.

Accordingly, if the printer manager selection button 2719 is again selected, the primary display area (now entitled "Print Manager") will display all of the printing devices currently accessible through the network, including the printing devices connected to the newly-added computing device as shown in FIG. 38. As seen in this figure, the primary display area may include three separate organizational areas. The first organizational area displays an icon representing each printing device directly connected to the host computer. The second display area then displays icons representing the printing devices that have been shared among the computers in the trusted association. The third display area then displays icons representing the printers that are still accessible through the network, but which currently are not available for use by the host computer.

Figure 39:
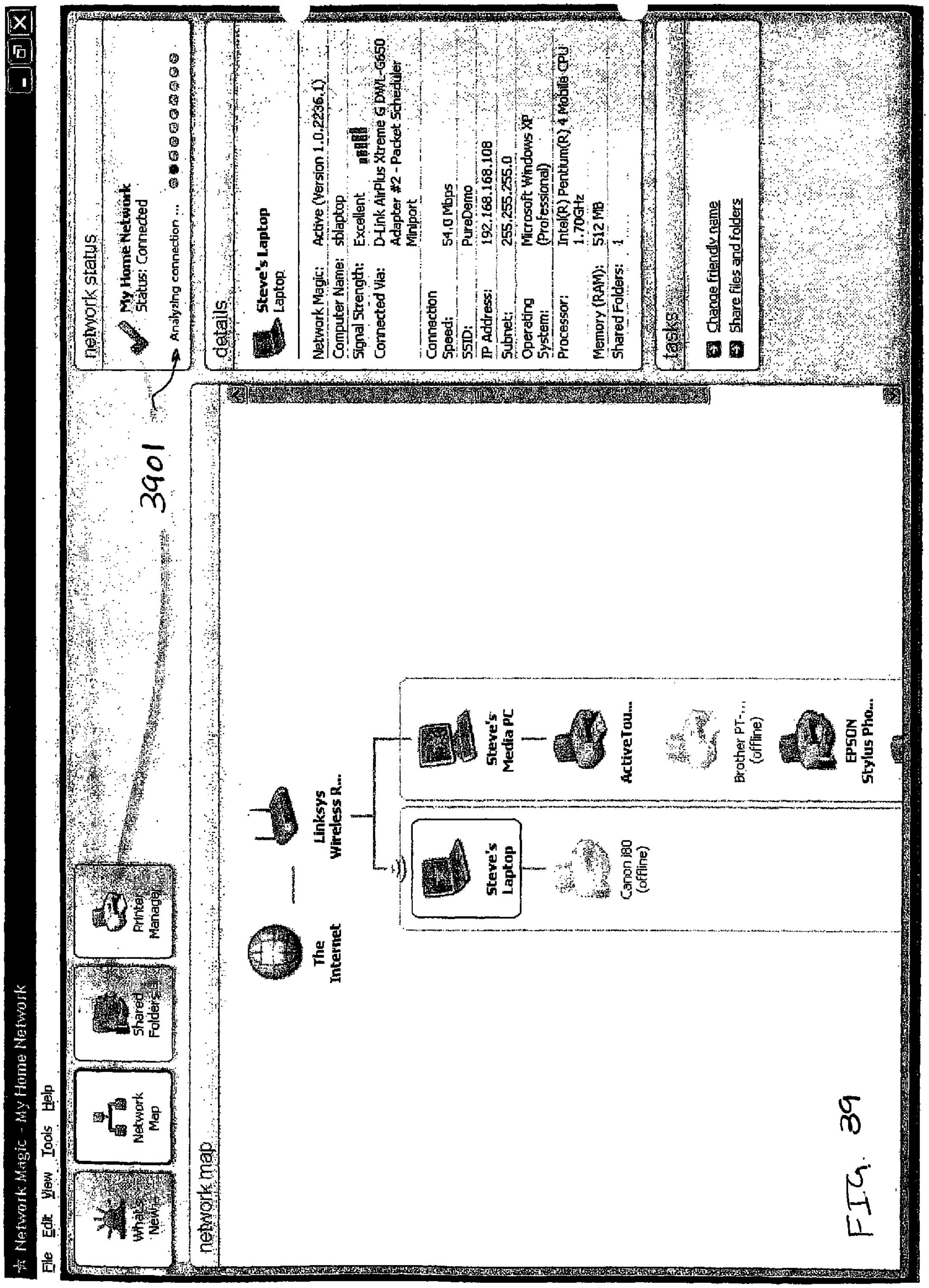
FIG. 39 illustrates another user interface that may be provided according to various aspects of the invention.

FIG. 39 illustrates another user interface that may be provided according to various embodiments of the invention. More particularly, this user interface may be provided when the tool initiates a process to determines the connection status of the network, as described in detail above. To indicate that the tool is updating the information displayed in the network status display area 2705, the network status display area 2705 may display an additional icon 3901 showing that an analysis of the network's connection is being performed.

Figure 40:
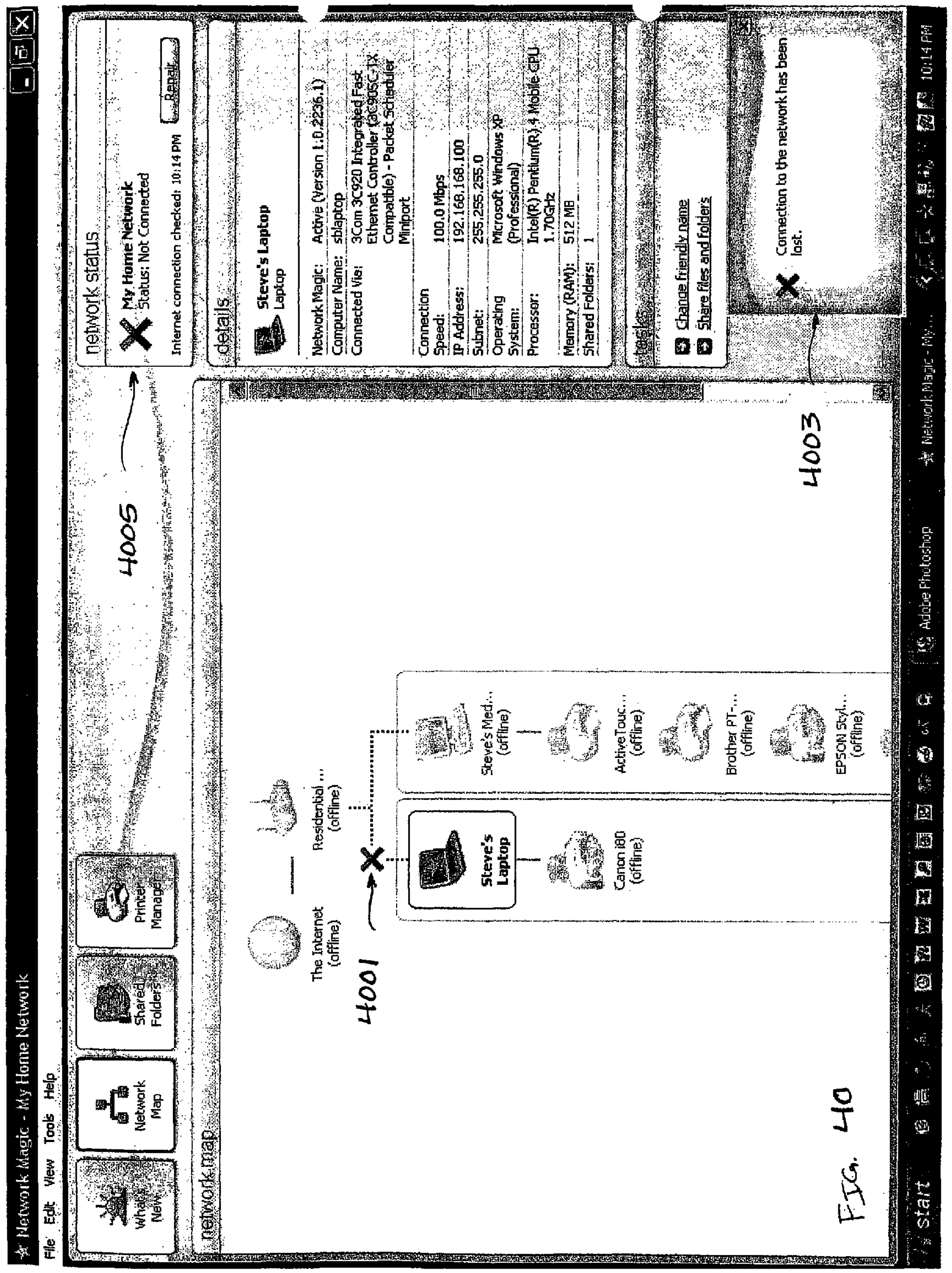
FIG. 40 illustrates the network map shown in FIG. 30 showing the host computer has lost its connection to the gateway device.

If the tool subsequently detects that the host computer has lost its connection to the gateway device, then the primary display area 2709 may be updated to reflect this information as shown in FIG. 40. More particularly, the network map 2721 shown in the primary display area 2709 may be revised to include an icon 4001 indicating that the connection between the host computer and the gateway device has been lost. Further, the icons representing the remaining devices on the network (i.e., the devices connected to the host computer through the gateway device) will reflect that these devices are no longer accessible to the host computer. In the illustrated example, the icons representing these devices in the network map are grayed out to indicate that status. Still further, the tool may send a notification message 4003 indicating that the connection to the network has been lost. The network status display area 2705 also will show a message 4005 indicating that the host computer is not connected to the network.

Figure 41:
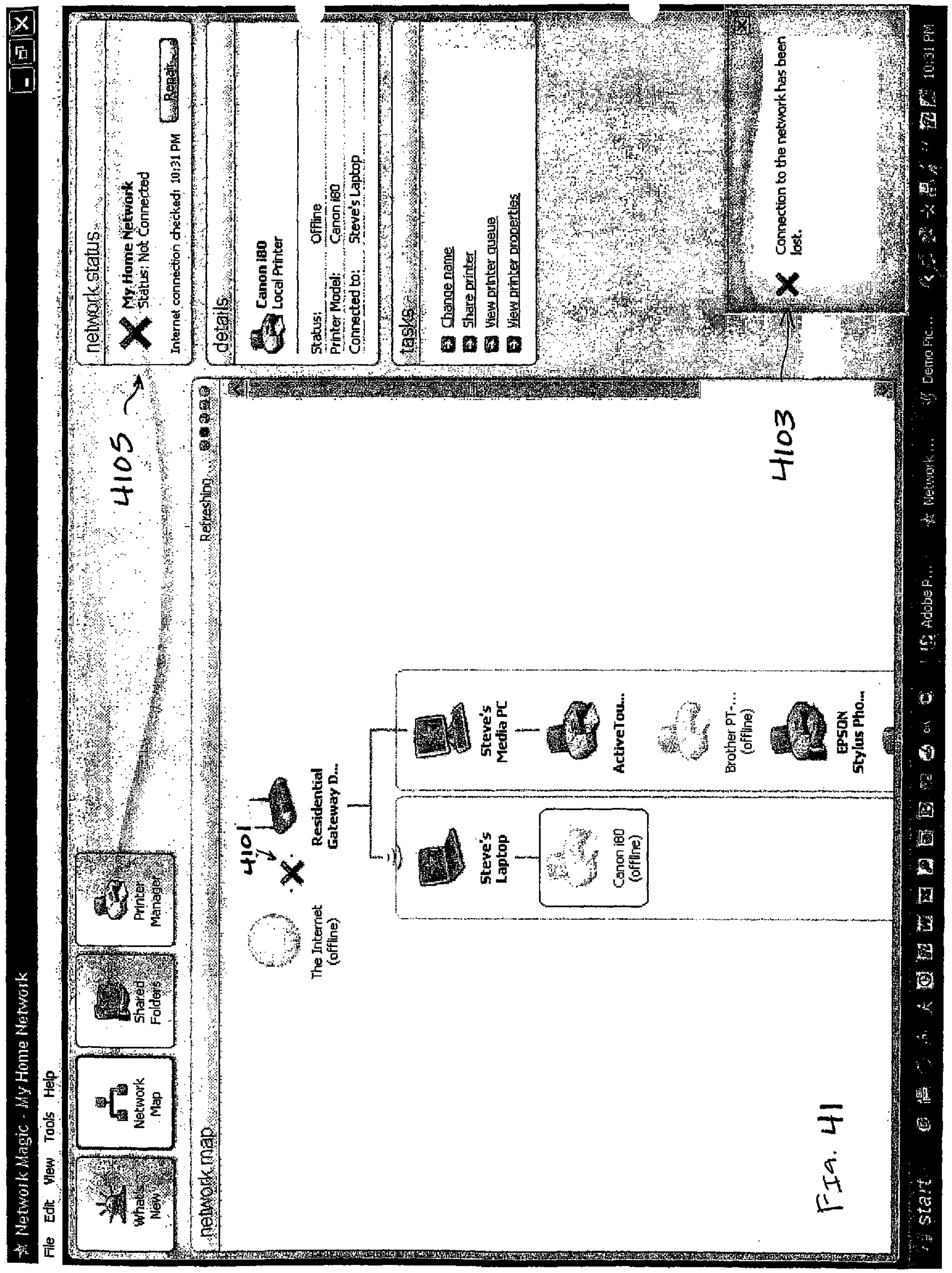
FIG. 41 illustrates the network map shown in FIG. 30 showing that the connection between the Internet node and the gateway device has been lost.

Similarly, if the tool determines that the connection between the gateway device and the Internet node has been lost, the network map shown in the primary display area will be updated to indicate this information. For example, as shown in FIG. 41, the primary display are may position the icon 4001 to show that the connection between the Internet node and the gateway device has been lost. Similarly, the notification message 4003 may be displayed, and the network status display area 2705 will display the message 4005 indicating that the host device has lost connectivity to the Internet node as well.

Figure 42:
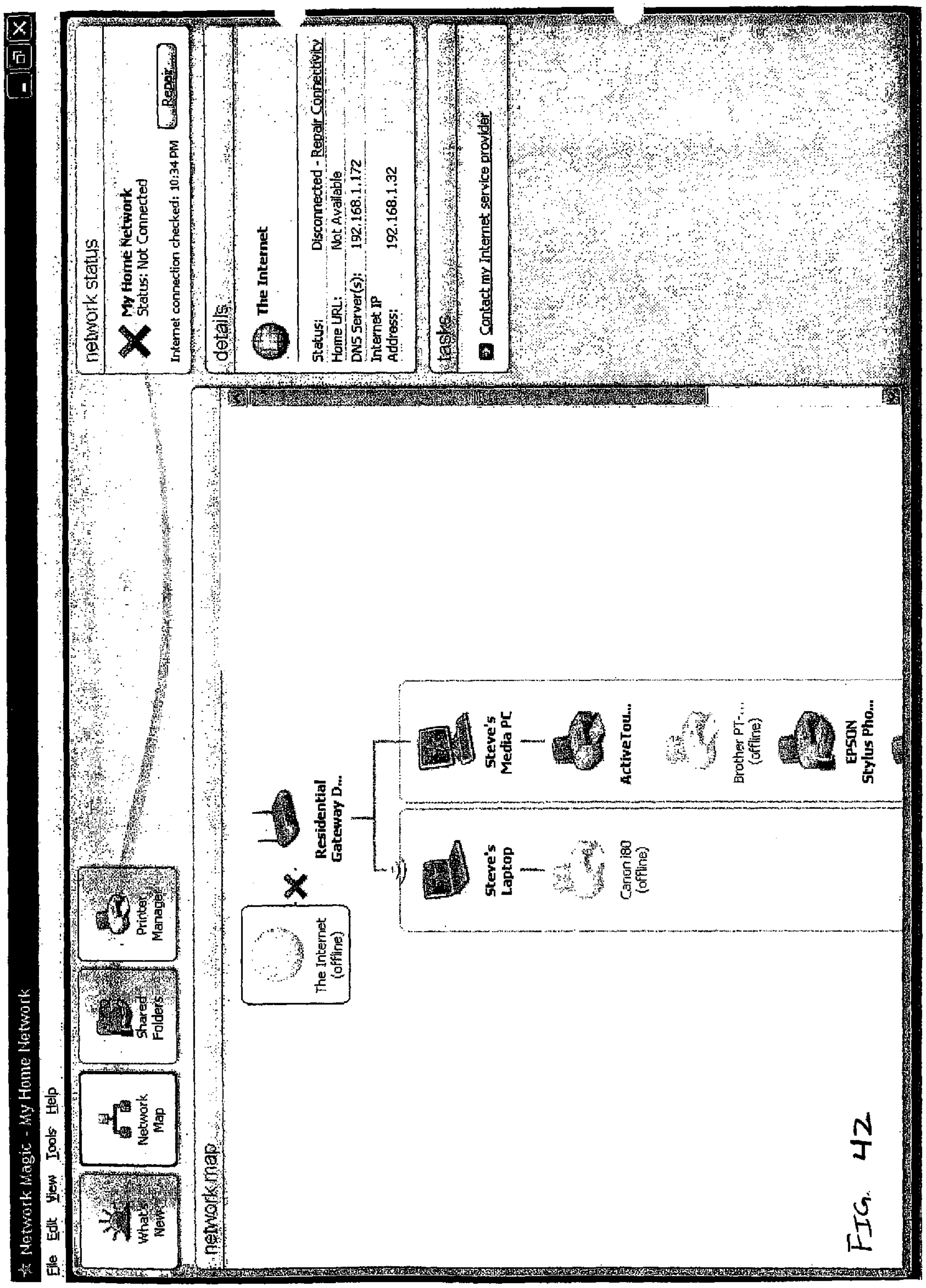
FIG. 42 illustrates the network map shown in FIG. 30 showing a "repair" button for repairing the loss of network connectivity.

If a network connection for the host computer is severed, various embodiments of the invention may provide assistance for the user in repairing the lost connection. For example, as illustrated in FIG. 42, the network status display area 2705 may include a "repair" button. As also shown in this figure, if the user selects the icon representing the Internet node in the network map (shown as off-line in the figure), the secondary display area may include a command for instructing the tool to attempt to repair the connectivity. If either of these commands is activated, various embodiments of the tool may implement any desired repair procedure for repairing the loss of network connectivity.

Figure 43:
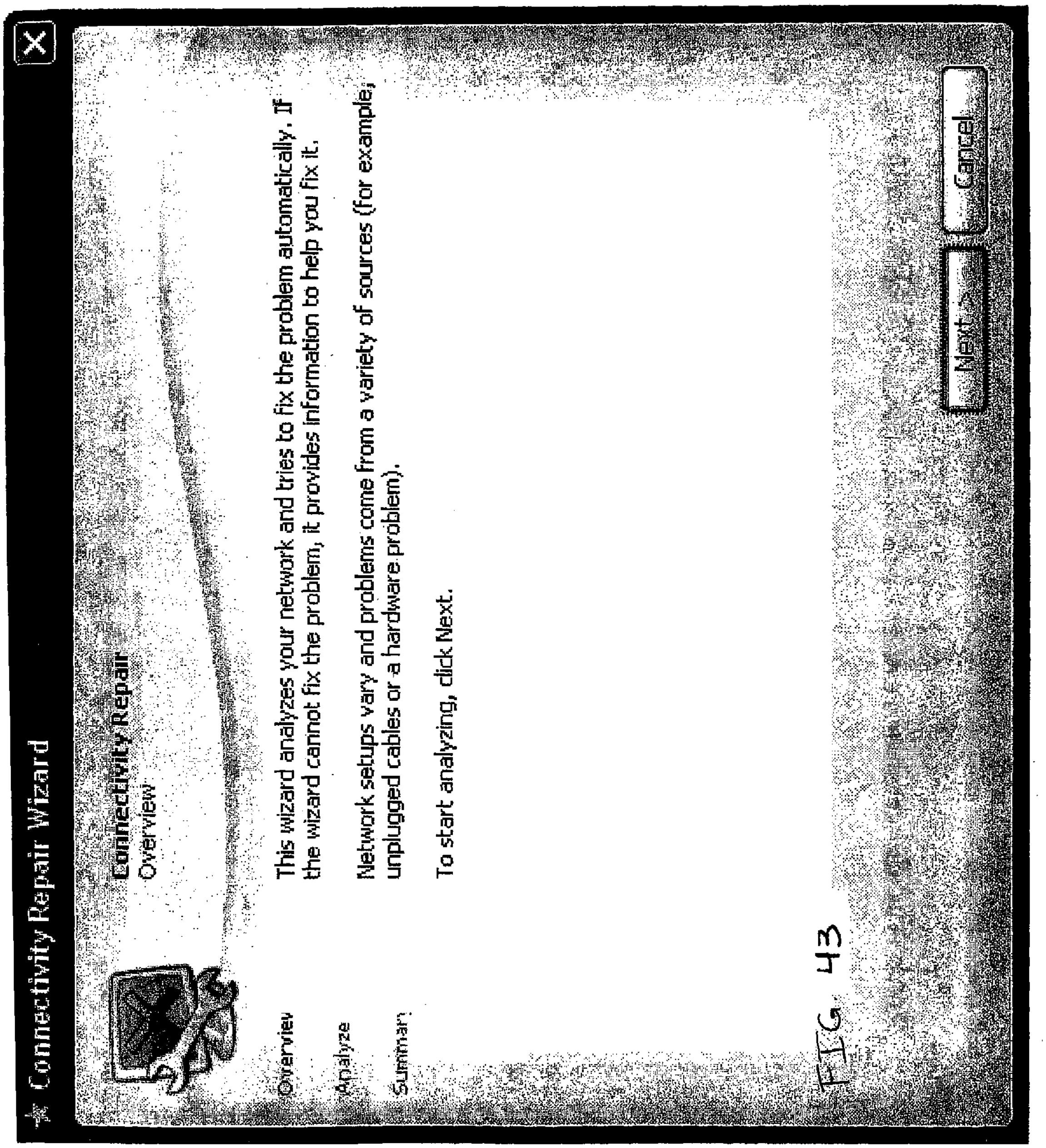
FIG. 43 illustrates a user interface showing an introductory page discussing an overview of the repair process according to various aspects of the invention.
Figure 44:
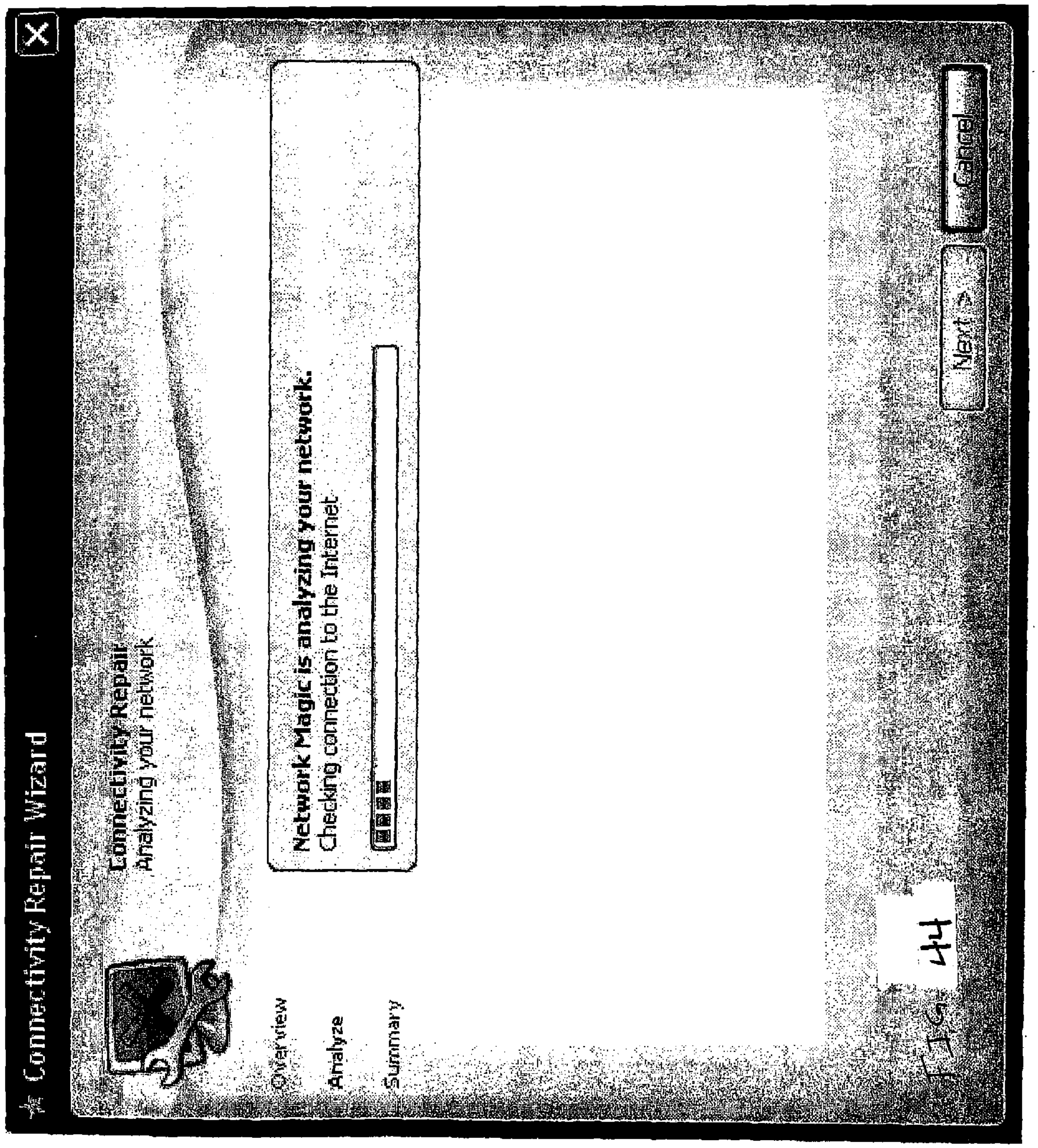
FIG. 44 illustrates a user interface according to various aspects of the invention showing an icon indicating that a network management tool is analyzing the network connectivity.
Figure 45:
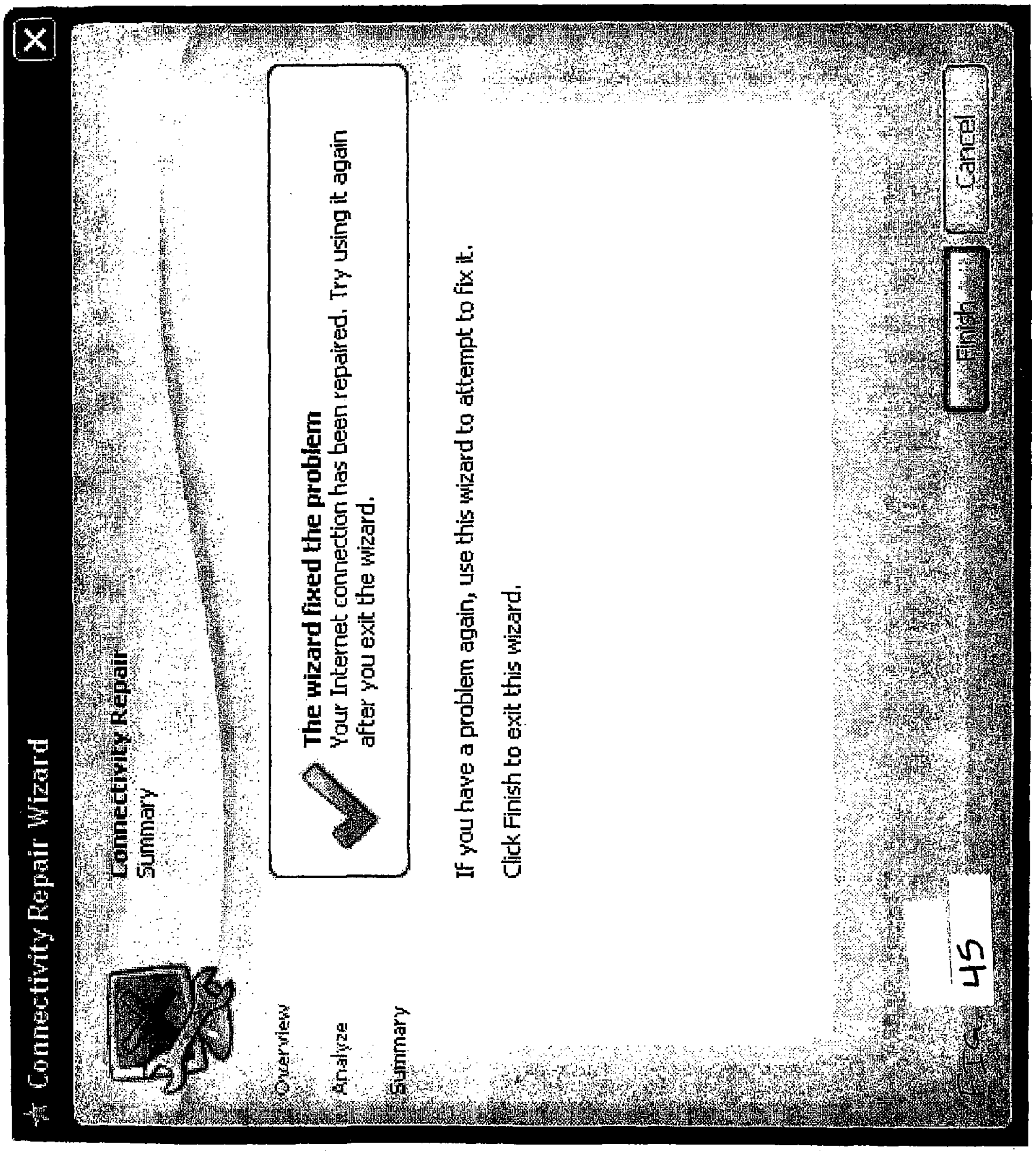
FIG. 45 illustrates a user interface according to various aspects of the invention showing that an analysis and associated repair process was successful.
Figure 46:
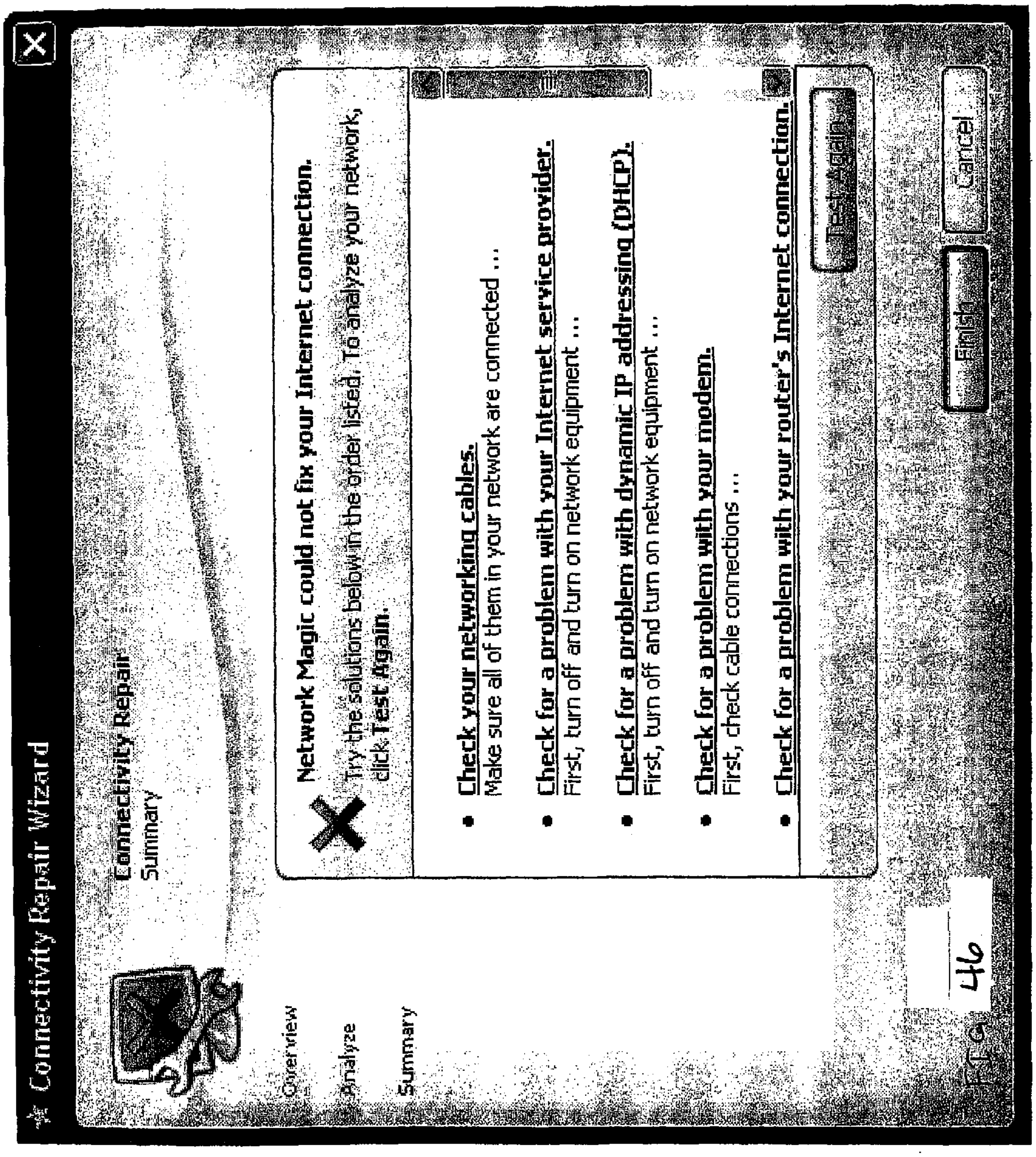
FIG. 46 illustrates a user interface according to various aspects of the invention showing that an analysis and associated repair process was unsuccessful.

For example, as shown in FIG. 43, the user interface may first display an introductory page discussing an overview of the repair process. After the user has read and acknowledged this page, the tool may display a user interface shown in FIG. 42. As seen in FIG. 44, the user interface displays an icon indicating that the tool is analyzing the network connectivity. If the analysis and associated repair process is successful, the tool may display the user interface shown in FIG. 45, indicating that the Internet connection was repaired. If, however, the repair process was unsuccessful, the tool may display a user interface such as the user interface shown in FIG. 46.

Figure 47:
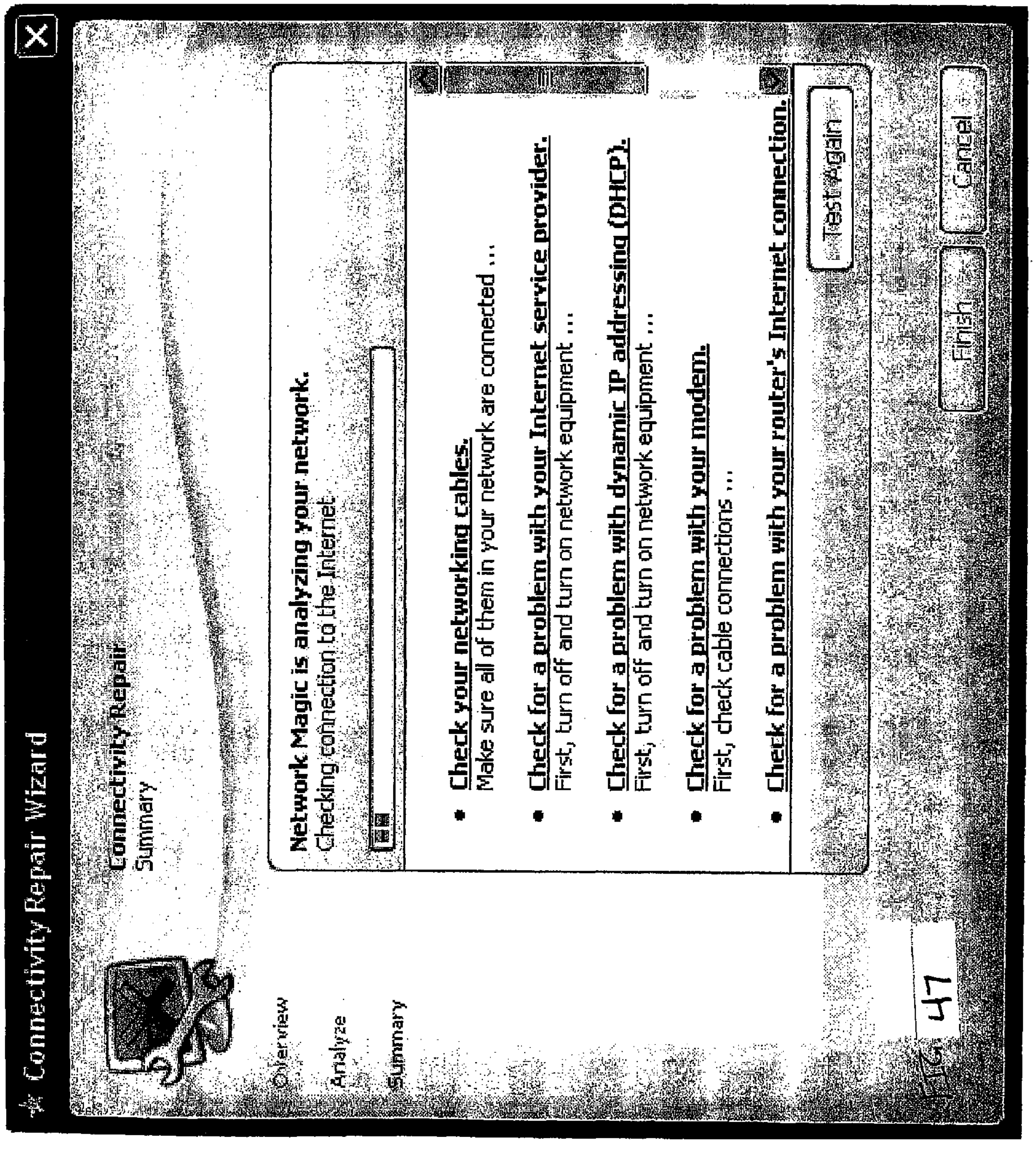
FIG. 47 illustrates a user interface according to various aspects of the invention showing that the connection repair process is repeating.
Figure 48:
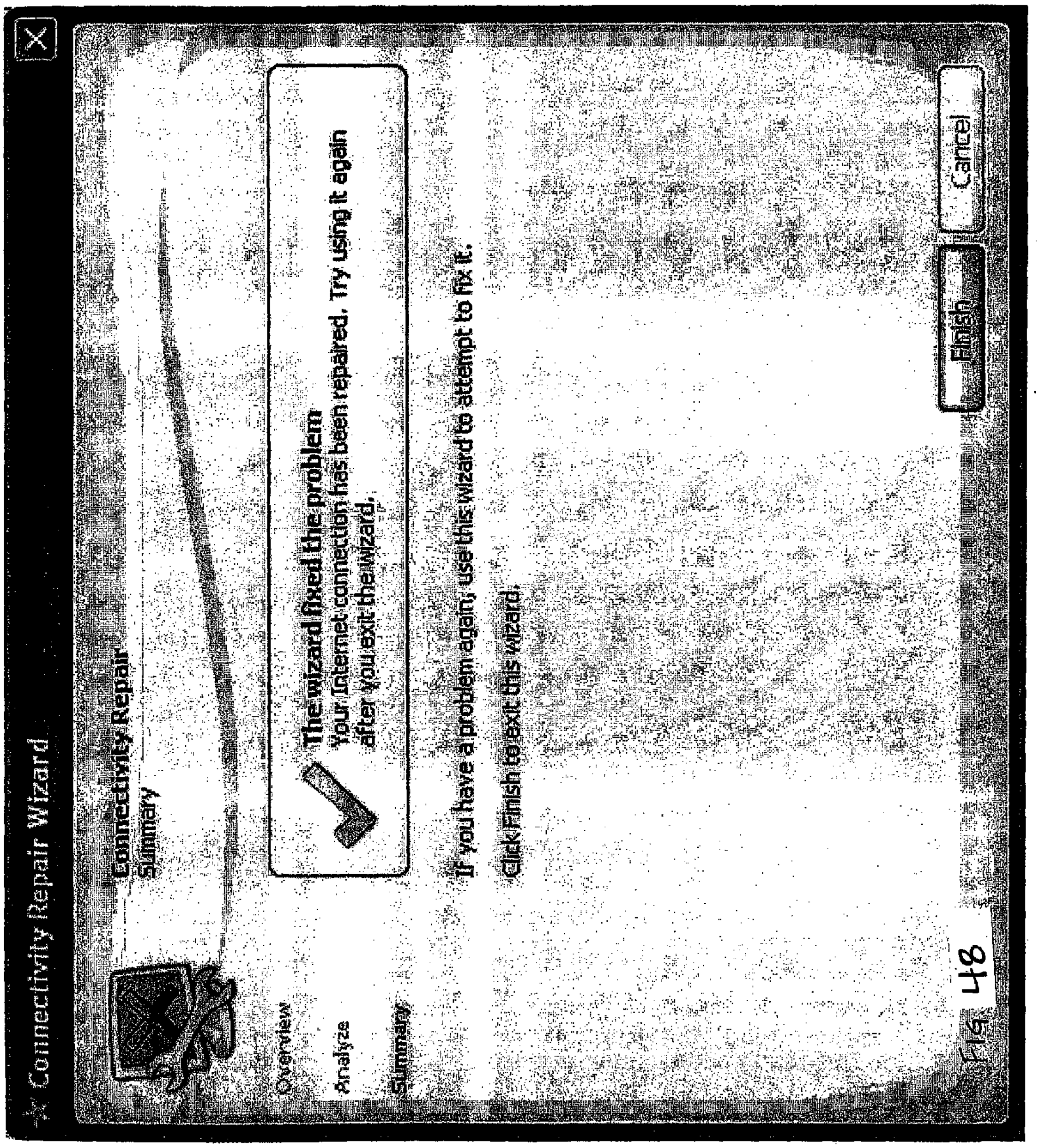
FIG. 48 illustrates a user interface according to various aspects of the invention showing a notification message informing the user that a connection has been established connection.

As seen in this figure, this user interface indicates that the repair process was unsuccessful. In addition, it displays a list of suggestions for a user to undertake in order to address the connectivity problem. These suggestions may include, for example, recommending that the user check the related network cables to ensure that they are properly secured. The user interface also provides a button for reattempting the repair process after the user has performed the recommended actions to restore the connection. If the user activates this button, the tool may display the user interface shown in FIG. 47, to indicate that it is repeating the connection repair process. If the tool is able to restore the network connection, either initially or when the repair process is repeated, the tool may provide a notification message informing the user of the established connection such as shown in FIG. 48.

Figure 49:
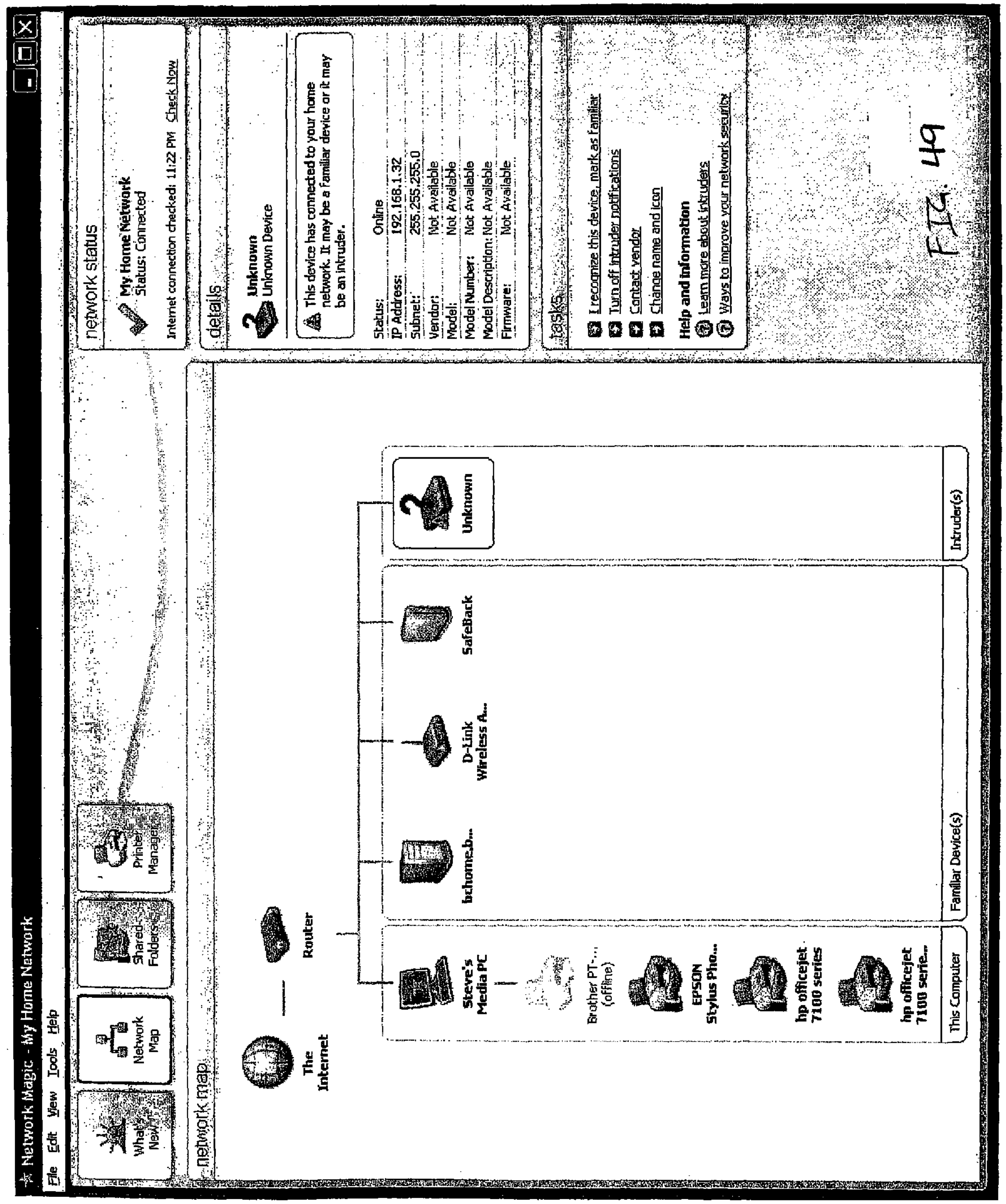
FIG. 49 illustrates another user interface that may be provided according to various aspects of the invention showing when a new device has joined the network.
Figure 50:
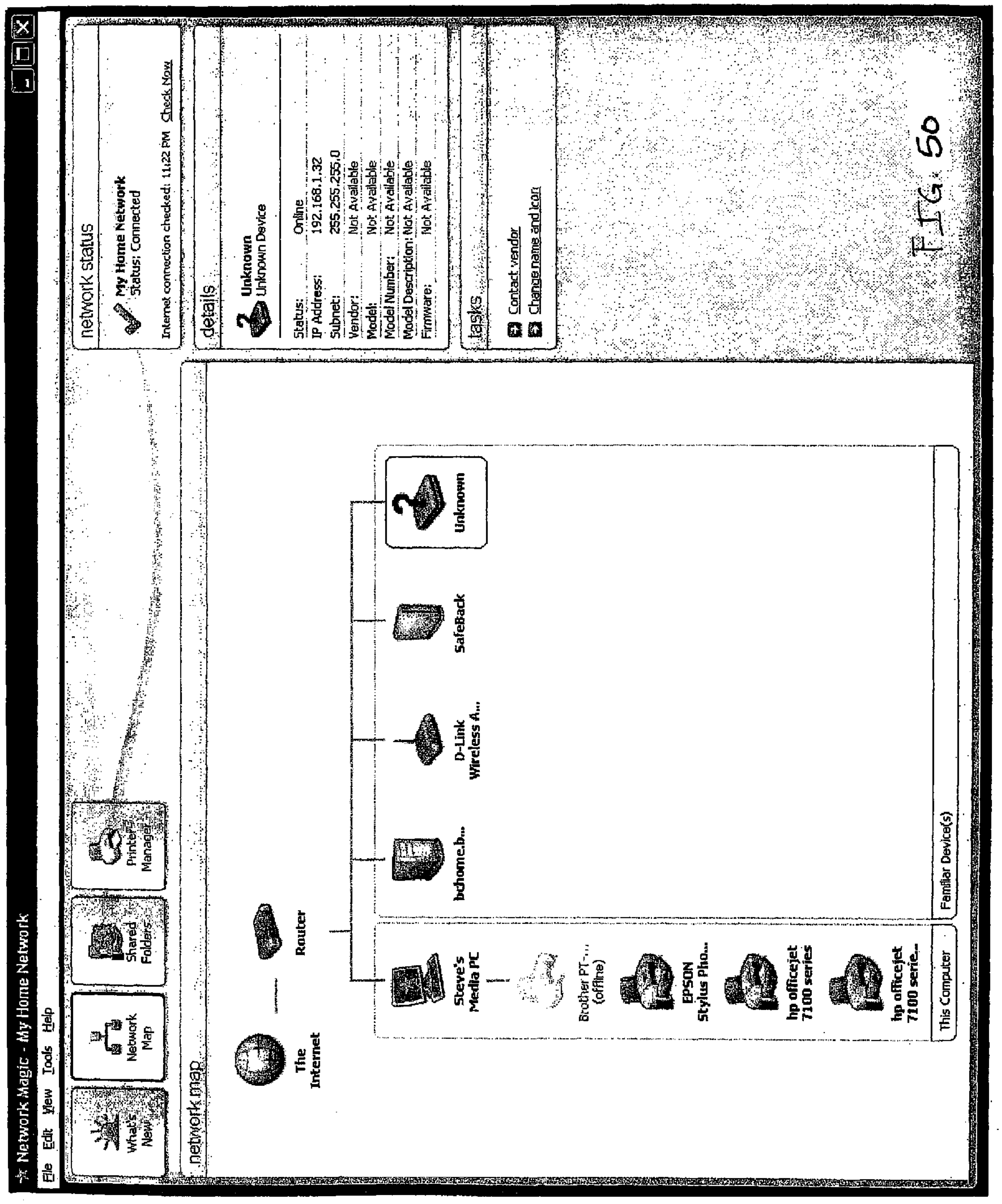
FIG. 50 illustrates the network map shown in FIG. 49 updated to show the new device as a "familiar" device.
Figure 51:
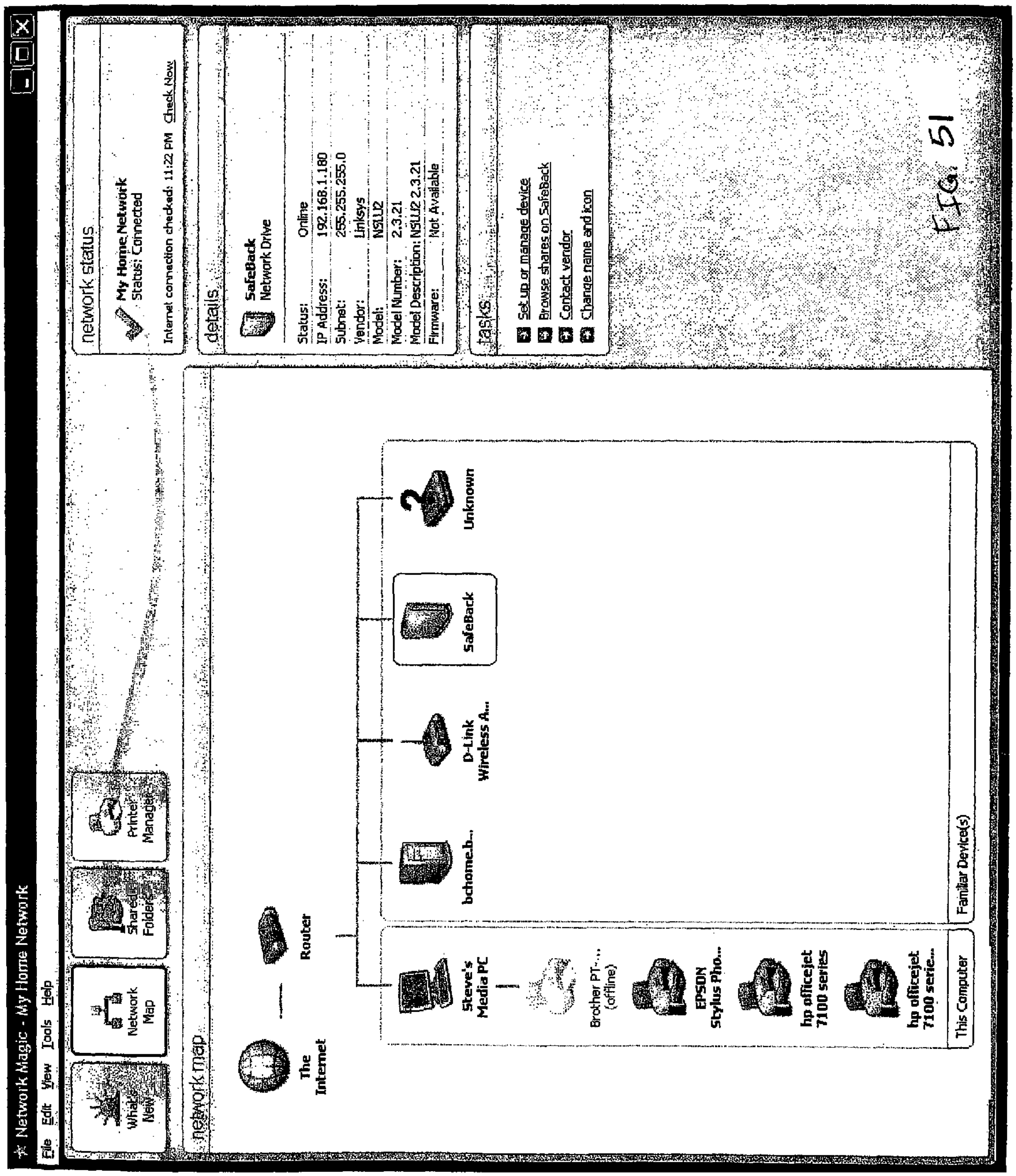
FIG. 51 illustrates another view of the network map shown in FIG. 49 updated to show information related to a network drive.

FIG. 49 illustrates still another example of a user interface that may be provided by various embodiments of the invention. More particularly, the user interface illustrated in FIG. 49 may be displayed when, for example, the tool determines that a new device has joined the network. As seen in this figure, the new device, entitled "unknown," is categorized as an "intruder" in the network map. When the user selects the icon representing this new device, however, various embodiments of the invention may still display information relating to this unknown device in the secondary display areas. If the user is aware of the identification of the new device and approves its entry into the network, the user can activate an appropriate task in the secondary display area to accept the new device as a familiar device. In response, the network map will be updated to show the new device as a "familiar" device as illustrated in FIG. 50. FIG. 51 then illustrates another view of this network map, showing information related to a network drive in the network in the secondary display areas.

Figure 52:
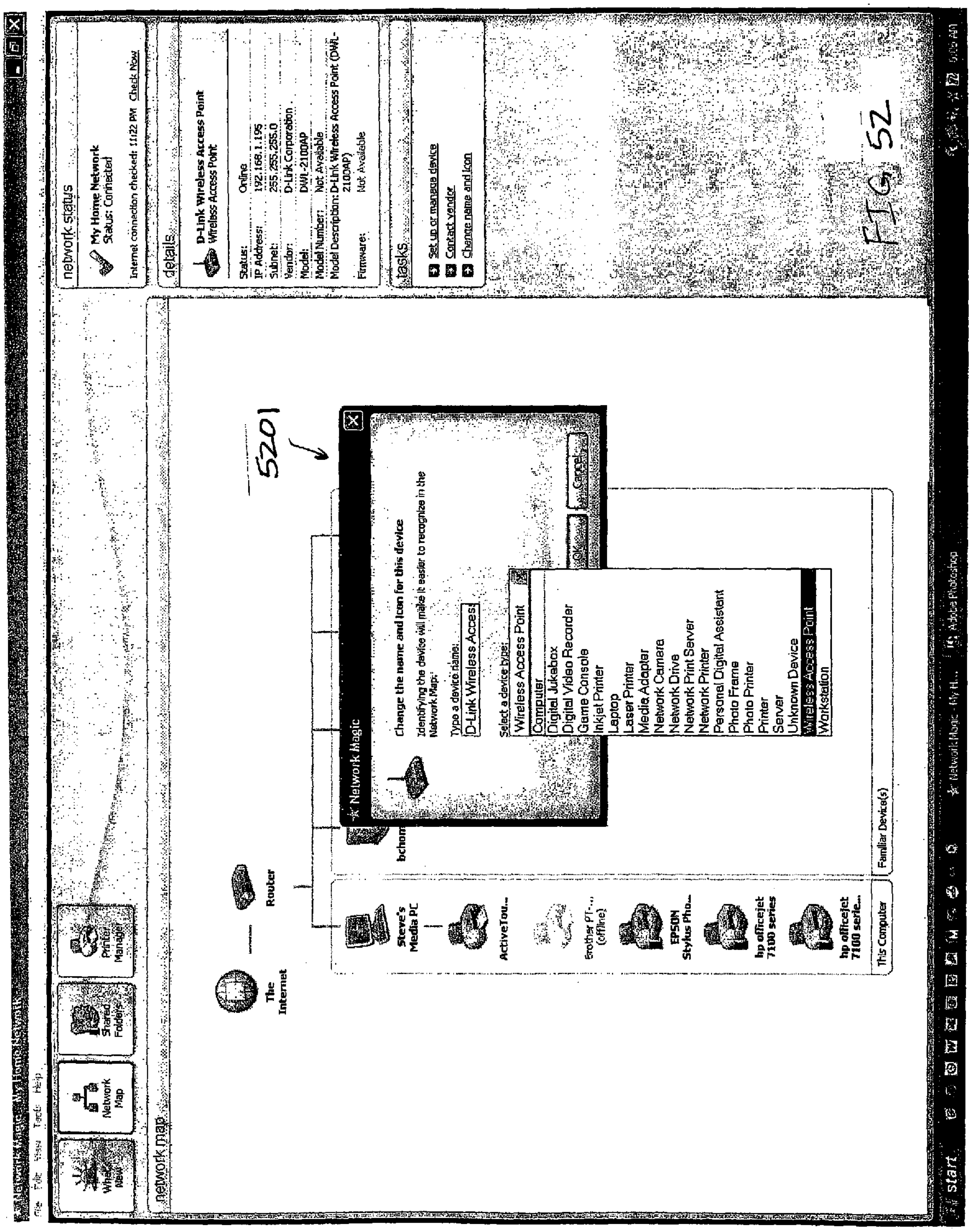
FIG. 52 illustrates a user interface according to various aspects of the invention for changing the name and type of a device.

If a user wishes to more accurately identify an unknown device that has joined the network, the user may, for example, choose to provide a convenient name for the device. For example, the user may select the icon representing the unknown device in the network map, and then select the command "change name and icon" in the secondary display area. In response to this selection, the tool may provide a user interface for changing the name and type of the device, such as the user interface illustrated in FIG. 52. As seen in this figure, the user interface 5201 may include a control area allowing the user to type a desired name for the device. The user interface 5201 may also include, for example, a control area with a drop-down menu listing options of supported device types. Still other techniques may be used by the user interface 5201 to allow a user to change the name and type designation for a network device. It also should be appreciated that, in addition to changing the name and designation type of unknown network devices, this user interface can similarly be employed to change the name and type of any device in the network, even if the device has already been previously identified and named.

Figure 53:
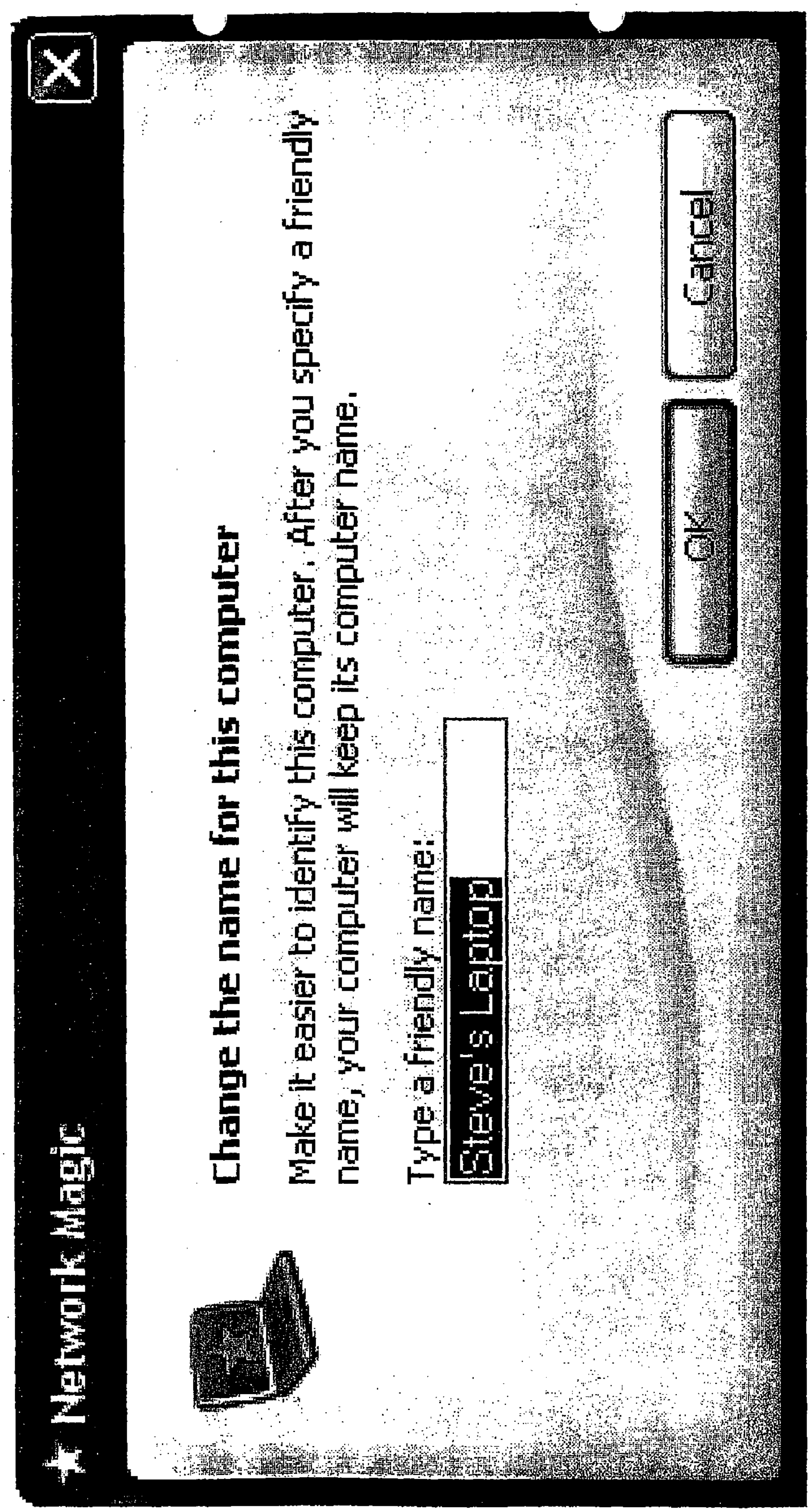
FIG. 53 illustrates a user interface according to various aspects of the invention for changing the friendly name for the host computer.
Figure 54:
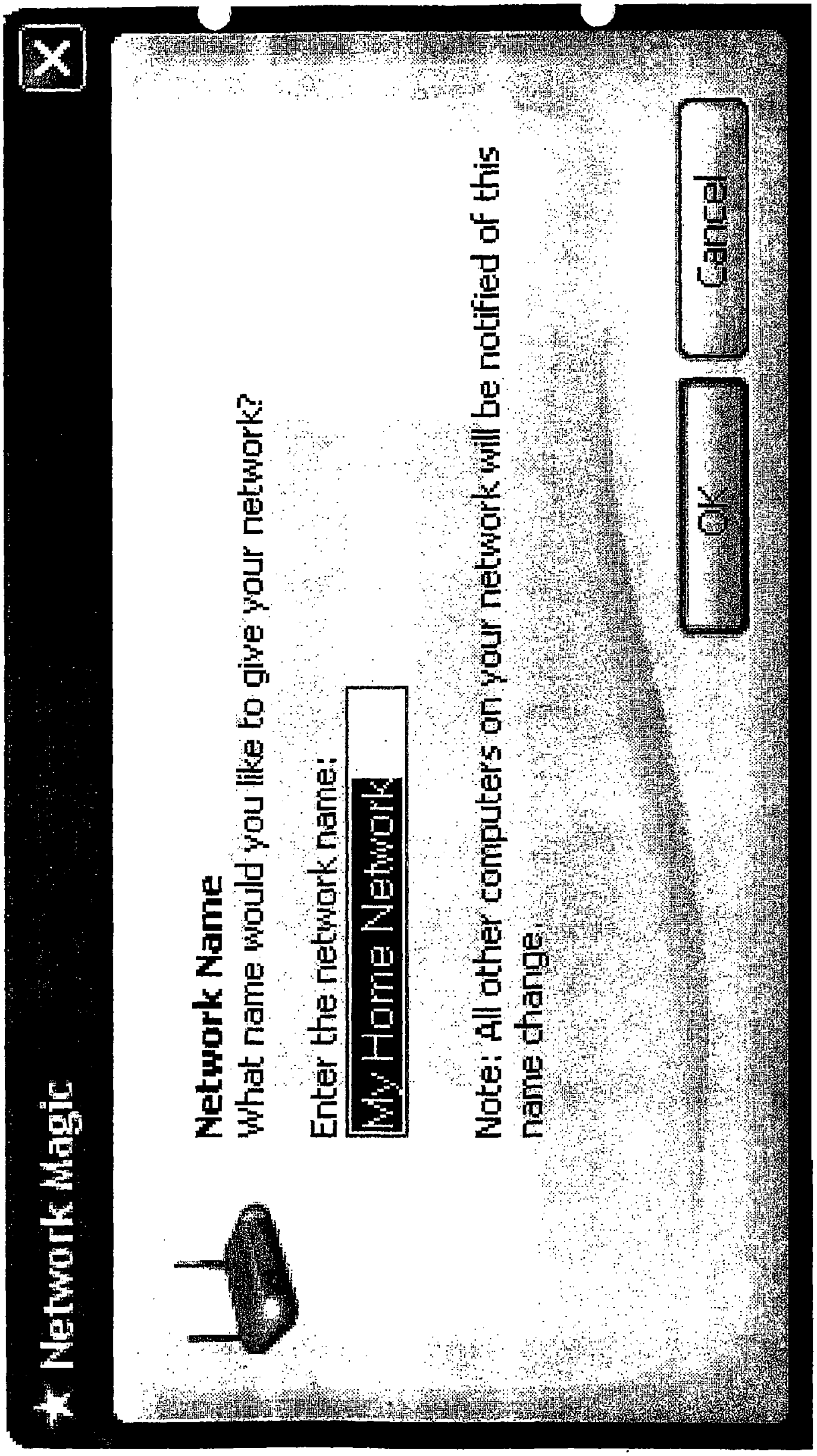
FIG. 54 illustrates a user interface that may be provided according to various aspects of the invention to change the name of the network.

Similarly, various embodiments as the invention may provide multiple user interfaces or options for changing the names of devices on the network, or even the name of the network itself. For example, FIG. 53 illustrates a user interface for changing the friendly name for the host computer, while FIG. 54 illustrates a user interface that may be provided to change the name of the network itself.

Figure 55:
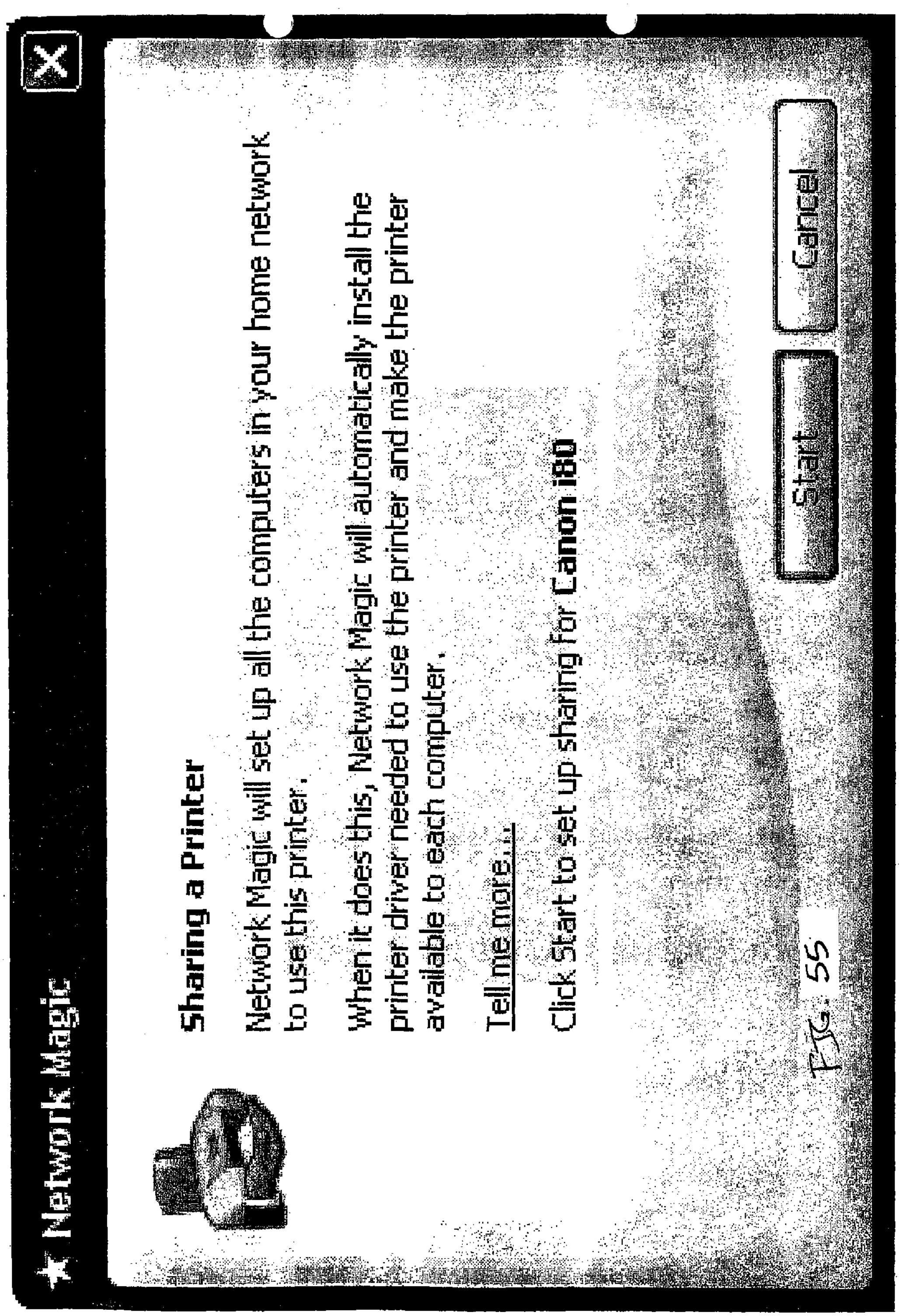
FIG. 55 illustrates a user interface that may be provided according to various aspects of the invention to assist a user in sharing a printer resource.

As described in detail above, different embodiments of the tool allow a user to share various resources with other computers in the network, and particularly with members of a trusted association. More particularly, some embodiments of the invention allow a user to share physical resources, such as printing devices. Accordingly, FIG. 55 illustrates a user interface that may be provided to assist a user in sharing a printer resource. More particularly, when the user has selected a printer in, for example, the primary display area, the secondary display area will show a command for sharing that printer as described in detail above. In response to the user selecting that share printer command, the user interface shown in FIG. 55 may be displayed, confirming the beginning of the sharing process and the user's selection of the printer. The user interface identifies the printer to be shared as a Canon i80 printer.

Figure 56:
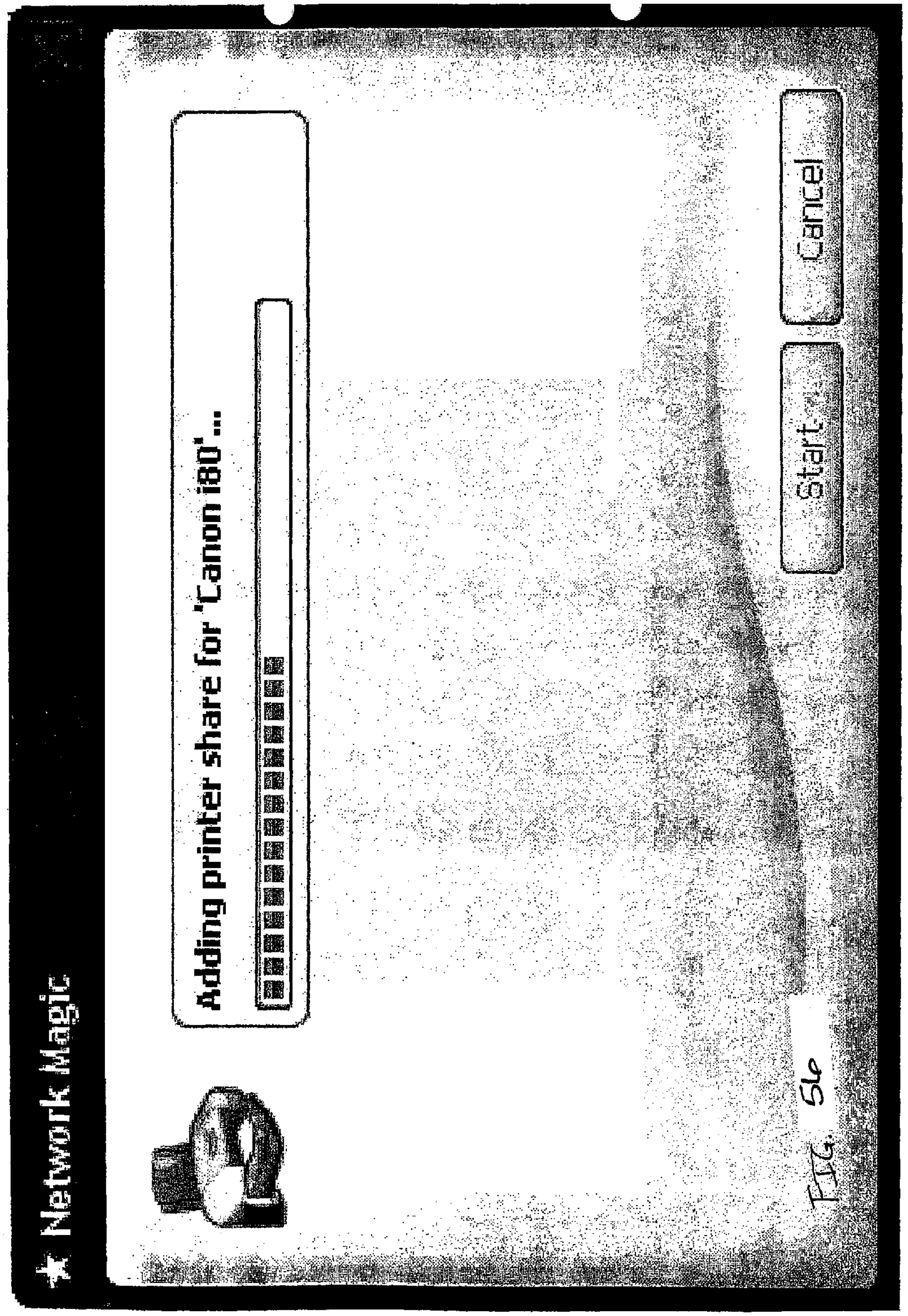
FIG. 56 illustrates a user interface that may be provided according to various aspects of the invention to indicate that a shared printer resource is being added.
Figure 57:
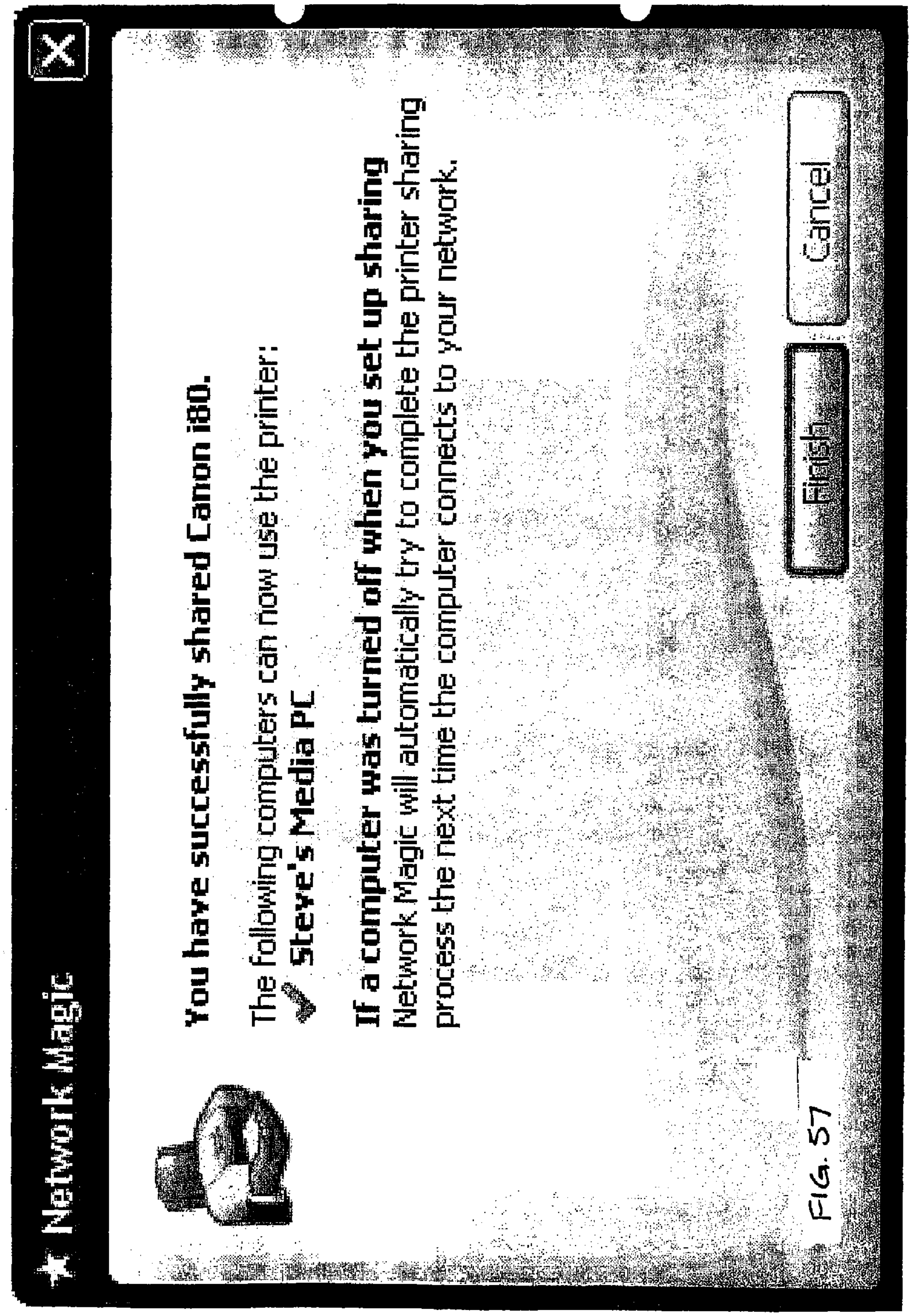
FIG. 57 illustrates a user interface that may be provided according to various aspects of the invention confirming the successful sharing of the designated printing device resource.

After the user has confirmed initiation of the sharing process for the designated printer, the tool may then provide the user interface shown in FIG. 56. At the same time, the tool will send out notifications to other instances of the tool on the network informing them of the shared printer resource, and synchronizing the network information data structure among the instances of the tool in the trusted association, as discussed in more detail above. When the sharing process has been completed, the tool may display the user interface shown in FIG. 57, confirming the successful sharing of the designated printing device resource. The user interface lists every computer that was configured to use the designated printing device resource. A green checkmark indicates the computer was successfully configured to use the designated printer device resource. A red X (not shown) would indicate the computer could not be configured to use the designated printer device resource.

Figure 58:
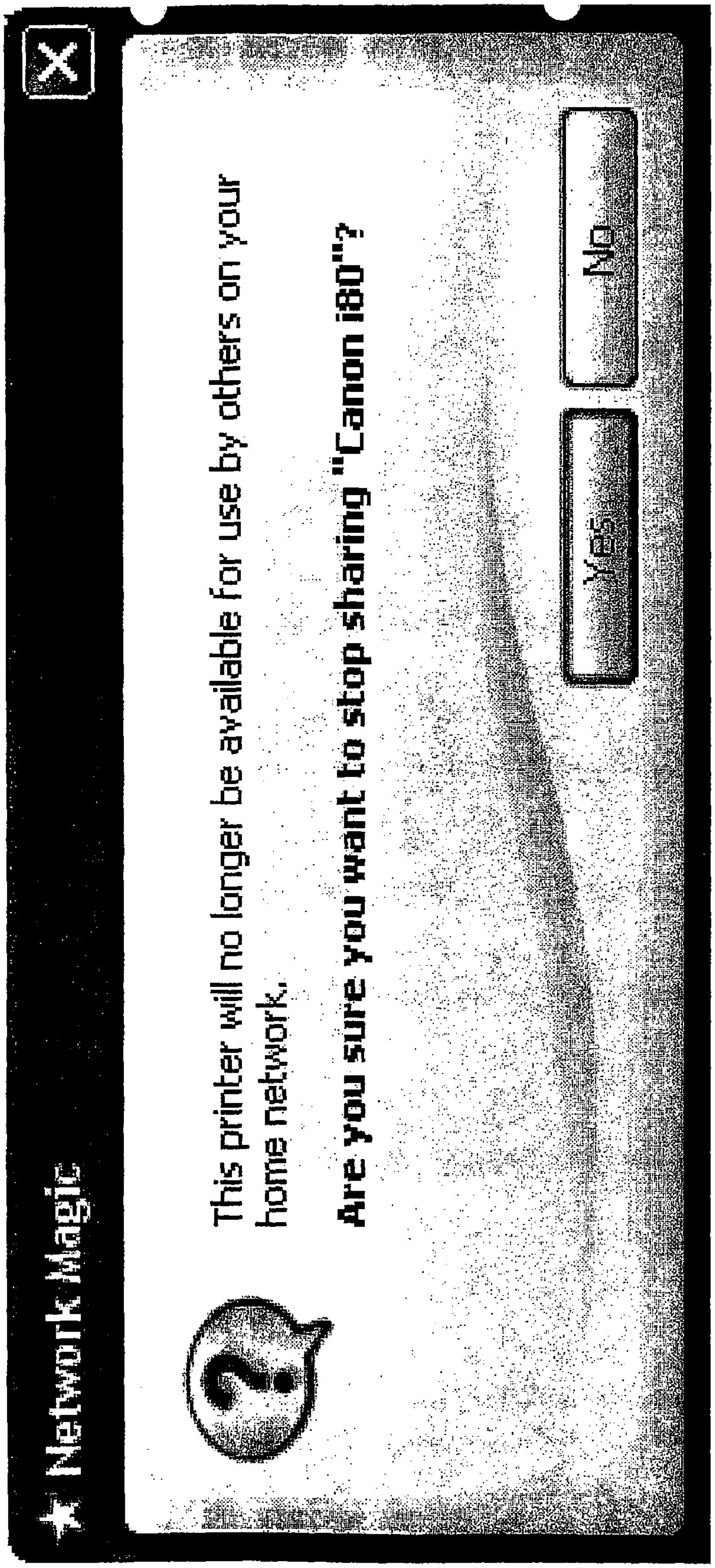
FIG. 58 illustrates a user interface that may be provided according to various aspects of the invention asking that the user confirm a decision to discontinue sharing the printer resource.

If a user subsequently decides to discontinue sharing a printing device resource, the user may select this option by, for example, a command associated with the printing device in the secondary display area or a command provided for the tool in a user interface provided by the operating system for managing the resource. With some embodiments of the invention, the tool may additionally display a confirmation message to the user, such as the message shown in FIG. 58, asking that the user confirm the decision to discontinue sharing the printer resource.

Figure 59:
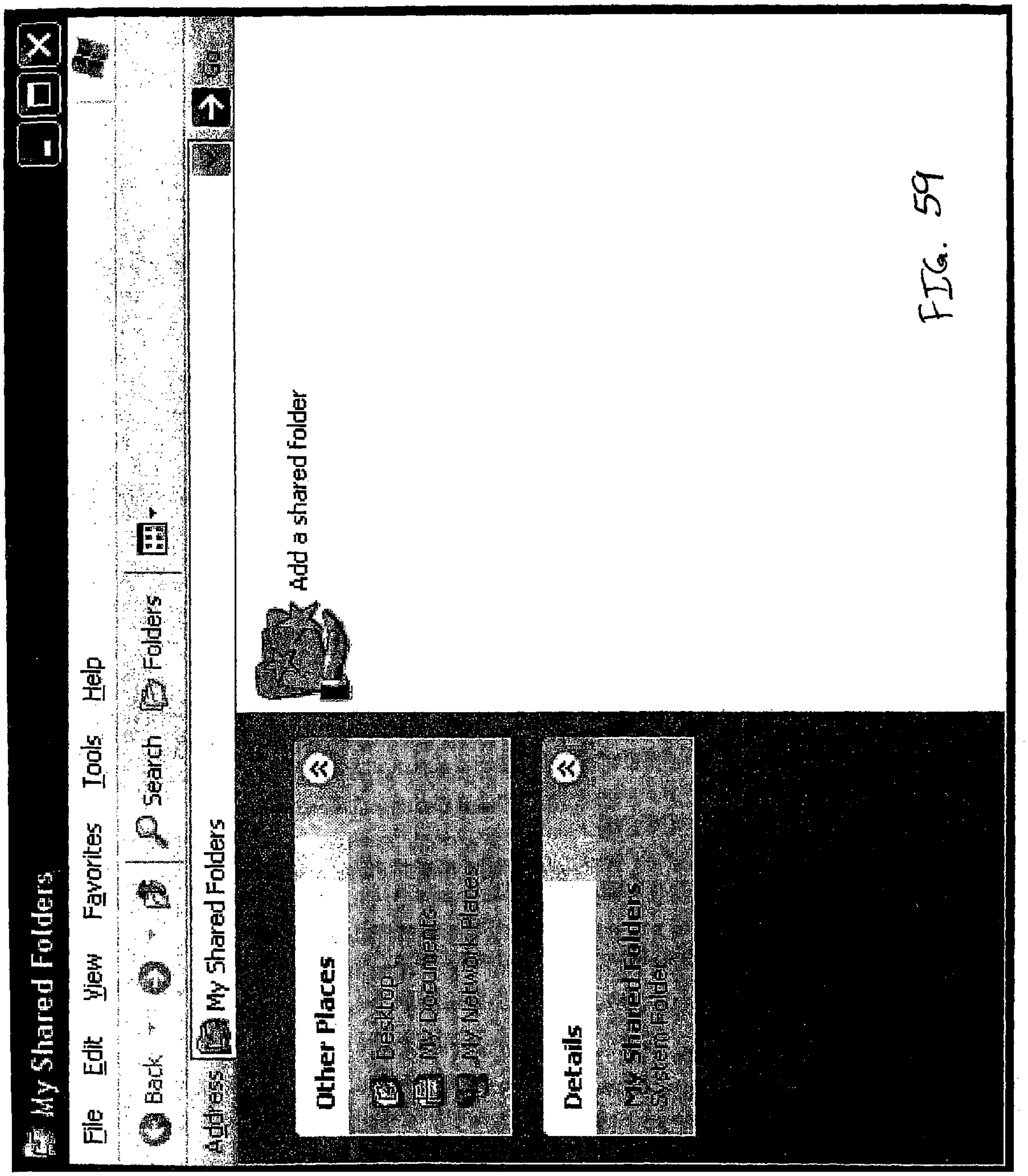
FIG. 59 illustrates a user interface that may be provided according to various aspects of the invention showing a folder for containing shared folders.

As also discussed in detail above, various embodiments of the tool may alternately or additionally allow a user to share a data resource, such as a file or folder. With some embodiments of the invention, the tool may provide a general command for creating a shared data resource in the user interface provided by the tool. Alternately or additionally, various embodiments of the invention may create a command for sharing folders through the operating system provided by the host computer. More particularly, some embodiments of the invention may add an entry for shared folders in the user interface employed by the host computer's operating system to list files available to the host computer. For example, as illustrated in FIG. 59, a folder, entitled "My Shared Folders," is provided in the Microsoft Windows Explorer user interface provided by the Microsoft Windows operating system for containing shared folders. As seen in this figure, this folder may also contain a command icon to add a shared folder.

Figure 60:
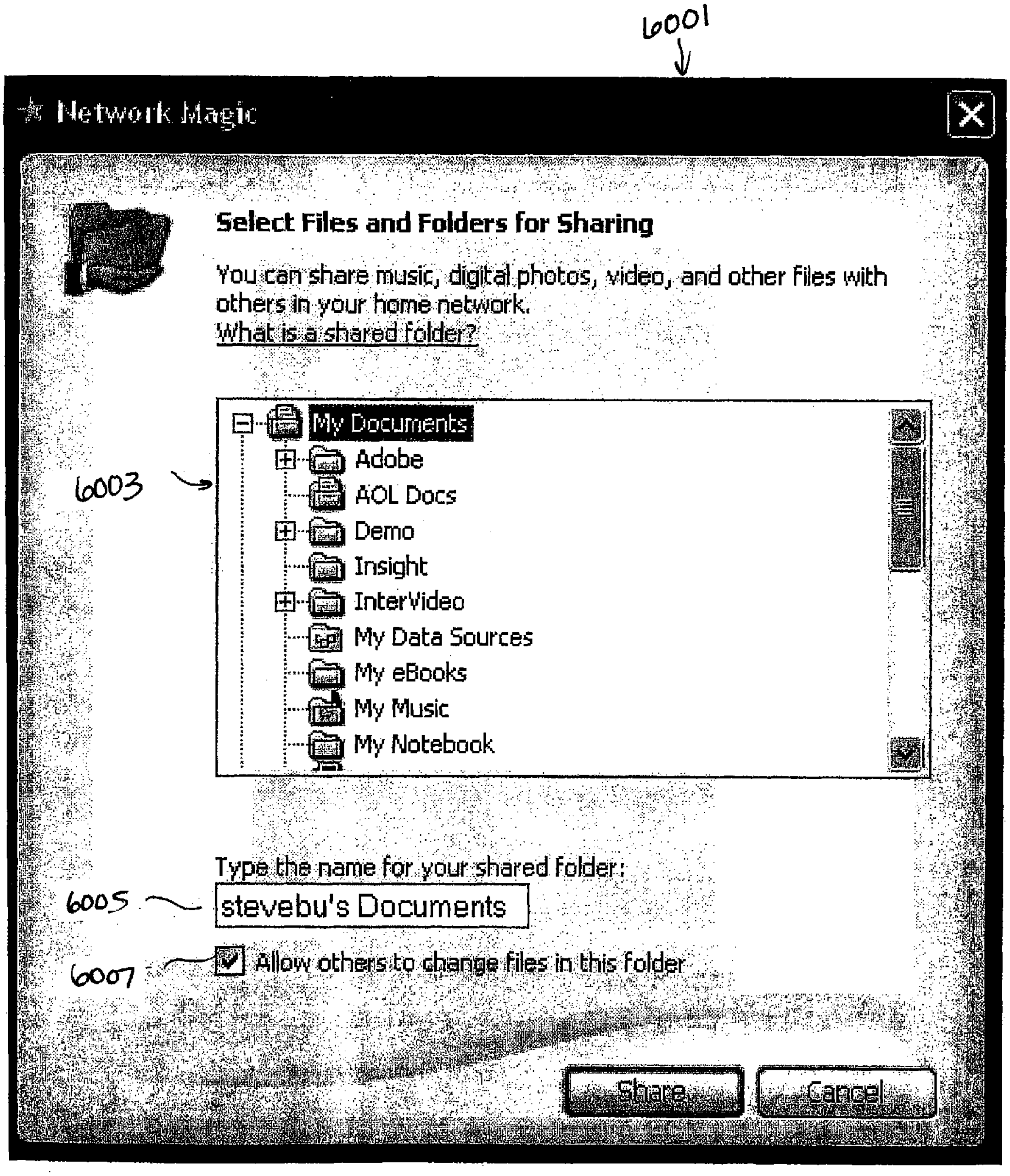
FIG. 60 illustrates a user interface that may be provided according to various aspects of the invention to assist a user in selecting a resource for sharing.
Figure 61:
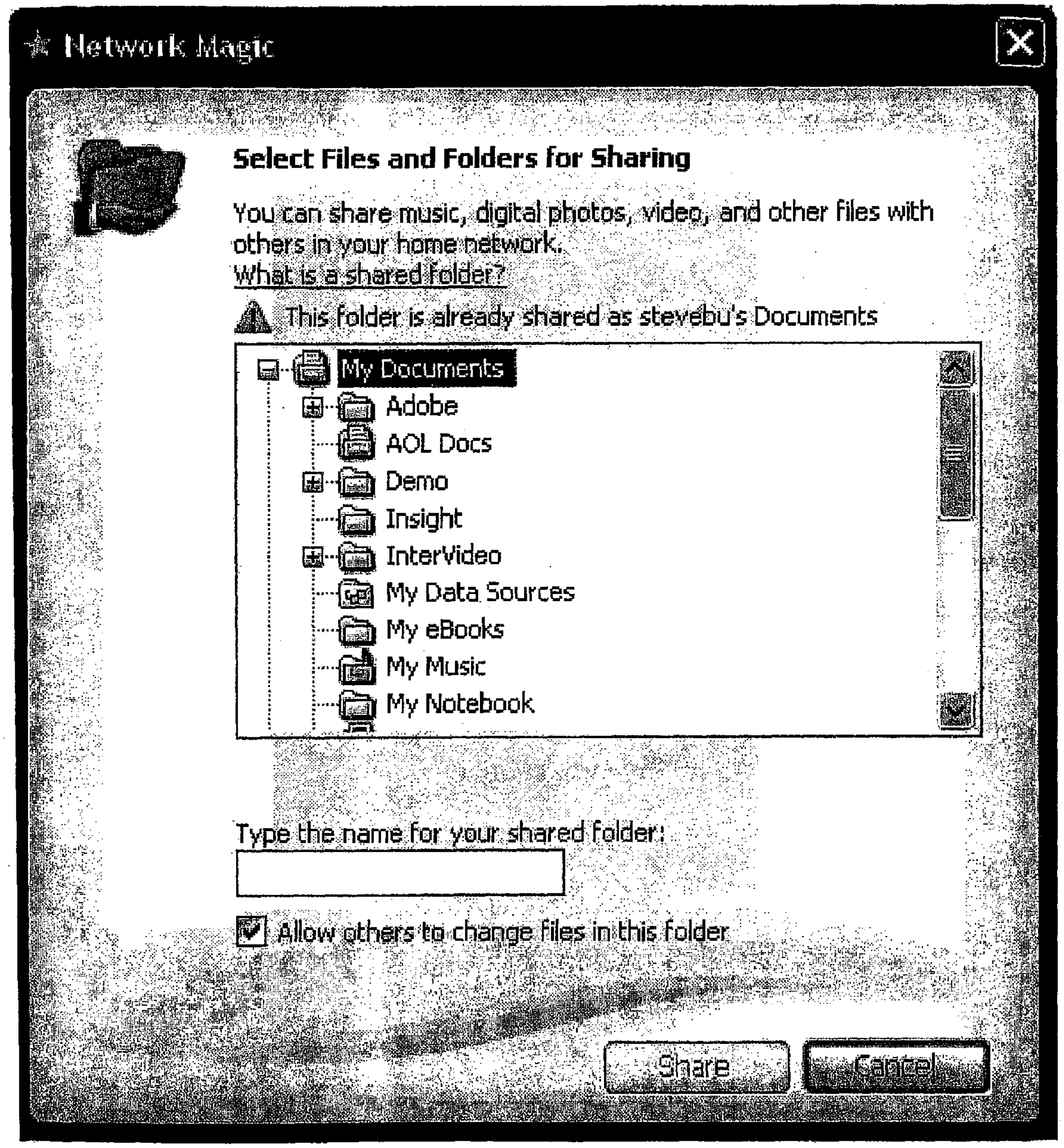
FIG. 61 illustrates a user interface that may be provided according to various aspects of the invention providing a user with a warning that a selected resource has already been shared.

When the user employs this type of general command to one or more data resources, the tool may provide the user with an interface for selecting the resource, such as the user interface illustrated in FIG. 60. As seen in this figure, the user interface 6001 provides a list 6003 of data resources (e.g., folders) that may be shared with other instances of the tool in the network. When the user selects a resource for sharing, the user may provide a shared name for the resource in the control 6005. In addition, the user may designate a control 6007 which determines whether other users in the trusted association may change the contents of the selected data resource. If the user subsequently attempts to share the same resource, this user interface may provide the user with a warning that the resource has already been shared as shown in FIG. 61.

Figure 62:
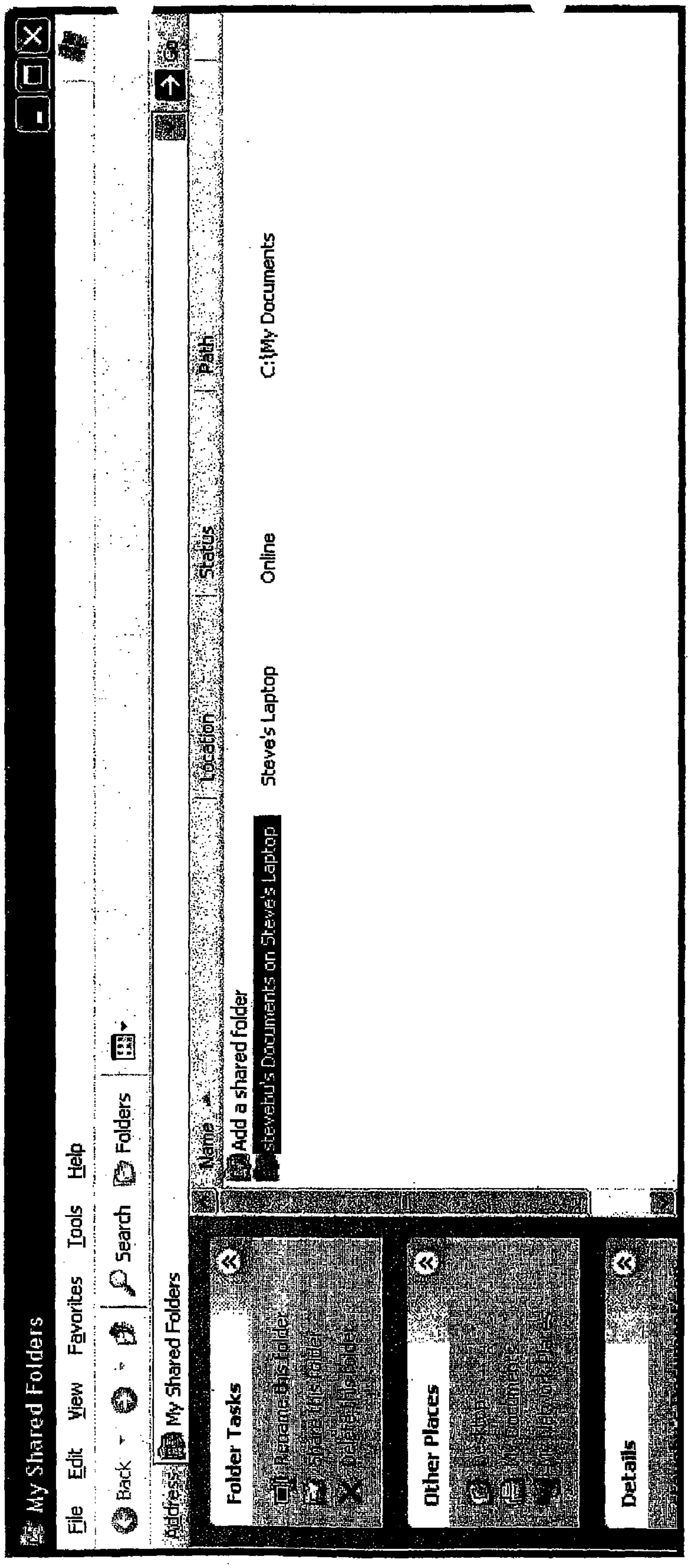
FIG. 62 illustrates a shared folder shown in the user interface provided by the operating system according to various aspects of the invention.
Figure 63:
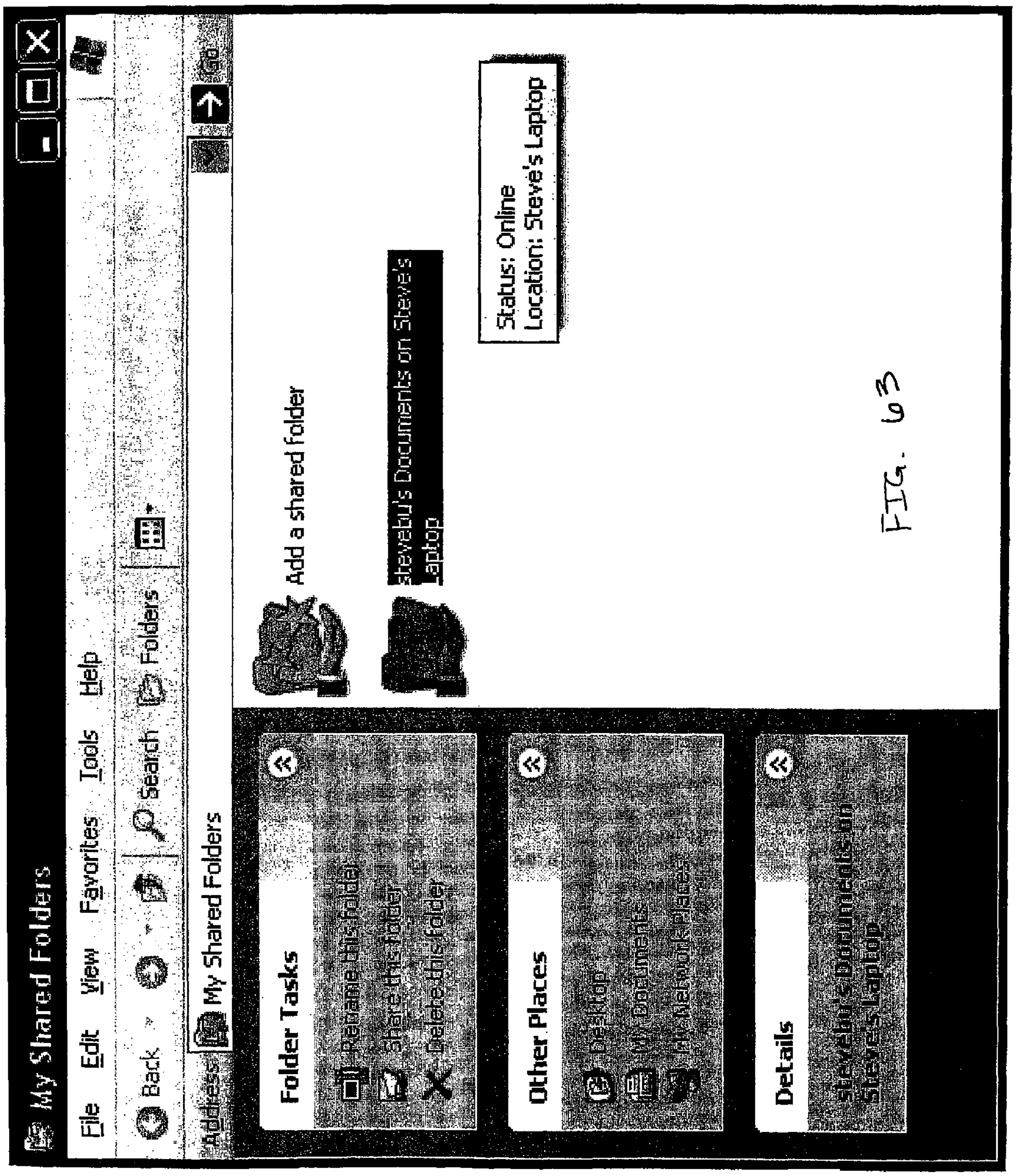
FIG. 63 illustrates a user interface that may be provided according to various aspects of the invention displaying the name and status of the computer responsible for maintaining a shared file.
Figure 64:
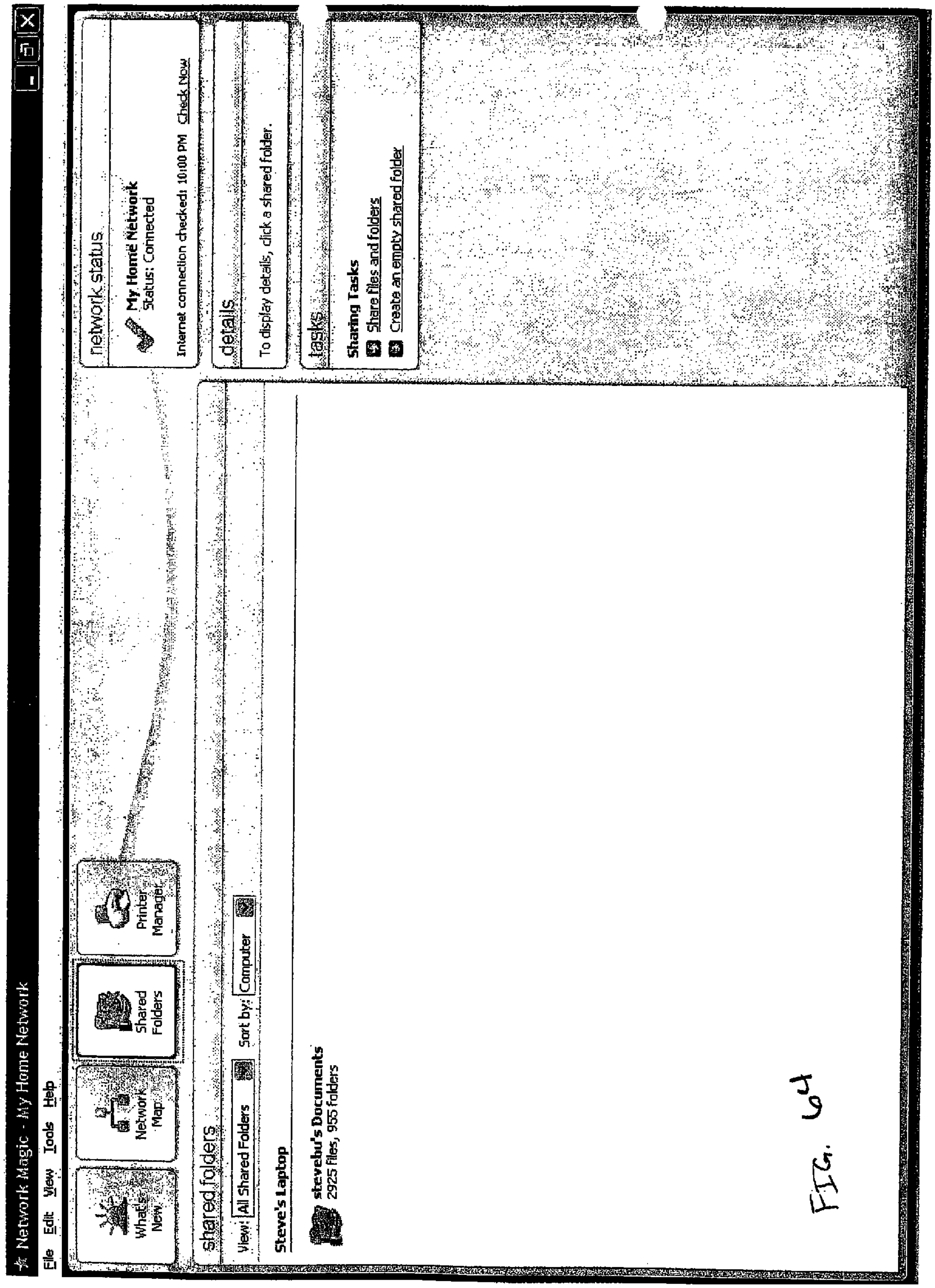
FIG. 64 illustrates a user interface that may be provided according to various aspects of the invention showing shared folders available to the host computer.

As shown in FIG. 62, when a user has shared a resource, it will be displayed as a shared folder in the user interface provided by the operating system. With some embodiments of the invention, if a user selects a shared folder displayed in this manner, the tool may additionally cause the name and status of the computer responsible for maintaining the shared file to be displayed, as shown in FIG. 63. When the shared folders selection button 2715 then is activated in the user interface provided by the tool, the shared folders available to the host computer will be displayed in the primary display area of the user interface as shown in FIG. 64.

Figure 65:
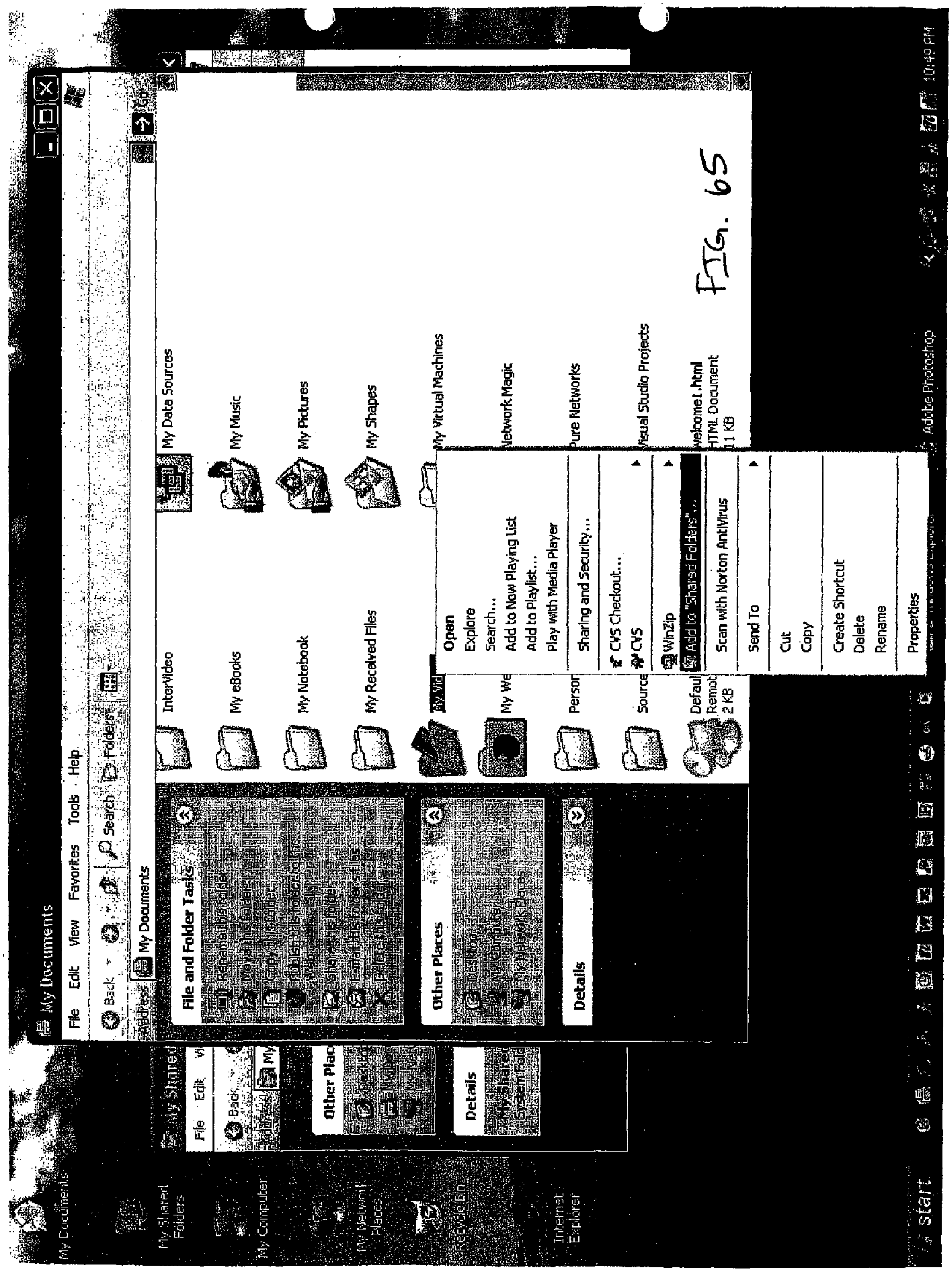
FIG. 65 illustrates the insertion of a command to share the selected file or folder among the other conventional menu commands in a user interface that may be provided according to various aspects of the invention.
Figure 66:
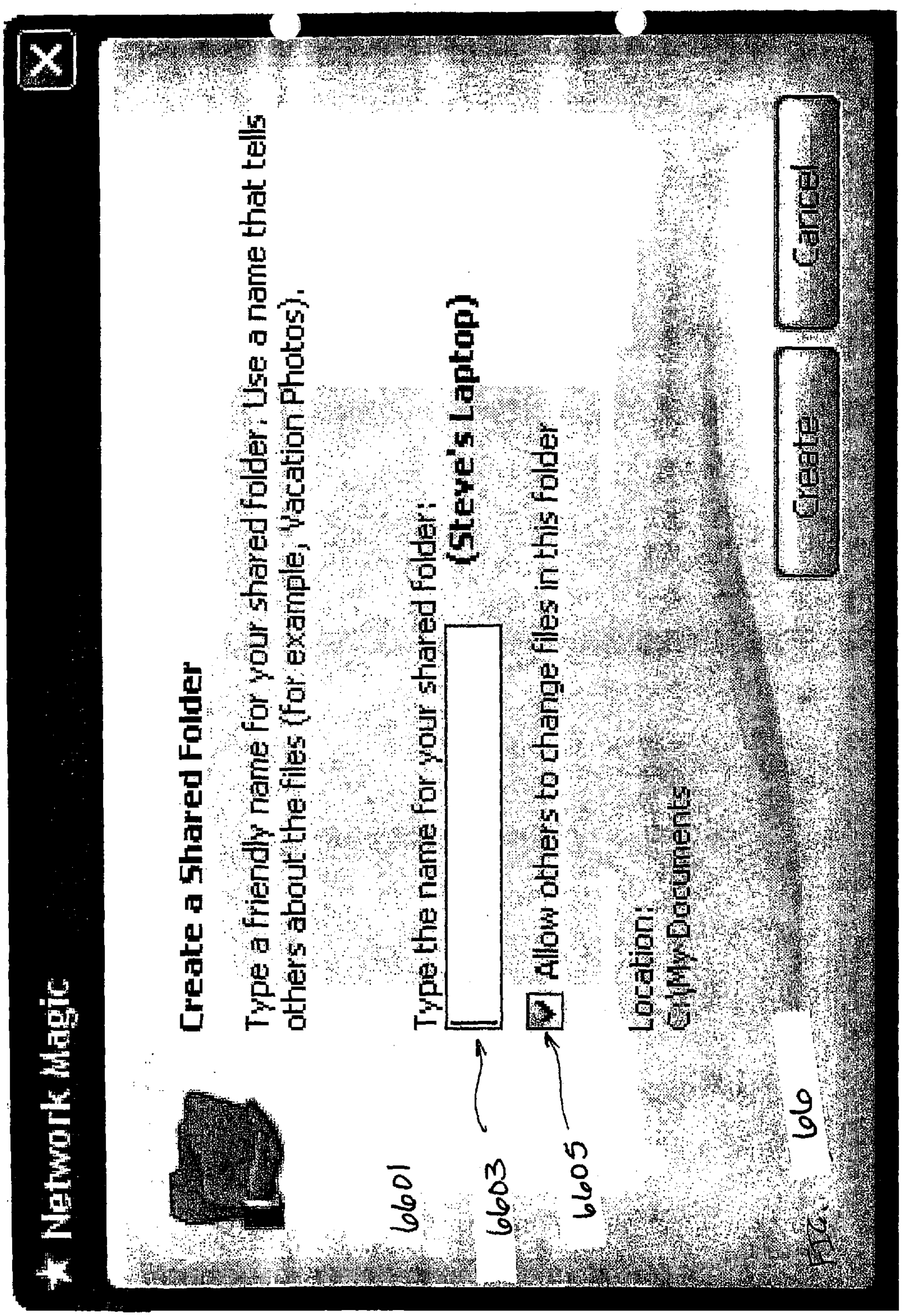
FIG. 66 illustrates a user interface that may be provided according to various aspects of the invention allowing the user to designate name under which the folder will be shared.

Still other embodiments of the invention may alternately or additionally insert resource sharing commands into other aspects of a user interface provided by the operating system for monitoring and controlling the resources. For example, FIG. 65 illustrates an example of the Microsoft Windows Explorer user interface displaying files locally available on the host machine. When the user selects a file, and activates a menu associated with the file, the tool will insert a command among the other conventional menu commands to share the selected file or folder, as shown in FIG. 65. When the user selects to create a new shared folder, the tool may provide an interface allowing the user to designate name under which the folder will be shared, such as the user interface in FIG. 66. As seen in this figure, the user interface 6601 provides a control 6603 in which the user can enter the desired name under which the selected file or folder will be shared. The user interface 6601 may also include a control 6605, allowing the user to select whether the file or folder can be modified by other users in the trusted association.

Figure 67:
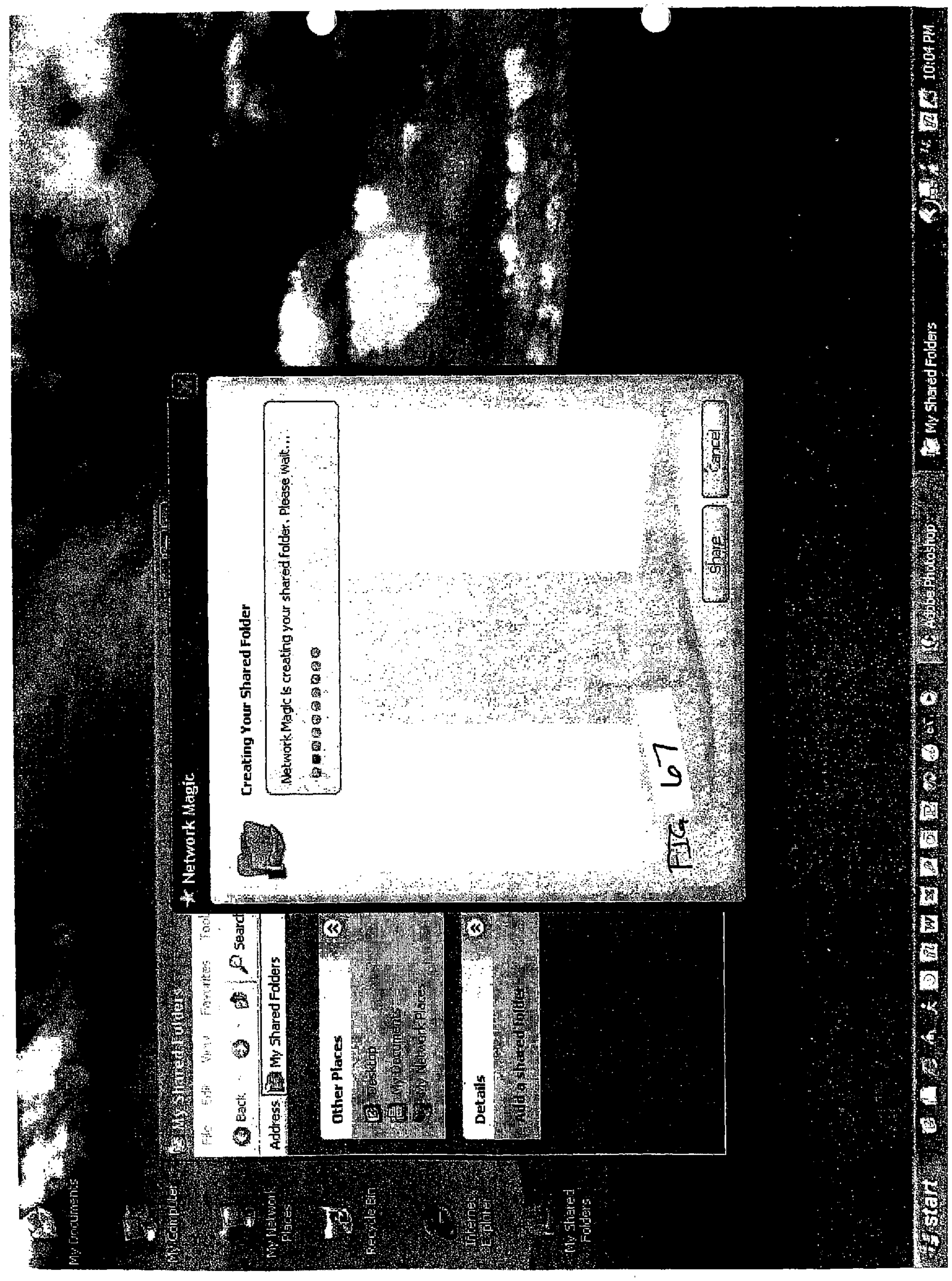
FIG. 67 illustrates a user interface that may be provided according to various aspects of the invention indicating that a resource is being shared with other instances of a network management tool.
Figure 68:
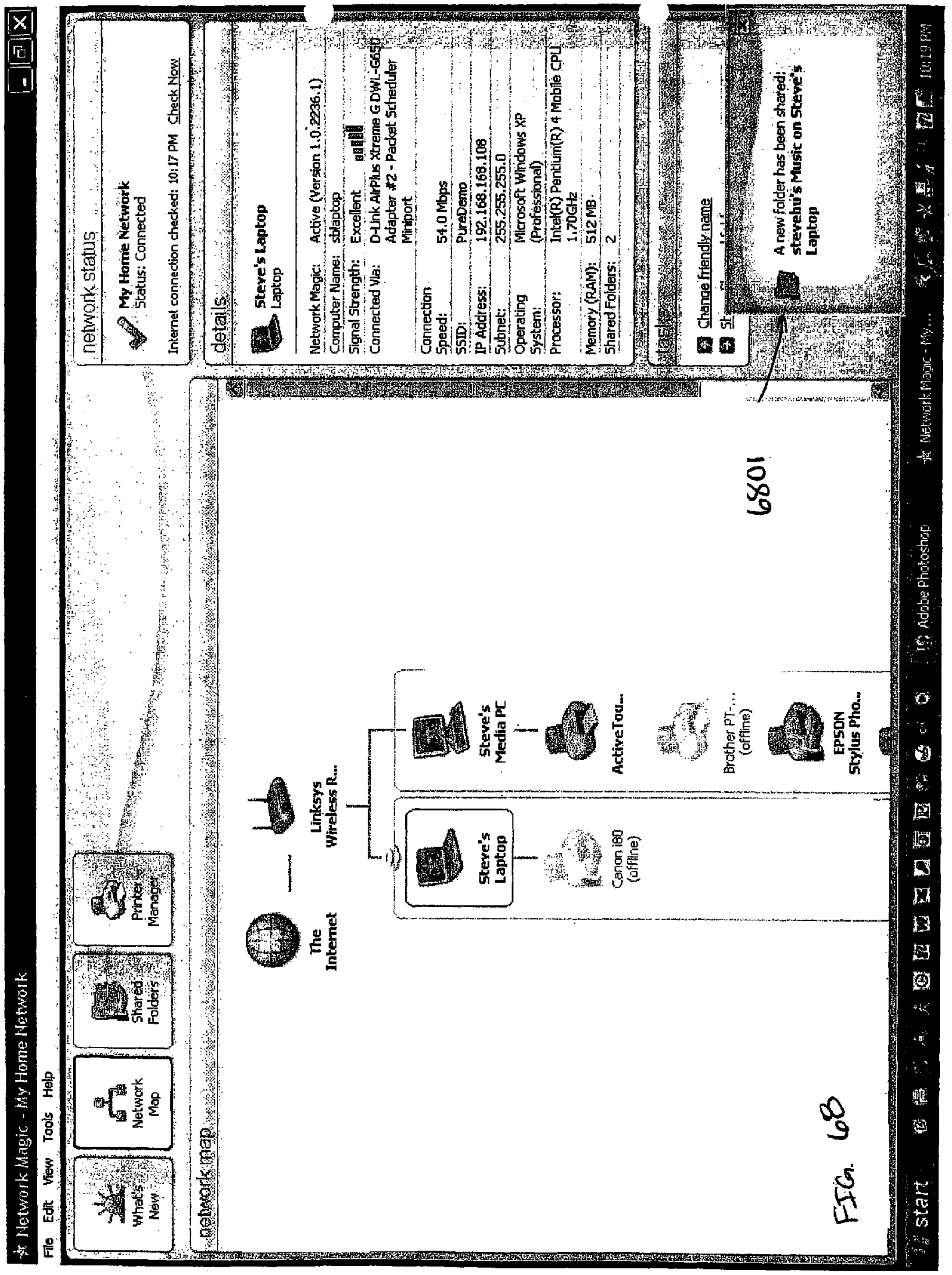
FIG. 68 illustrates a user interface that may be provided according to various aspects of the invention with a notification messages informing users of a shared resource.
Figure 69:
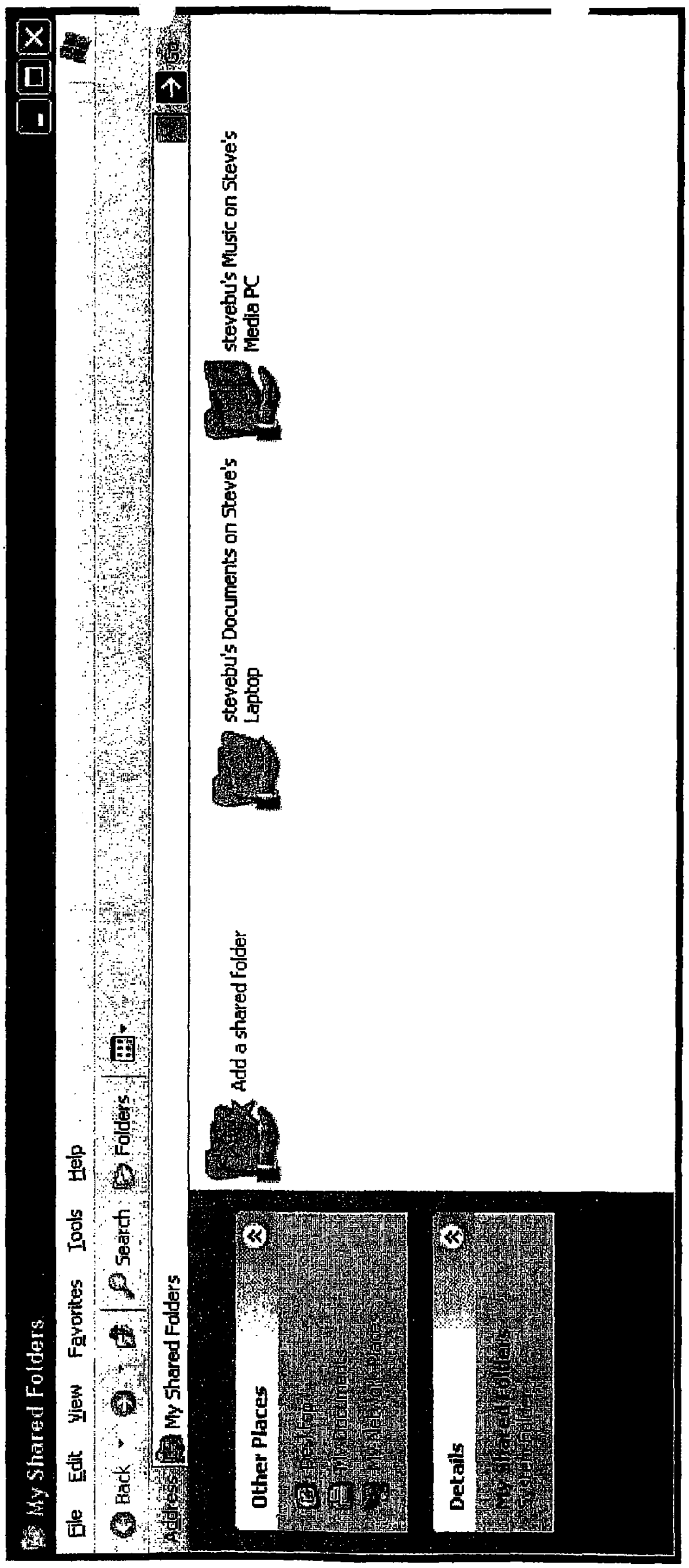
FIG. 69 illustrate how added data resource may be displayed in the general resource display interface provided by the operating system according to various aspects of the invention.

Once the user has submitted the information necessary to share a file folder and instructed the sharing process to begin, various embodiments of the invention may provide a user interface, such as the user interface shown in FIG. 67, indicating that the resource is being shared with other instances of the tool. As described in detail above, during this process the information necessary to access a file or folder selected by the user is being shared with other instances of the tool in the trusted association. Instances of the tool in the trusted association also may provide notification messages informing users of the shared resource, such as the notification message 6801 shown in FIG. 68. Again, the added data resource may be displayed in the general resource display interface provided by the operating system, as shown in FIG. 69.

Figure 70:
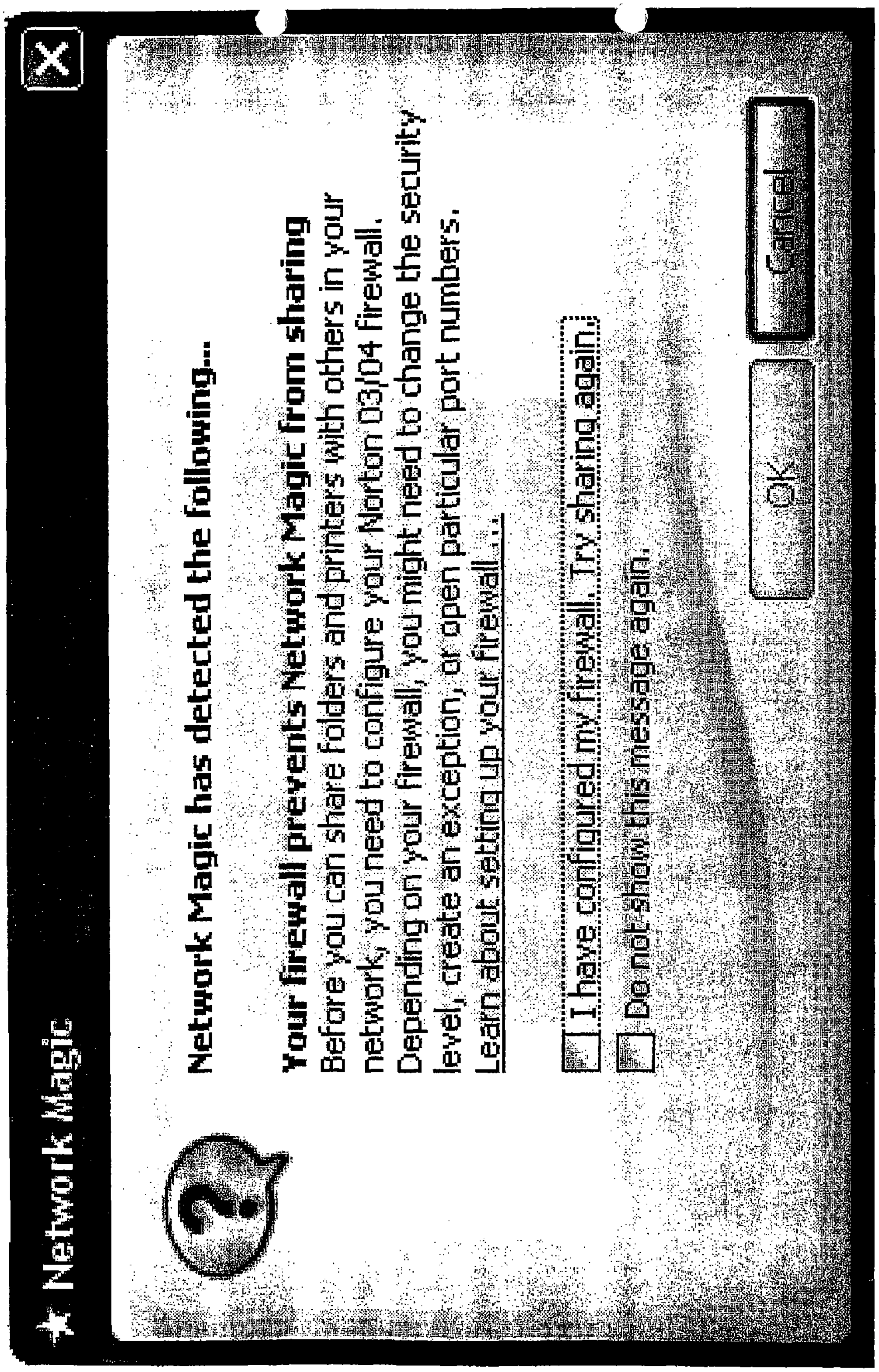
FIG. 70 illustrates a notification message that may be provided by according to various aspects of the invention when a firewall prevents a network management tool from sharing a resource with another instance of the tool in the network.

If, however, the tool is unable to share the resource for some reason, it may notify the user that the sharing process failed. More particularly, various embodiments of the invention may provide a notification message reporting the sharing process failure to the user. For example, FIG. 70 illustrates a notification message that may be provided by some embodiments of the invention when a firewall prevents the tool from sharing a resource with another instance of the tool in the network.

Figure 71:
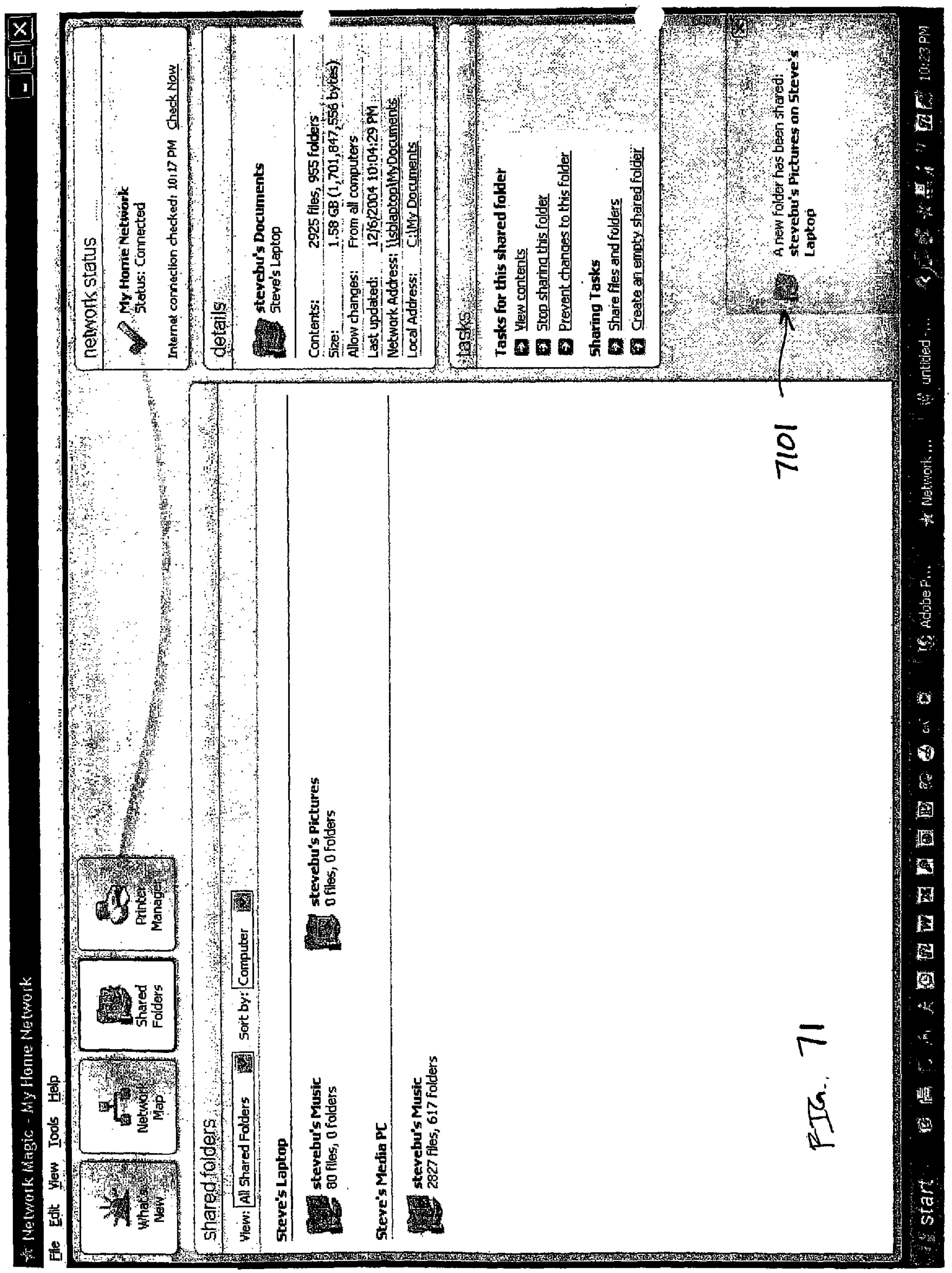
FIG. 71 illustrates a user interface that may be provided according to various aspects of the invention alerting the user that a new data resource has been shared.

Once a data resource, such as a folder, has been shared, the tool may display a notification, such as the notification message 7101 shown in FIG. 71, alerting the user that a new data resource has been shared. In addition, the resource may be displayed in the primary display area of the user interface. For example, as previously noted, selecting the shared folder selection button 2715 will display shared folders in the primary display area. With various embodiments of the invention, the display of the shared resources can be organized according to different criteria.

Figure 72:
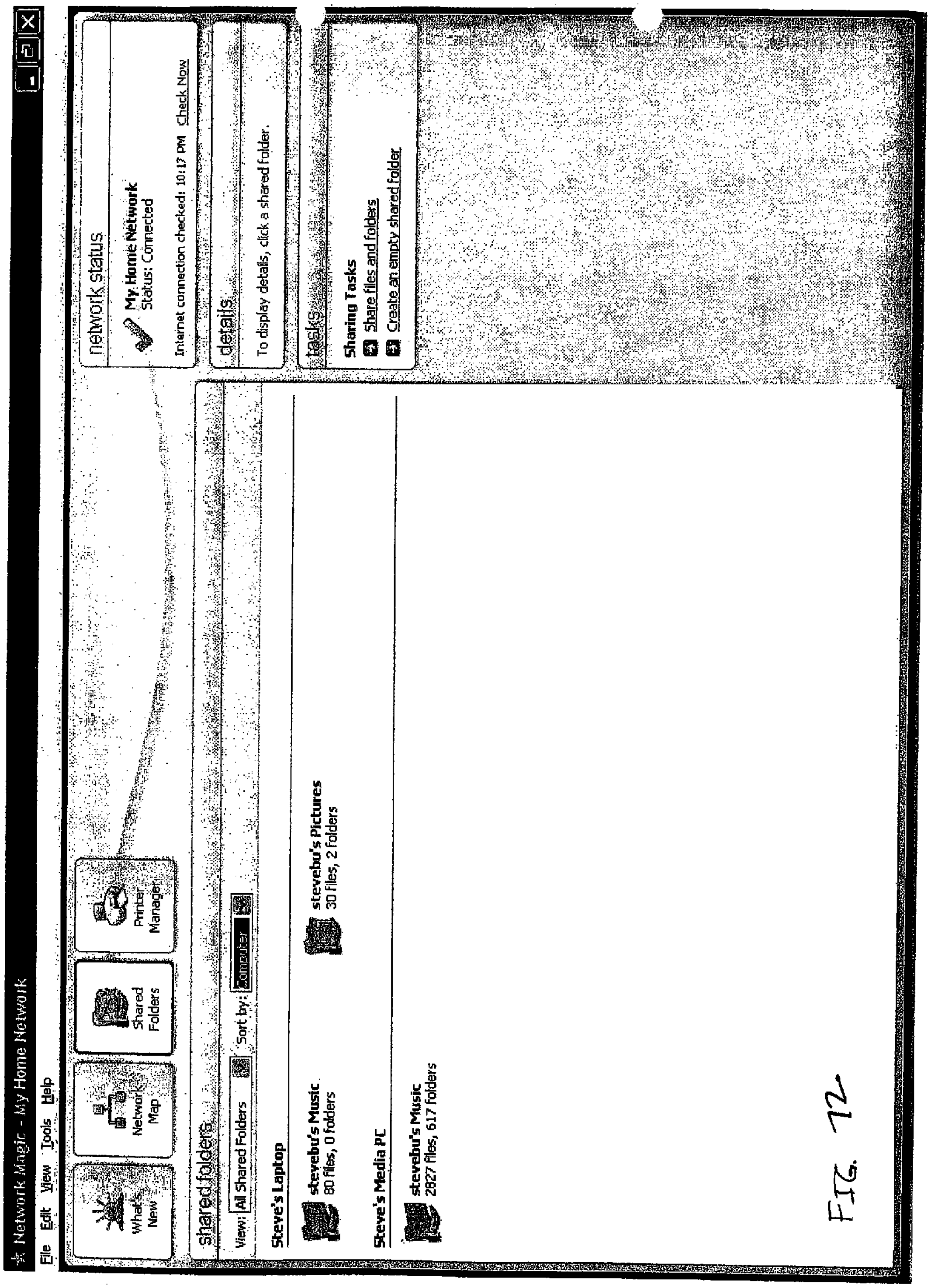
FIG. 72 illustrates a user interface that may be provided according to various aspects of the invention showing that shared resources may be organized according to the computers responsible for maintaining these resources.
Figure 73:
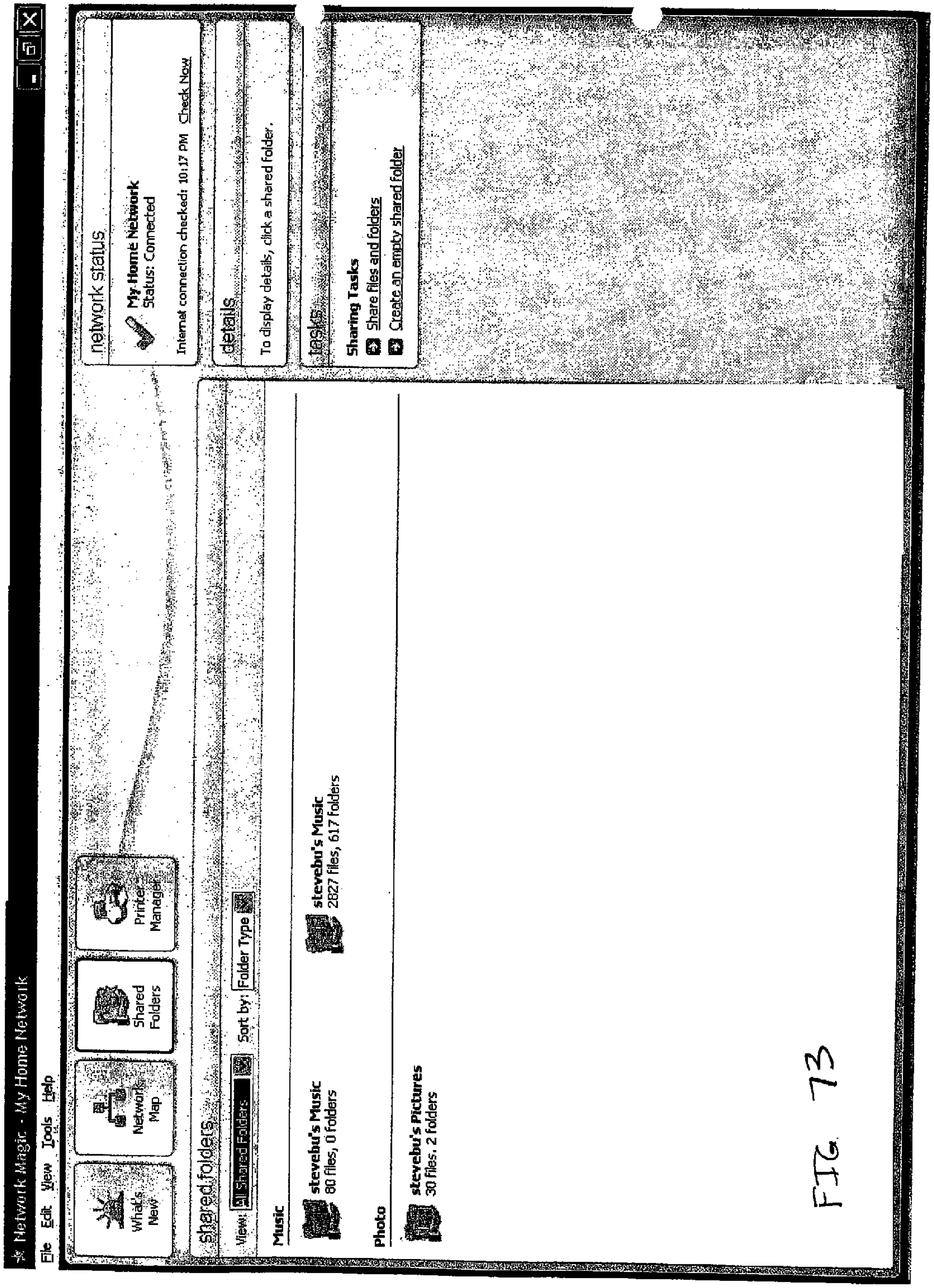
FIG. 73 illustrates a user interface that may be provided according to various aspects of the invention showing that shared folders can alternately be organized according to folder type.
Figure 74:
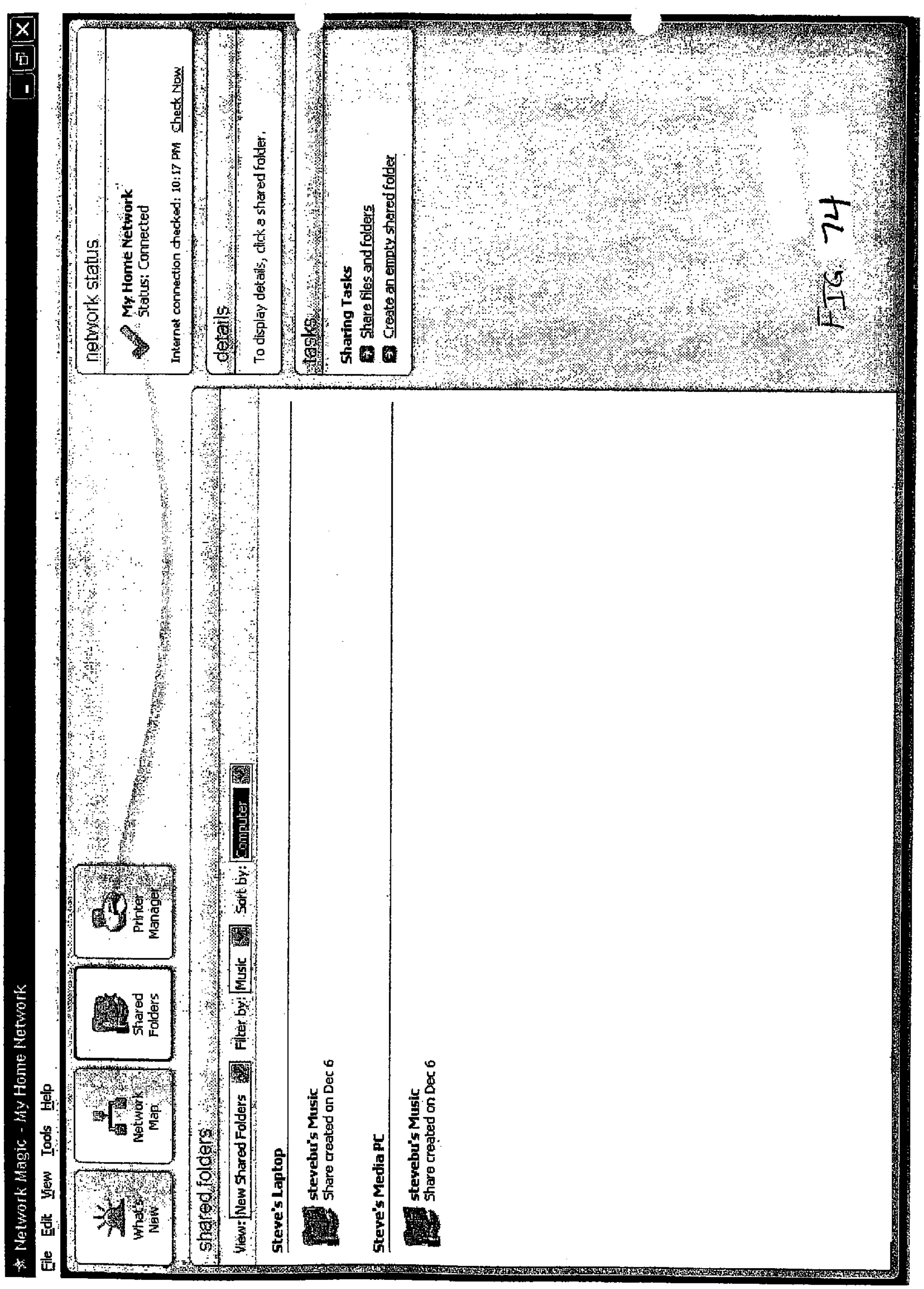
FIG. 74 illustrates a user interface that may be provided according to various aspects of the invention displaying only those shared resources designated as music type resources.

For example, as illustrated in FIG. 72, the shared resources may be organized according to the computers responsible for maintaining these resources, while FIG. 73 illustrates that the shared folders can alternately be organized according to folder type. Further, the display of the resources may be filtered based upon a resource type associated with the resource. For example, in FIG. 74, the primary display area displays only those shared resources designated as music type resources.

Figure 75:
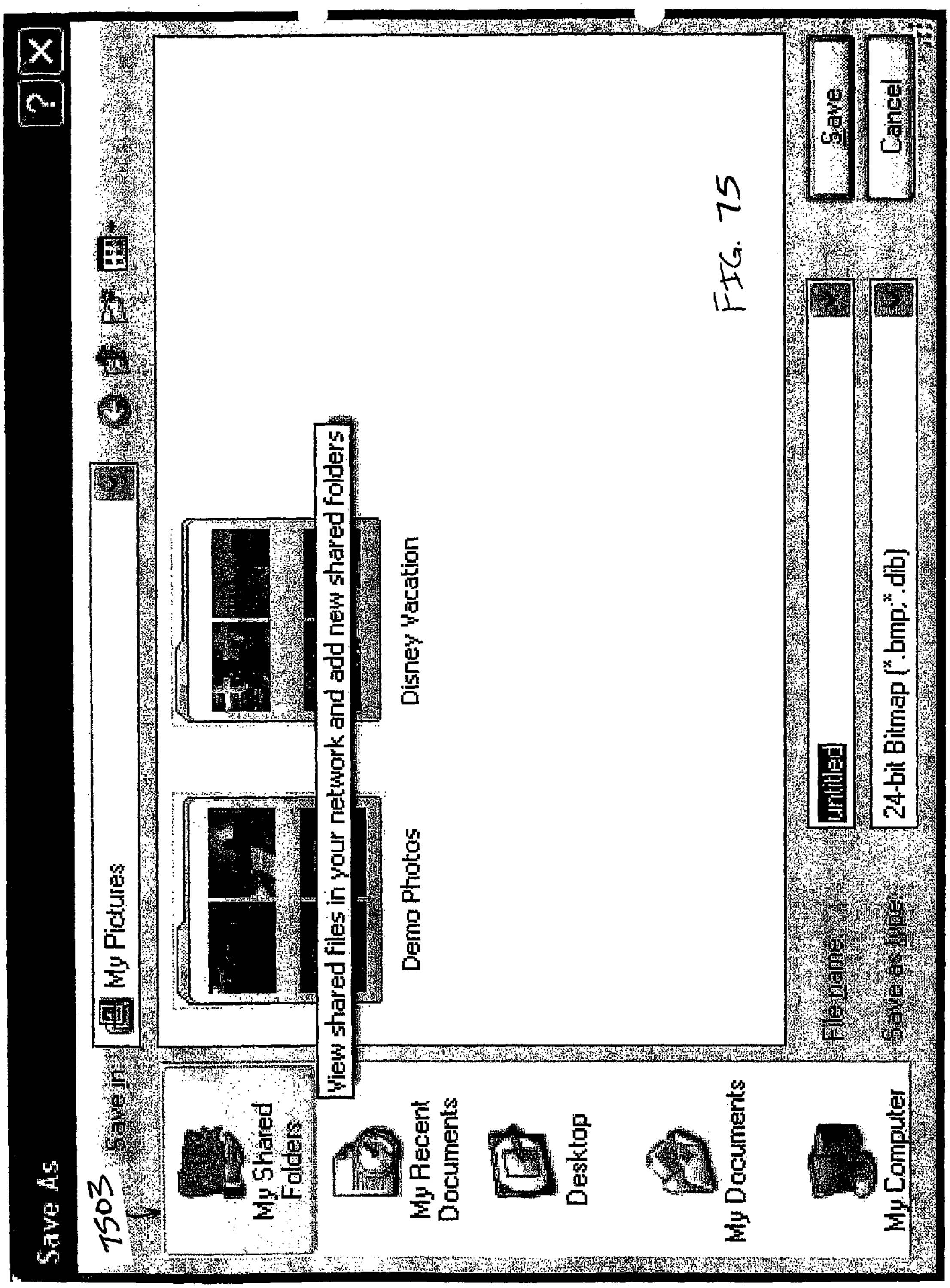
FIG. 75 illustrates an example of how files may be added to a shared data resource according to various aspects of the invention.

FIG. 75 illustrates an example of how files may be added to a shared data resource, such as a shared folder. As seen in this figure, various embodiments of the invention may work with the user interface provided by the Microsoft Windows Explorer user interface for saving data files into a designated folder. As seen in this figure, various embodiments of the tool may insert a command 7503 for selecting the group of shared folders as the location in which to save files. The user interface may further include a folder within the group of shared folders into which the files will be saved.

Figure 76:
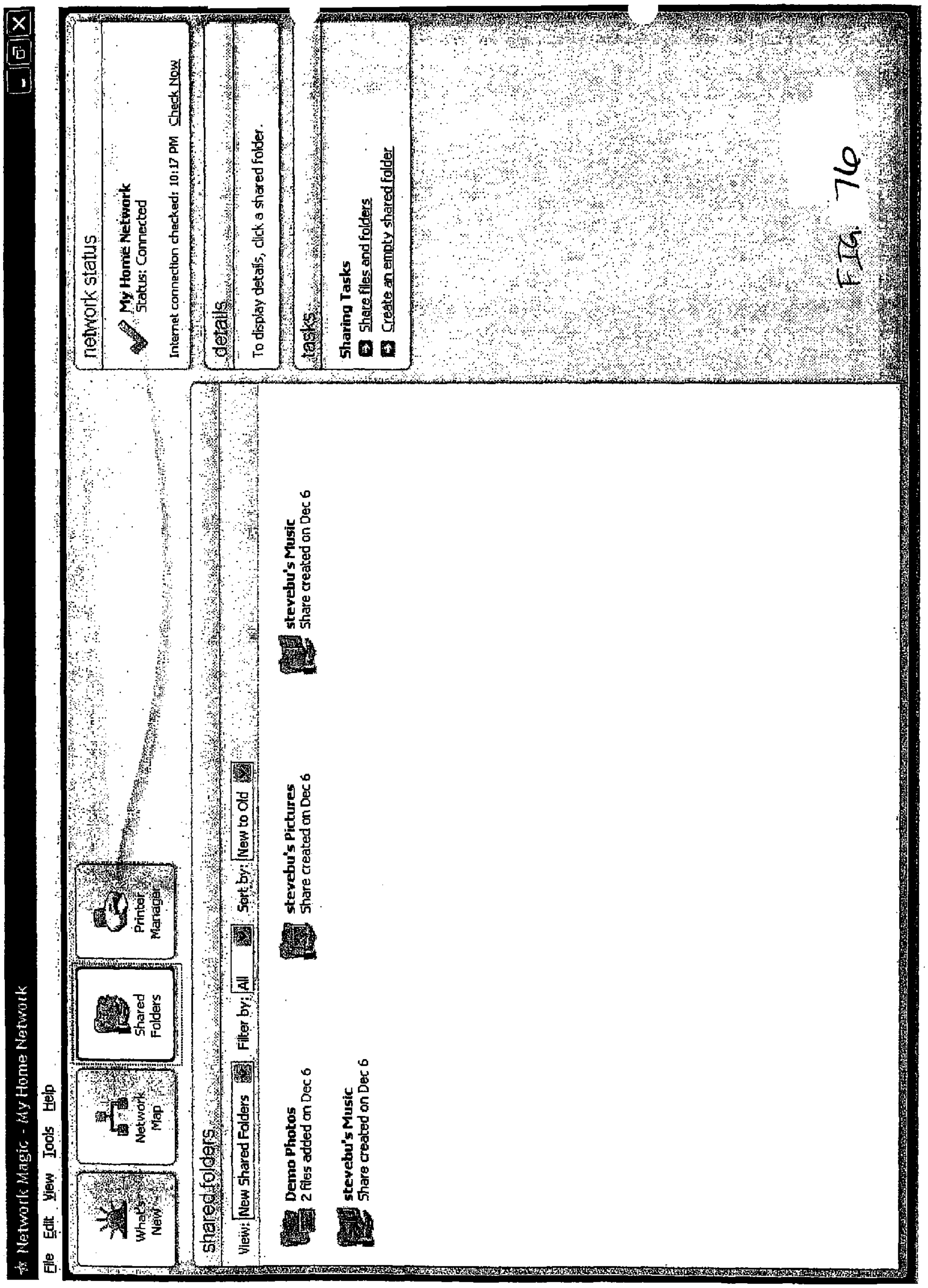
FIG. 76 illustrates a user interface that may be provided according to various aspects of the invention configured to indicate when files have been recently added to a shared folder.
Figure 77:
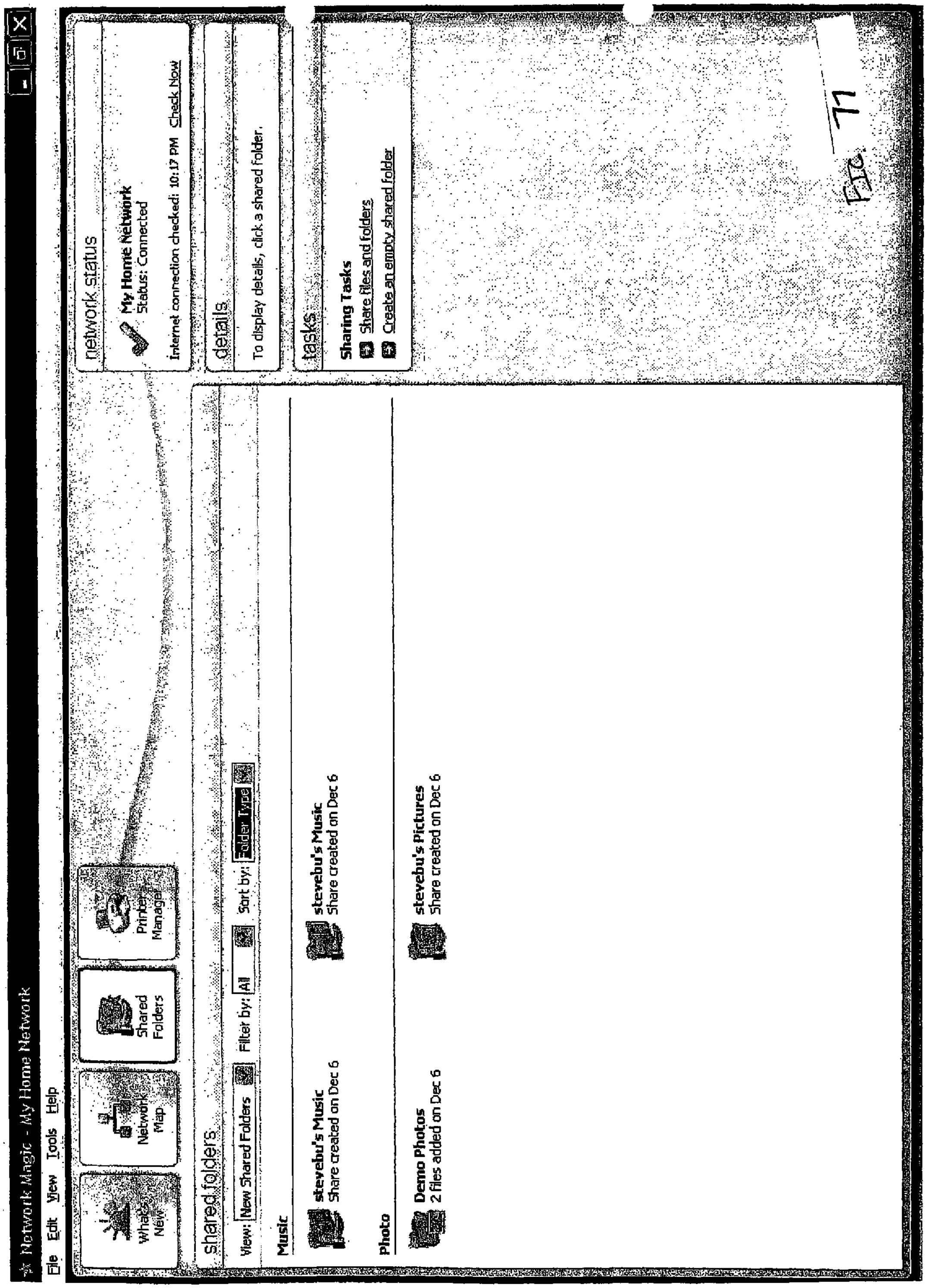
FIG. 77 illustrates a user interface that may be provided according to various aspects of the invention showing an express indication that two files were added on a recent date.

FIG. 76 then illustrates how the primary display area can be configured to indicate when files have been recently added to a shared folder. In this figure, the folder with the recently added files includes an express indication that two files were added on a recent date. In FIG. 77, the shared folders are arranged in order of creation.

Figure 78:
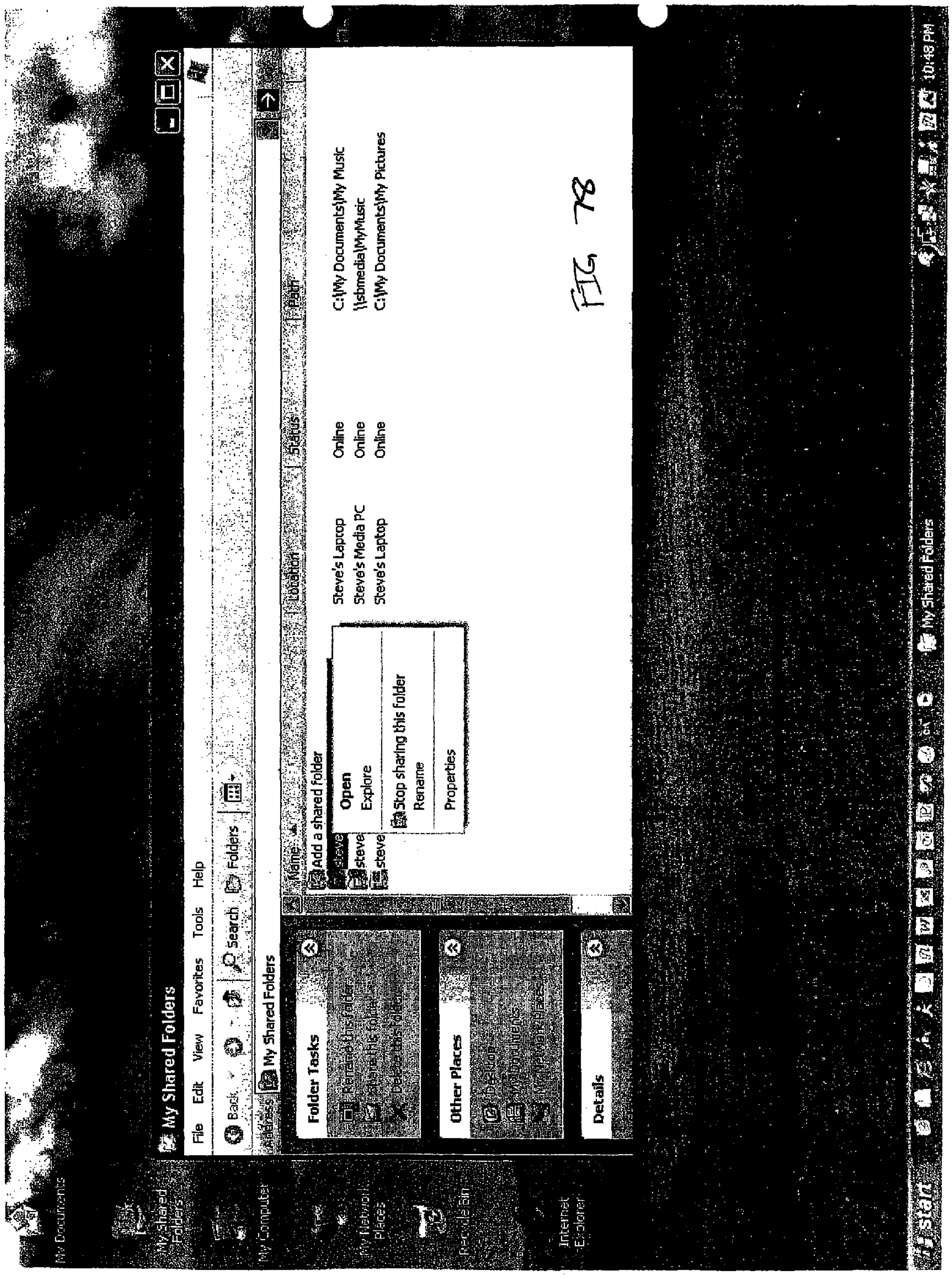
FIG. 78 illustrates the insertion of a "stop sharing" command into the menu of commands associated with the selection of a file in a user interface provided by an operating system.
Figure 79:
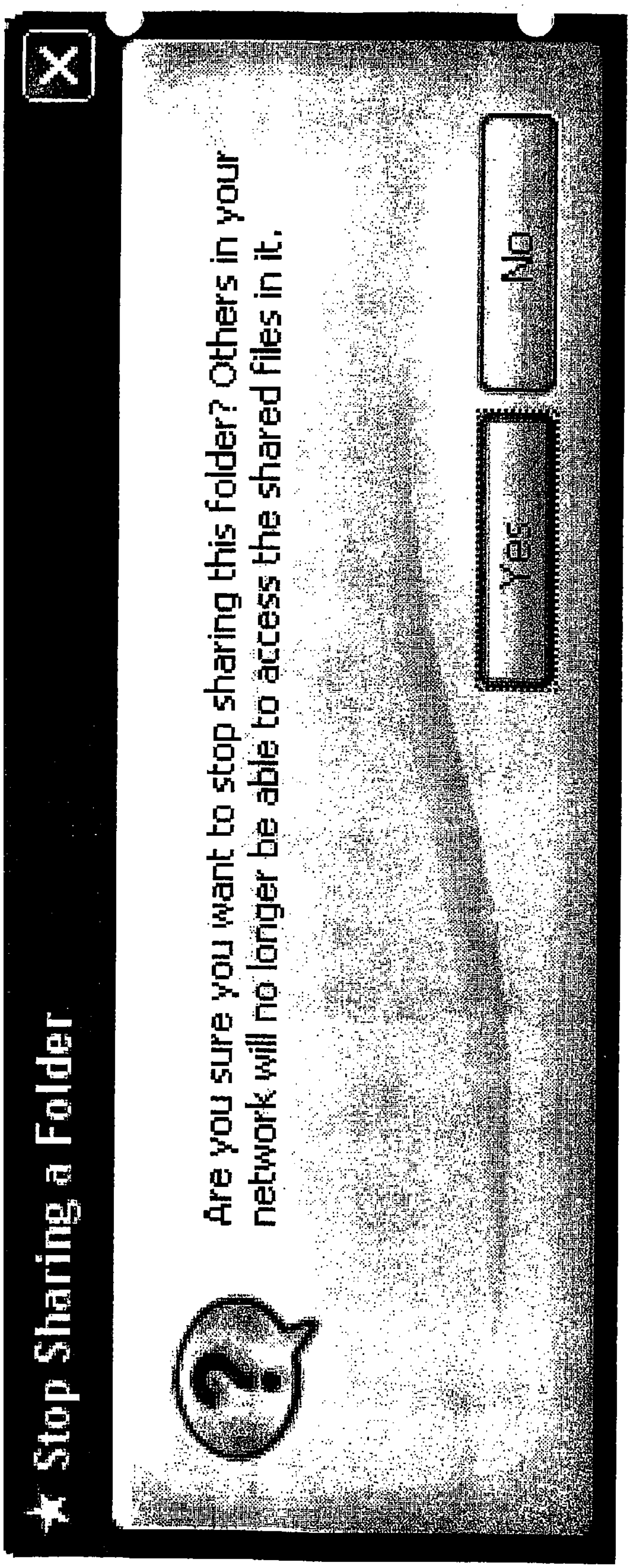
FIG. 79 illustrates a user interface that may be provided according to various aspects of the invention requesting confirmation of a selection to discontinue sharing of a file.
Figure 80:
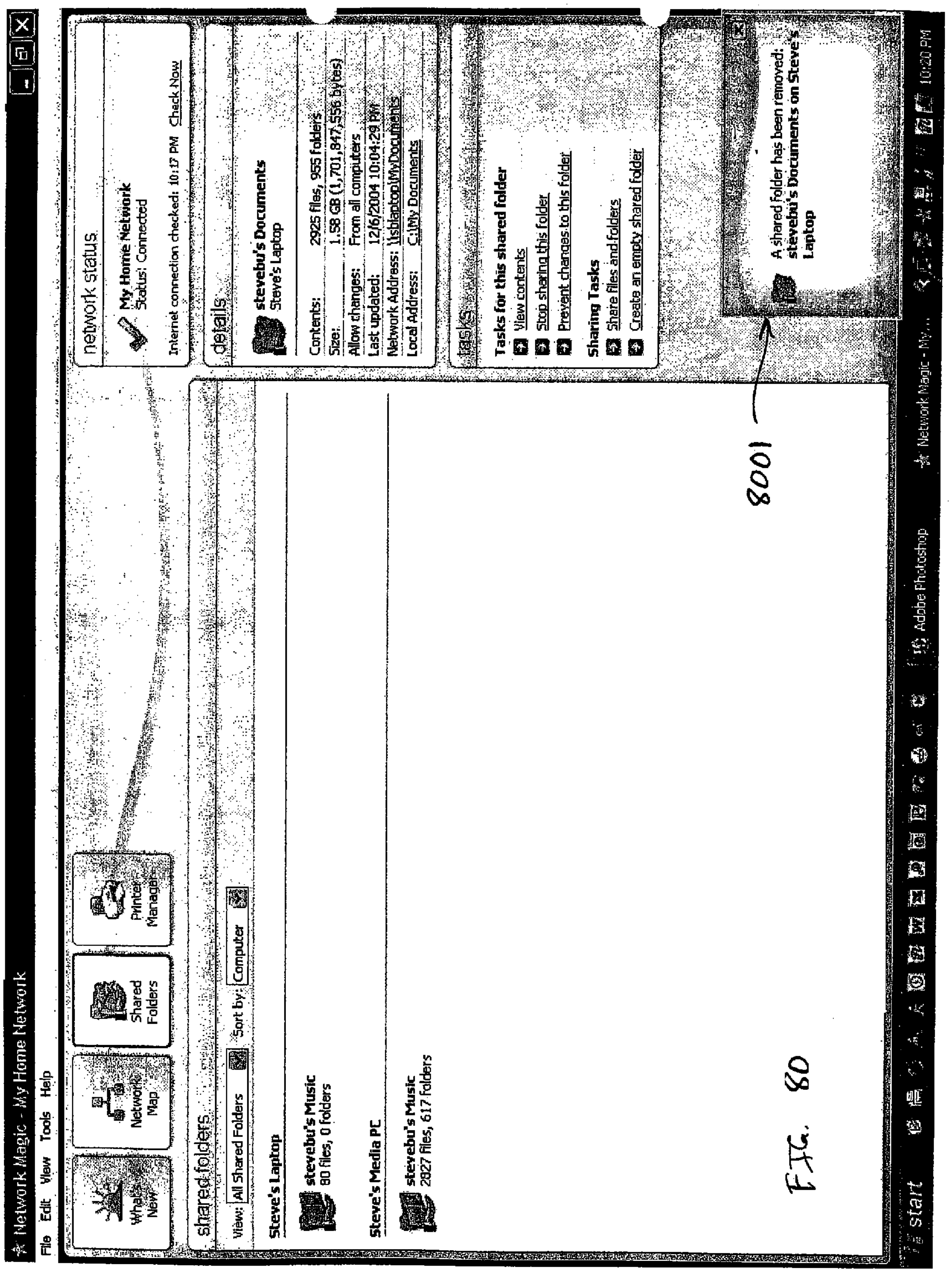
FIG. 80 illustrates one example of a notification message 8001 that may be displayed according to various aspects of the invention notifying a user that a resource is no longer being shared.

Various embodiments of the invention may additionally provide one or more techniques to allow a user to discontinue sharing of a resource, such as a data resource like a folder for file. For example, as illustrated in FIG. 78, various embodiments of the invention may insert a “stop sharing” command into the menu of commands associated with the selection of a file in a user interface provided by an operating system, such as the Microsoft Windows Explorer user interface provided by the Microsoft Windows operating system. If the user selects to discontinue sharing a file, some embodiments of the invention may additionally provide a notification requesting confirmation from the user, such as the notification message shown in FIG. 79. In addition, when the network information data structure is updated to reflect that a data resource is no longer being shared, the tool will issue an event message. This event message may then, in turn, be used to display a notification to the user that a resource has no longer been shared. For example, FIG. 80 illustrates one example of a notification message 8001 that may be displayed according to various embodiments of the invention.

Figure 81:
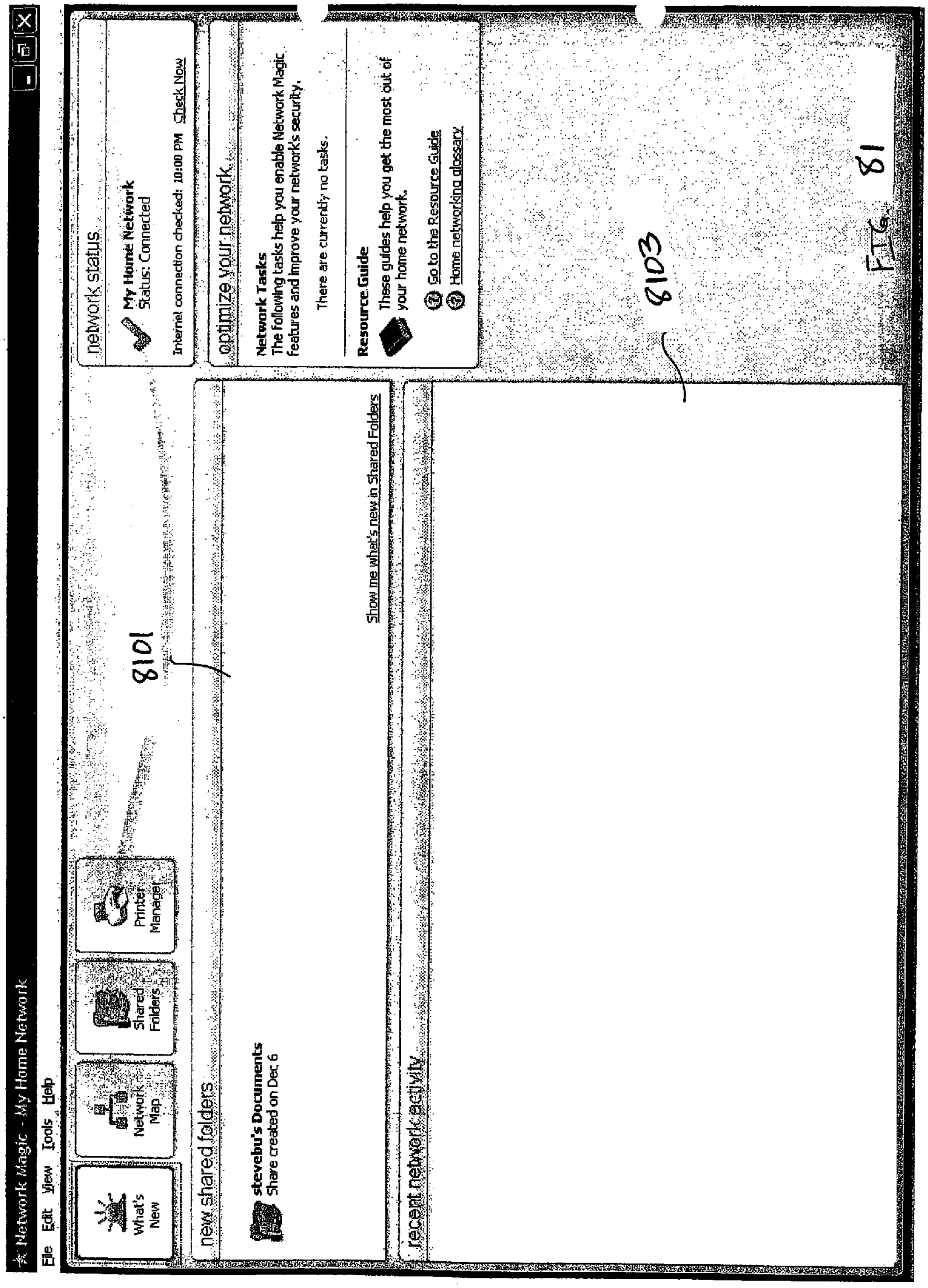
FIG. 81 illustrates a user interface that may be provided according to various aspects of the invention showing new shared folders.
Figure 82:
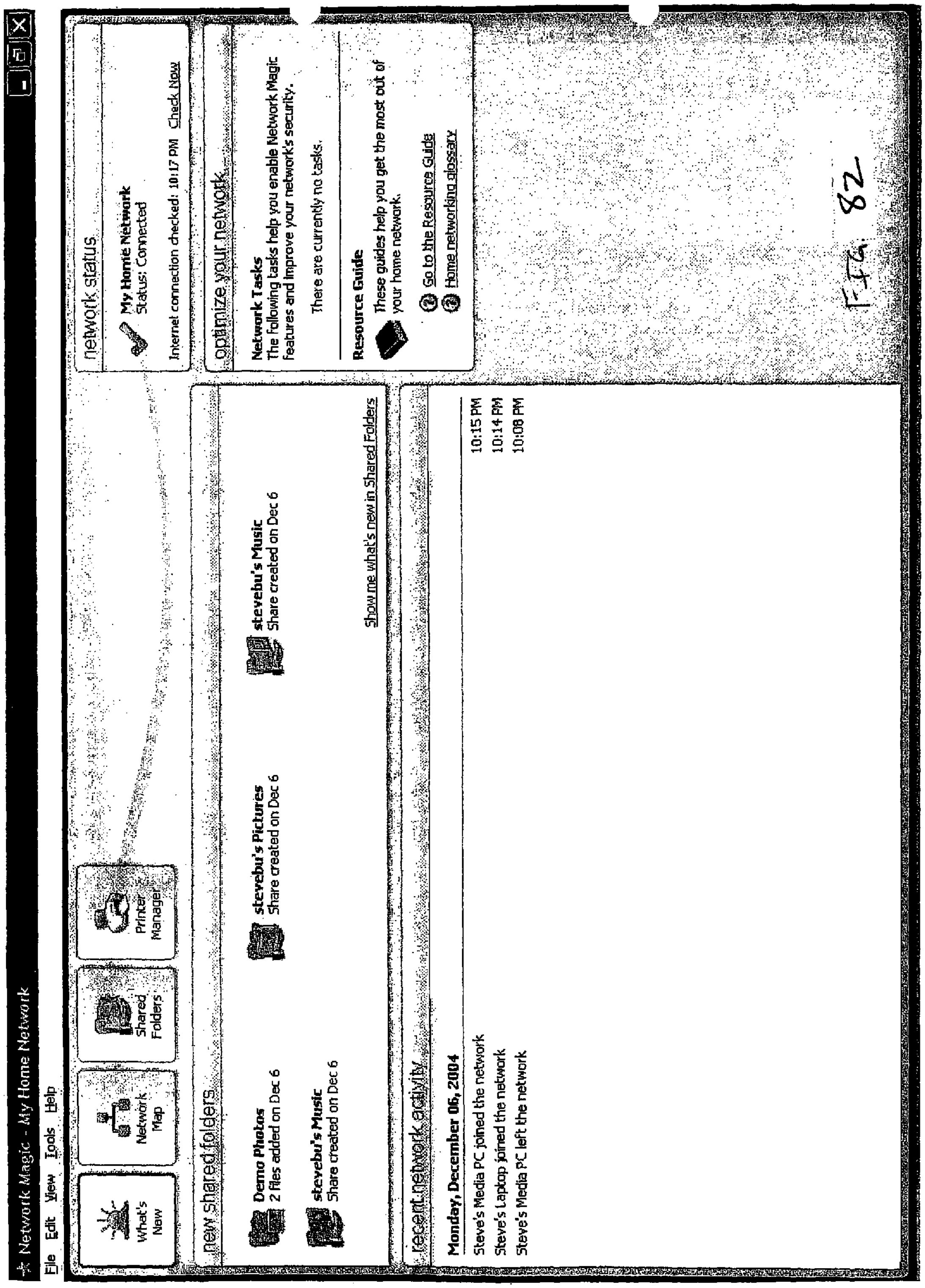
FIG. 82 illustrates a user interface that may be provided according to various aspects of the invention identifying computers that have recently joined or left the network.
Figure 83:
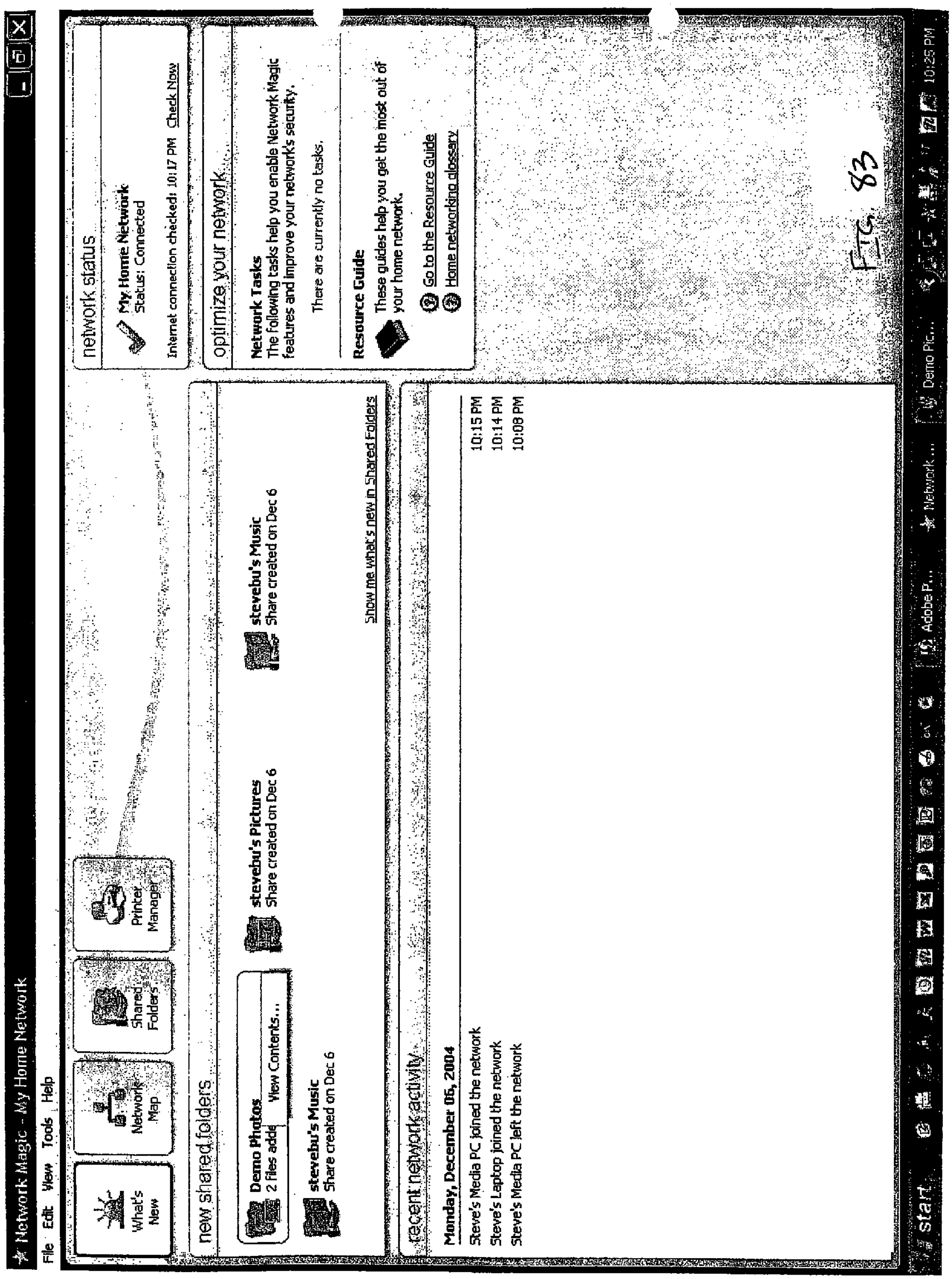
FIG. 83 illustrates a user interface that may be provided according to various aspects of the invention allowing a user to execute one or more tasks regarding a selected folder.

If the new information selection button 2713 is employed, the user interface may provide one or more primary display areas to display recent changes or activities in the network. For example, as shown in FIG. 81, the user interface may display a primary display area 8101 entitled “new shared folders.” This display area will then show folders that have recently been shared among the trusted association of tools in the network. The user interface may also provide another primary display 8103 listing recent network activity. For example, as illustrated in FIG. 82, the primary display area 8103 may identify computers that have recently joined or left the network, and indicate the times and/or dates at which these computers joined or left the network. As illustrated in FIG. 83, selecting a folder in the primary display area may allow the user to execute one or more tasks regarding the selected folder, such as to view the contents of the folder.

Figure 84:
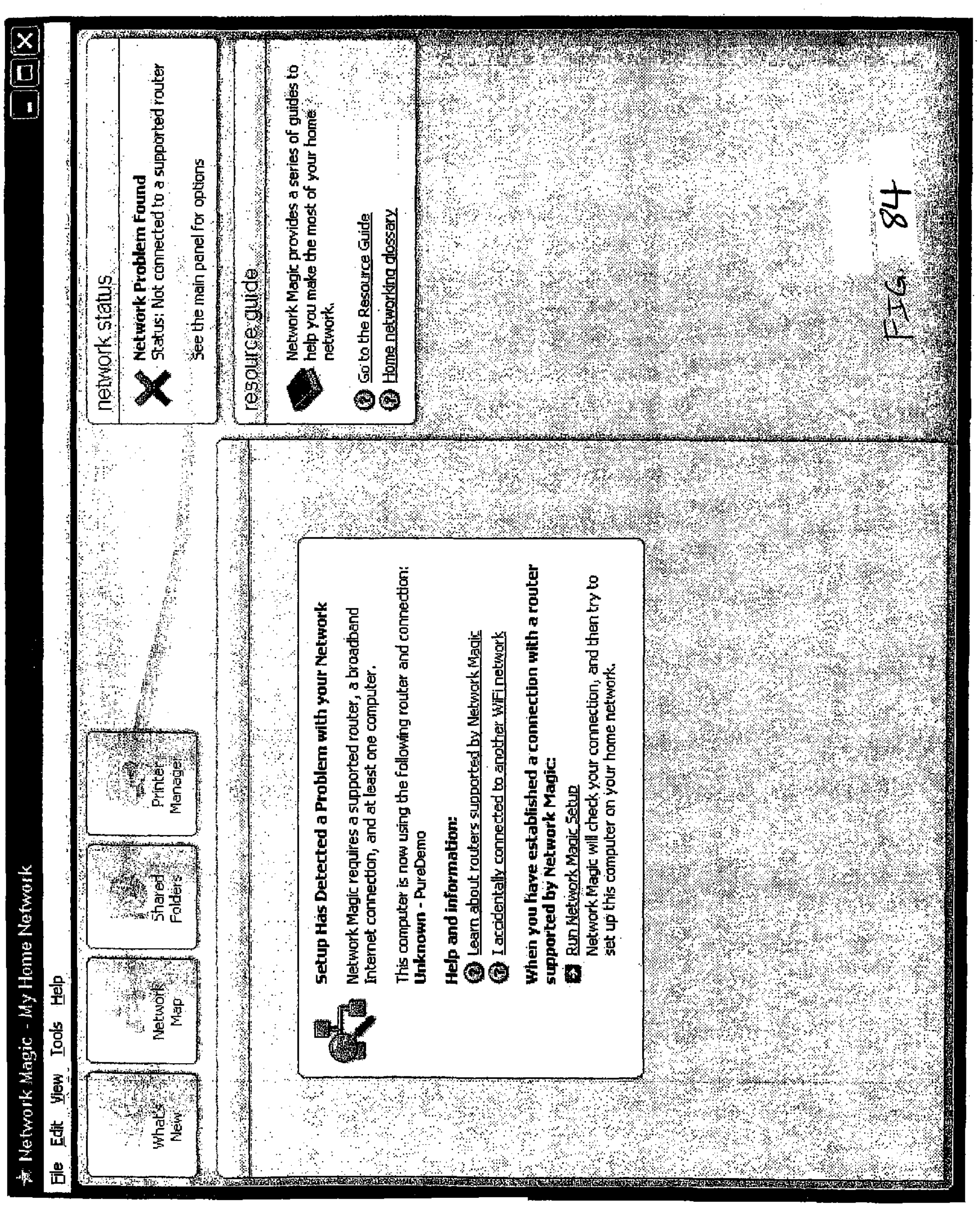
FIG. 84 illustrates a user interface that may be provided according to various aspects of the invention indicating that a network management tool cannot establish a connection to the network.
Figure 85:
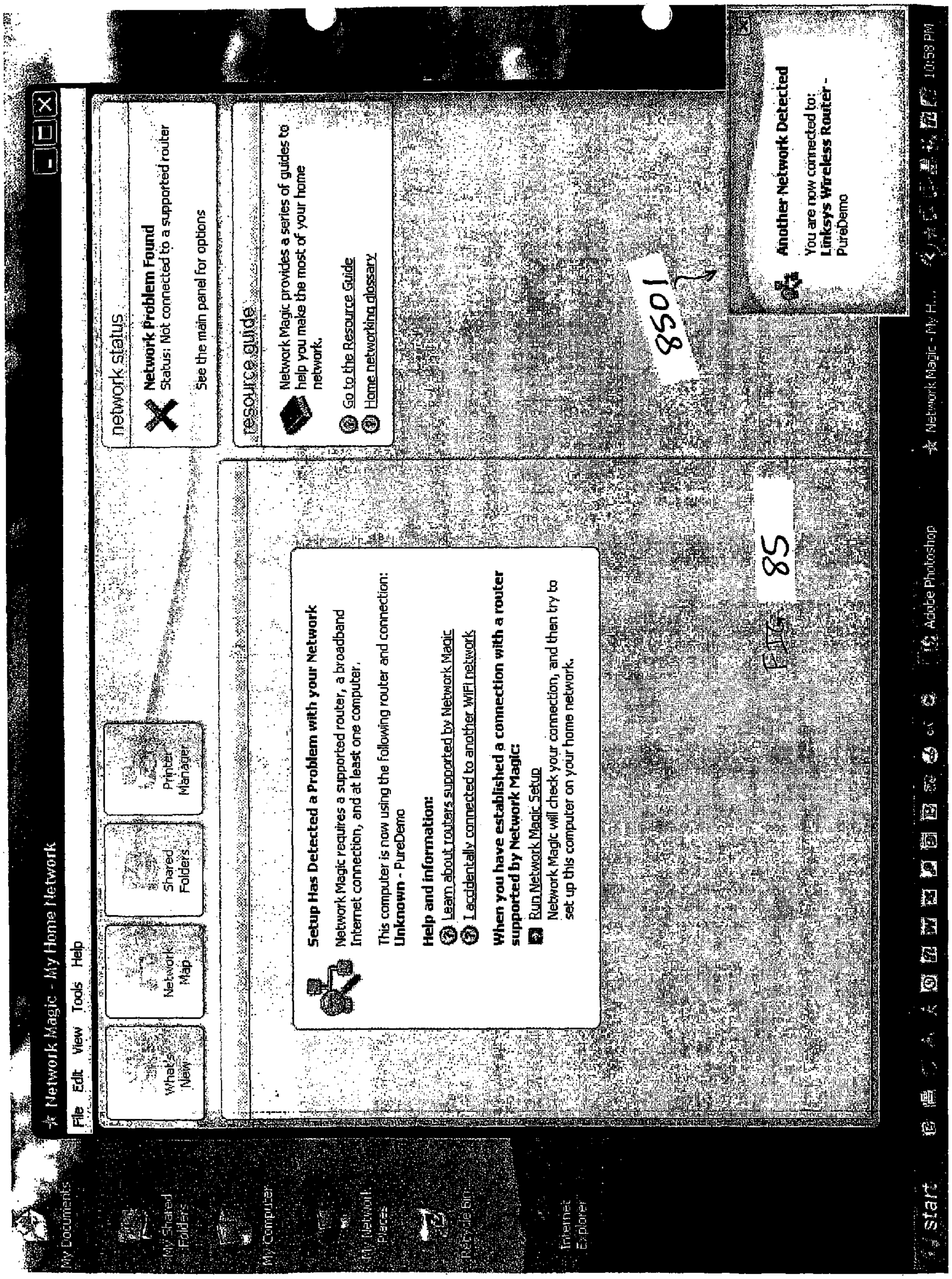
FIG. 85 illustrates a user interface that may be provided according to various aspects of the invention indicating the inadvertent detection of another network.

If the tool cannot establish a connection to the network after having been initially installed and configured, it may provide a user interface indicating the problem to the user. An example of one such interface is shown in FIG. 84. As seen in this figure, the primary display area indicates that a problem has been detected with the network. If, for example, the problem is the inadvertent detection of another network (such as though a wireless network signal), various embodiments of the invention may provide a notification message to this effect, such as the notification message 8501 illustrated in FIG. 85.

Figure 86:
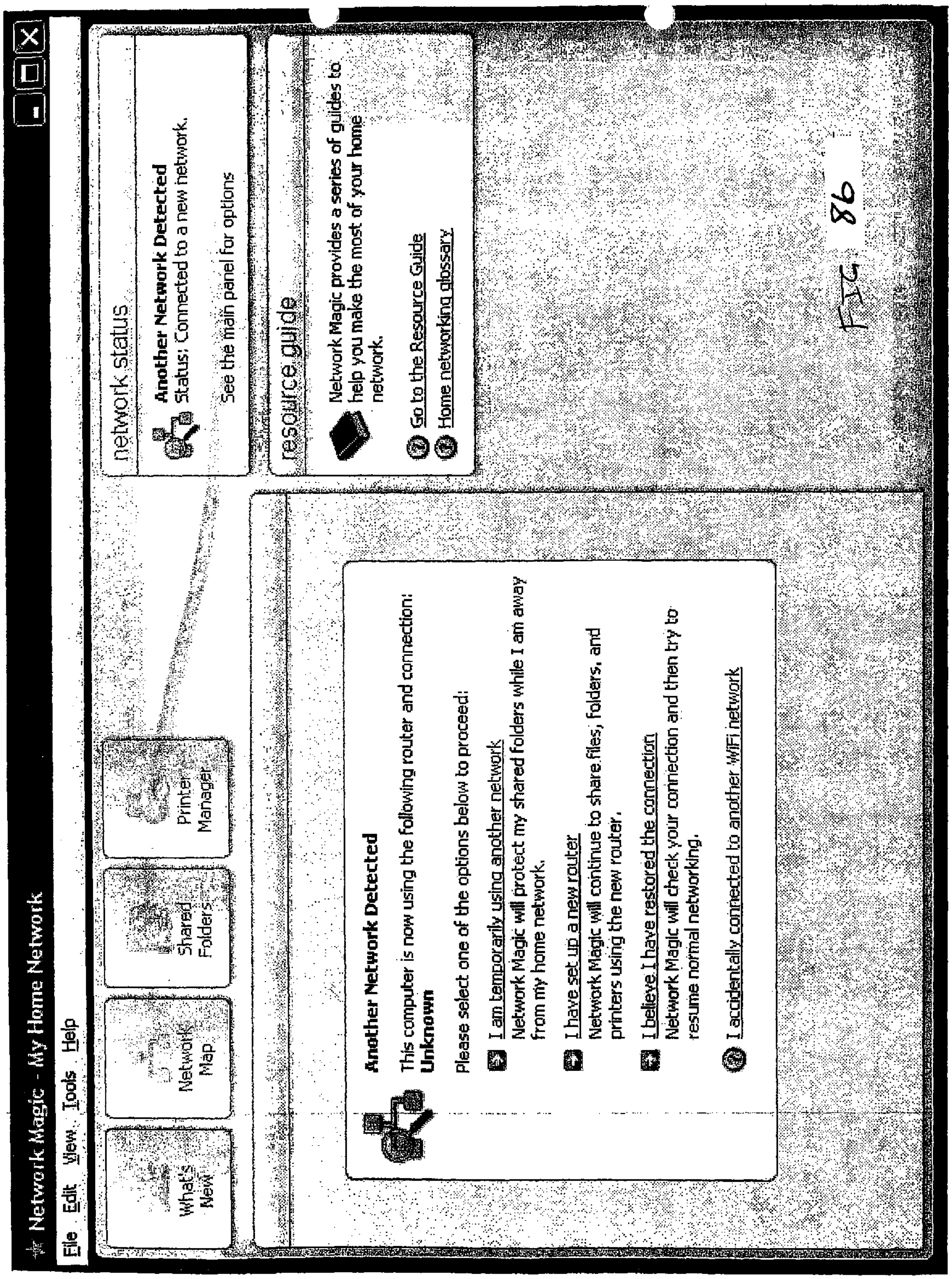
FIG. 86 illustrates a user interface that may be provided according to various aspects of the invention with a list of suggestions for proceeding in view of the detection of a new network.
Figure 87:
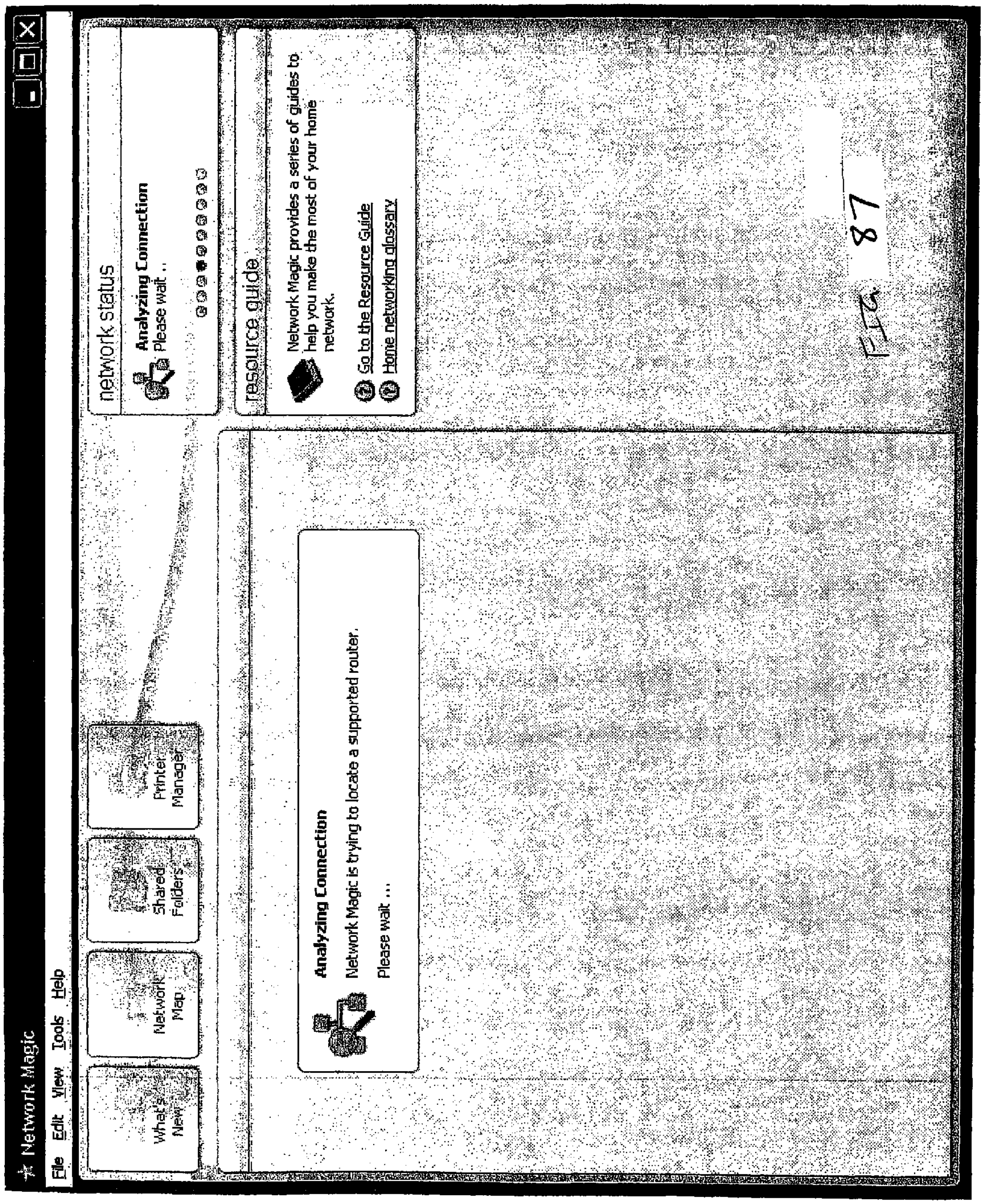
FIG. 87 illustrates a user interface that may be provided according to various aspects of the invention indicating that a network management tool is attempting to recognize the reestablished communication with the network.
Figure 88:
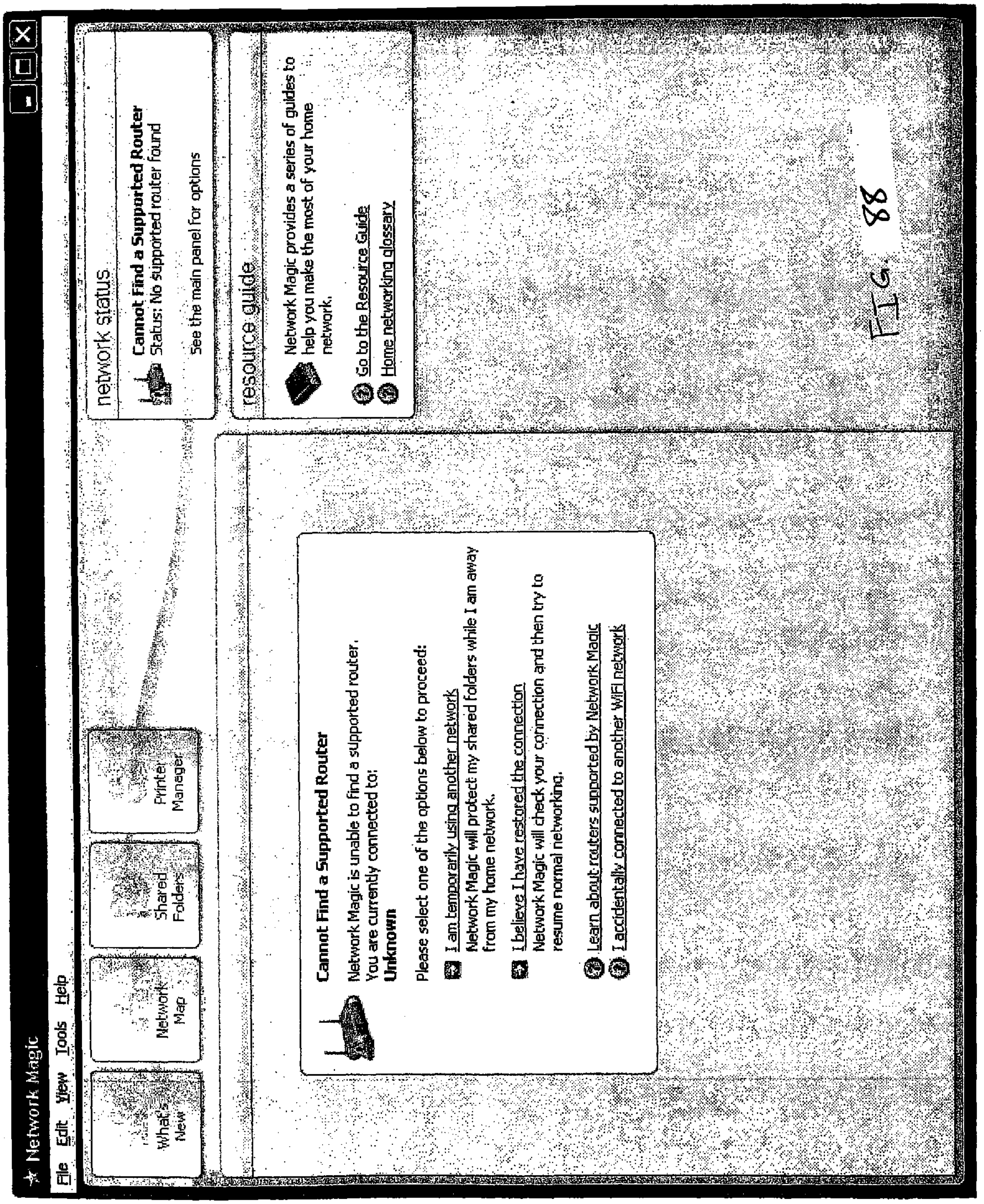
FIG. 88 illustrates a user interface that may be provided according to various aspects of the invention alerting a user that a network management tool cannot locate a router that is supported by the tool.
Figure 89:
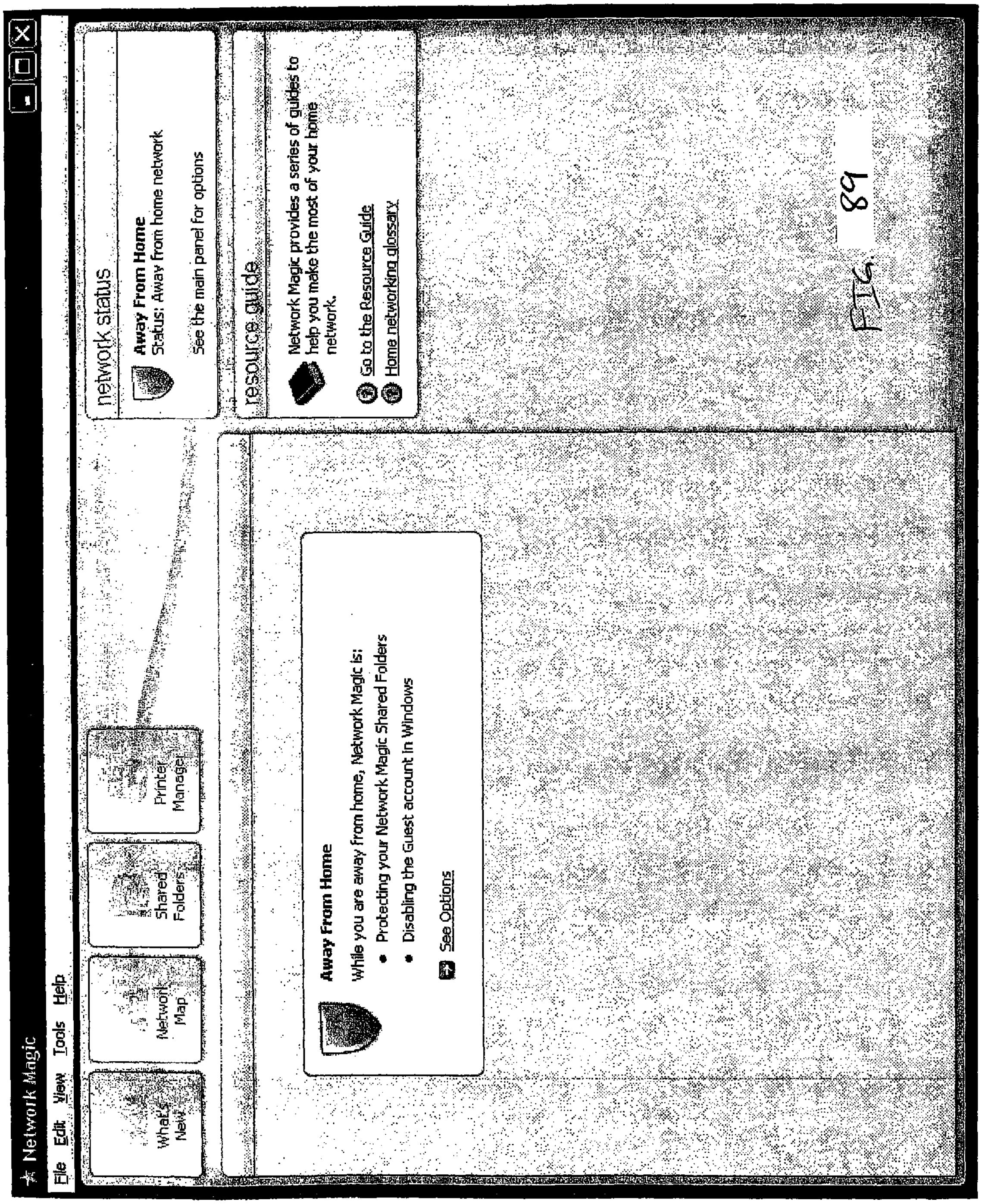
FIG. 89 illustrates a user interface that may be provided according to various aspects of the invention indicating that a network management tool has determined that the host computer is outside of the home network.

Further, upon completion of the notification, the primary display area may then indicate that another network is detected, and provide the user with a list of suggestions for proceeding in view of the detection of the new network. One example of such an interface is shown in FIG. 86. If the user believes that the network connection has been reestablished, the user can, for example, activate a control to attempt to recognize the reestablished communication with the network. One example of a user interface that may be employed to indicate that the tool is undergoing this process is illustrated in FIG. 87. If for example the tool cannot locate a router that is supported by the tool, various embodiments of the invention may provide a user interface, such as the user interface shown in FIG. 88, alerting the user of this problem. Still further, if the tool determines that the user’s host computer is outside of the home network, the primary display area may simply display a message indicating this to the user, as illustrated in FIG. 89.

Figure 90:
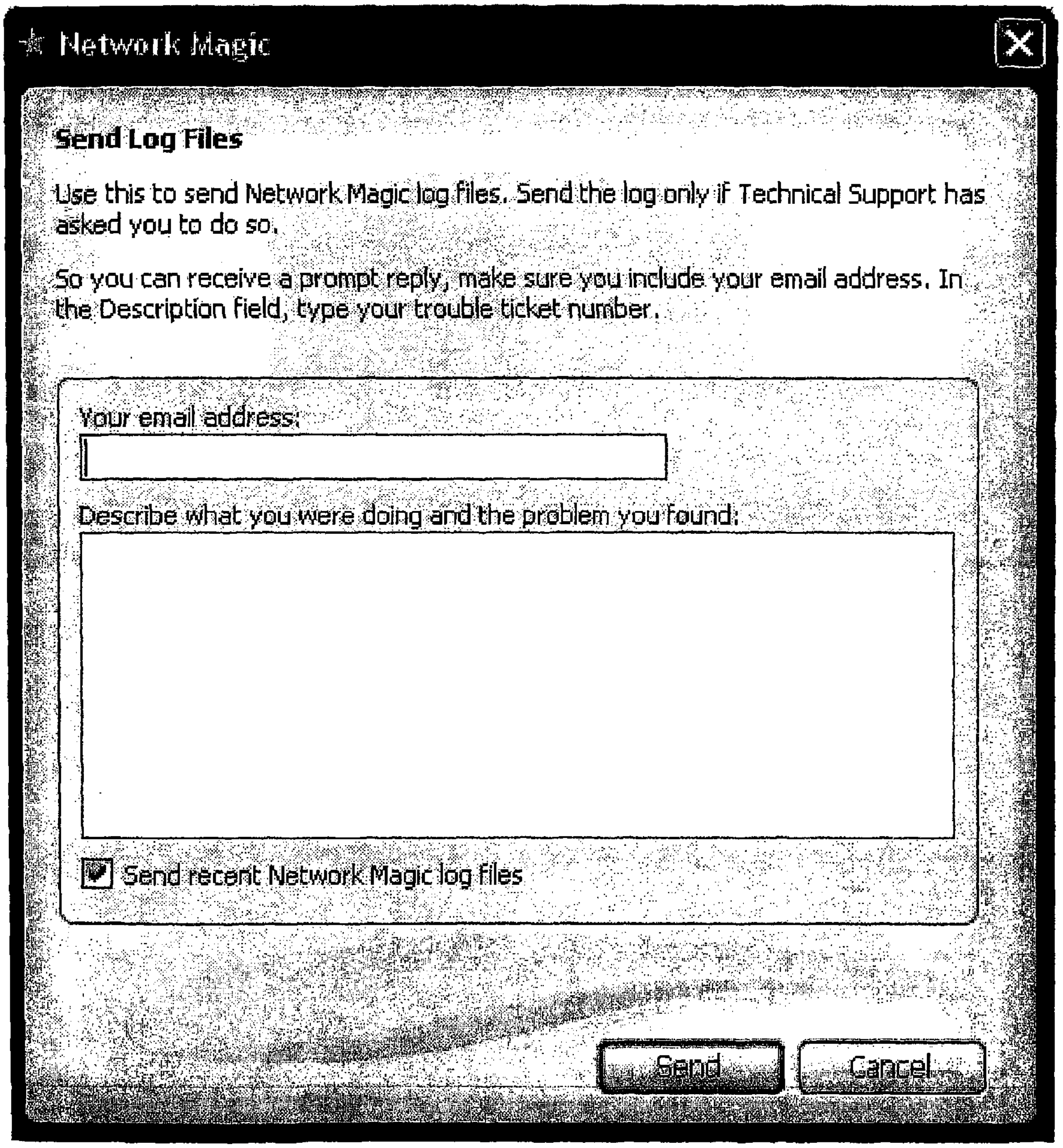
FIG. 90 illustrates a user interface that may be provided according to various aspects of the invention to allow a user to send log files associated with the tool to a technical support consultant.
Figure 91:
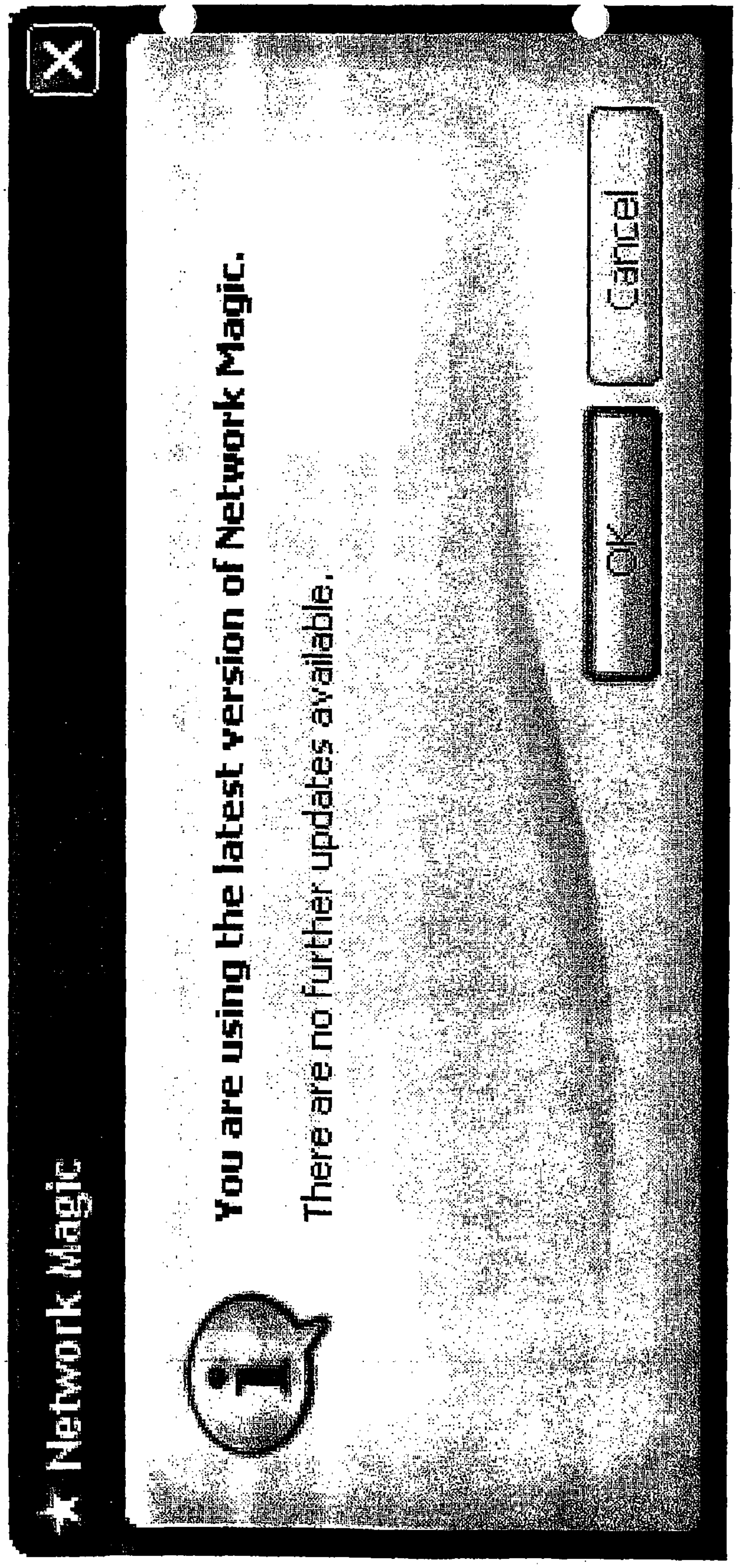
FIG. 91 illustrates a notification message that may be provided according to various aspects of the invention if the user wishes to confirm that the current version of the tool is the most up-to-date.
Figure 92:
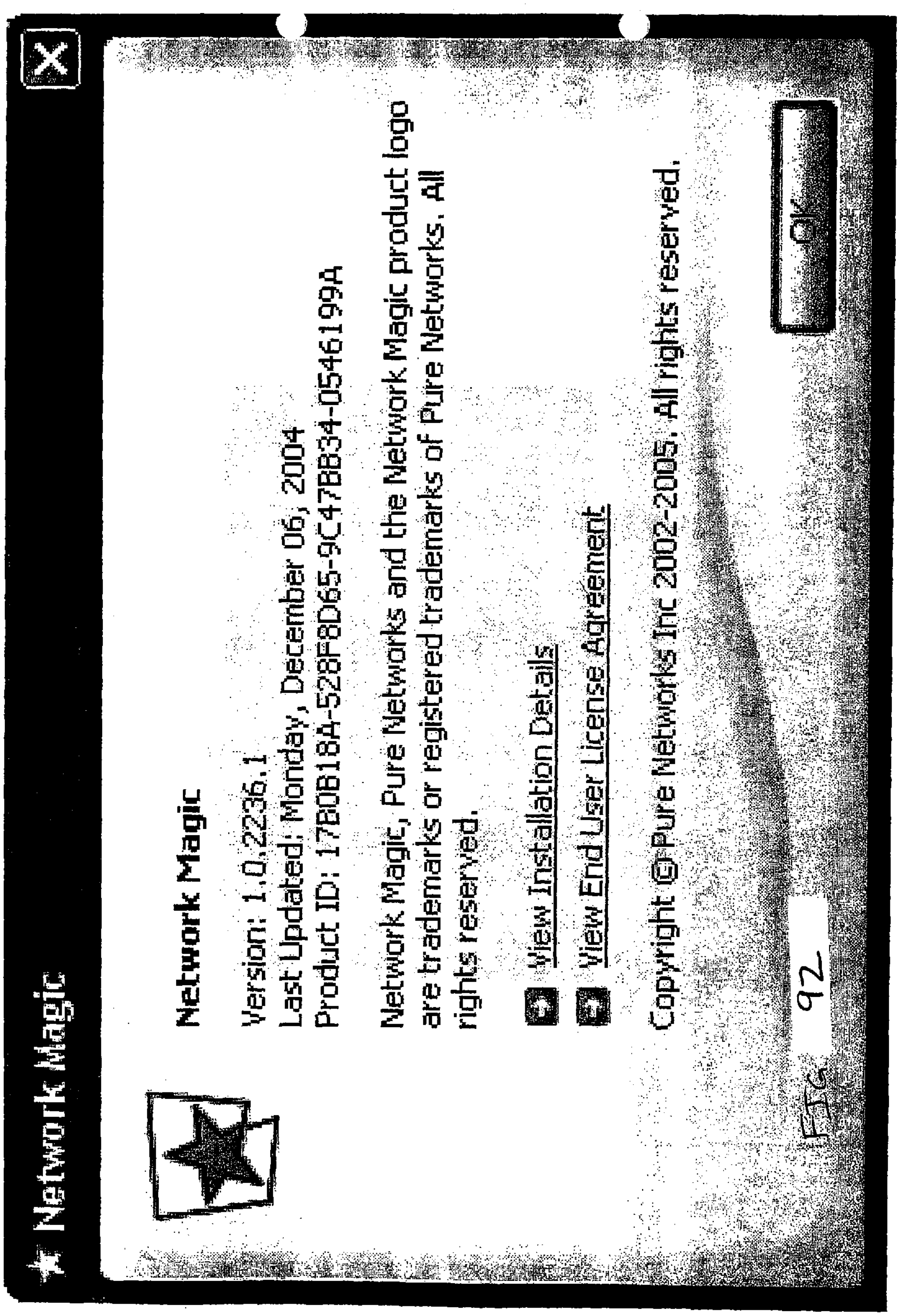
FIG. 92 illustrates a notification that may be provided to a user according to various aspects of the invention indicating version update and product identification information.

Various embodiments of the invention may additionally provide different user interfaces to assist a user in employing the tool. For example, FIG. 90 illustrates a user interface that may be provided to allow a user to send log files associated with the tool to a technical support consultant. The interface includes a control for the user to enter an email address, and a control allowing the user to provide a brief description of the nature of the problem. FIG. 91 then illustrates a notification message that may be provided if the user wishes to confirm that the current version of the tool is the most up-to-date, while FIG. 92 illustrates a notification that may be provided to a user indicating version update, and product identification information.

Figure 93:
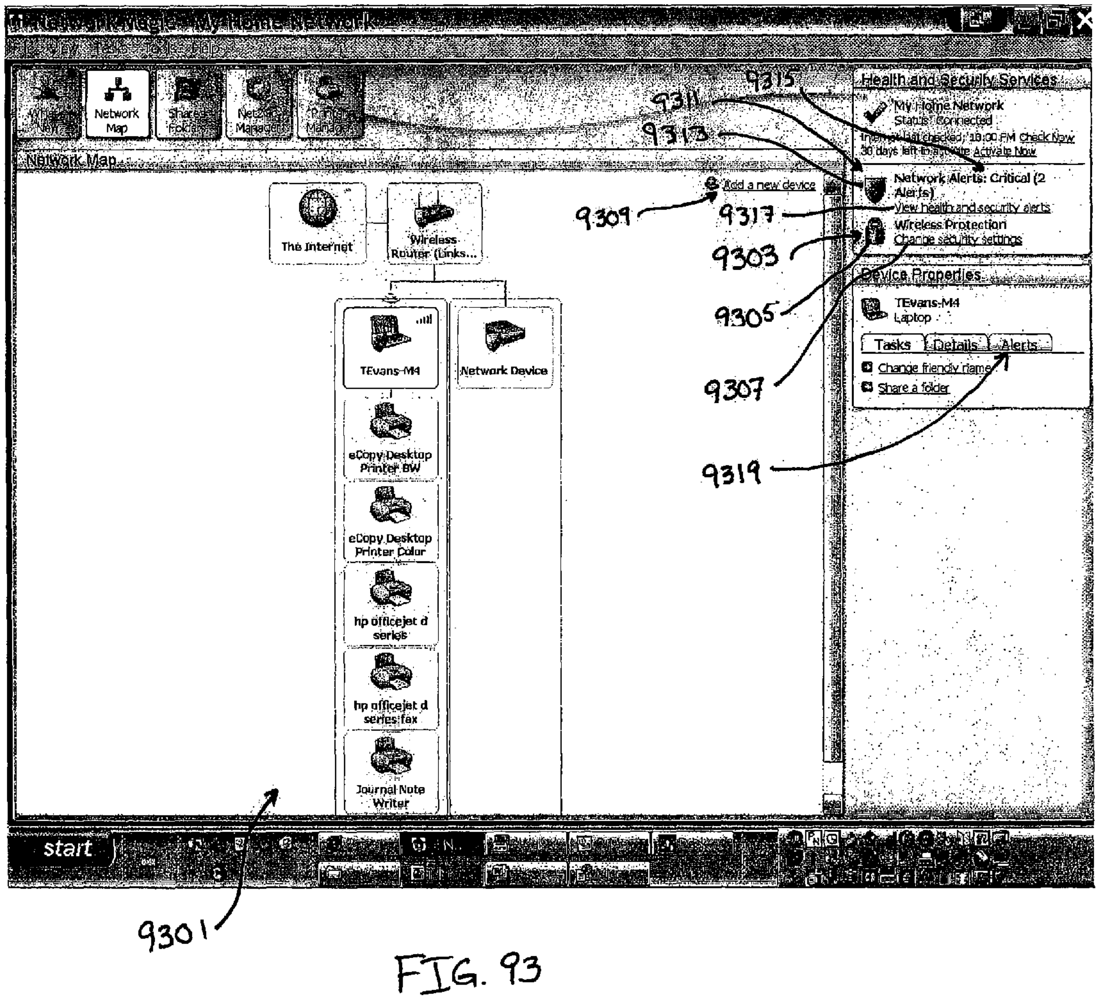
FIG. 93 illustrates a user interface including a wireless network protection control that may be provided according to various aspects of a network management tool according to the invention.

As previously noted, various implementations of a network management tool according to the invention may assist a user in establishing and maintaining security of the network. For example, FIG. 93 illustrates a user interface 9301 that includes a wireless network protection control 9303. The wireless network protection control 9301 includes an indicator 9305 and a settings control 9307. With various examples of the invention, the indicator 9305 may have three states. In the illustrated example, the indicator 9305 displays a closed, "clear" padlock, indicating that the network is not employing a wireless gateway device, the wireless features of the wireless gateway device are not currently enabled, or the wireless gateway device does not support the wireless network protection features provided by the network management tool. With some embodiments of the invention, the indicator 9305 may alternately display an open padlock with a red "X" in the center to indicate that the network is unprotected and open to intruders, or a closed padlock with a green "check" in the center to indicate that the network is using some type of protection. Of course, other images may be displayed by the indicator 9305. Further, the indicator 9305 may display additional images to indicate the type of network protection established and being maintained by the network management tool (e.g., whether the protection is MAC filtering by the network gateway device, not broadcasting the SSID, or a combination of both).

Figure 94:
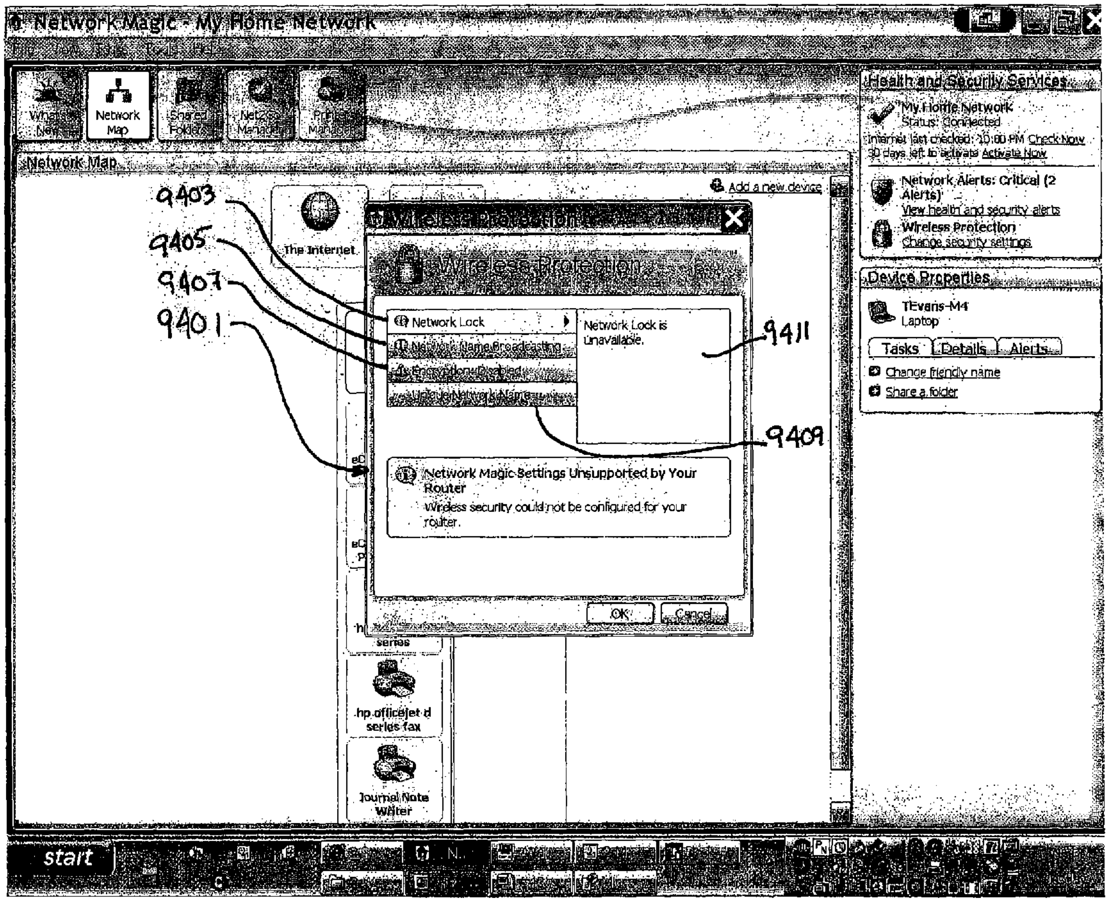
FIG. 94 illustrates a wireless protection user interface that may be provided according to various aspects of the invention if a user activates a settings control in the user interface of FIG. 93.

If the user wishes to change the security setting for the network the user can activate the settings control 9307. In response, the tool may display the wireless protection user interface 9401 illustrated in FIG. 94. As seen in this figure, the interface 9401 includes a network lock control 9403, a network name broadcasting control 9405, an encryption indicator 9407, a network name indicator 9409, and a status change control 9411.

If the user activates the network lock control 9403, then the status change control 9411 displays a selection control, such as a "check" box, that allows the user to configure the gateway device to employ MAC filtering to secure the network. More particularly, if the user selects to use MAC filtering, then the intruder detection module 1009 will configure the gateway device to exclude devices that have been indicated as "intruder" from the accessing the network. The intruder detection module 1009 may configure the gateway device using, e.g., the gateway device-specific driver previously selected for controlling the gateway device, as discussed in detail above. With alternate examples of the invention, however, the intruder detection module 1009 may interact with a control page (e.g., an HTML page) provided by the gateway device to initiate MAC filtering.

For example, the intruder detection module 1009 will examine the data object of each device in the network to identify devices that have been identified as "trusted." It then obtains the MAC address for each of those devices, and provides them to the gateway device. The gateway device will then exclude devices having any other MAC address from accessing the network. Thus, if any "intruder" devices are in the network when the MAC filtering is activated, then these "intruder" devices will be immediately evicted from the network. Further, new devices that have not previously been designated as "trusted" devices will not be allowed to join the network. It should be noted that, when an intruder device is evicted from off the network, the network map 2721 may then display the intruder device as "offline." The "intruder" device may then be kept on the map so its status can be tracked (e.g., whether or not it rejoins the network). Alternately or additionally, the display of the "intruder" device may be specifically removed from the network map 2721 by the user.

If, on the other hand, the user activates the network name broadcasting control 9405, then the status change control 9411 displays a selection control, such as a "check" box, that allows the user to configure the gateway device to refrain from broadcasting the SSID for the network. Again the network management tool may configure the gateway device using, e.g., the gateway device-specific driver previously selected for controlling the gateway device, as discussed in detail above, or by interacting with a control page (e.g., an HTML page) provided by the gateway The encryption indicator 9407 indicates whether or not the gateway device is employing encryption and, if so, the specific encryption technique employed. As previously noted, this information is obtained when the data object for gateway device is created. Accordingly, the encryption indicator 9407 can obtain this information from the data object for the gateway device. If the gateway device is not using encryption, then various examples of the invention may prompt the user to configure the gateway device to employ encryption to provide additional security. For example, the status change control 9411 may provide the user with instructions (or a link to instruction) on how to configure the gateway device to use encryption. With some examples of the invention, the status change control 9411 may provide the user with a link to a control page (e.g., an HTML page) provided by the gateway device for configuring the gateway device to use encryption.

Returning now to FIG. 93, the interface 9301 may include an add device control 9309. If the user activates this control, then the network tool may display a user interface querying the user as to how the new device will join the network (i.e., if the new device will be connected to the network through a wire connected or through a wireless connection). Next, the network management tool will adjust the security settings of the network based upon the manner in which the device will join the network. For example, if the device will join the network using a wireless connection, then the network management tool may temporarily allow the gateway device to broadcast the SSID. Further, the network management tool will temporarily stop the gateway device from using MAC filtering, if necessary. Also, if the gateway device is using some type of encryption, then the management tool may prompt the user to disable the use of encryption.

As a result, the network management tool will detect any new devices attempting to join the network, as discussed in more detail above. The tool will then provide an interface identifying these new devices to the user. The user can employ the interface to specifically designate which devices should be allowed to join the network. The MAC addresses for these devices are then added to the list of trusted devices employed by the gateway device for MAC filtering, and the MAC filtering is reactivated, thereby resecuring the network. In addition, each of the newly added devices may be added to the network map 2721 as also described in detail above.

As also seen in FIG. 93, the user interface 9301 may include a network alert control 9311. The network alert control includes an alert type indicator 9313, an alert number indicator 9313, and an alert control 9315. As previously discussed in detail, the networking monitoring agent 1130 of each network management tool instantiated in the network may monitor the status of various software applications (including the operating system) on its host device every, e.g. 2 seconds. This status information then may be stored, e.g., in the data object for that device, so that it is shared among all instantiations of the network management tool in the network, as also discussed above. The network management tool thus can provide the network alert control 9311 to alert a user of significant status conditions on devices across the network.

For example, the alert type indicator 9313 may be a graphical indicator to indicate the types of alert noted by the network management tool. In the illustrated example, the shield with a red "X" in the center may be used to inform the user of a critical alert when a network device has a status condition that may compromise the security of the network. A shield with an exclamation point in the center may then be used to inform the user of an urgent alert when a network device has a status condition of which the user should be aware. Further, a shield with a green "check" in the center may be used to inform that user that there are no alerts regarding status conditions detected in network devices (or when the user has already viewed any existing alerts and chosen to ignore them). The alert number indicator 9313 may then indicate that type of status alerts, and further indicate the number of alerts that the network management tool has collected from the devices on the network.

Figure 95:
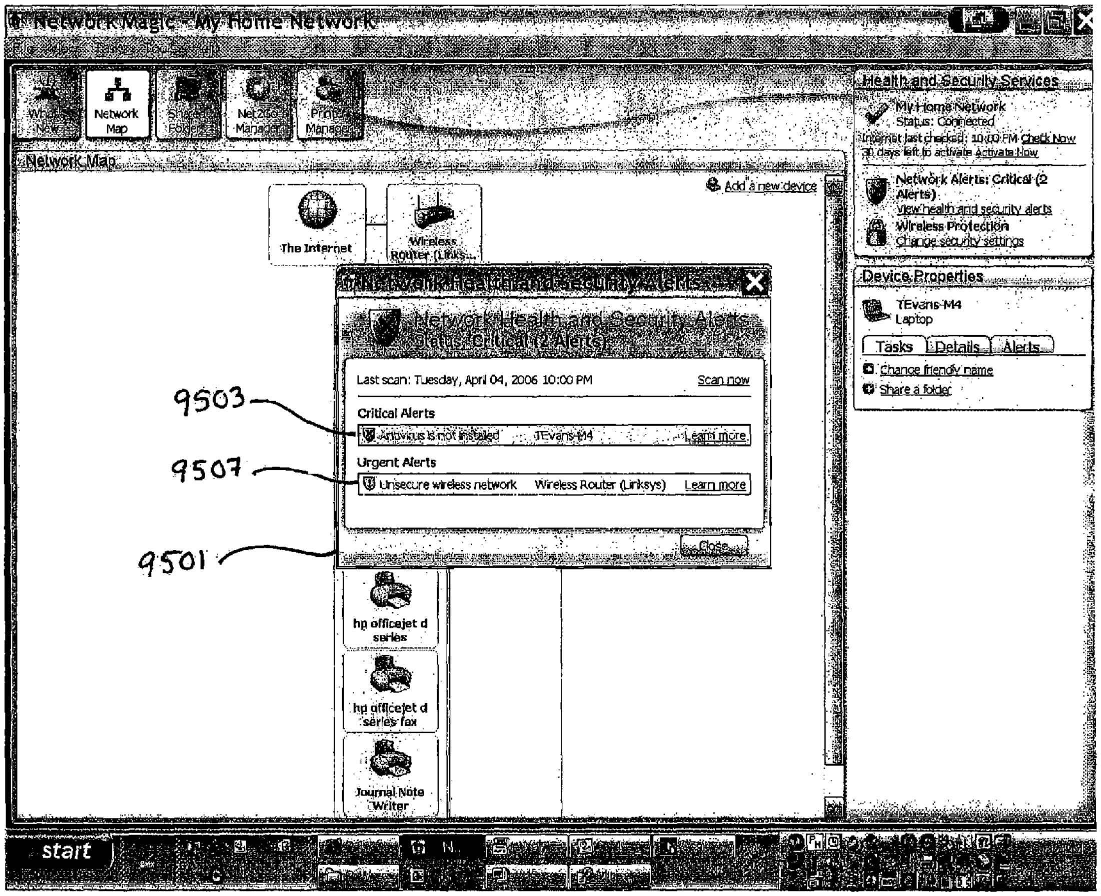
FIG. 95 illustrates an alert user interface that may be provided according to various aspects of the invention if a user activates a network alert control in the user interface of FIG. 93.

If a user wishes to learn more information about an alerted status change, then the user can activate the network alert control 9311. In response, the network management tool may display the alert user interface 9501 illustrated in FIG. 95. With some embodiments of the invention, the network management tool will provide a message with each status condition. If the status condition is favorable, then the message may be a positive or "good" message, such as an alert that antivirus software on a network device has been activated. If, however, the status condition is unfavorable, then the message may be a negative or "bad" message, such as an alert that antivirus software on a device has not been activated. For example, as seen in FIG. 95, the alert user interface 9501, the alert user interface 9501 displays an alert 9503 that antivirus software on the network device named "TEvans-M4" is not installed. It also displays an alert 9507 indicating that the gateway device named "Wireless Router (Linksys)" is not secured.

If a user wishes to change or otherwise address a status condition noted in an alert, then the user can activate a control associated with the alert. In response, the network management tool may display one or more user interfaces, referred to as "wizard screens," relating to the alert. For example, if the user wishes to address a failure to activate an antivirus software application, then the network management tool may provide a first wizard screen that invites the user to fix or ignore the problem. If the user selects to fix the problem, then the network management tool may display a second wizard screen that, e.g., provides a control to open an antivirus software application. The network management tool may then display a third wizard screen that indicates whether the antivirus software application has been successfully activated.

Table 26 illustrates the network device status conditions that may be monitored according to various examples of the invention:

TABLE 26

| HealthAlert_Type | Class | Good Text | Bad Text | Details Action | Wizard Screen #1 | Wizard Screen #2 | Wizard Screen #3 |
|---|---|---|---|---|---|---|---|
| Intruder on Network | Wireless Security | No intruders detected | Possible intruder detected | Fix | Fix/Ignore | Opens up Wireless Security Center | None |
| Not logged into Windows Networking | Network Magic | Windows Networking is available | Windows Network is not available | Learn more | Learn More/Ignore | Description + link to help topic | None |
| Anti Virus Auto Scan Disabled | Antivirus | Antivirus AutoScan is enabled | Antivirus AutoScan is turned off | Enable | Fix/Ignore | Local: Button to open AV; Remote: Message goto Local | Local: Success/Fail |
| Anti Virus Not Installed | Antivirus | Antivirus protection is enabled | Antivirus is not installed | Purchase | AV Upsell with Ignore checkbox at bottom | None | None |
| Anti Virus Not Current | Antivirus | Antivirus is current | Antivirus updates available | Update | Fix/Ignore | Local: Button to open AV; Remote: Message goto Local | Local: Success/Fail |
| Firewall Disabled | Firewall | Firewall protection is enabled | Firewall is turned off | Enable | Fix/Ignore | Local: Button to open FW; Remote: Message goto Local | Local: Success/Fail |
| Firewall Not Installed | Firewall | Firewall protection is enabled | Firewall is not installed | Purchase | FW Upsell with 2 checkboxes at bottom: Ignore, Turn on Windows Firewall (goes to Wizard #2) | Local: Button to open FW; Checkbox for Windows. Remote: Message goto Local | None |

TABLE 26-continued

| HealthAlert_Type | Class | Good Text | Bad Text | Details Action | Wizard Screen #1 | Wizard Screen #2 | Wizard Screen #3 |
|---|---|---|---|---|---|---|---|
| Network Magic Not Installed | Network Magic | Network Magic is running | Network Magic is not installed | Install | Fix/Ignore | Autoshare Network Folder with setup. Send email to link on local network | Success/Fail |
| Windows Update Not Enabled | Windows Update | Windows Update is current | Windows Update is turned off | Fix | Fix/Ignore | No Group Policy: Turn on; Group Policy: Description | Success/Fail |
| Windows Update Not Installed | Windows Update | Windows Update is current | Windows Update is not installed | Install | Learn More/Ignore | Description + link to MSFT Web Site | None |
| Windows Update Not Automatic | Windows Update | Windows Update is current | Windows Updates are not automatic | Fix | Fix/Ignore | No Group Policy: Turn on; Group Policy: Description | Success/Fail |
| Windows Update Critical Updates Available | Windows Update | Windows Update was successful | Critical Windows Updates are available | Update | Fix/Ignore | No Group Policy: Turn on; Group Policy: Description | Success/Fail |
| Windows Update Reboot Required | Windows Update | Windows Update was successful | Windows Update requires a reboot | Reboot | Fix/Ignore | No Group Policy: Turn on; Group Policy: Description | Success/Fail |
| Windows Update User Input Required | Windows Update | Windows Update was successful | Windows Update requires user input | Confirm | Fix/Ignore | No Group Policy: Turn on; Group Policy: Description | Success/Fail |
| Unsecure Network | Wireless Security | Wireless Network is secure | Unsecure wireless network | Fix | Fix/Ignore | No wireless: Description + Help; Wireless: Button to Launch Wireless Security Center | None |
| Network Magic Updates Available | Network Magic | Network Magic is current | Network Magic Updates available | Upgrade | Fix/Ignore | Trigger Remote download of Network Magic updates | Success/Fail |

This table also shows the type or "class" of each status condition that is monitored, the "good" and "bad" text associated with each condition, and the action to be taken to address each status condition if unfavorable. Still further, Table 26 includes the wizard screens displayed for each status condition. As seen from the table, various embodiments of the invention may monitor and provide alerts on the presence and status of antivirus software on each computer in the network, the presence and status of a software firewall on each computer in the network, the status of Microsoft Windows security updates on each computer in the network, the version of the network management tool on each computer in the network, the presence of intruders on the network (which may be obtained from the intruder detection module discussed above), the status of the network's security (if wireless).

It should be noted that, with various examples of the invention, an alert for a status condition in a network device may also be viewed with the other information related to that device. For example, as discussed in detail above, a user may view specific information about a network device by selecting that device in the network map 2172. This specific information may then include any alerts for status conditions on the network device. Thus, as shown in FIG. 93, the interface 9301 may include a tab control 9319 for viewing alerts associated with the selected device (which, in the illustrated example, is the computer entitled "TEvans-M4"). When a user selects this tab, the interface 9301 will display the alert the that antivirus software on the network device named "TEvans-M4" is not installed, together with the controls for addressing this condition, as discussed in detail above with regard to user interface 9501.

Figure 96:
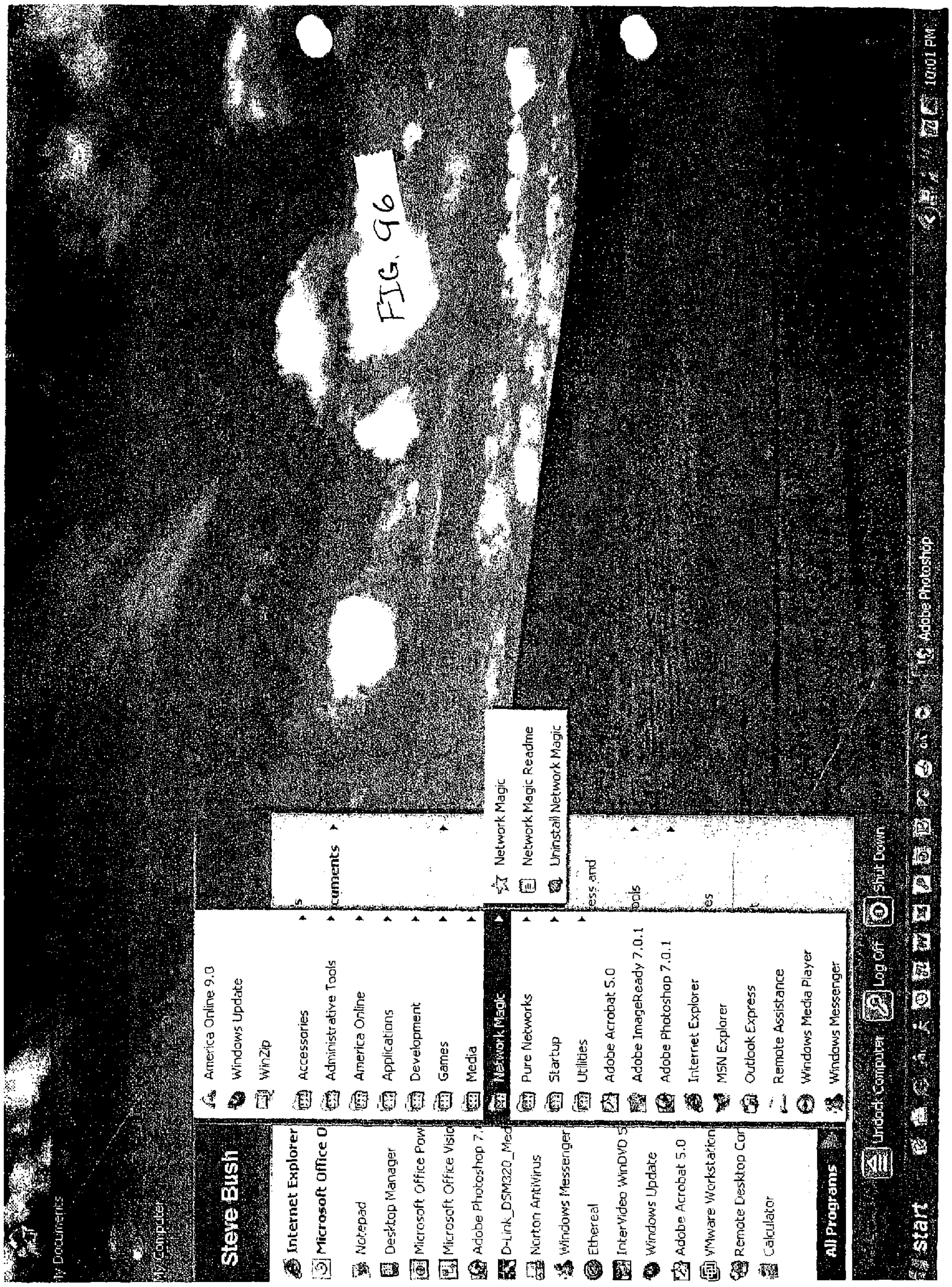
FIG. 96 illustrates how various embodiments of the invention may be launched from the general launch menu provided by a host computer's operating system.
Figure 97:
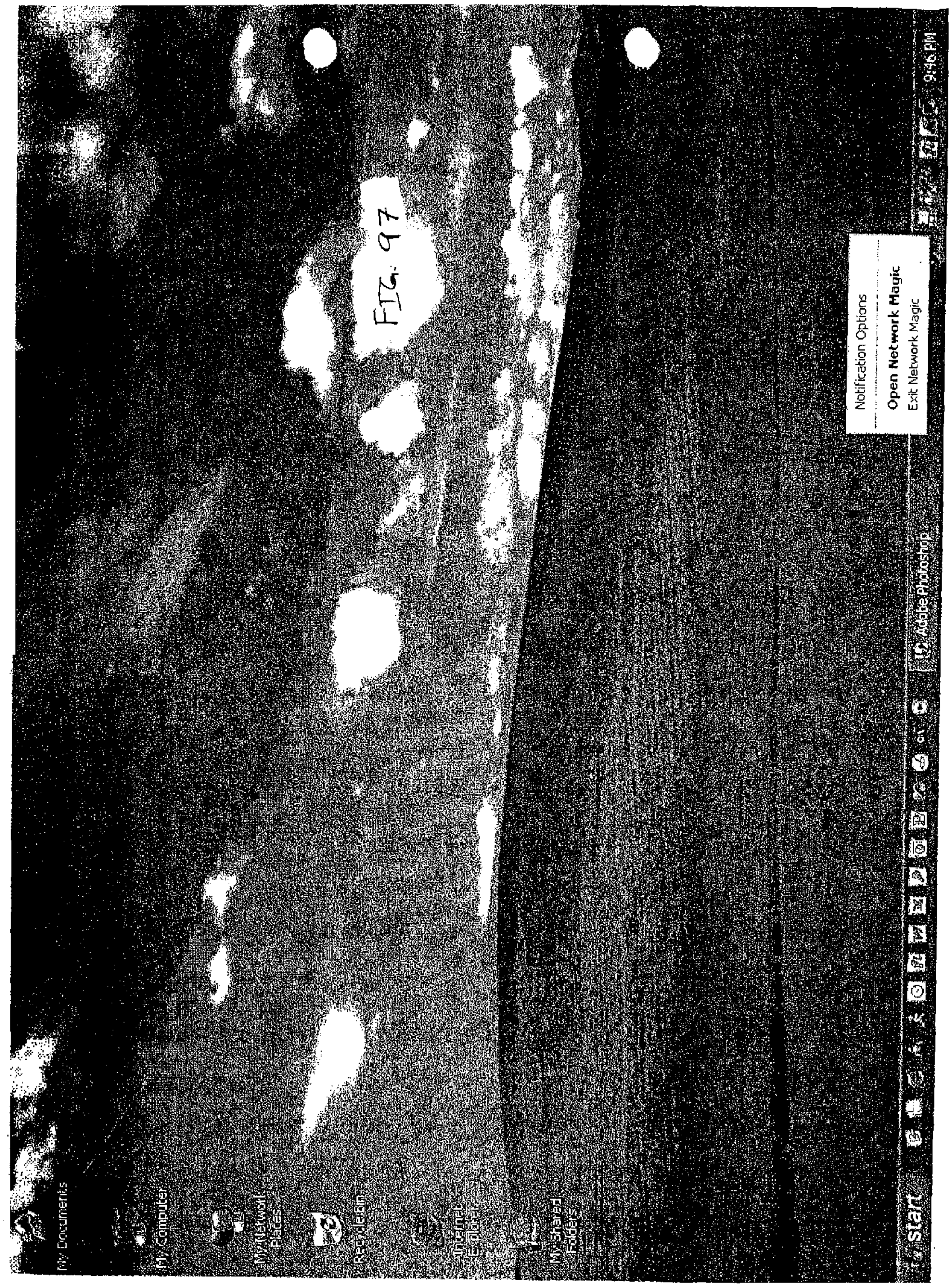
FIG. 97 illustrates a user interface that may be provided according to various aspects of the invention showing how various aspects of the invention may provide a system tray icon for launching embodiments of the invention.
Figure 9B:
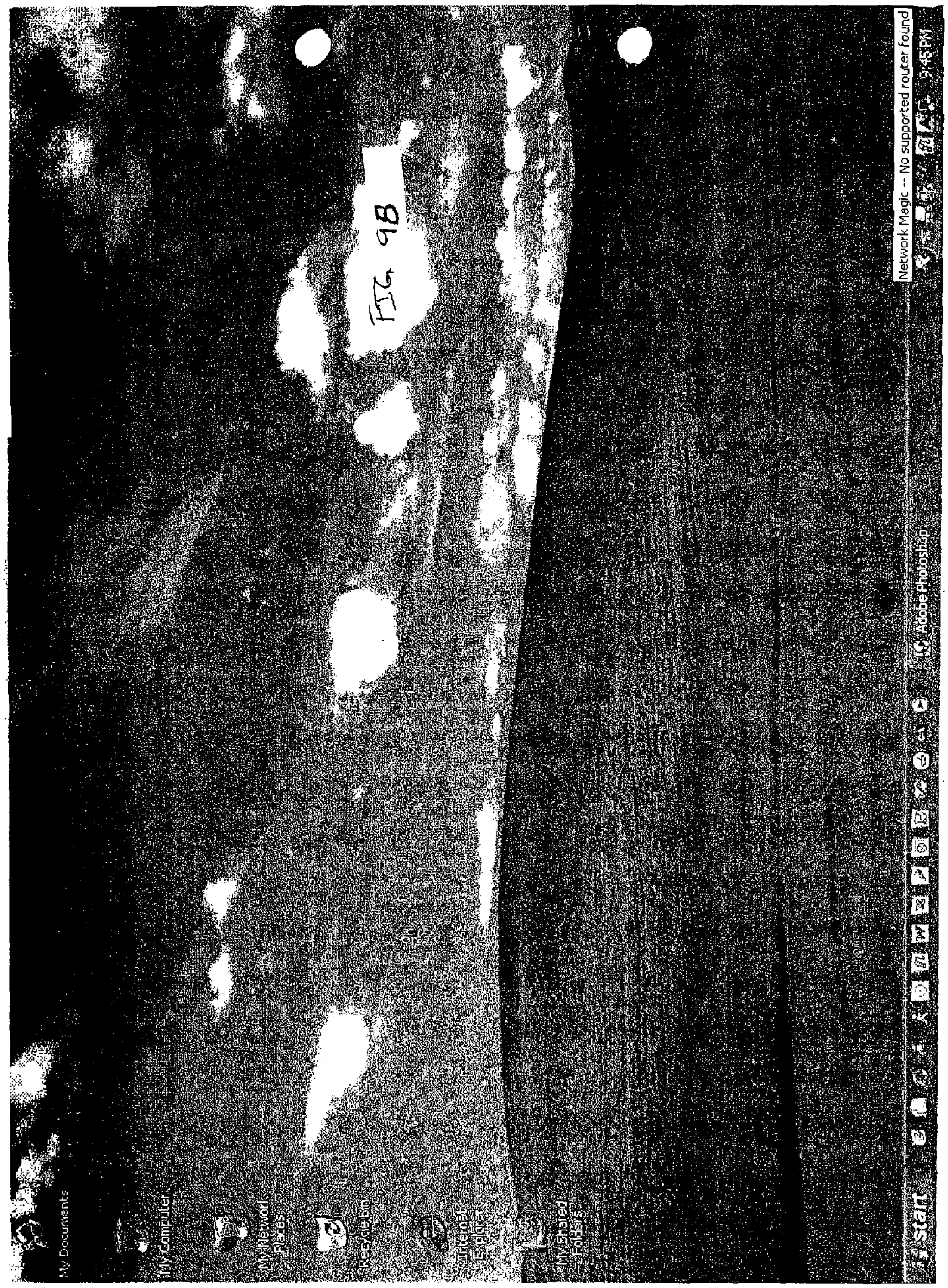

As will be appreciated by those of ordinary skill in the art, a variety of techniques can be employed to initiate an instance of the tool. For example, as shown in FIG. 96, various embodiments of the invention may be launched from the general launch menu provided by the host computer's operating system. Some embodiments of the invention may additionally provide a smaller, permanent icon {sometimes referred to as a "system tray icon") for launching an instance of the tool, such as illustrated in FIG. 97. It should also be appreciated that this system tray icon can be used to provide information to a user even without activating a fully-enabled instance of the tool. For example, as illustrated in FIG. 98, placing a pointing device over the icon may display a message relating to the status of the tool.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as described herein.

What is claimed is:

1. A method to be executed by a network management tool on a personal computer, comprising:

monitoring a first computing device and a second computing device, which are configured to achieve connectivity to a computing network via wireless connections;

determining that the second computing device is not connected to the computing network;

synchronizing a list of device operations in the second computing device with a list of device operations in the first computing device when the second computing device is connected to the computing network such that the second device has a list of device operations that occurred when the second device was offline;

receiving health or security information for the first and second computing devices to be combined and subsequently rendered on a display of the personal computer; and filtering which devices are permitted to connect to the computing network through a wireless gateway device provisioned for providing the wireless connections in a single residence of a residential environment in which the first computing device and the second computing device are operating and wherein the network management tool is configured to:

monitor a status of a connection to a printer;

monitor antivirus software operating on the first computing device and the second computing device;

detect that the antivirus software is not operational in the first computing device; and remotely fix the antivirus software of the first computing device using the network tool such that the antivirus software becomes operational.

2. The method recited in claim 1, further comprising receiving the health or security information for the second computing device from a monitoring service running on the second computing device.

3. The method recited in claim 1, further comprising receiving the health or security information for the second computing device from a monitoring service running on a third computing device connected to the second computing device.

4. The method recited in claim 3, wherein the second computing device is a computing appliance.

5. The method recited in claim 1, further comprising receiving health or security information for a third computing device connected to the computing network.

6. The method recited in claim 1, wherein the combined health and security information is displayed with a map of the computing network.

7. The method recited in claim 1, wherein the health or security information includes information relating to firewall software applications, anti-virus software applications, or other anti-malware software application.

8. The method recited in claim 1 wherein the health or security information includes information relating to operation of an operating system.

9. The method recited in claim 7, further comprising determining from the health or security information that at least one of said applications has not been installed on the second computing device.

10. The method recited in claim 9, further comprising installing said at least one application on the second computing device using at least one electronic device remote from the second computing device.

11. The method recited in claim 7, further comprising determining from the health or security information that at least one of said applications is not operational on the second computing device.

12. The method recited in claim 11, further causing said at least one application to be operational on the second computing device using at least one electronic device remote from the second computing device.

13. The method recited in claim 7, further comprising:

determining from the health or security information that at least one of said applications is not operational on the second computing device; and providing, using at least one electronic device remote from the second computing device, a recommendation for correcting a functionality or changing a status of the at least one of said applications.

14. The method recited in claim 9, further comprising providing a recommendation of said at least one application to be installed on the second computing device.

15. A network management tool resident on a personal computer and configured for:

monitoring a first computing device and a second computing device, which are configured to achieve connectivity to a computing network via wireless connections;

determining that the second computing device is not connected to the computing network;

synchronizing a list of device operations in the second computing device with a list of device operations in the first computing device when the second computing device is connected to the computing network such that the second device has a list of device operations that occurred when the second device was offline;

filtering which devices are permitted to connect to the computing network through a wireless gateway device provisioned for providing the wireless connections in a single residence of a residential environment in which the first computing device and the second computing device are operating;

monitoring a status of a connection to a printer;

monitoring antivirus software operating on the first computing device and the second computing device;

detecting that the antivirus software is not operational in the first computing device, which is a laptop; and remotely fixing the antivirus software of the first computing device using the network tool such that the antivirus software becomes operational.

16. The network management tool recited in claim 15, further configured for maintaining a list of identified member devices.

17. The network management tool recited in claim 15, further comprising a monitoring module operable to alert a user when a wireless gateway device is not using encryption.

18. The method of claim 1, wherein the printer was designated as a shared printer when the second computing device was not connected to the computing network, the method further comprising:

configuring the second computing device to use the shared printer when the second device becomes connected to the computing network.

19. The method of claim 1, further comprising:

updating, when the second computing device is connected to the computing network, the list of device operations in the first computing device with a list of device operations in the second computing device that occurred when the second computing device was not connected to the computing network.

* * * * *